Figure 4:
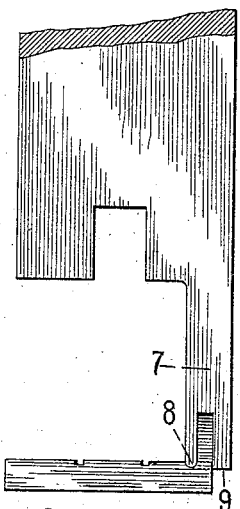

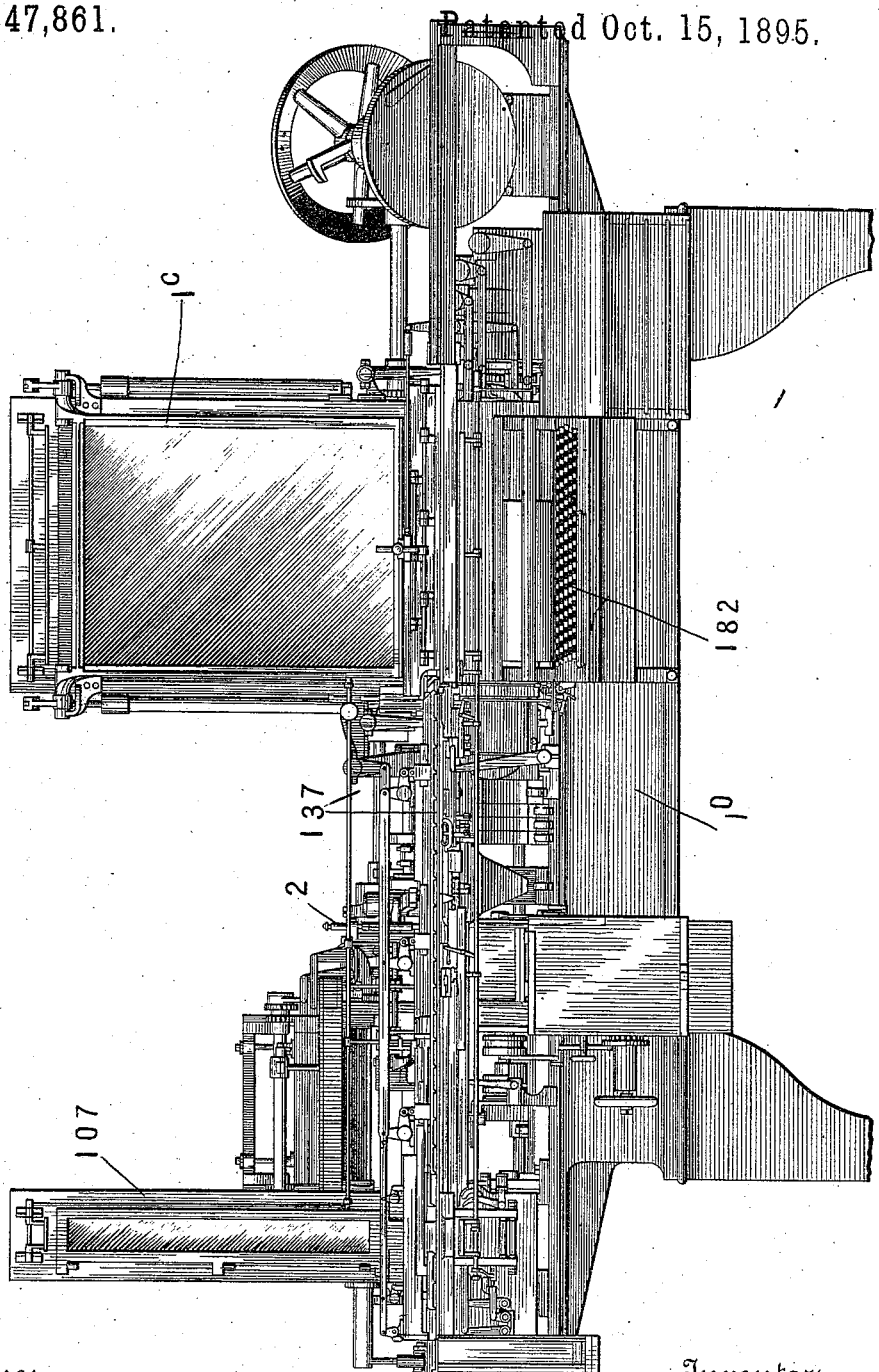

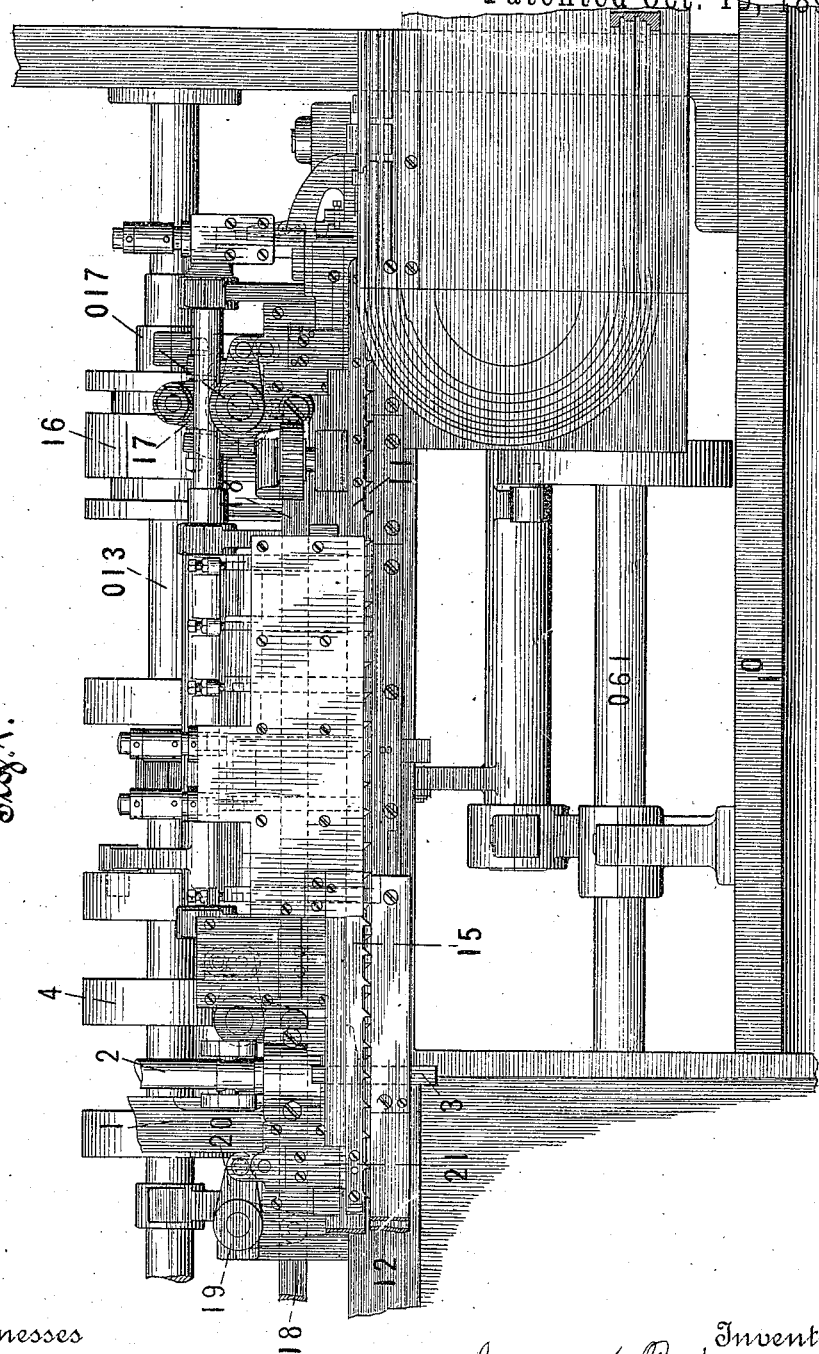

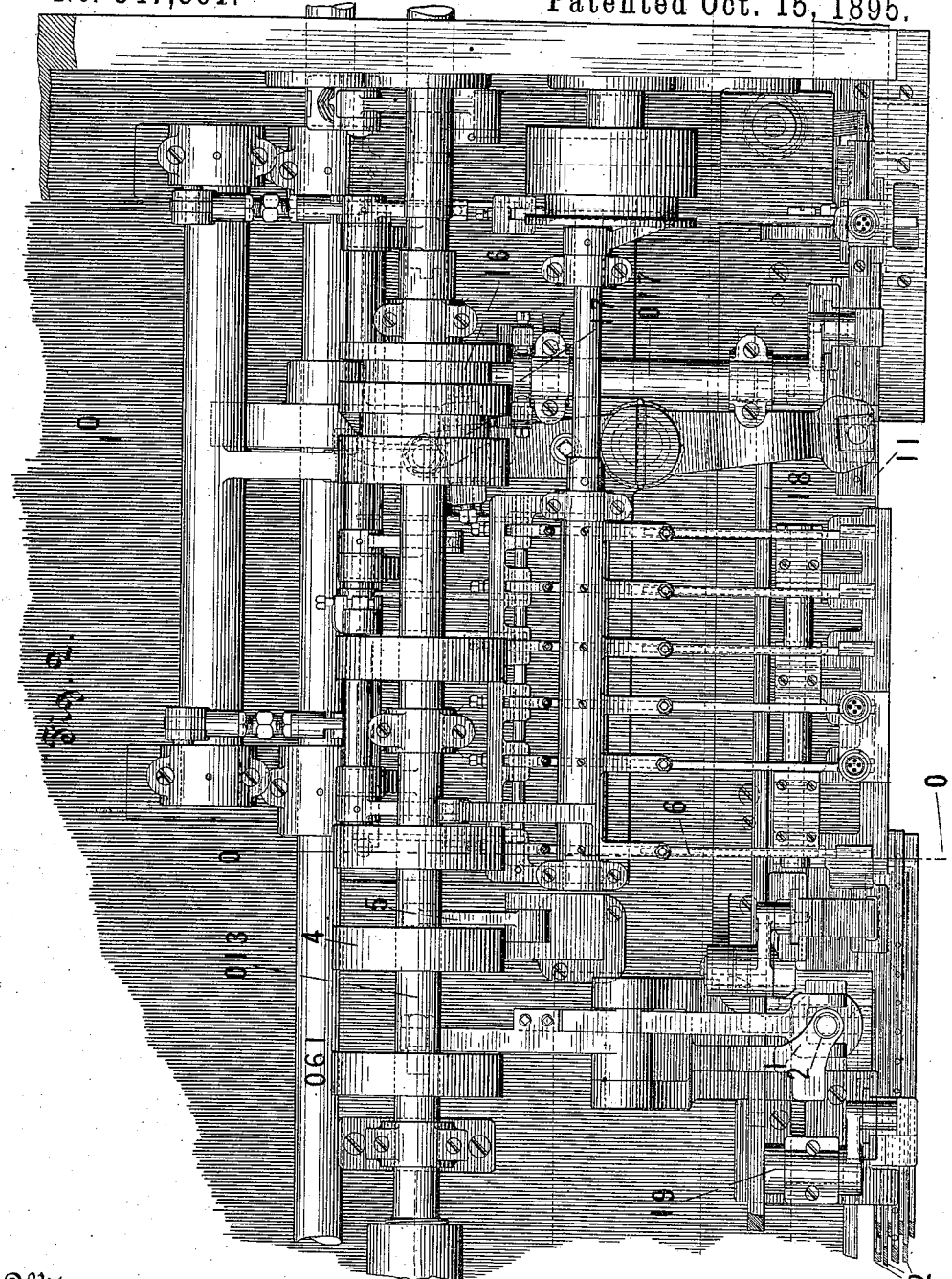

(No Model.) 81 Sheets—Sheet 4.
J. W. PAIGE & C. R. NORTH.
AUTOMATIC TYPE JUSTIFYING MACHINE.
No. 547,861. Patented Oct. 15, 1895.
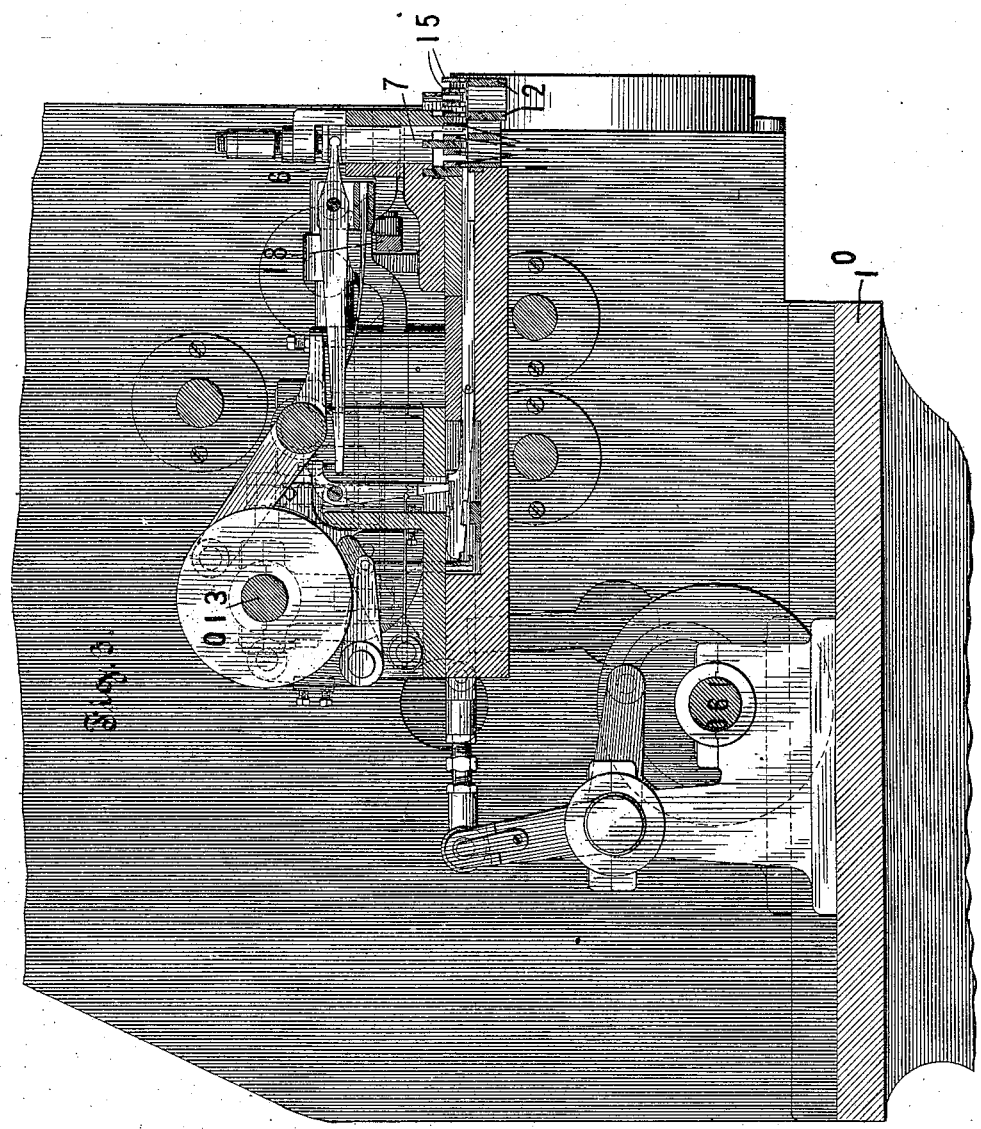
Witnesses
Fredk. H. Mills
Chas. H. Hood.
Inventors.
James W. Paige and
Charles R. North
By their Attorney
David H. Fletcher.

(No Model.)　　　　　　　　　　　　　　　　　　　　81 Sheets—Sheet 5.

J. W. PAIGE & C. R. NORTH.
AUTOMATIC TYPE JUSTIFYING MACHINE.

No. 547,861.　　　　　　　　　　　　　Patented Oct. 15, 1895.

Witnesses
Fred'k H. Mills.
Chas. H. Hood.

Inventors.
James W. Paige and
Charles R. North
By their Attorney
David H. Fletcher.

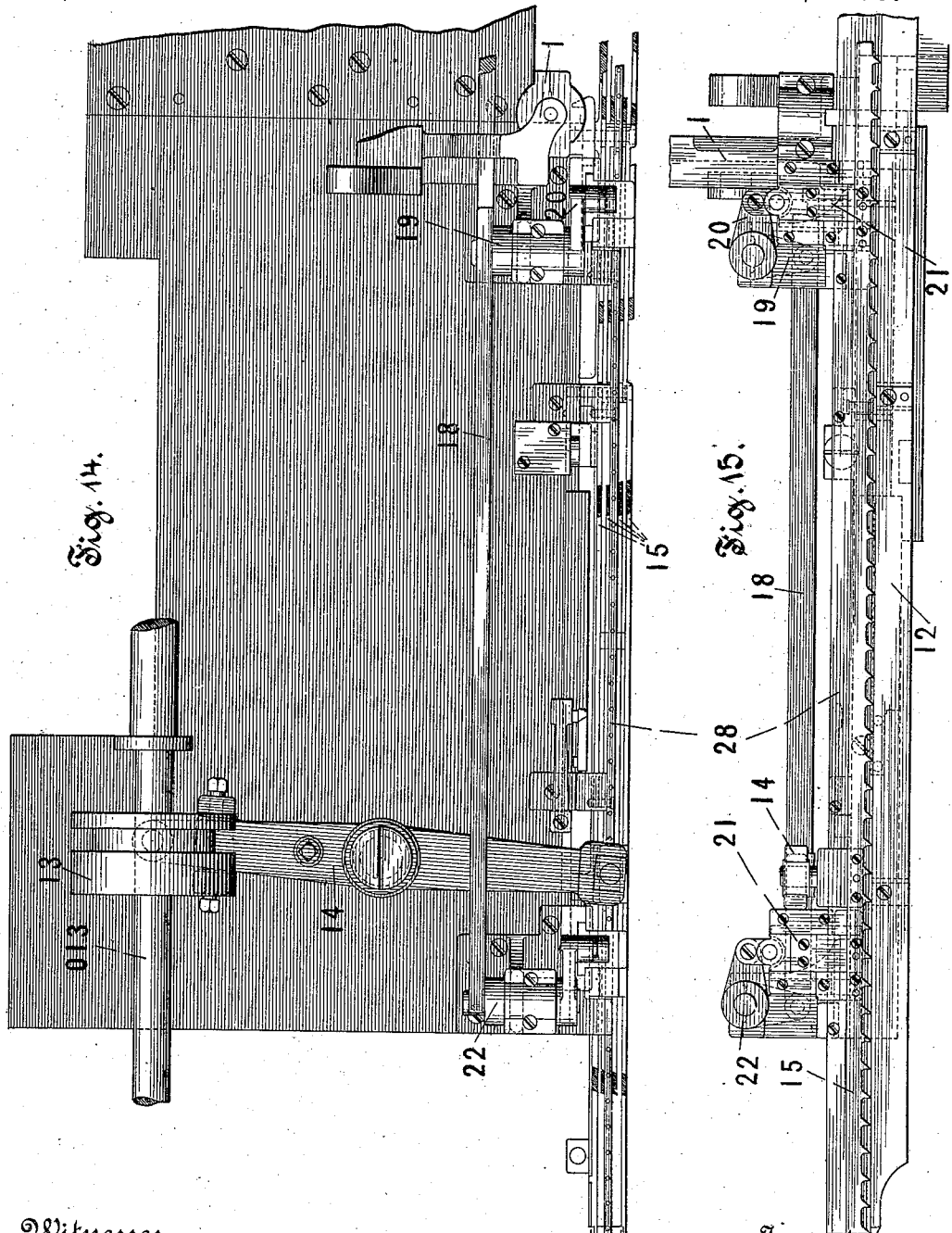

(No Model.) 81 Sheets—Sheet 7.
J. W. PAIGE & C. R. NORTH.
AUTOMATIC TYPE JUSTIFYING MACHINE.
No. 547,861. Patented Oct. 15, 1895.
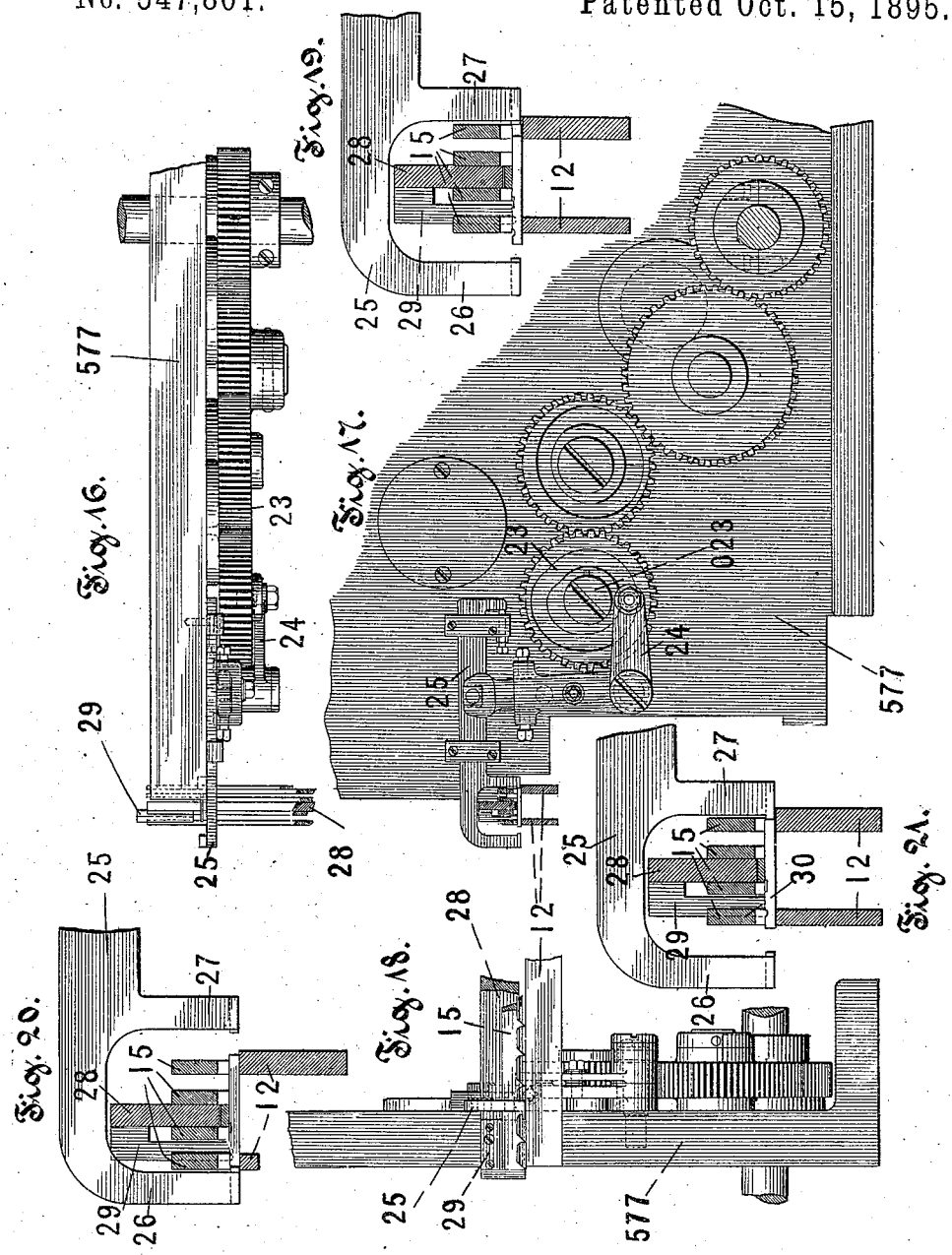
Witnesses
Fredk. H. Mills.
Chas. T. Hood.
Inventors,
James W. Paige and
Charles R. North,
By their Attorney
David H. Fletcher, (No Model.) 81 Sheets—Sheet 8.
J. W. PAIGE & C. R. NORTH.
AUTOMATIC TYPE JUSTIFYING MACHINE.
No. 547,861. Patented Oct. 15, 1895.
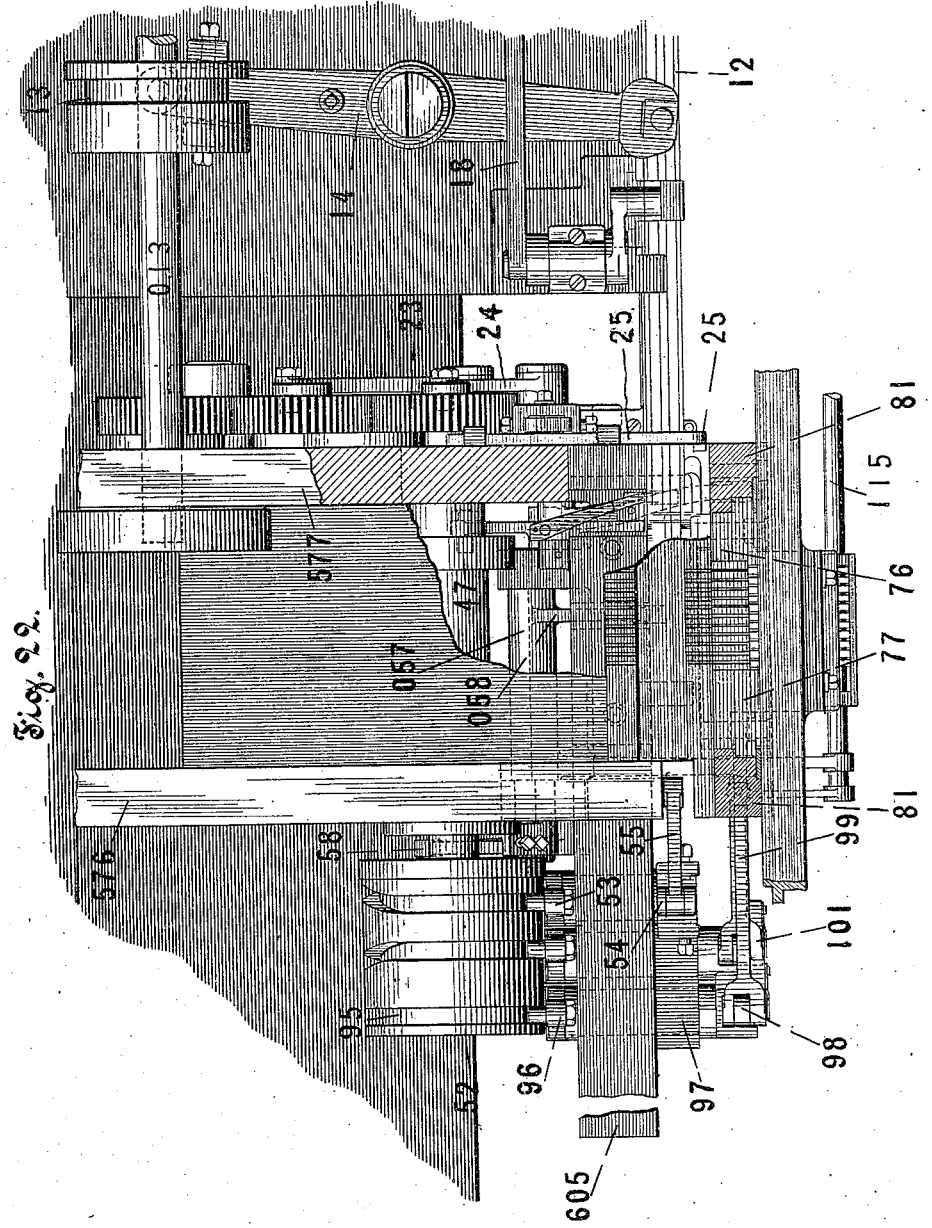
Witnesses
Fridr. H. Milk.
Chas. H. Hood.
Inventors.
James W. Paige and
Charles R. North
By their Attorney
David H. Fletcher.

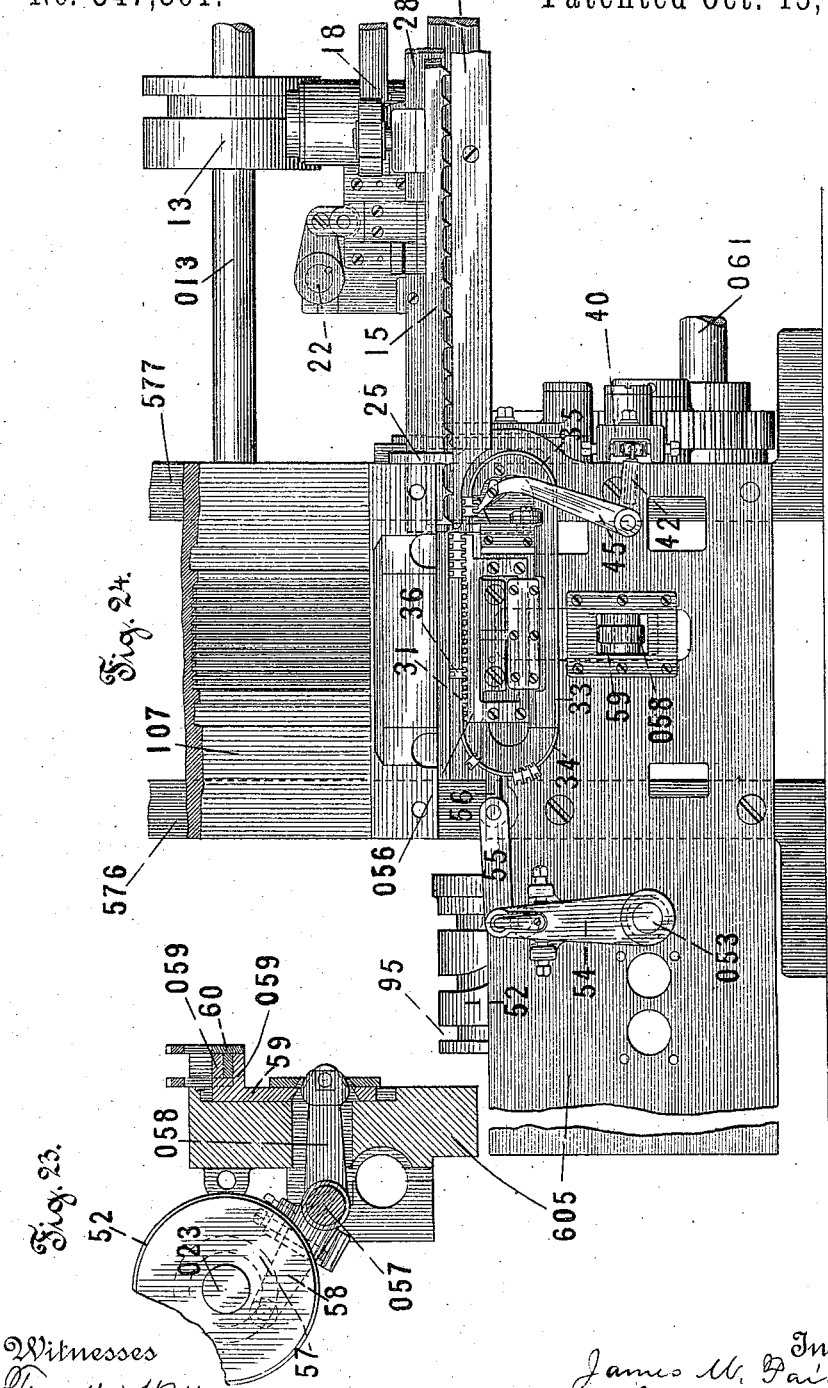

(No Model.) 81 Sheets—Sheet 10.
J. W. PAIGE & C. R. NORTH.
AUTOMATIC TYPE JUSTIFYING MACHINE.
No. 547,861. Patented Oct. 15, 1895.
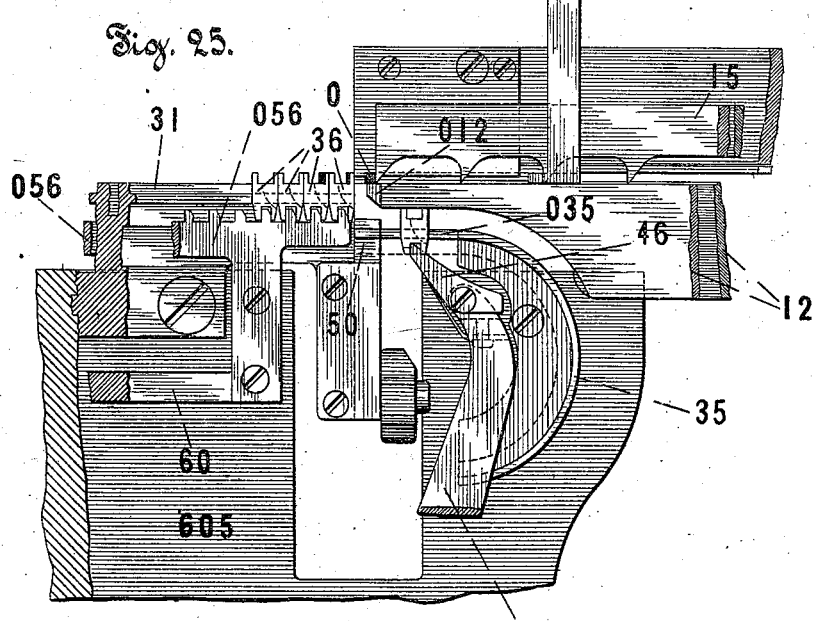
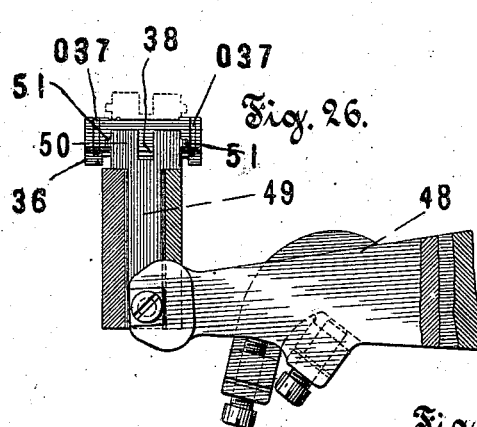
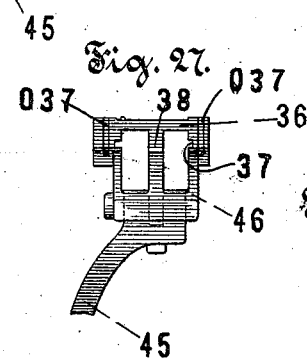
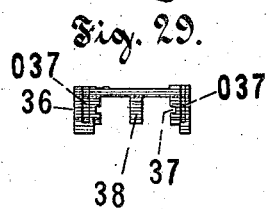
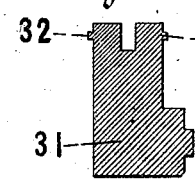
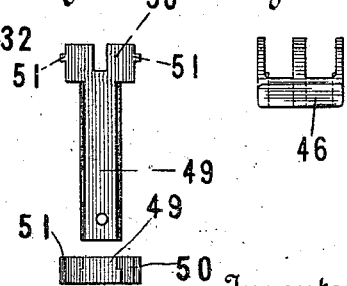
Witnesses
Fredk. H. Mills.
Chas. H. Hood.
Inventors.
James W. Paige and
Charles R. North.
By their Attorney
David H. Fletcher.
THE NORRIS PETERS CO., WASHINGTON, D. C.

(No Model.) 81 Sheets—Sheet 11.
J. W. PAIGE & C. R. NORTH.
AUTOMATIC TYPE JUSTIFYING MACHINE.
No. 547,861. Patented Oct. 15, 1895.
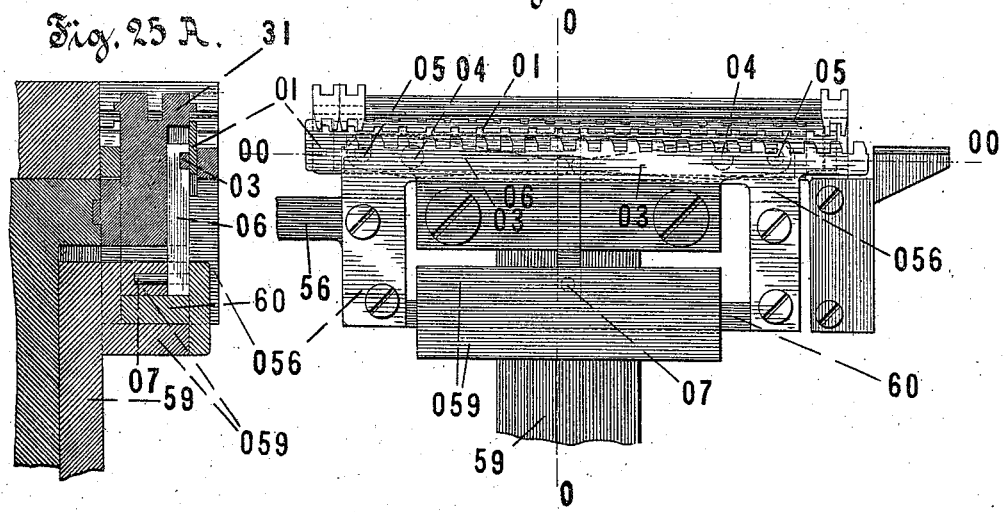
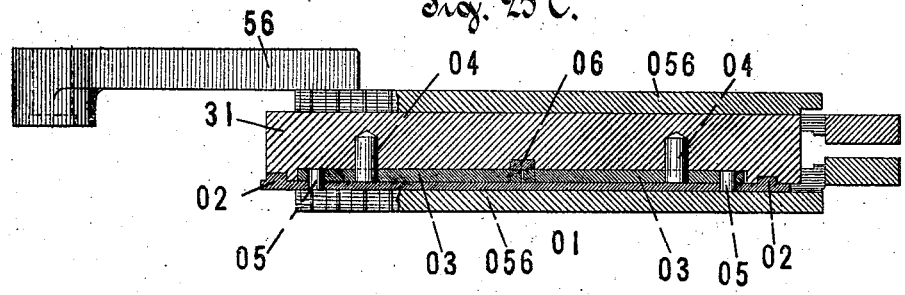
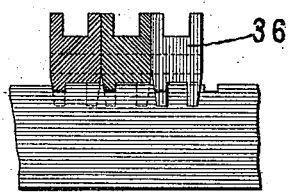
Witnesses
Fredk. H. Mills.
Chas. H. Hood.
Inventors.
James W. Paige and
Charles R. North
By their Attorney
David H. Fletcher.

(No Model.)  
81 Sheets—Sheet 12.
J. W. PAIGE & C. R. NORTH.
AUTOMATIC TYPE JUSTIFYING MACHINE.
No. 547,861. Patented Oct. 15, 1895.
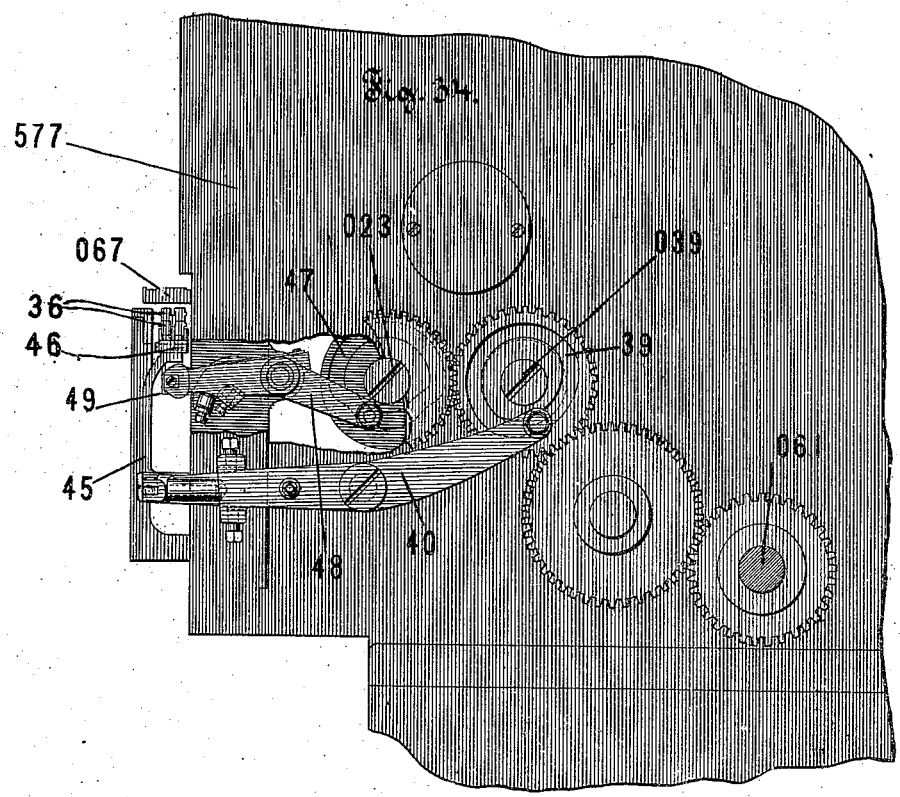
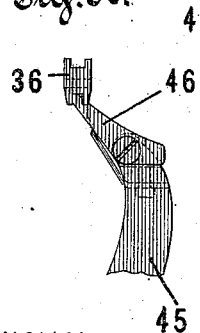
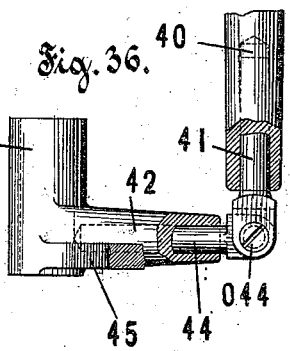
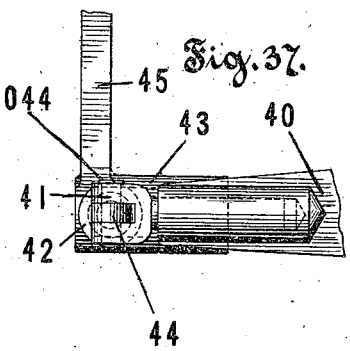
Witnesses  
Fred'k H. Mills  
Chas. H. Hood
Inventors.  
James W. Paige and  
Charles R. North  
By their Attorney  
David H. Fletcher

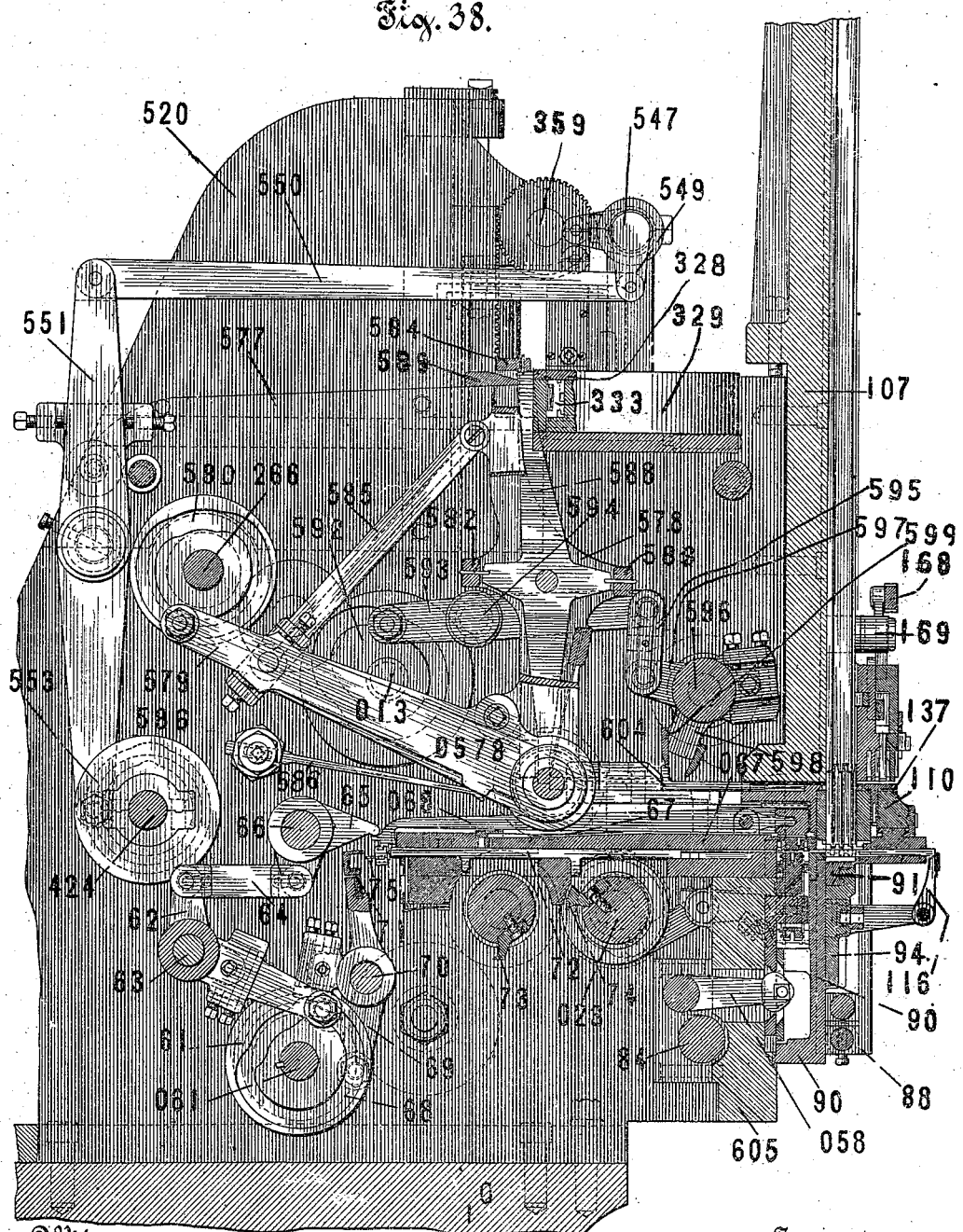

(No Model.)  81 Sheets—Sheet 14.
J. W. PAIGE & C. R. NORTH.
AUTOMATIC TYPE JUSTIFYING MACHINE.
No. 547,861.  Patented Oct. 15, 1895.
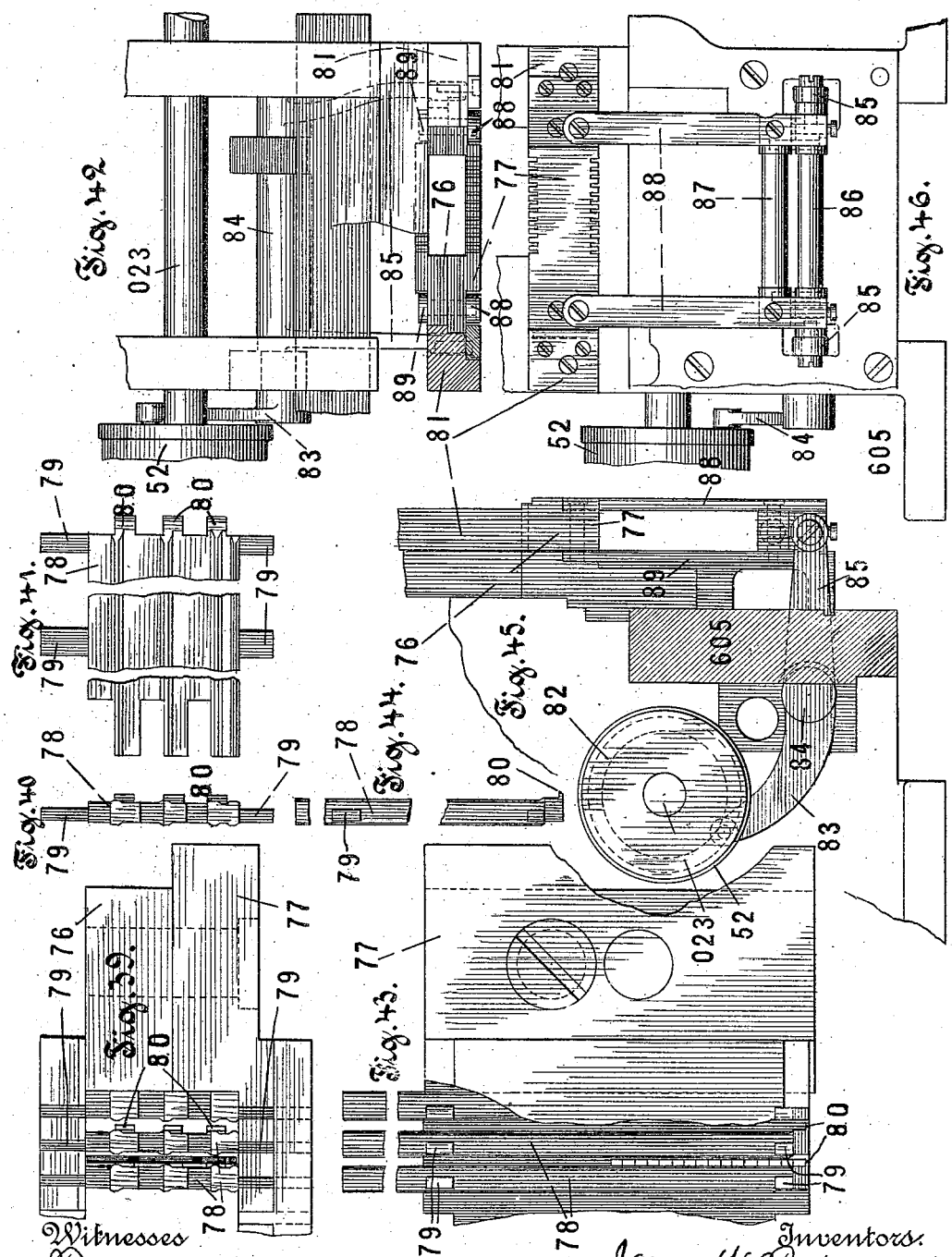
Witnesses
Fredk. H. Mills.
Chas. H. Hood.
Inventors:
James W. Paige and
Charles R. North
By their Attorney
David H. Fletcher.
THE NORRIS PETERS CO., WASHINGTON, D. C.

(No Model.)   81 Sheets—Sheet 15.
J. W. PAIGE & C. R. NORTH.
AUTOMATIC TYPE JUSTIFYING MACHINE.
No. 547,861.   Patented Oct. 15, 1895.
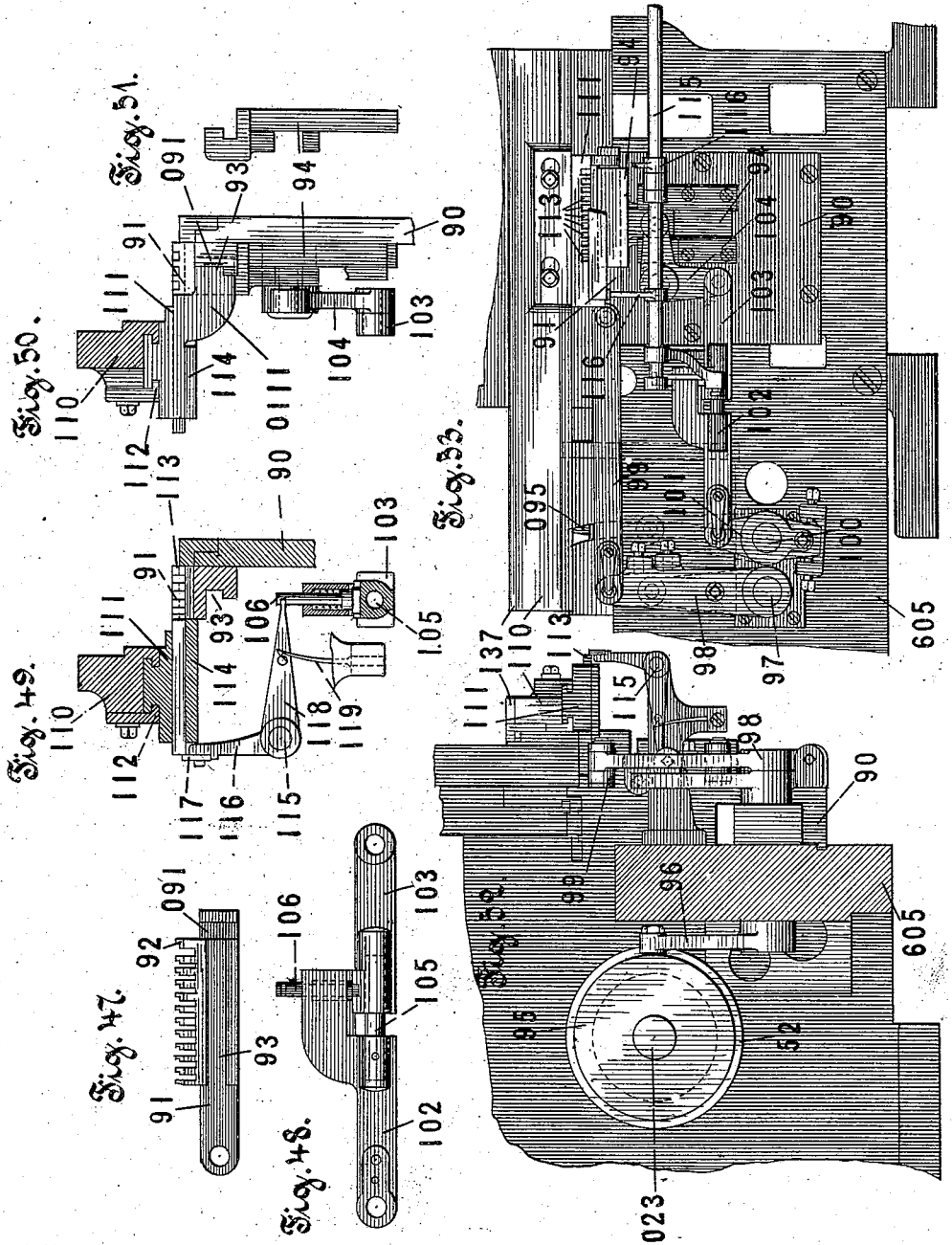
Witnesses
Fredk. H. Mills.
Chas. H. Hood.
Inventors.
James W. Paige and
Charles R. North
By their Attorney
David H. Fletcher.

(No Model.)
81 Sheets—Sheet 16.
J. W. PAIGE & C. R. NORTH.
AUTOMATIC TYPE JUSTIFYING MACHINE.
No. 547,861.
Patented Oct. 15, 1895.
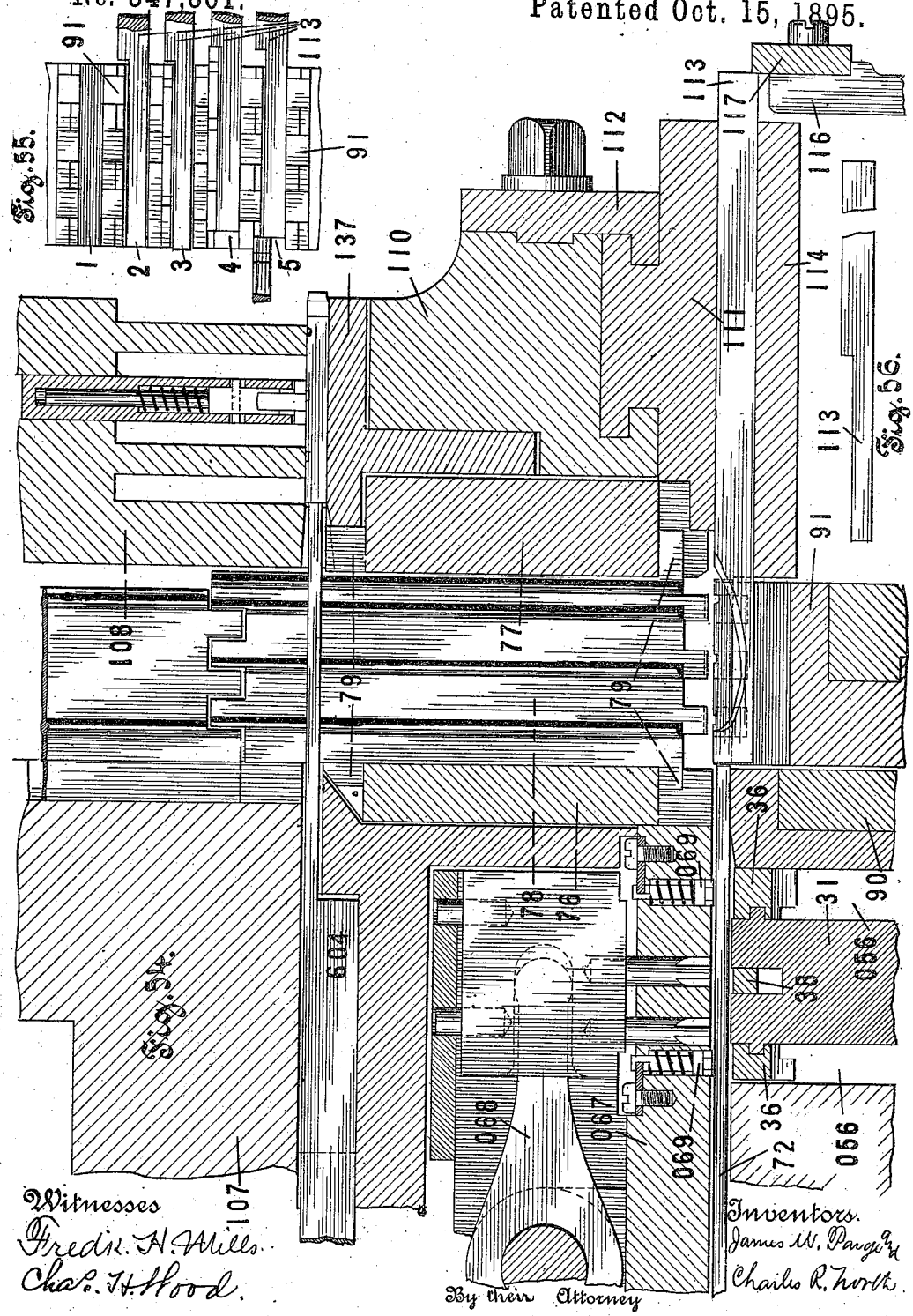
Witnesses
Fredk. H. Mills.
Chas. H. Hood.
Inventors.
James W. Paige
Charles R. North
By their Attorney
David H. Fletcher.
THE NORRIS PETERS CO., WASHINGTON, D. C.

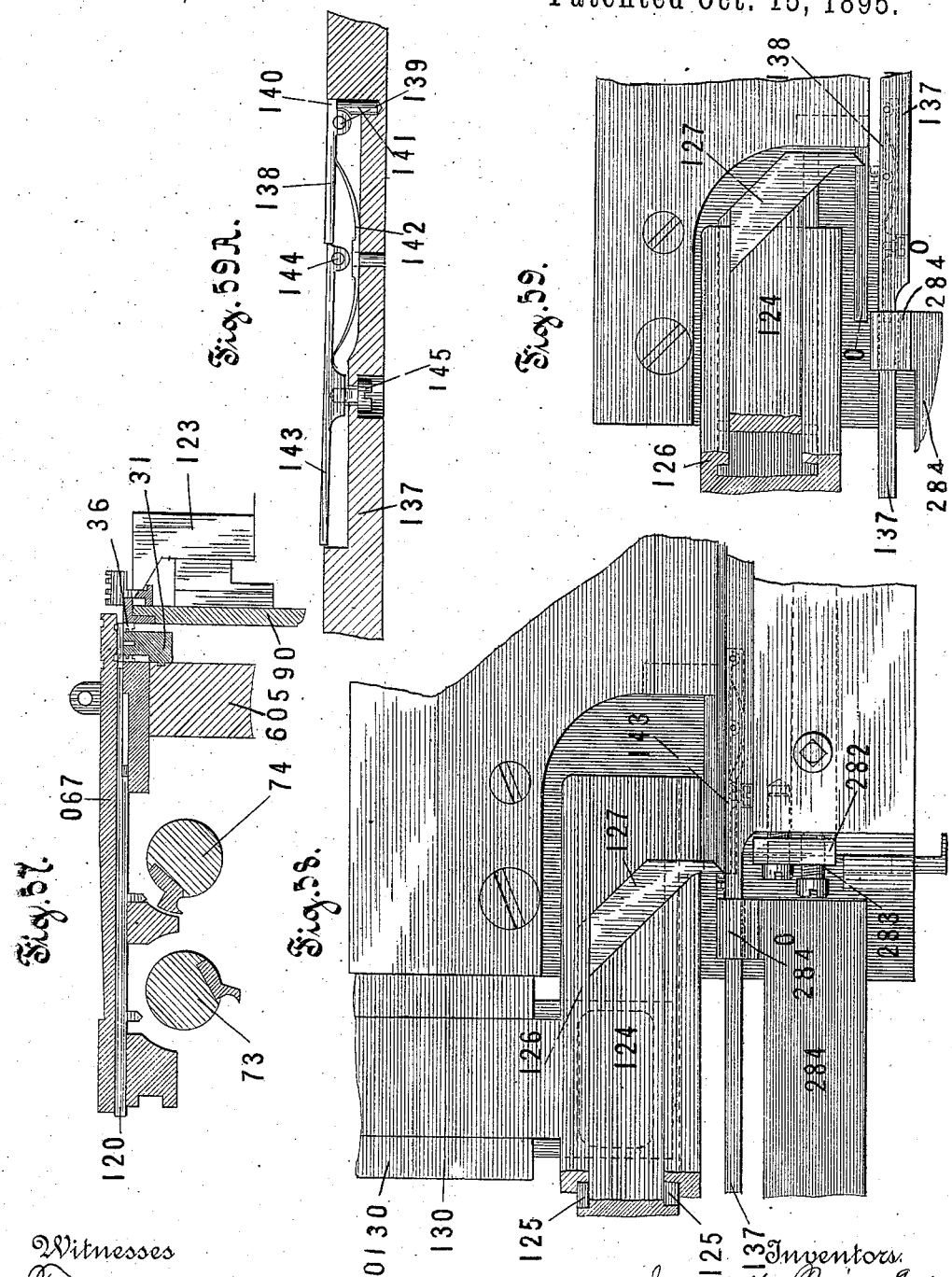

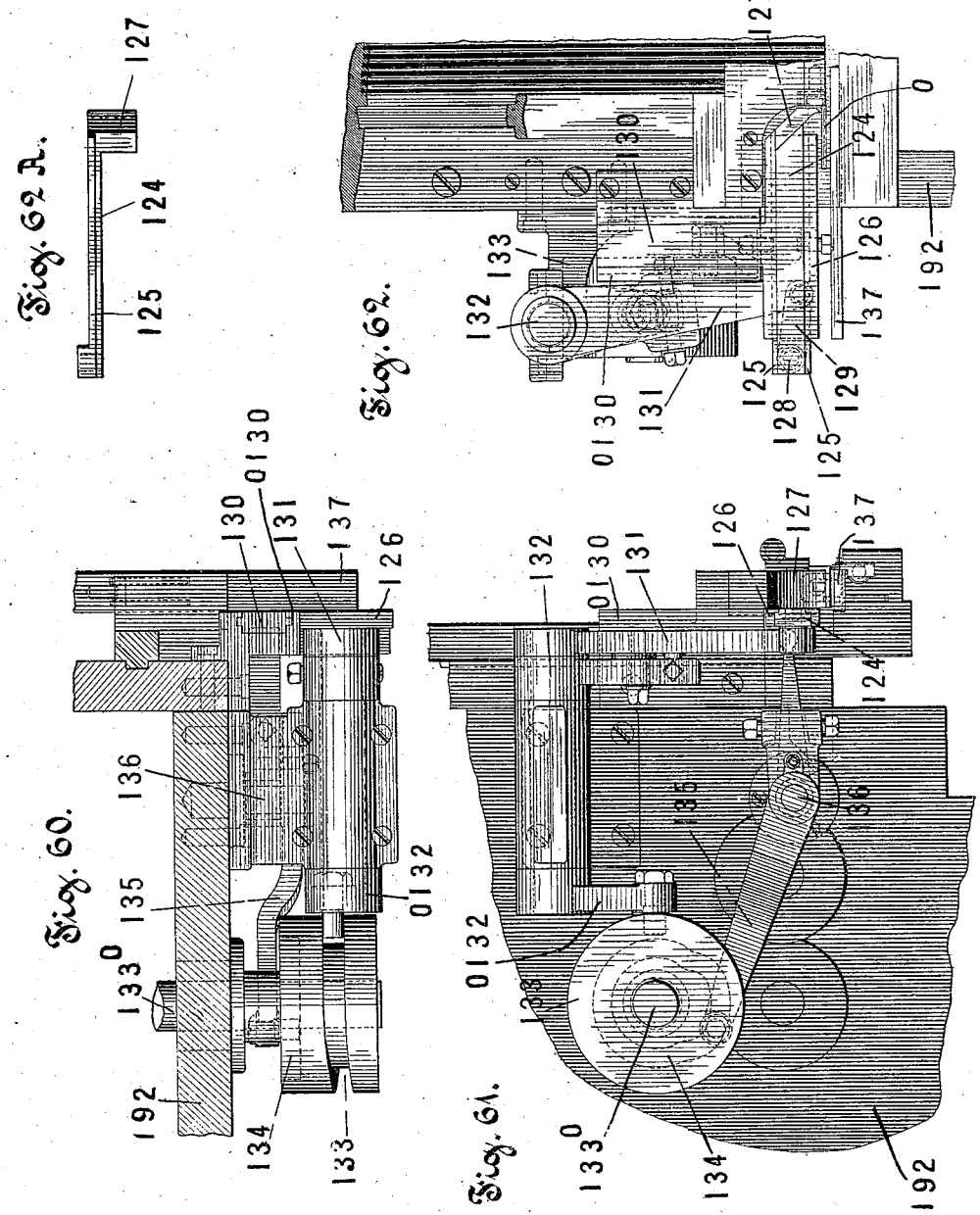

(No Model.)

81 Sheets—Sheet 19.

J. W. PAIGE & C. R. NORTH.
AUTOMATIC TYPE JUSTIFYING MACHINE.

No. 547,861.  Patented Oct. 15, 1895.

Witnesses
Fredk. H. Mills.
Chas. H. Wood.

Inventors.
James W. Paige and
Charles R. North
By their Attorney
David H. Fletcher.

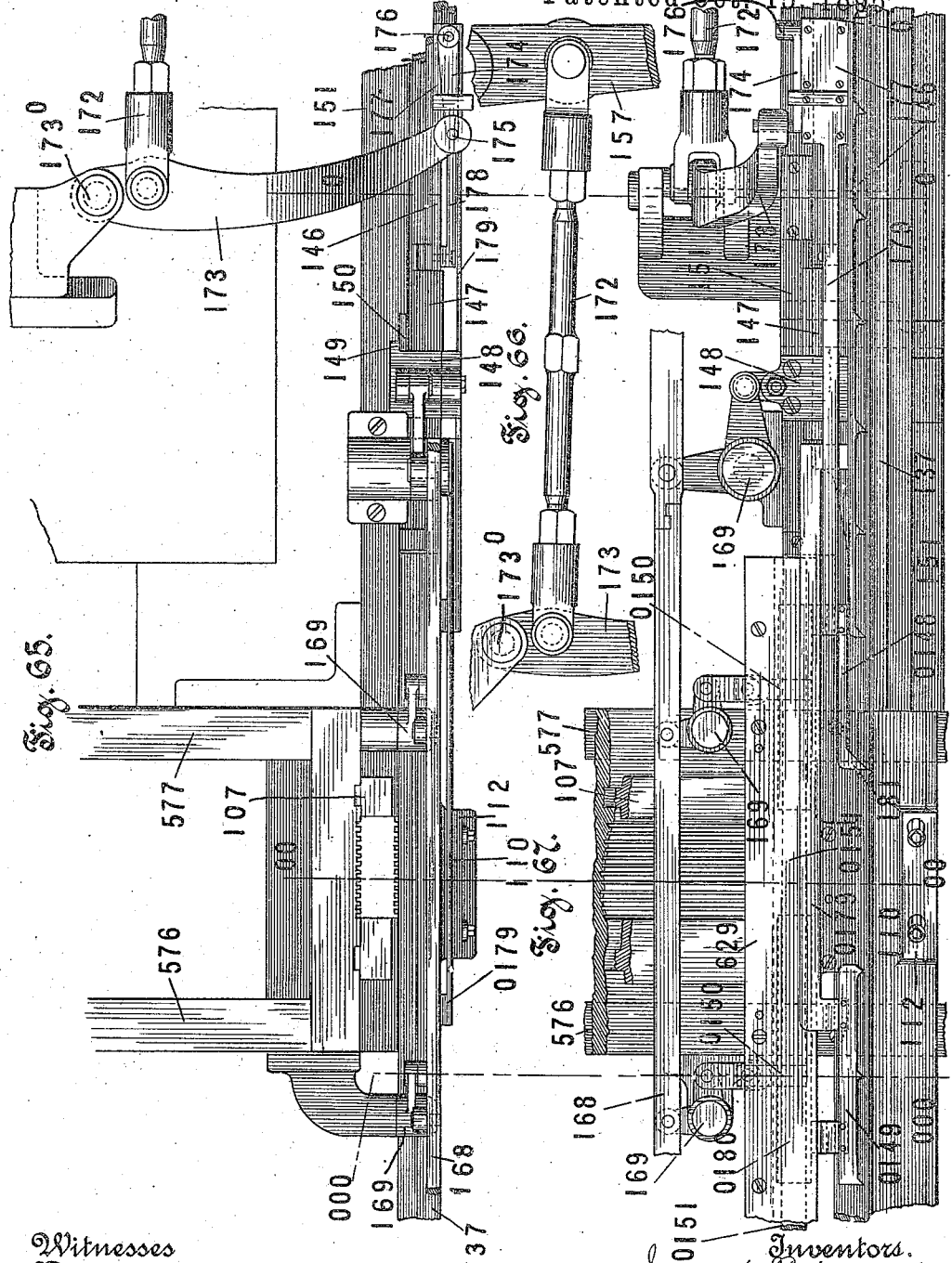

(No Model.)
81 Sheets—Sheet 21.

J. W. PAIGE & C. R. NORTH.
AUTOMATIC TYPE JUSTIFYING MACHINE.

No. 547,861.
Patented Oct. 15, 1895.

Witnesses
Fredk. H. Mills.
Chas. H. Wood.

Inventors
James W. Paige and
Charles R. North,
By their Attorney
David H. Fletcher (No Model.)
81 Sheets—Sheet 22.
J. W. PAIGE & C. R. NORTH.
AUTOMATIC TYPE JUSTIFYING MACHINE.
No. 547,861. Patented Oct. 15, 1895.
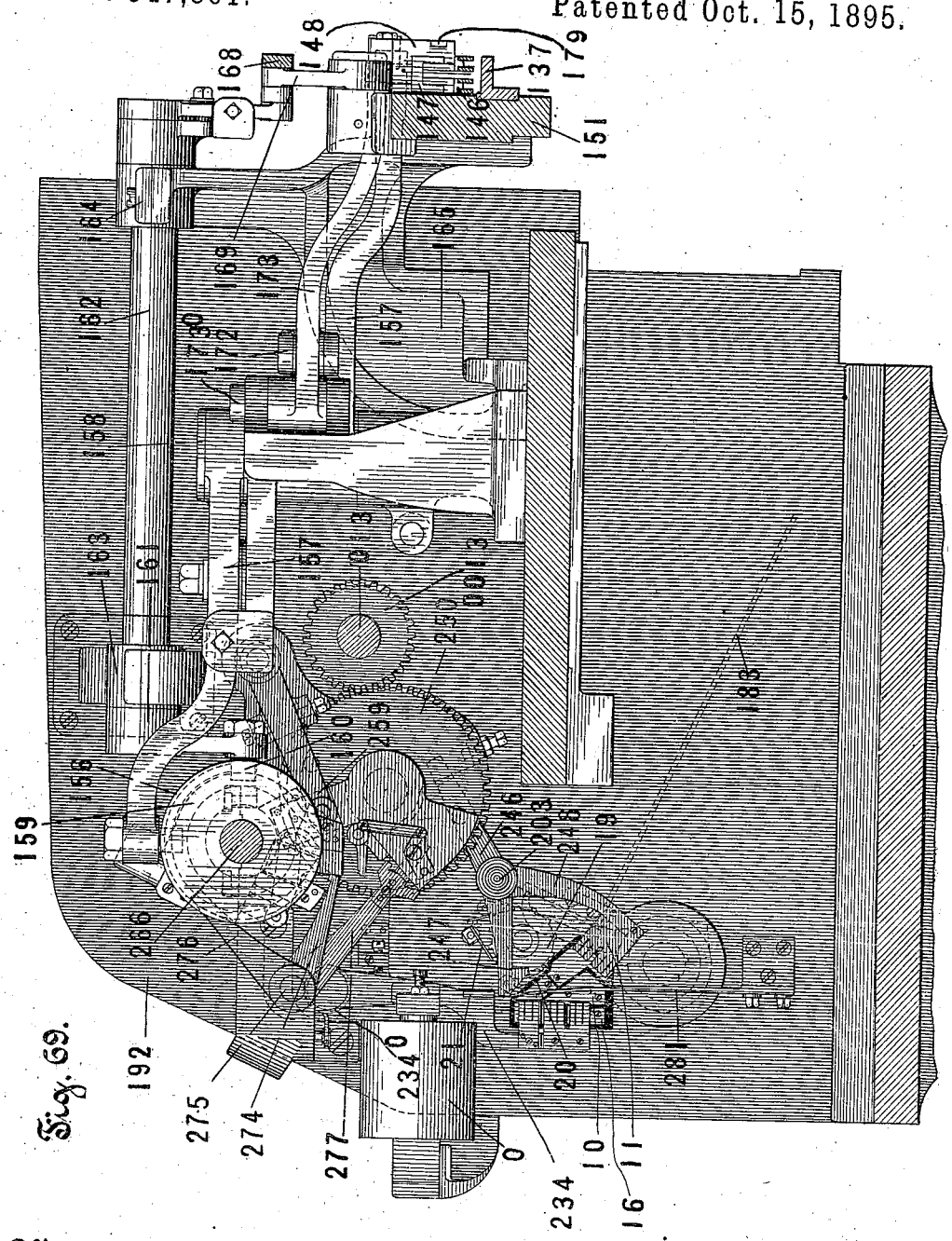

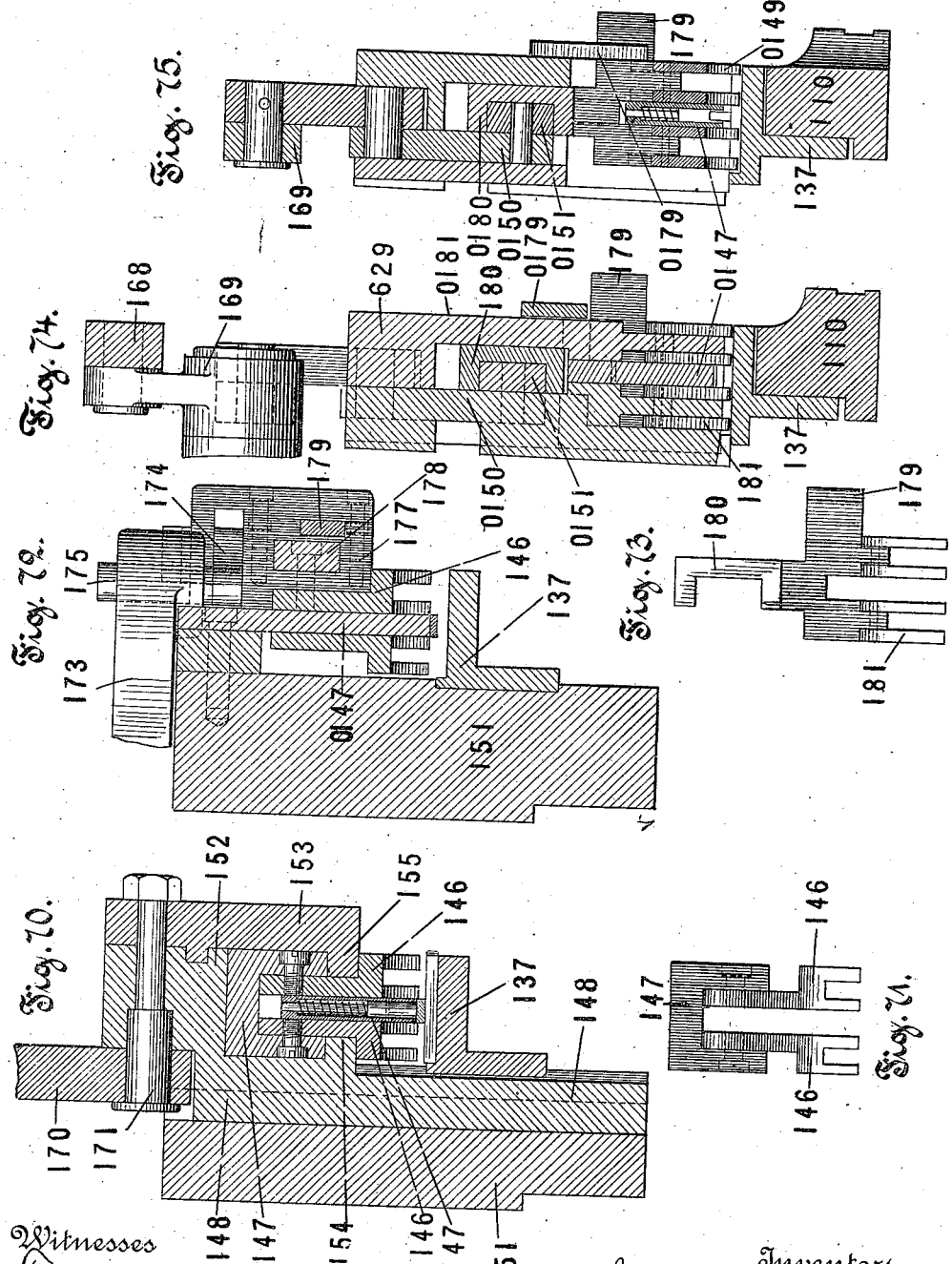

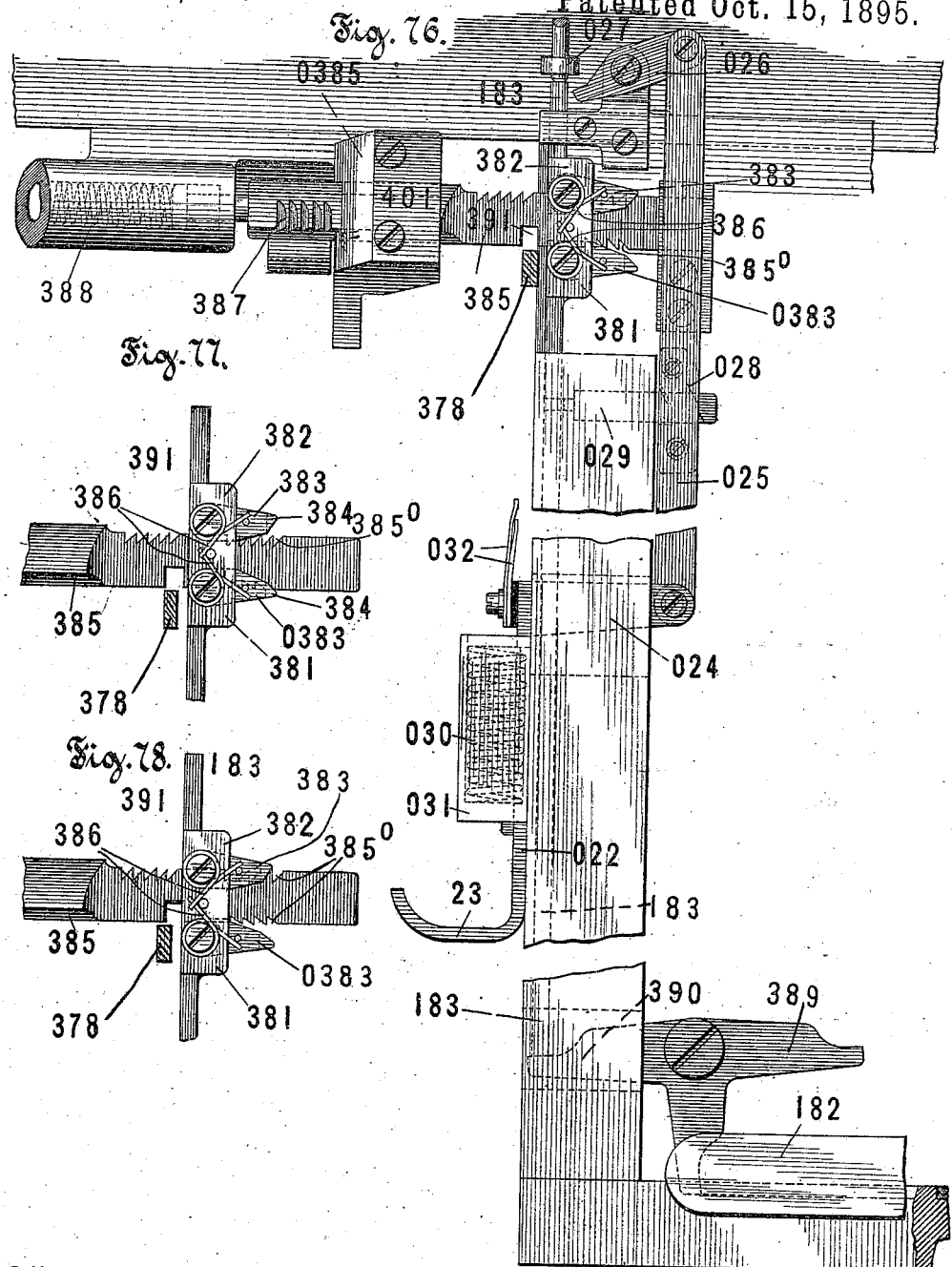

(No Model.)
J. W. PAIGE & C. R. NORTH.
AUTOMATIC TYPE JUSTIFYING MACHINE.
No. 547,861.
Patented Oct. 15, 1895.
81 Sheets—Sheet 25.
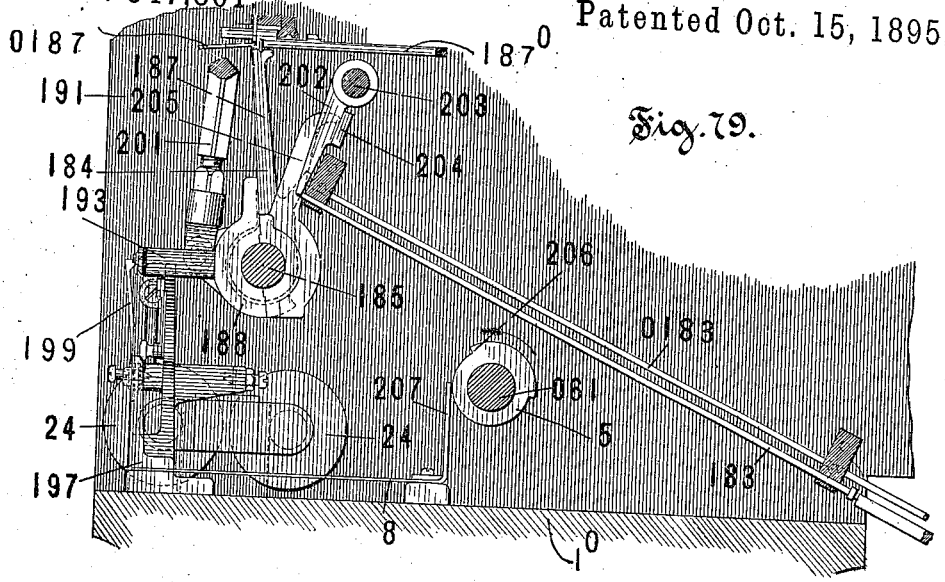
Fig. 79.
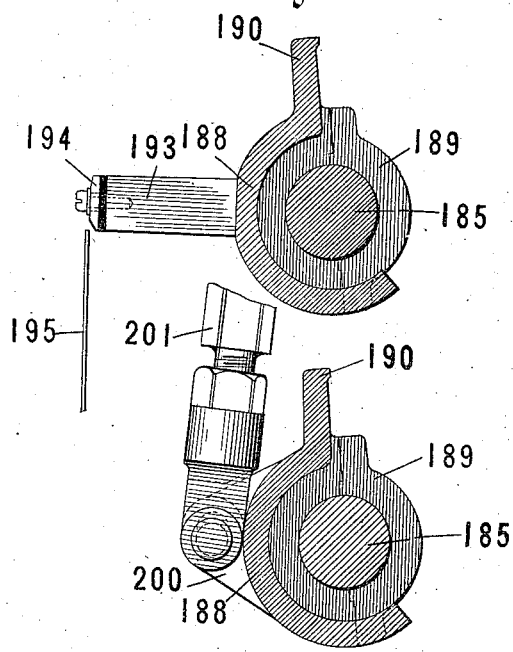
Fig. 80.
Fig. 82.
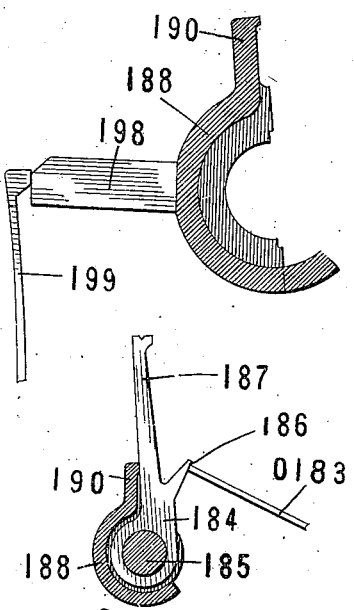
Fig. 81.
Fig. 83.
Witnesses
Fred'k H. Miles.
Chas. H. Wood.
Inventors.
James W. Paige and
Charles R. North,
By their Attorney
David H. Fletcher.

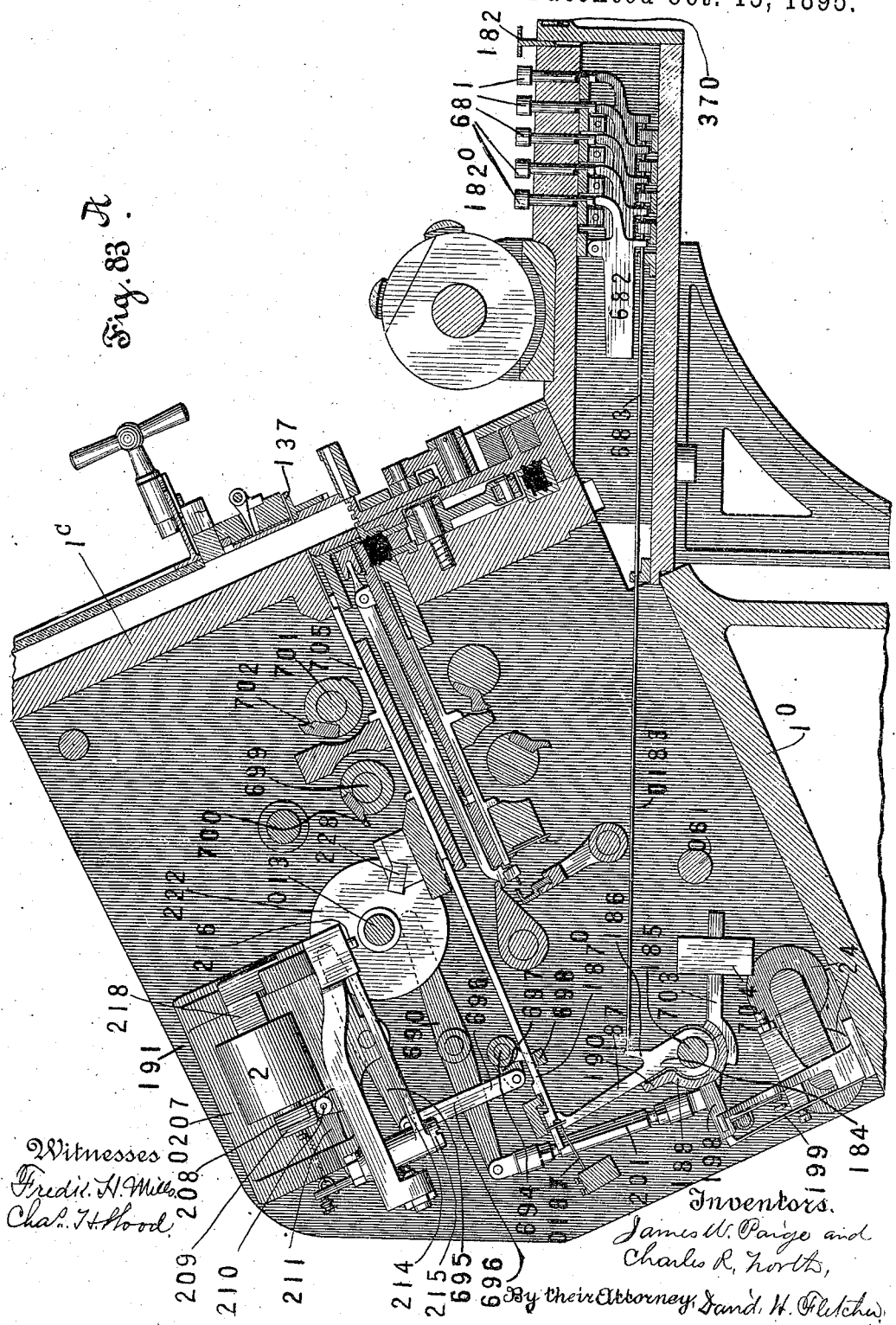

(No Model.)

J. W. PAIGE & C. R. NORTH.
AUTOMATIC TYPE JUSTIFYING MACHINE.

No. 547,861. Patented Oct. 15, 1895.

81 Sheets—Sheet 27.

Witnesses
Fredk. H. Mills.
Chas. H. Hood.

Inventors.
James W. Paige and
Charles R. North
By their Attorney
David H. Fletcher.

(No Model.)

J. W. PAIGE & C. R. NORTH.
AUTOMATIC TYPE JUSTIFYING MACHINE.

No. 547,861.

Patented Oct. 15, 1895.

81 Sheets—Sheet 28.

Witnesses
Fredk. H. Mills.
Chas. H. Hood.

Inventors.
James W. Paige and
Charles R. North
By their Attorney
David H. Fletcher.

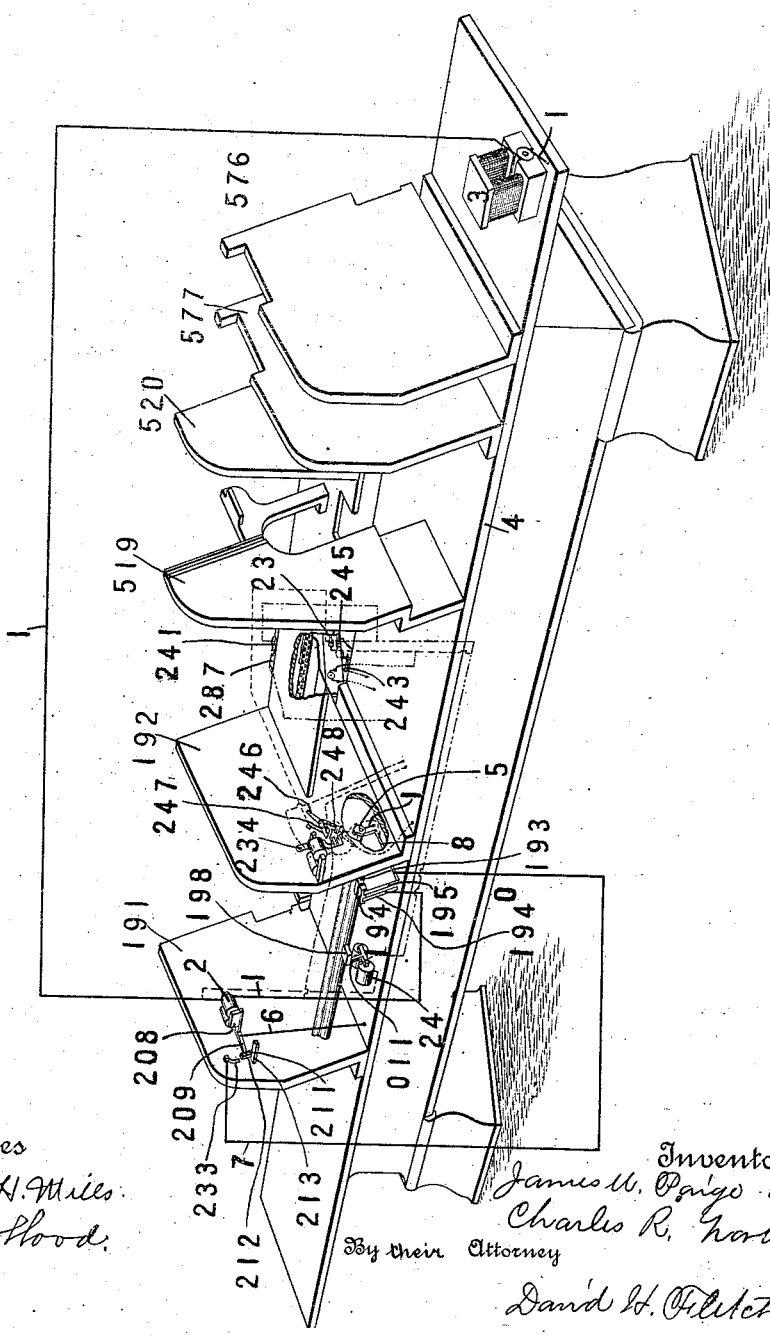

(No Model.)
81 Sheets—Sheet 30.
J. W. PAIGE & C. R. NORTH.
AUTOMATIC TYPE JUSTIFYING MACHINE.
No. 547,861.
Patented Oct. 15, 1895.
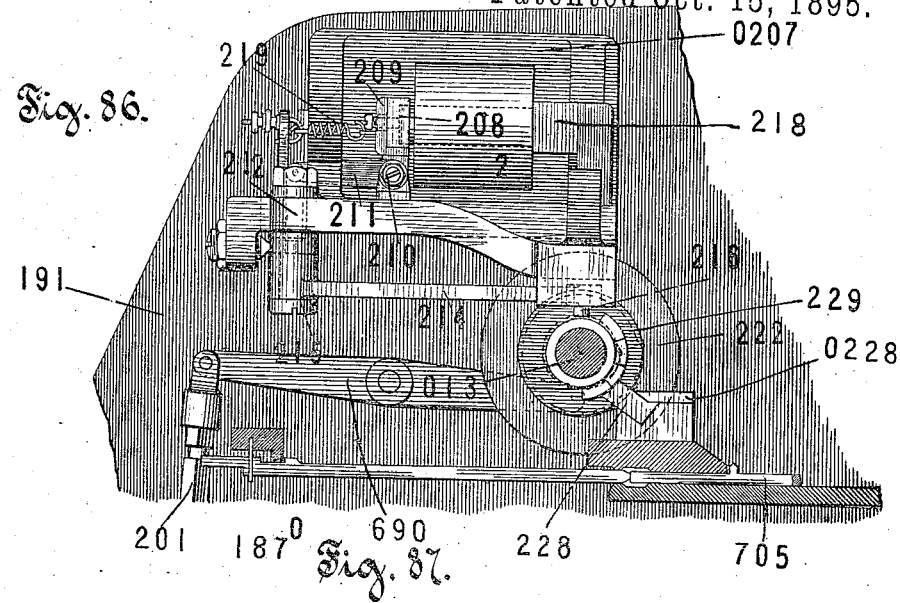
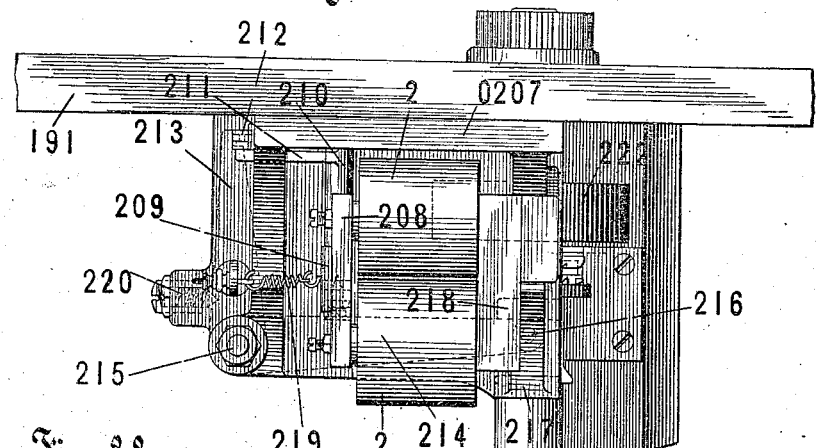
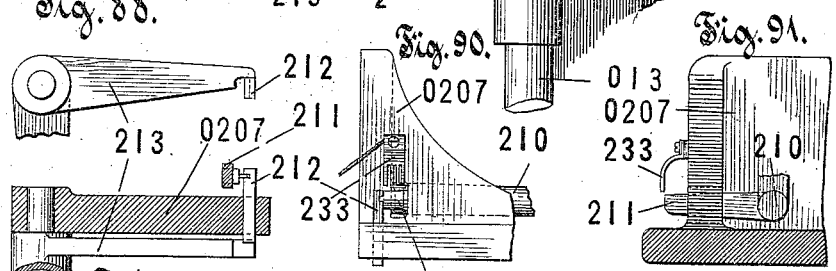
Witnesses
Fredk. H. Mills.
Chas. T. Hood.
Inventors:
James W. Paige and
Charles R. North
By their Attorney
David H. Fletcher.

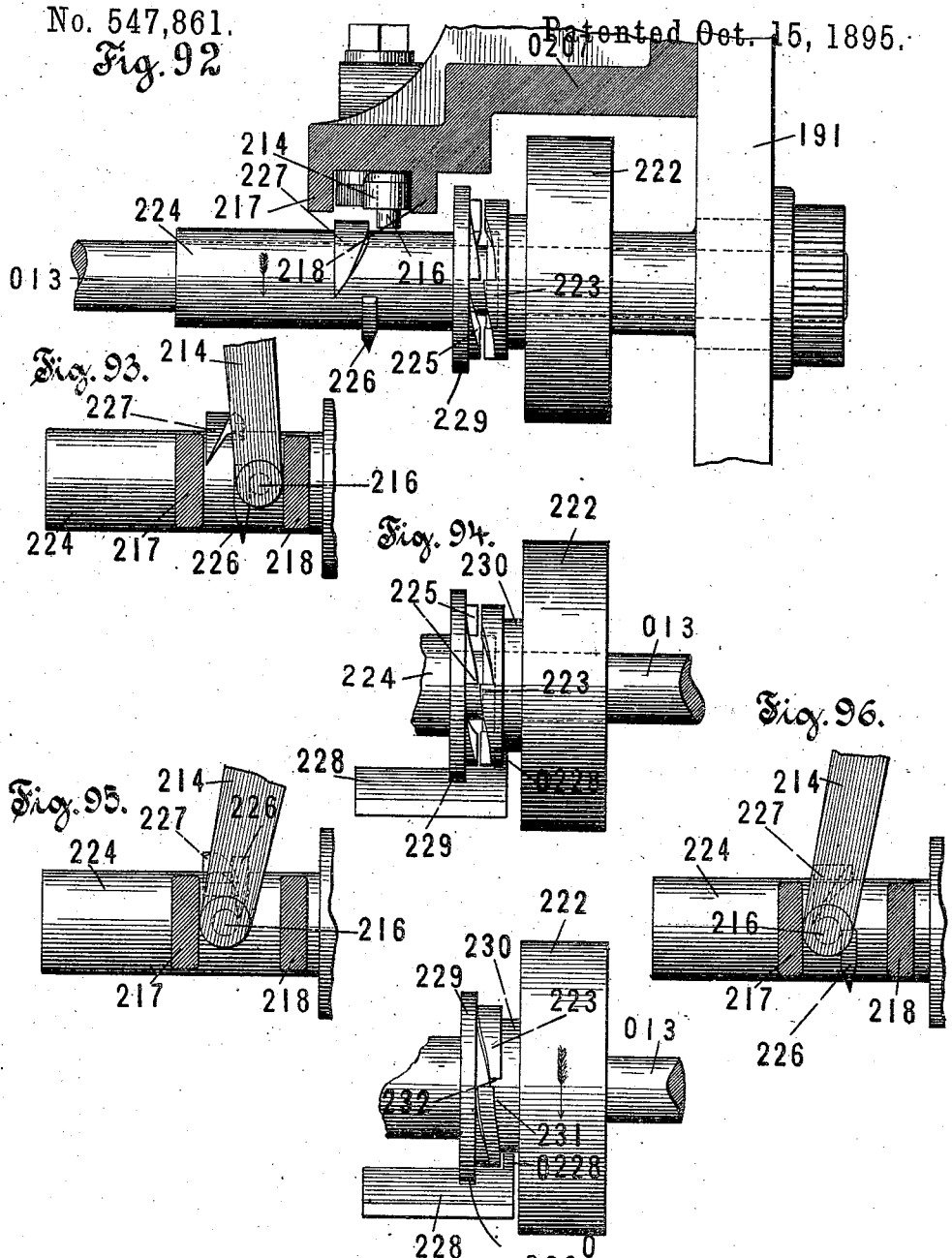

(No Model.)
81 Sheets—Sheet 32.
J. W. PAIGE & C. R. NORTH.
AUTOMATIC TYPE JUSTIFYING MACHINE.
No. 547,861.
Patented Oct. 15, 1895.
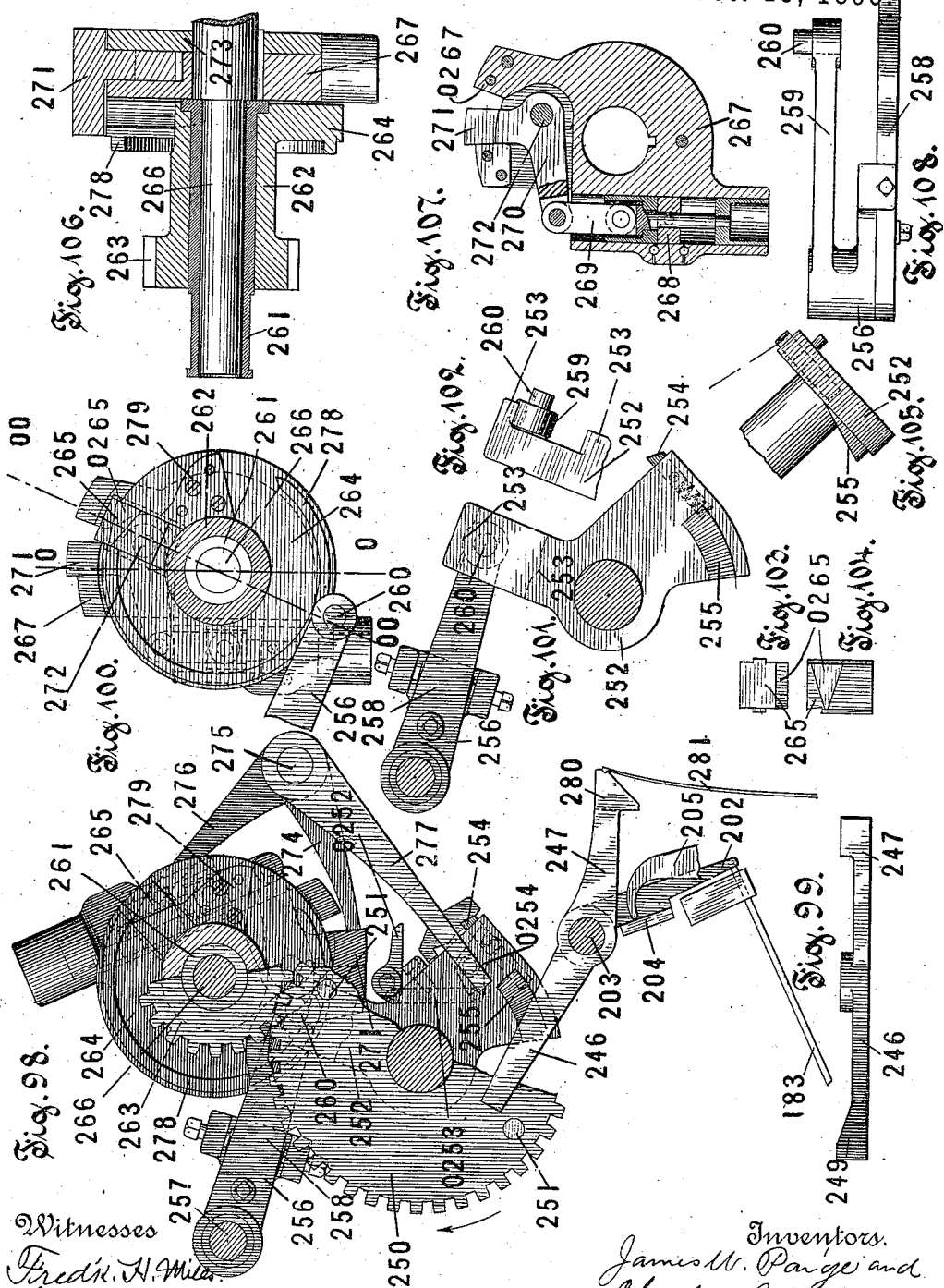
Witnesses
Fred'k. H. Miles.
Chas. H. Wood.
Inventors.
James W. Paige and
Charles R. North
By their Attorney
David H. Fletcher.

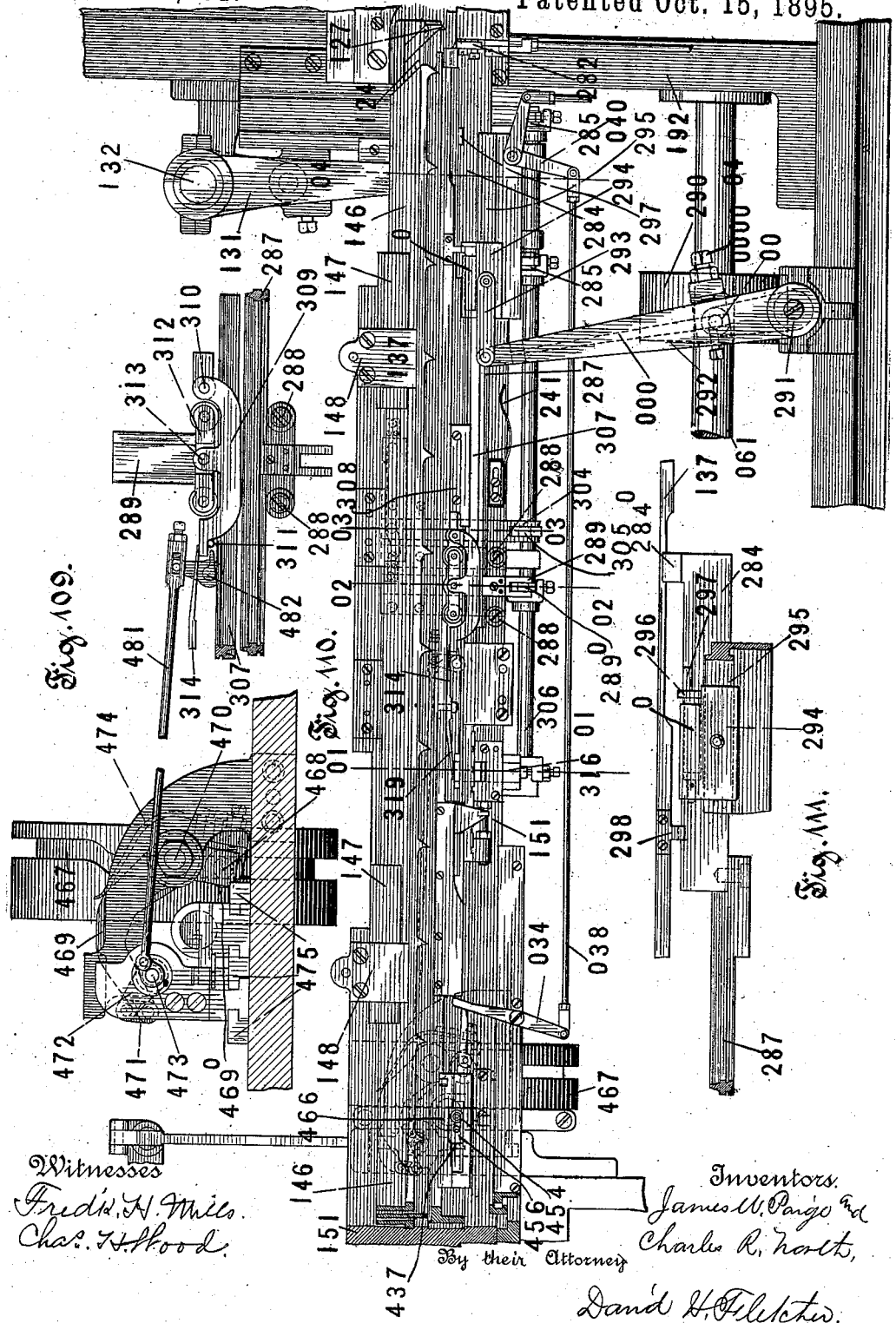

(No Model.) 81 Sheets—Sheet 34.
J. W. PAIGE & C. R. NORTH.
AUTOMATIC TYPE JUSTIFYING MACHINE.
No. 547,861. Patented Oct. 15, 1895.
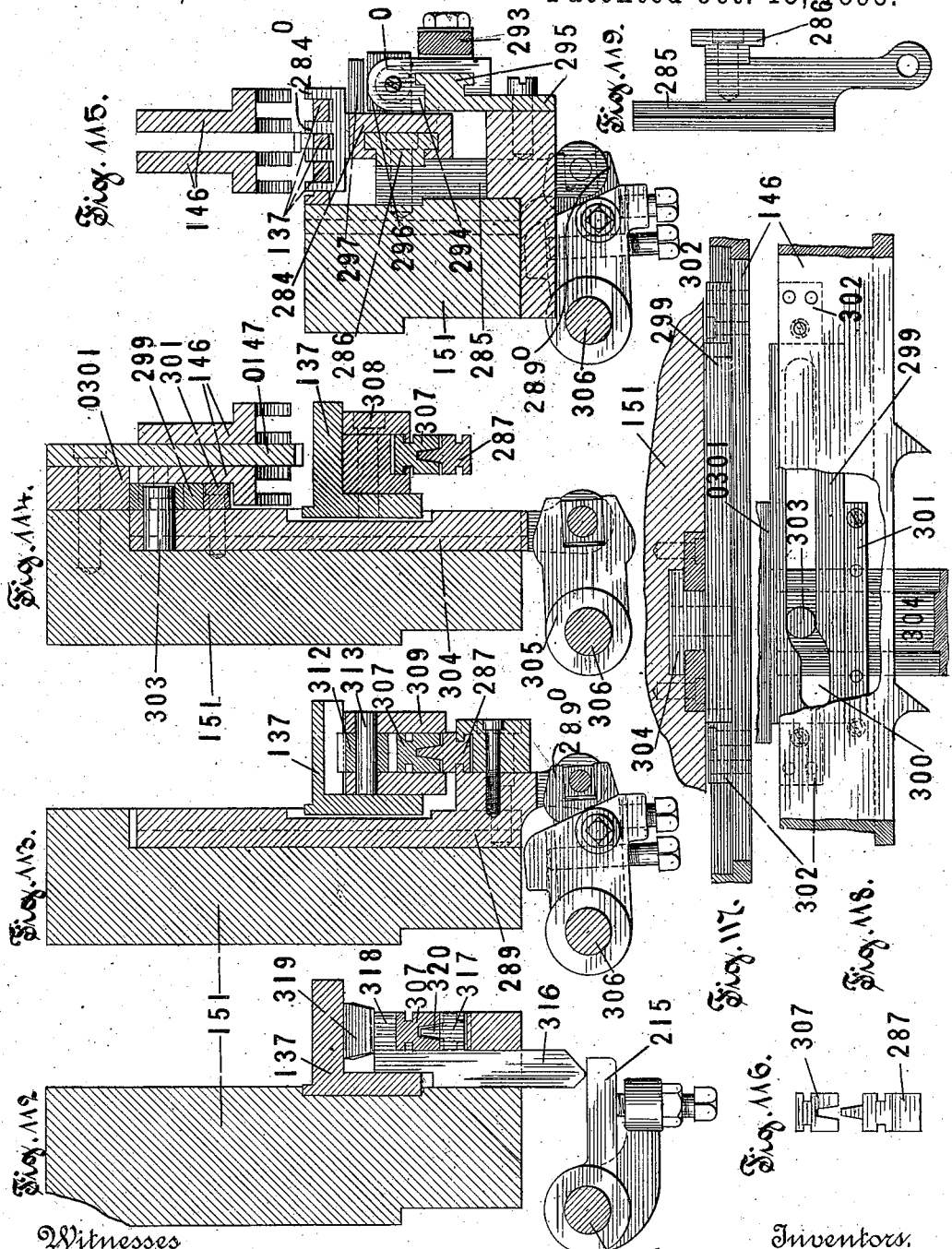

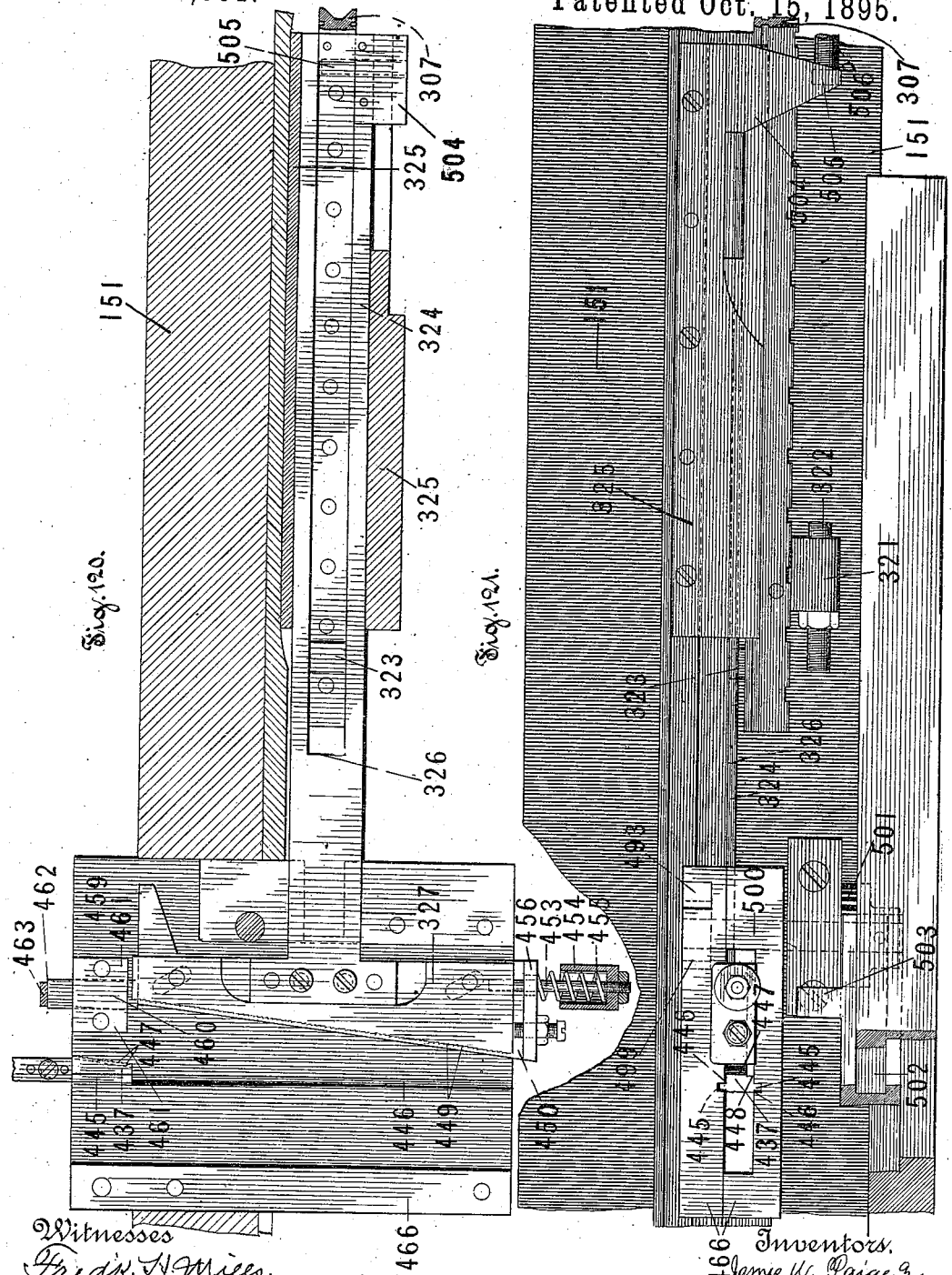

(No Model.)
81 Sheets—Sheet 36.
J. W. PAIGE & C. R. NORTH.
AUTOMATIC TYPE JUSTIFYING MACHINE.
No. 547,861.  Patented Oct. 15, 1895.
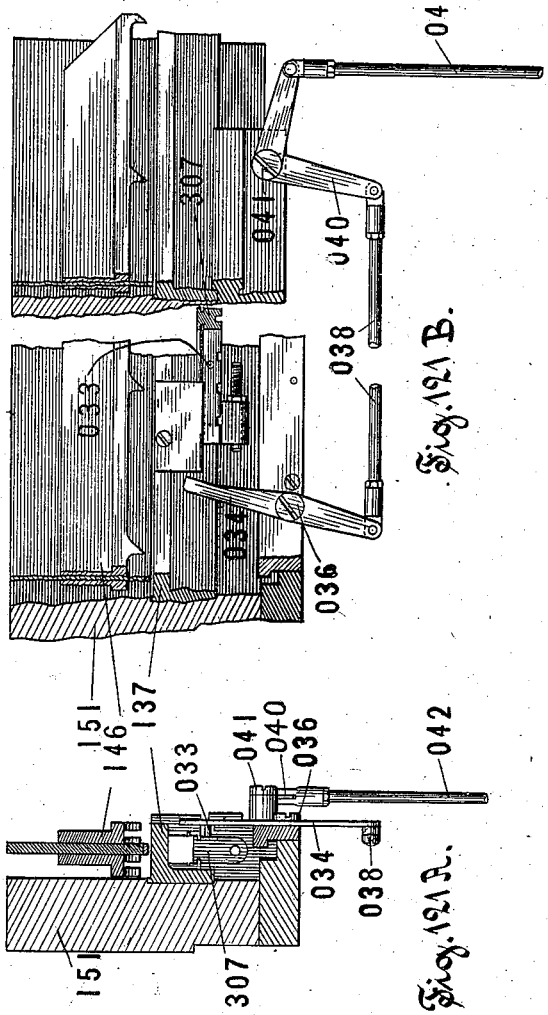
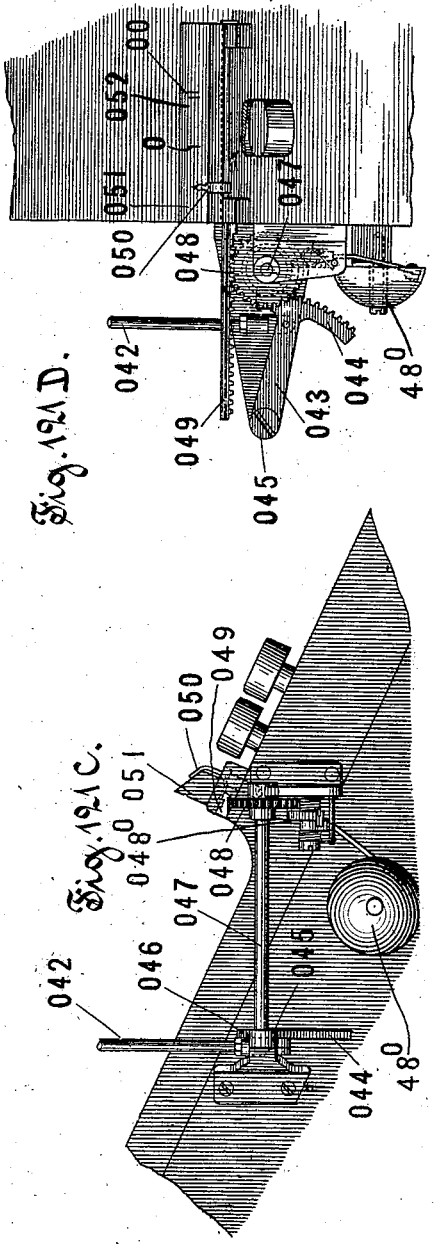
Witnesses
Fredk. H. Mills.
Chas. H. Wood.
Inventors.
James W. Paige and
Charles R. North
By their Attorney
David H. Fletcher.

(No Model.)
81 Sheets—Sheet 37.
J. W. PAIGE & C. R. NORTH.
AUTOMATIC TYPE JUSTIFYING MACHINE.
No. 547,861.
Patented Oct. 15, 1895.
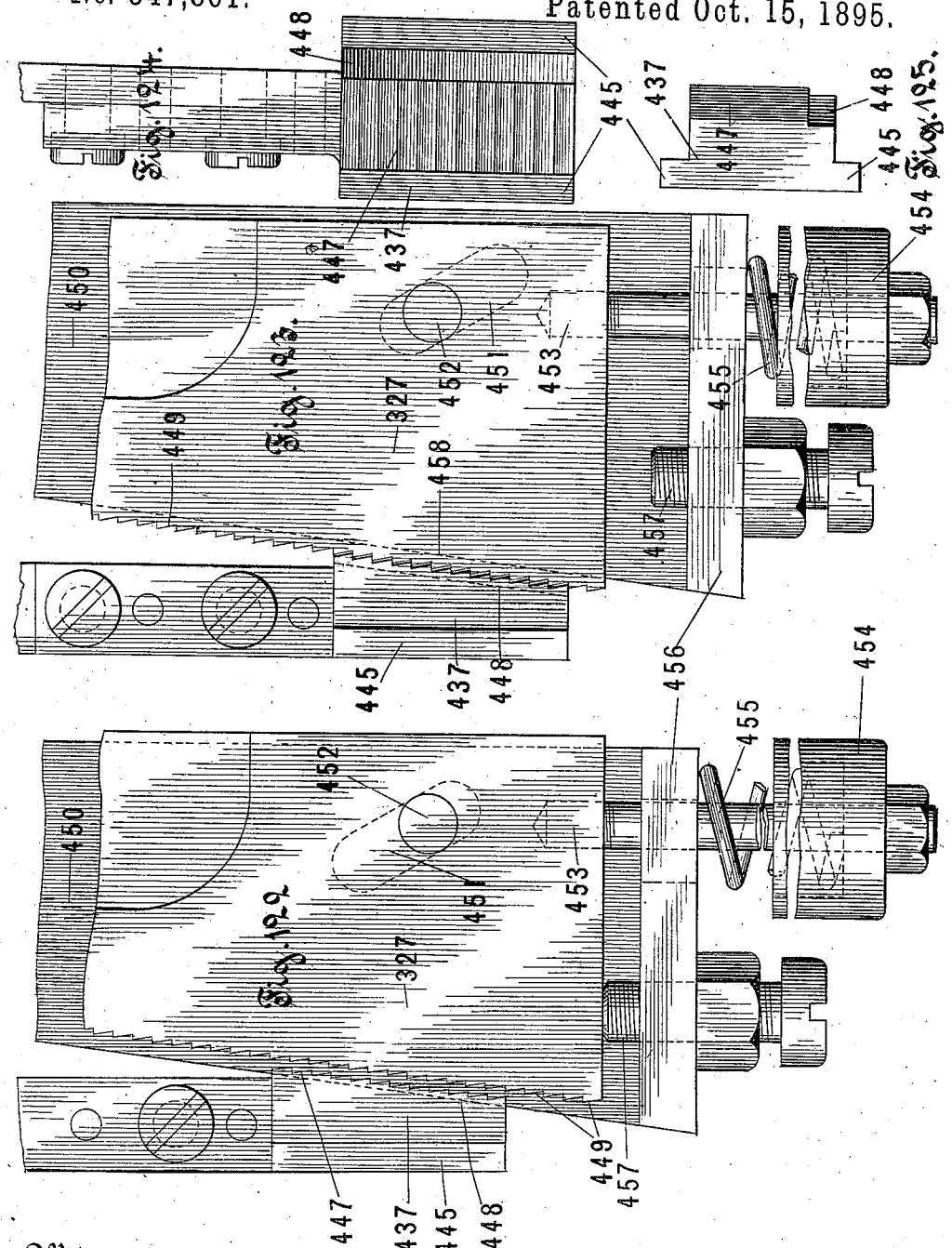
Witnesses
Fred'k. H. Mills.
Chas. H. Hood.
Inventors.
James W. Paige and
Charles R. North,
By their Attorney
David H. Fletcher.

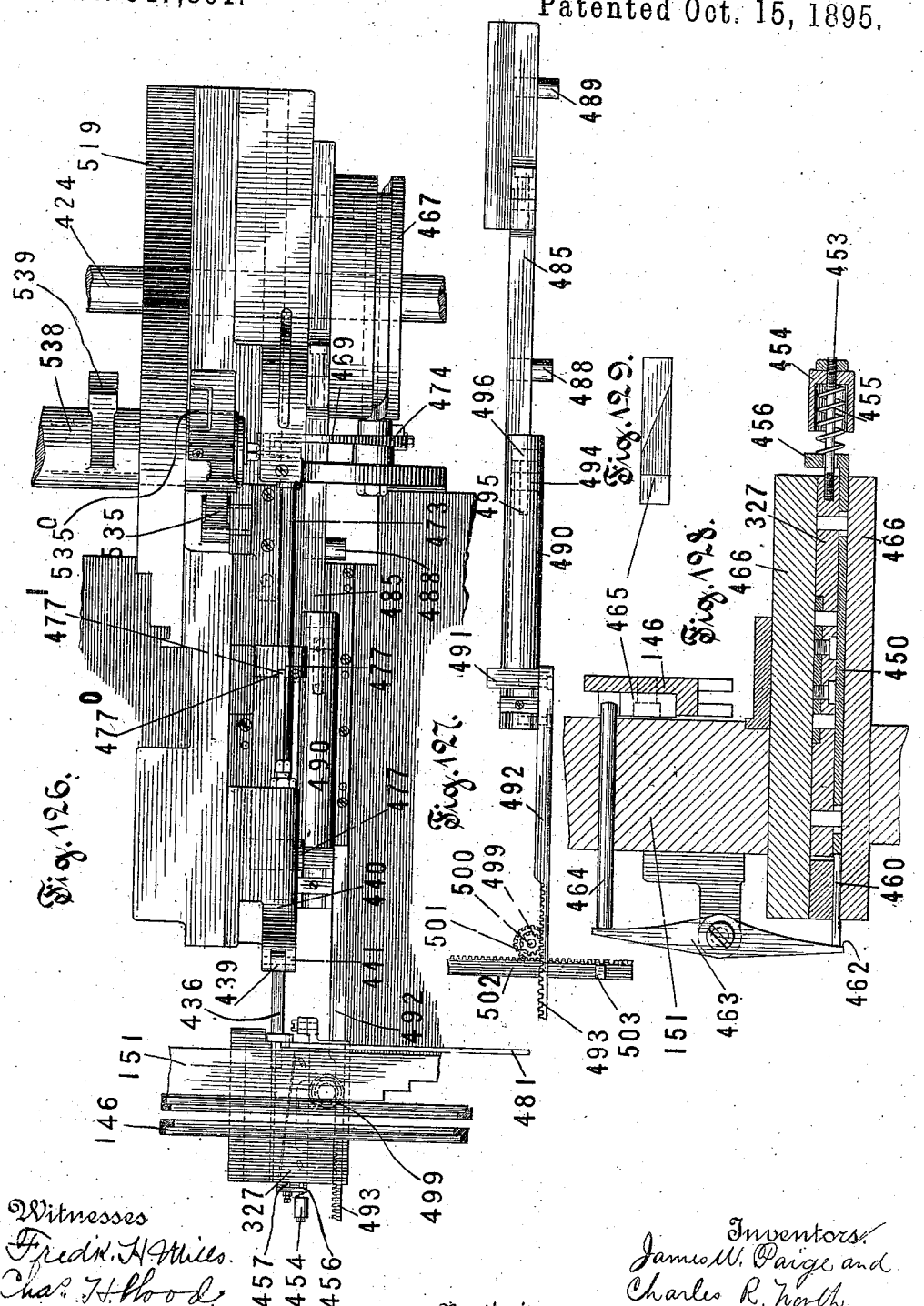

(No Model.)   81 Sheets—Sheet 39.
J. W. PAIGE & C. R. NORTH.
AUTOMATIC TYPE JUSTIFYING MACHINE.
No. 547,861.  Patented Oct. 15, 1895.
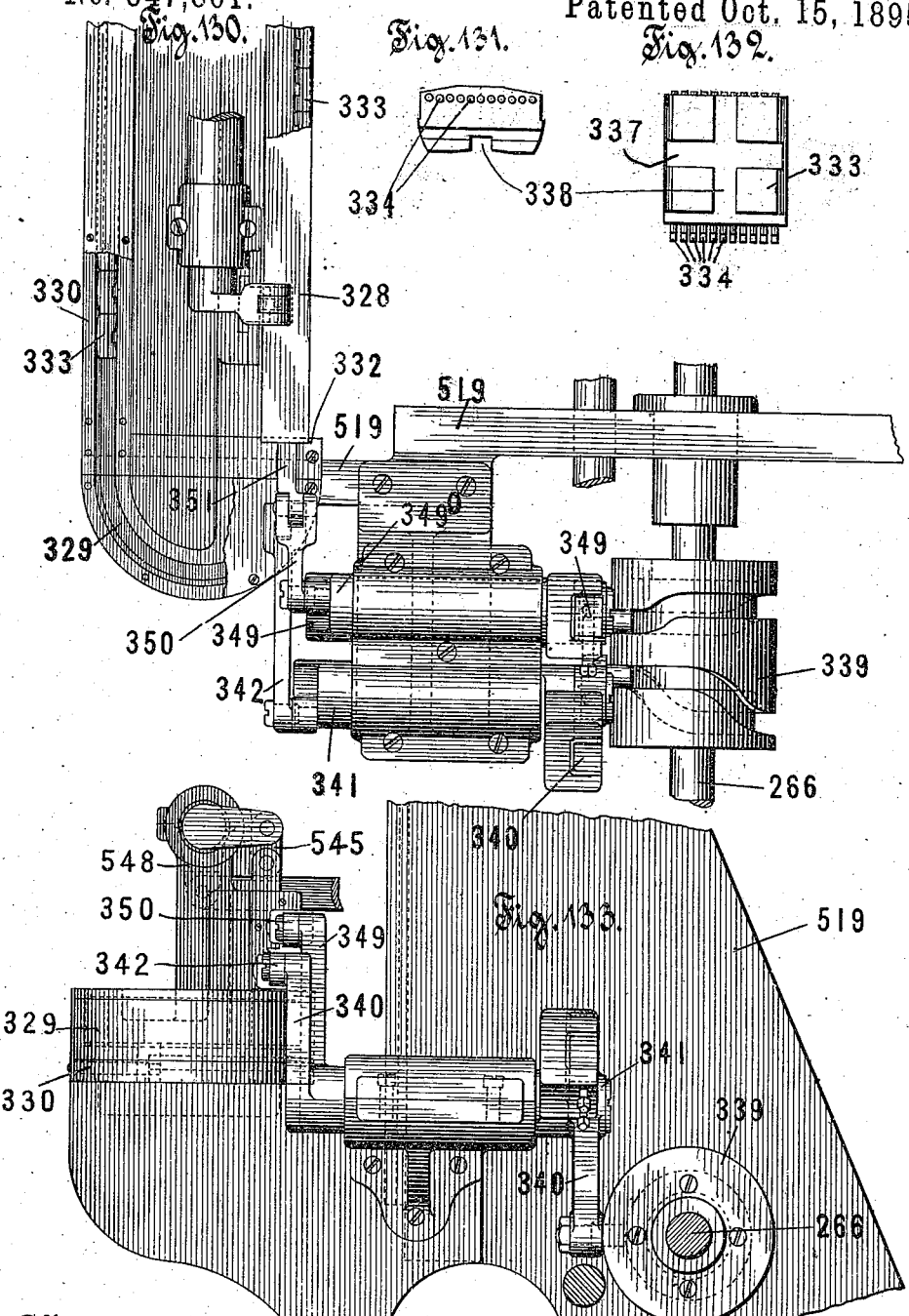
Witnesses
Fred. H. Mills.
Chas. H. Hood.
Inventors.
James W. Paige and
Charles R. North
By their Attorney
David H. Fletcher.

(No Model.)
81 Sheets—Sheet 40.
J. W. PAIGE & C. R. NORTH.
AUTOMATIC TYPE JUSTIFYING MACHINE.
No. 547,861.
Patented Oct. 15, 1895.
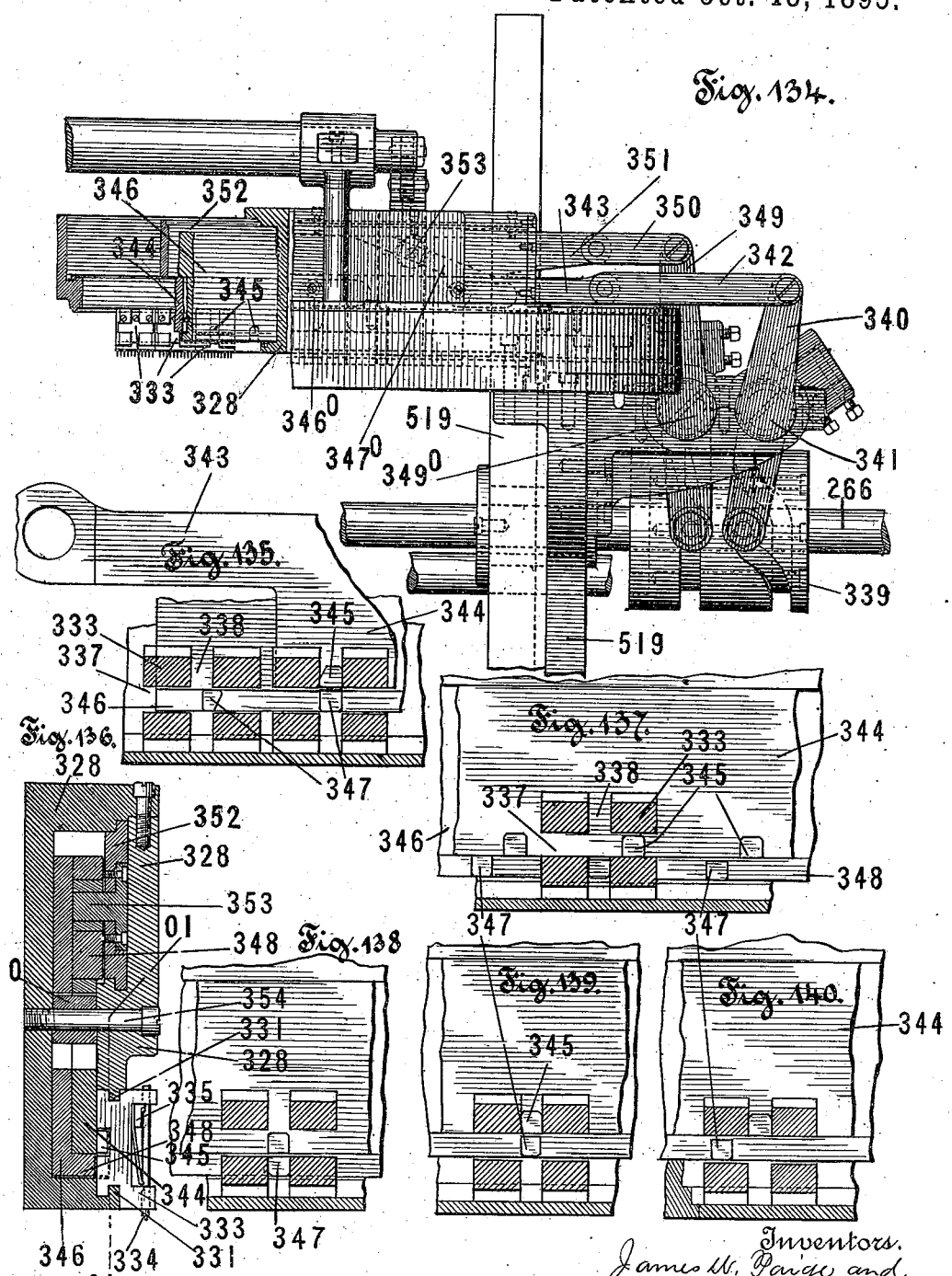
Witnesses.
Fredk. H. Miles.
Chas. H. Wood.
Inventors.
James W. Paige and
Charles R. North,
By their Attorney
David H. Fletcher.

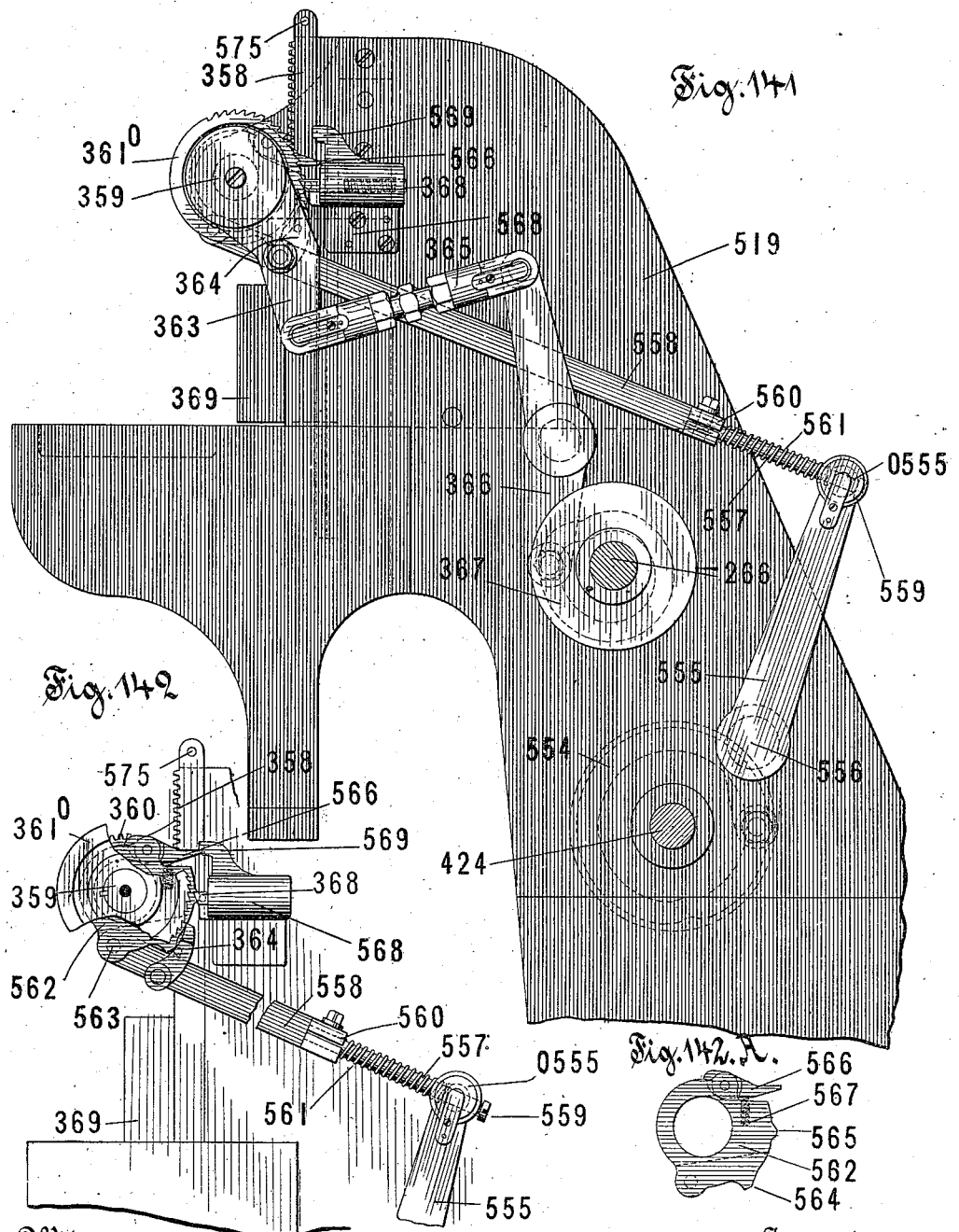
(No Model.) 81 Sheets—Sheet 41.
J. W. PAIGE & C. R. NORTH.
AUTOMATIC TYPE JUSTIFYING MACHINE.
No. 547,861. Patented Oct. 15, 1895.

(No Model.)

81 Sheets—Sheet 42.

J. W. PAIGE & C. R. NORTH.
AUTOMATIC TYPE JUSTIFYING MACHINE.

No. 547,861.

Patented Oct. 15, 1895.

Witnesses
Fredk. H. Mill.
Chas. H. Hood.

Inventors.
James W. Paige and
Charles R. North.
By their Attorney
David H. Fletcher.

THE NORRIS PETERS CO., WASHINGTON, D. C.

(No Model.) 81 Sheets—Sheet 43.

J. W. PAIGE & C. R. NORTH.
AUTOMATIC TYPE JUSTIFYING MACHINE.

No. 547,861. Patented Oct. 15, 1895.

Witnesses
Fred'k H. Mills.
Chas. H. Hood.

Inventors
James W. Paige and
Charles R. North,
By their Attorney
David H. Fletcher.

THE NORRIS PETERS CO., WASHINGTON, D. C.

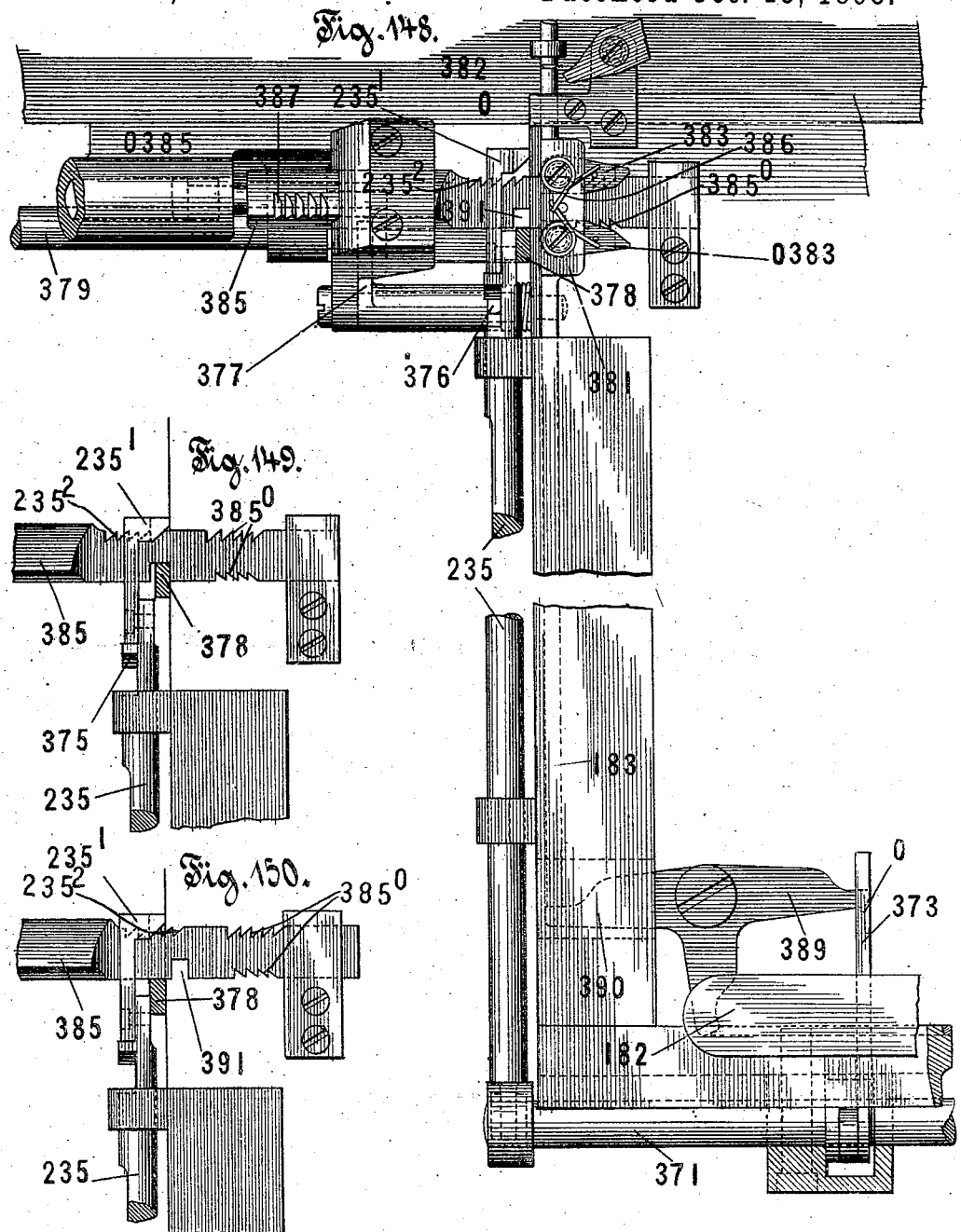

(No Model.)
J. W. PAIGE & C. R. NORTH.
AUTOMATIC TYPE JUSTIFYING MACHINE.
No. 547,861. Patented Oct. 15, 1895.
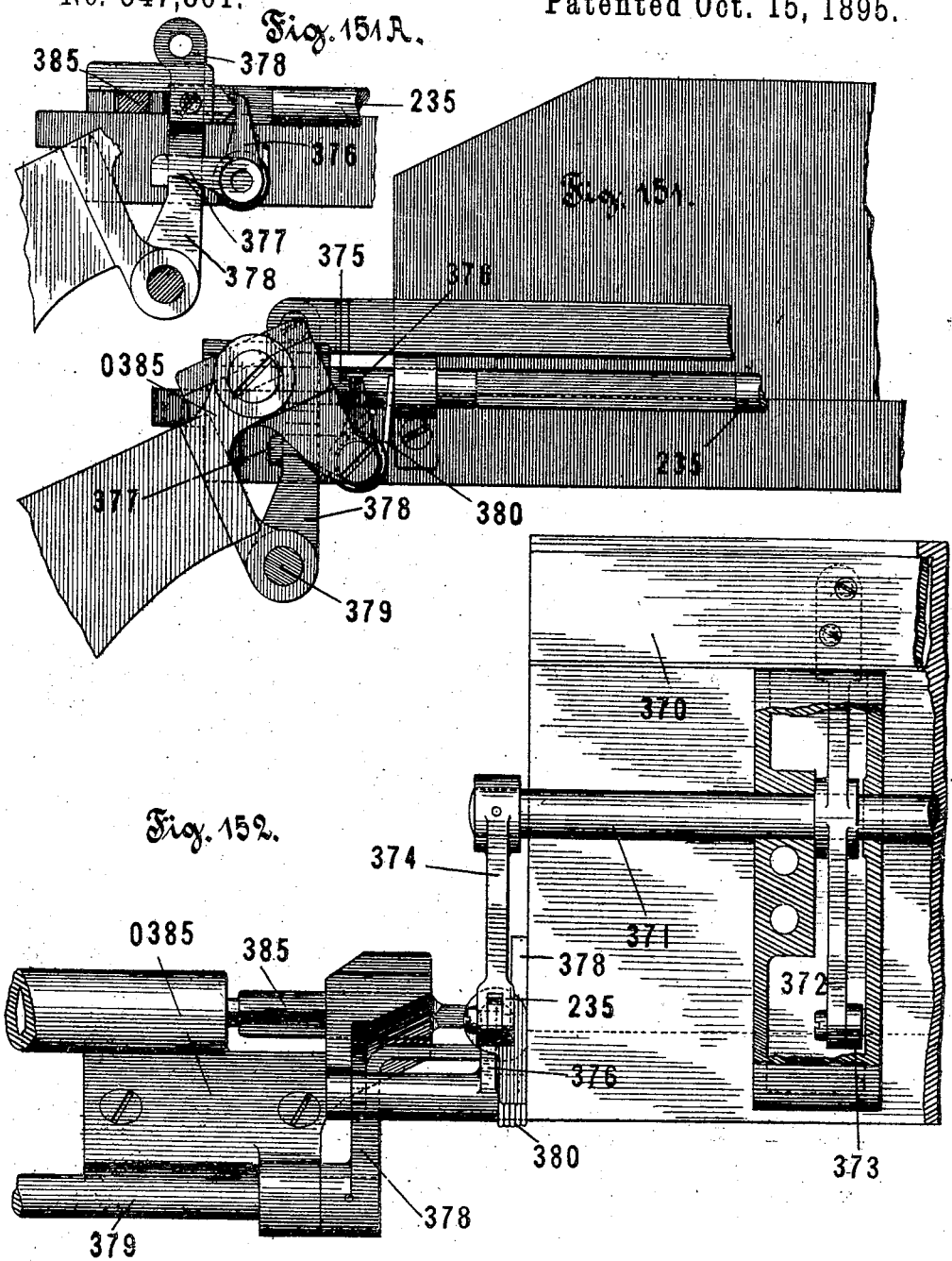

(No Model.) 81 Sheets—Sheet 46.
J. W. PAIGE & C. R. NORTH.
AUTOMATIC TYPE JUSTIFYING MACHINE.
No. 547,861. Patented Oct. 15, 1895.
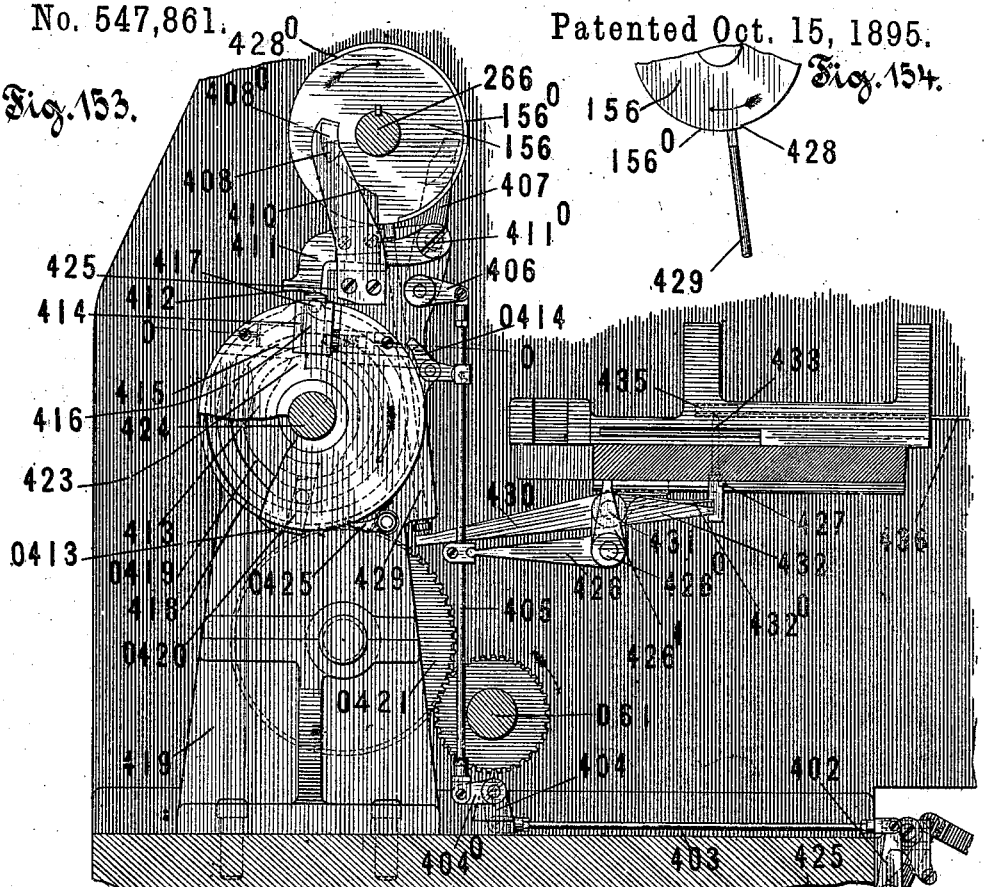
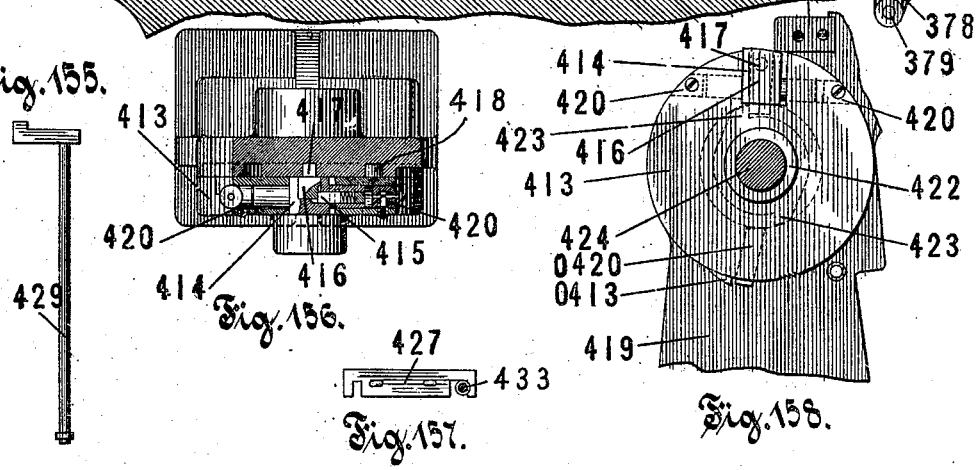
Witnesses
Fred K. H. Mills.
Chas. H. Hood.
Inventors.
James W. Paige and
Charles R. North.
By their Attorney
David H. Fletcher.

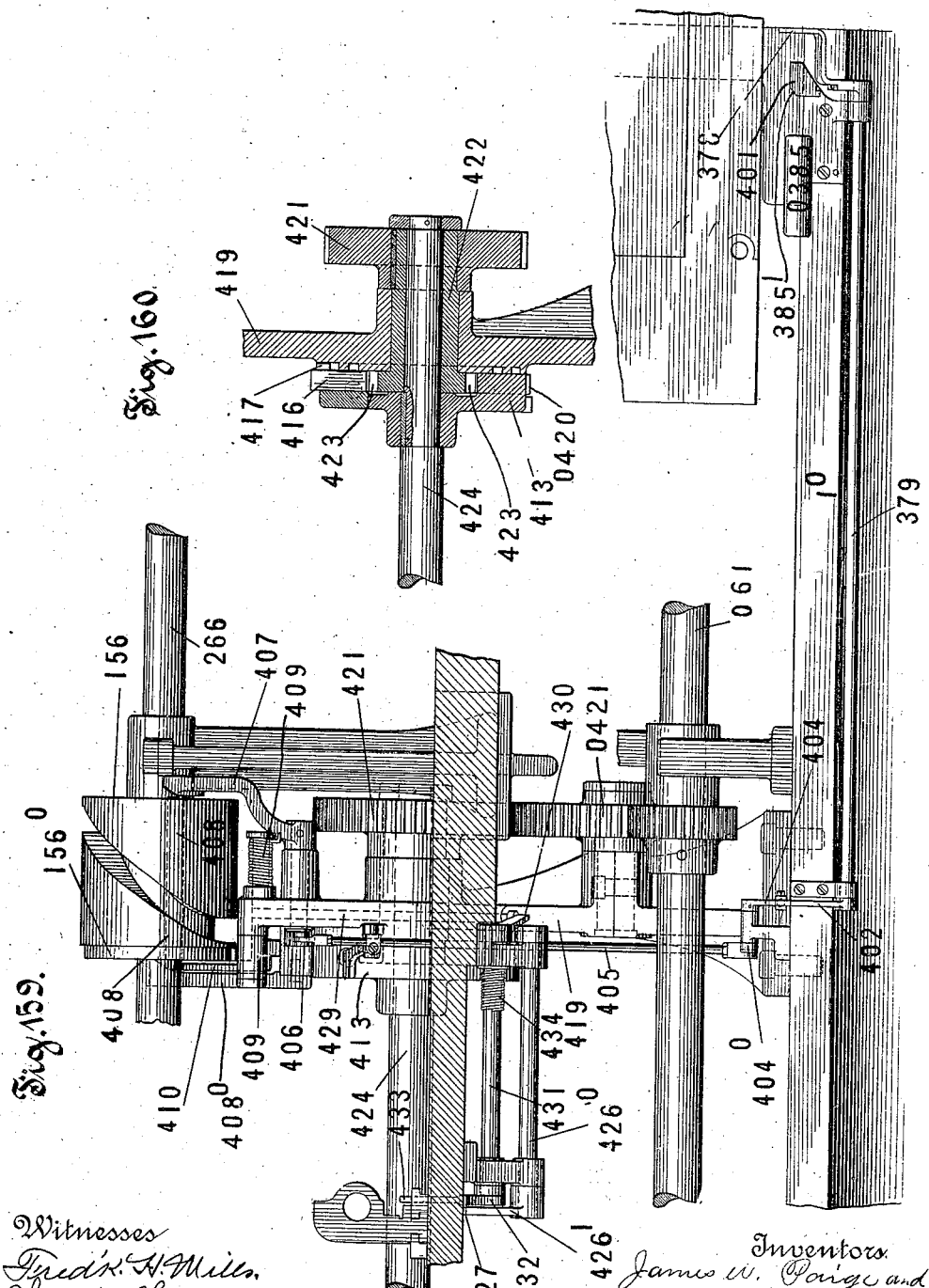

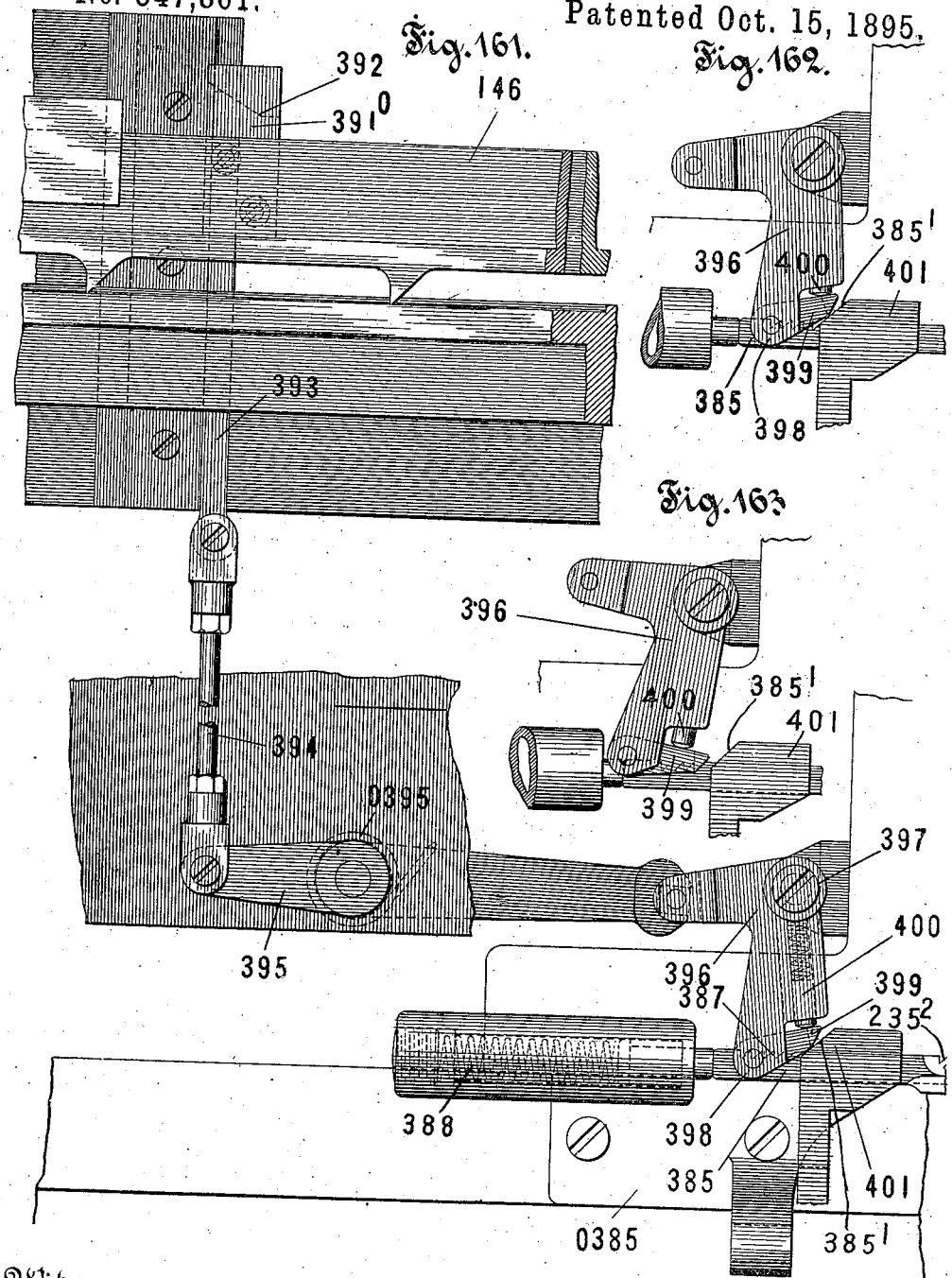

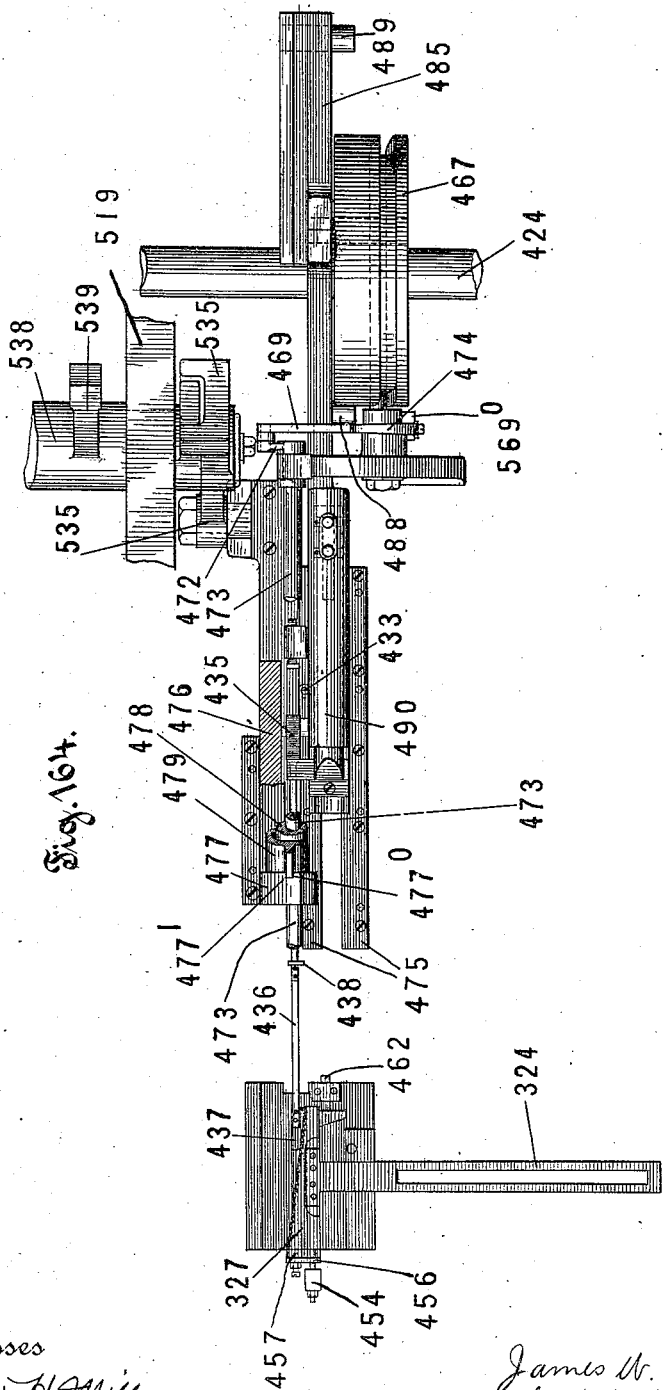

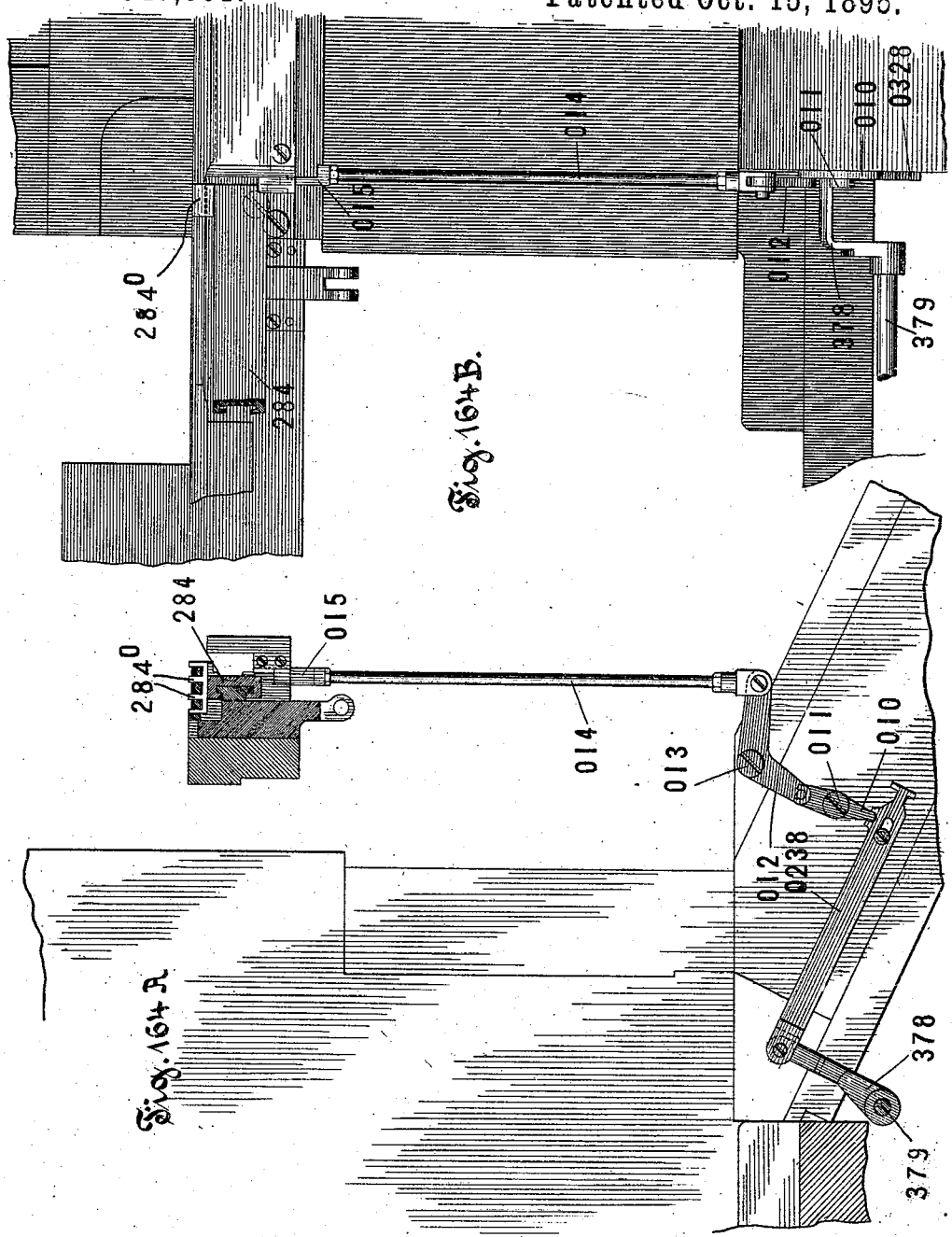

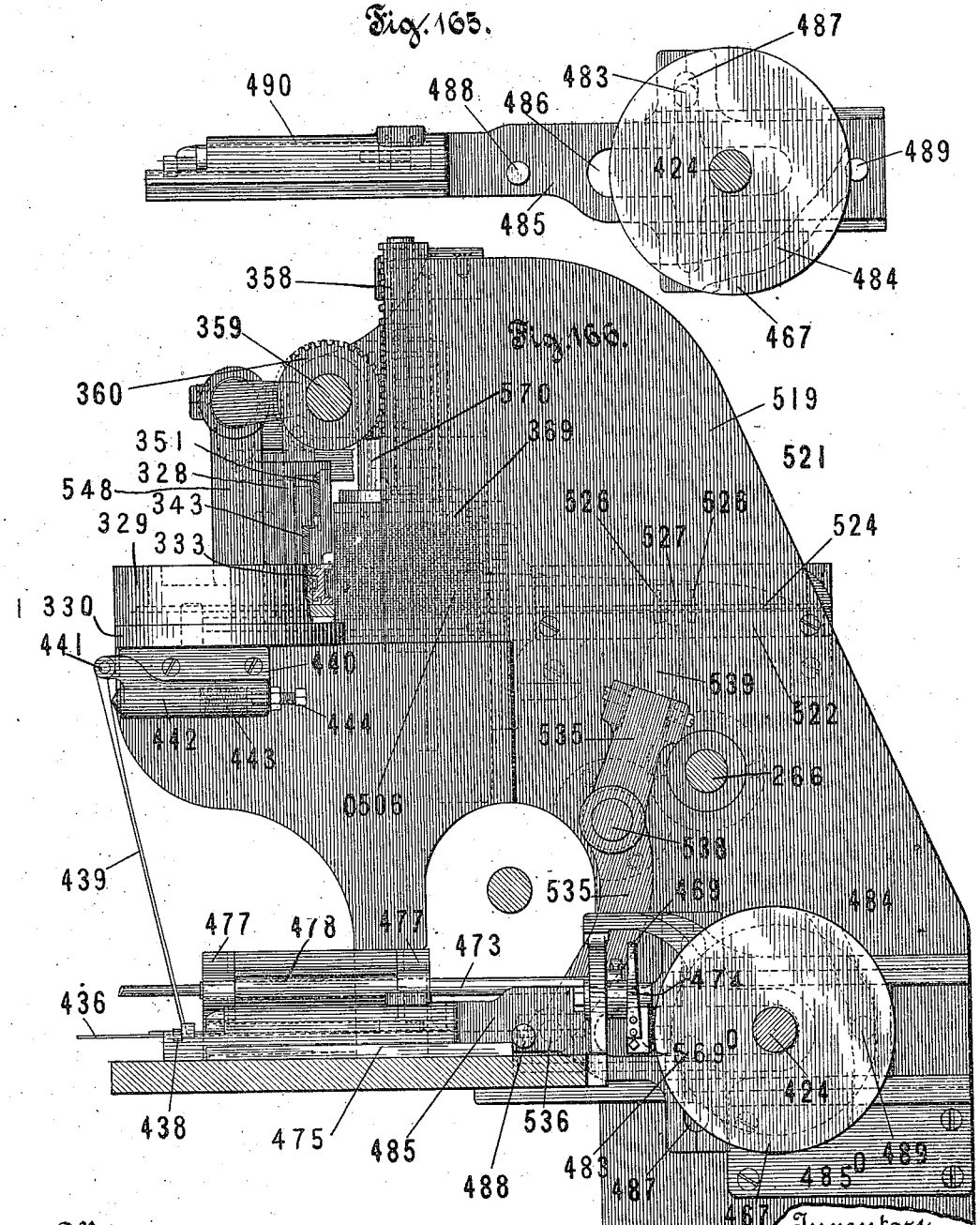

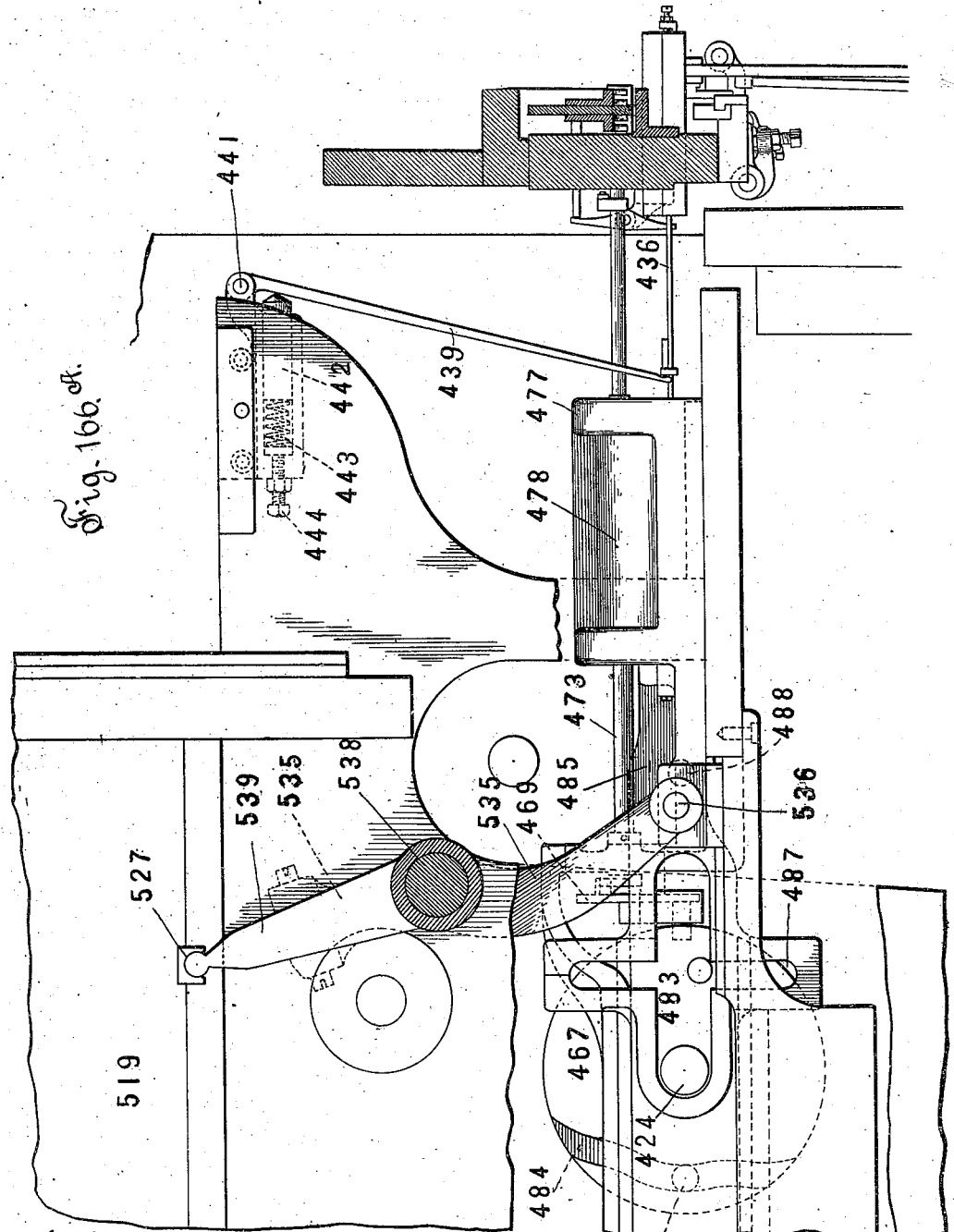

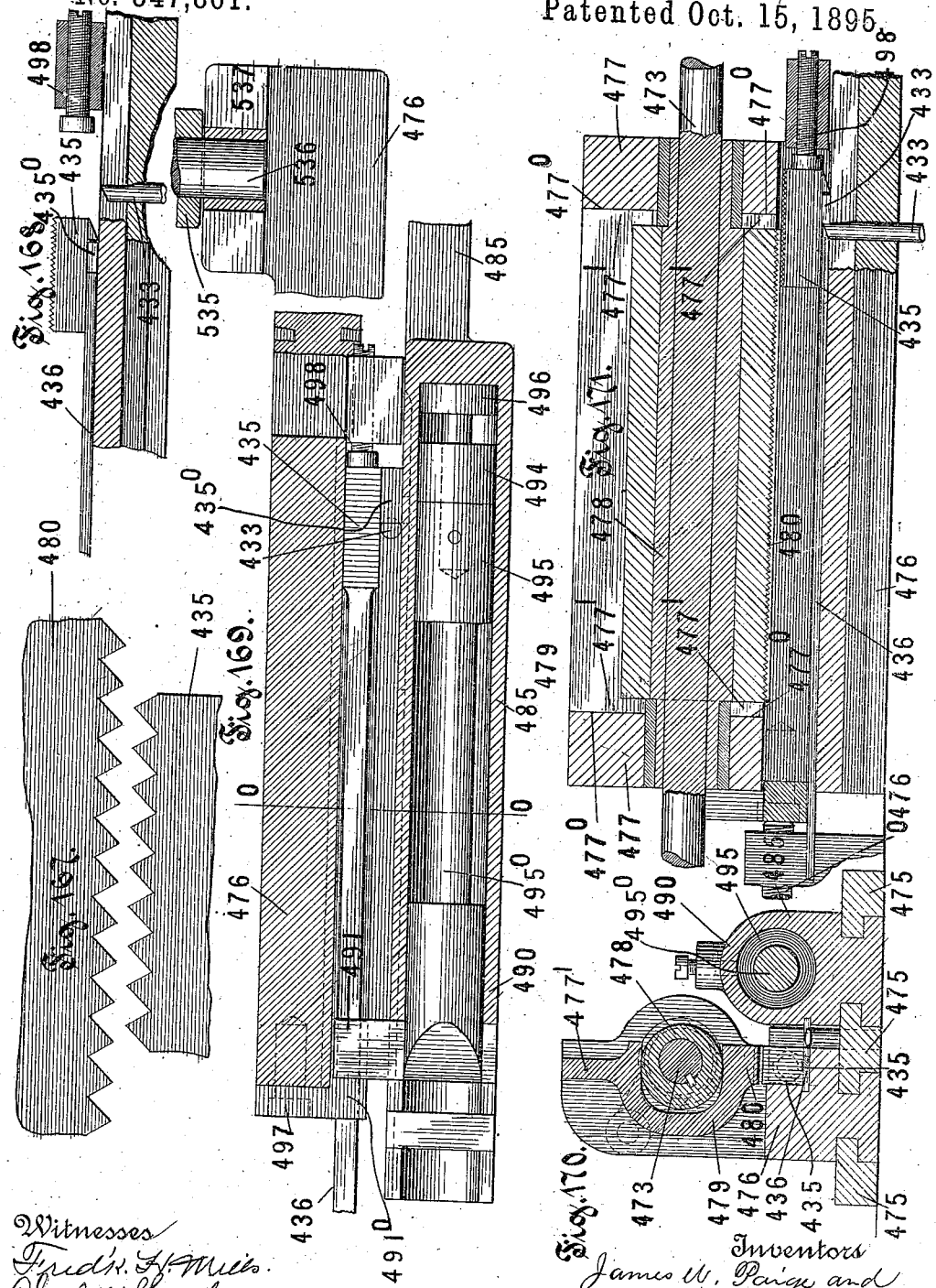

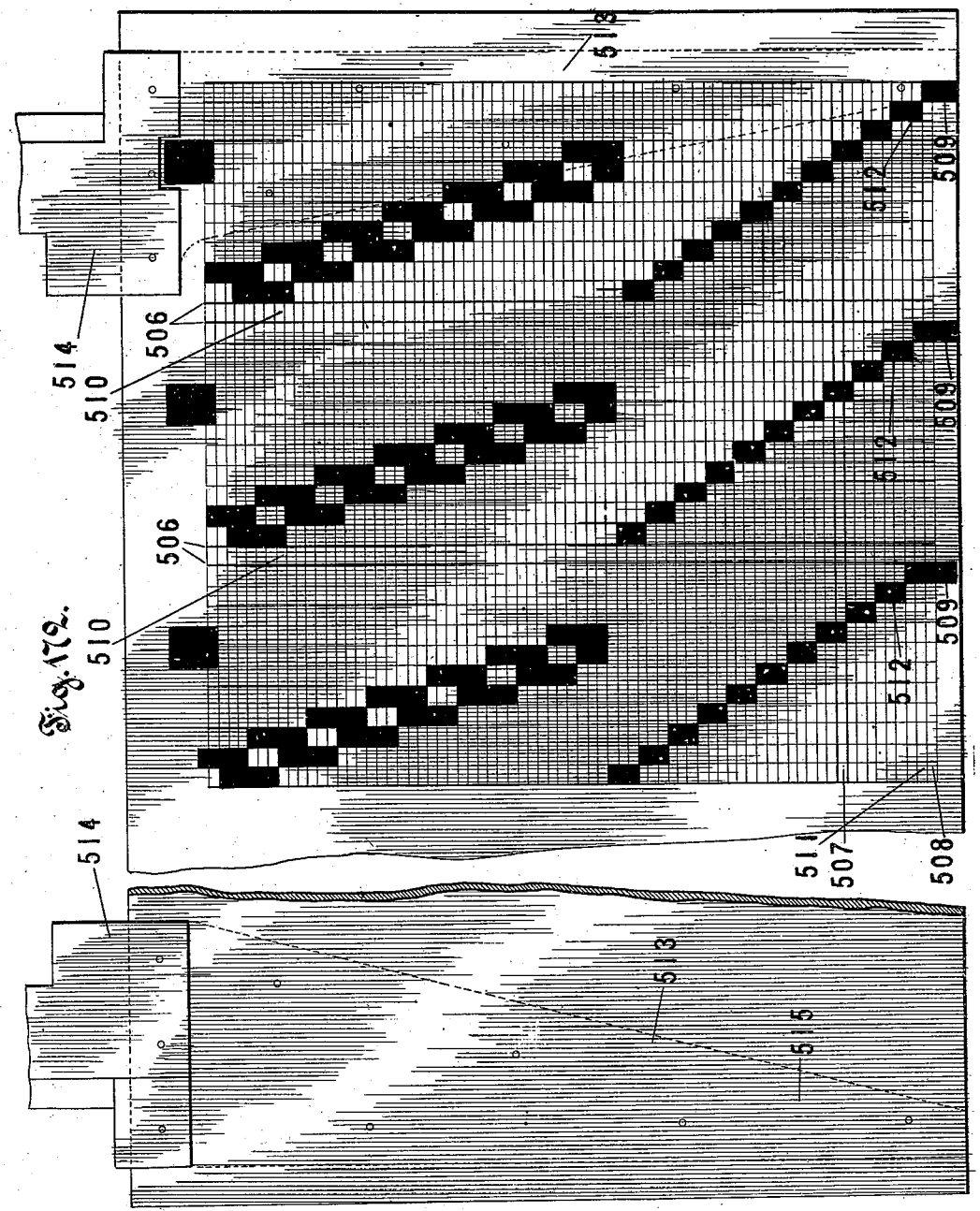

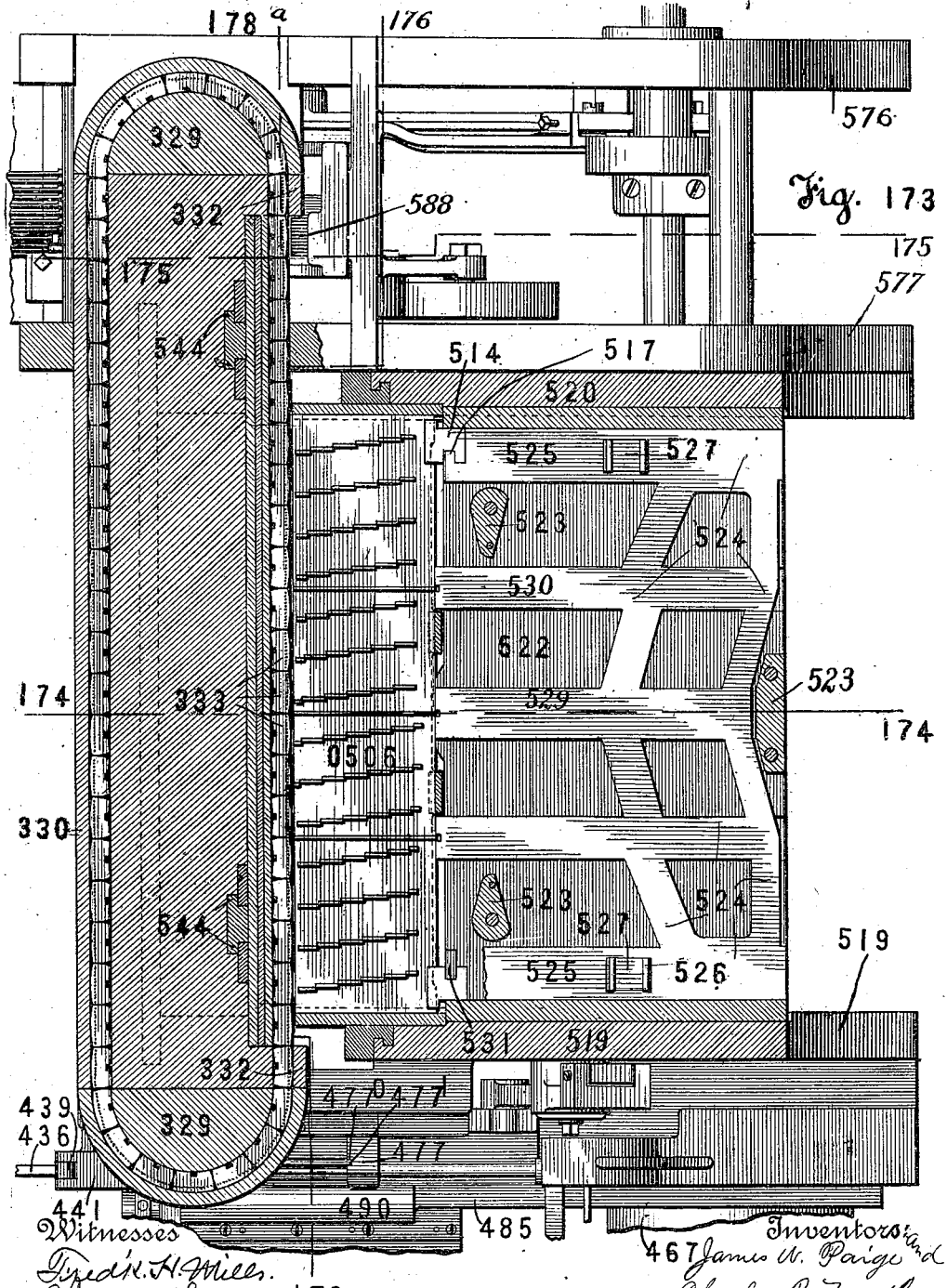

(No Model.)
81 Sheets—Sheet 56.

J. W. PAIGE & C. R. NORTH.
AUTOMATIC TYPE JUSTIFYING MACHINE.

No. 547,861.
Patented Oct. 15, 1895.

Witnesses:
Fredk. H. Mills
Chas. T. Hood

Inventors:
James W. Paige and
Charles R. North
By their Attorney
David H. Fletcher

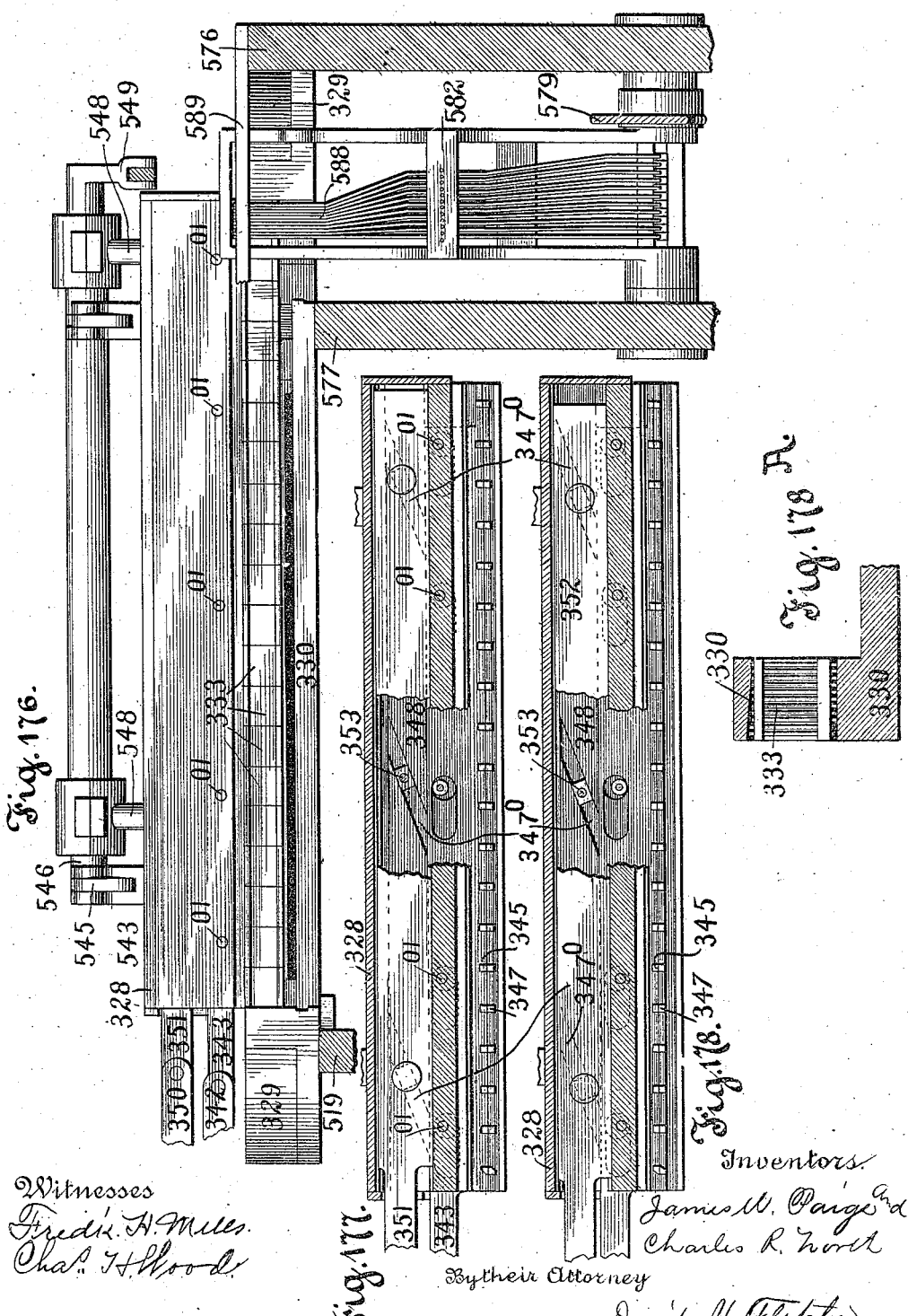

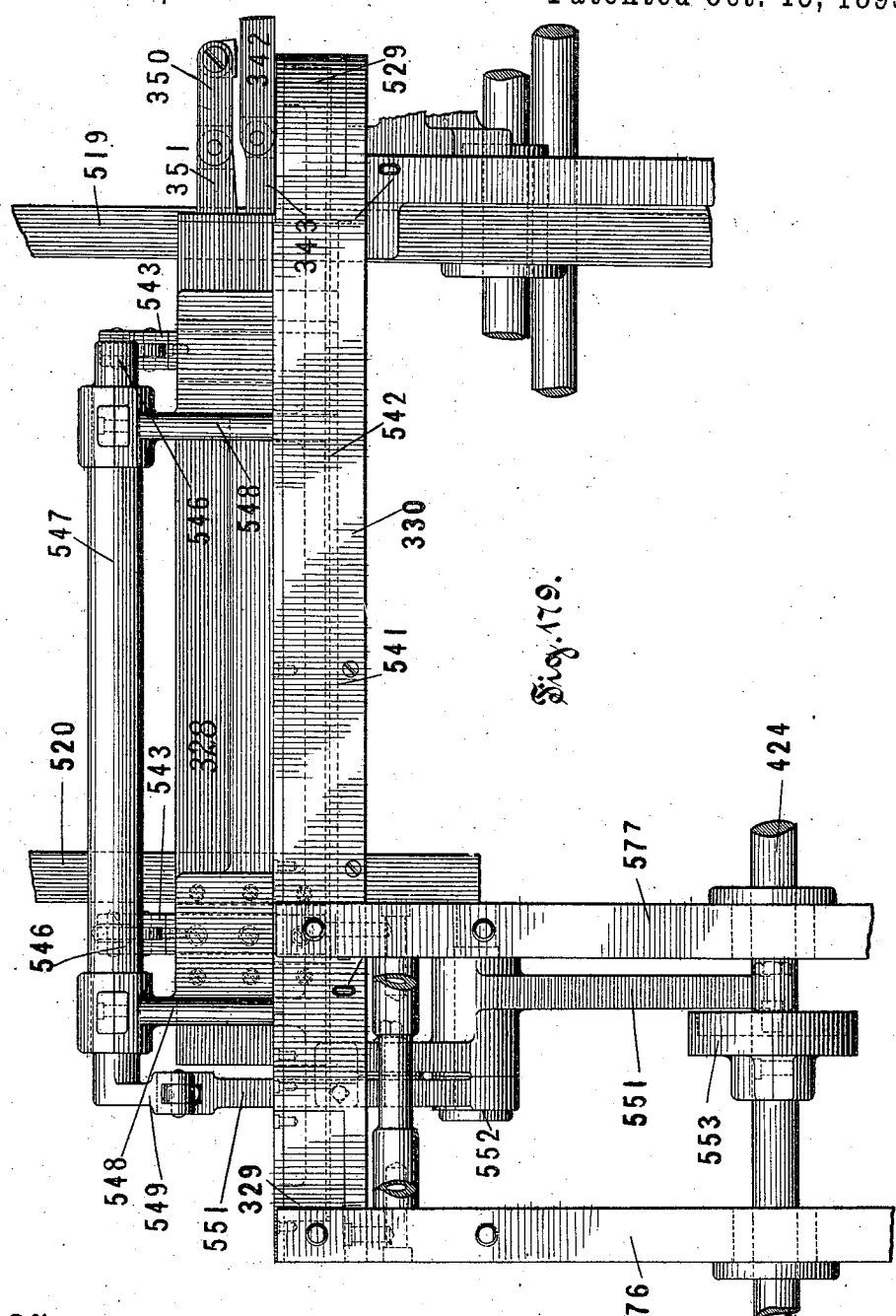

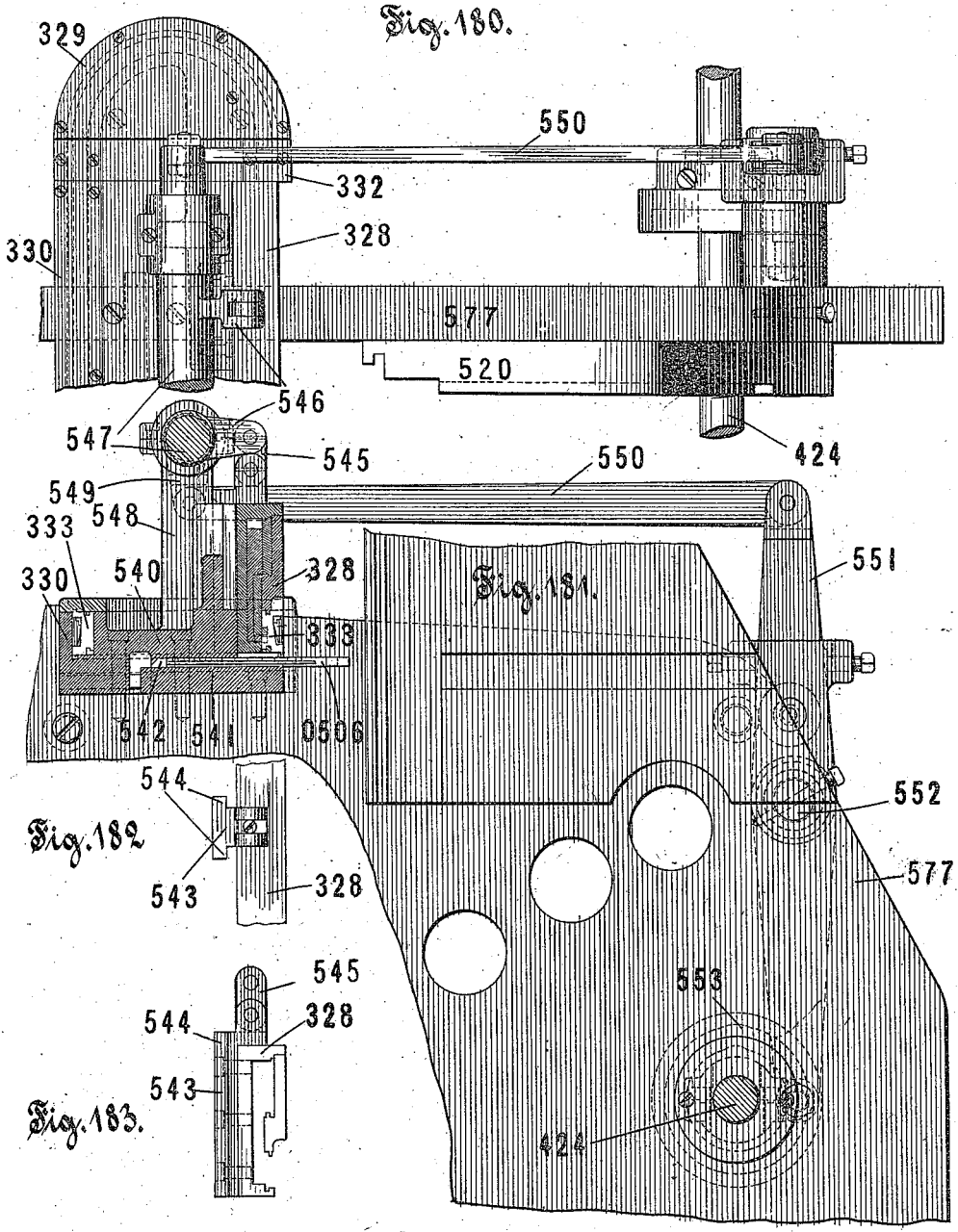

(No Model.) 81 Sheets—Sheet 60.
J. W. PAIGE & C. R. NORTH.
AUTOMATIC TYPE JUSTIFYING MACHINE.
No. 547,861. Patented Oct. 15, 1895.
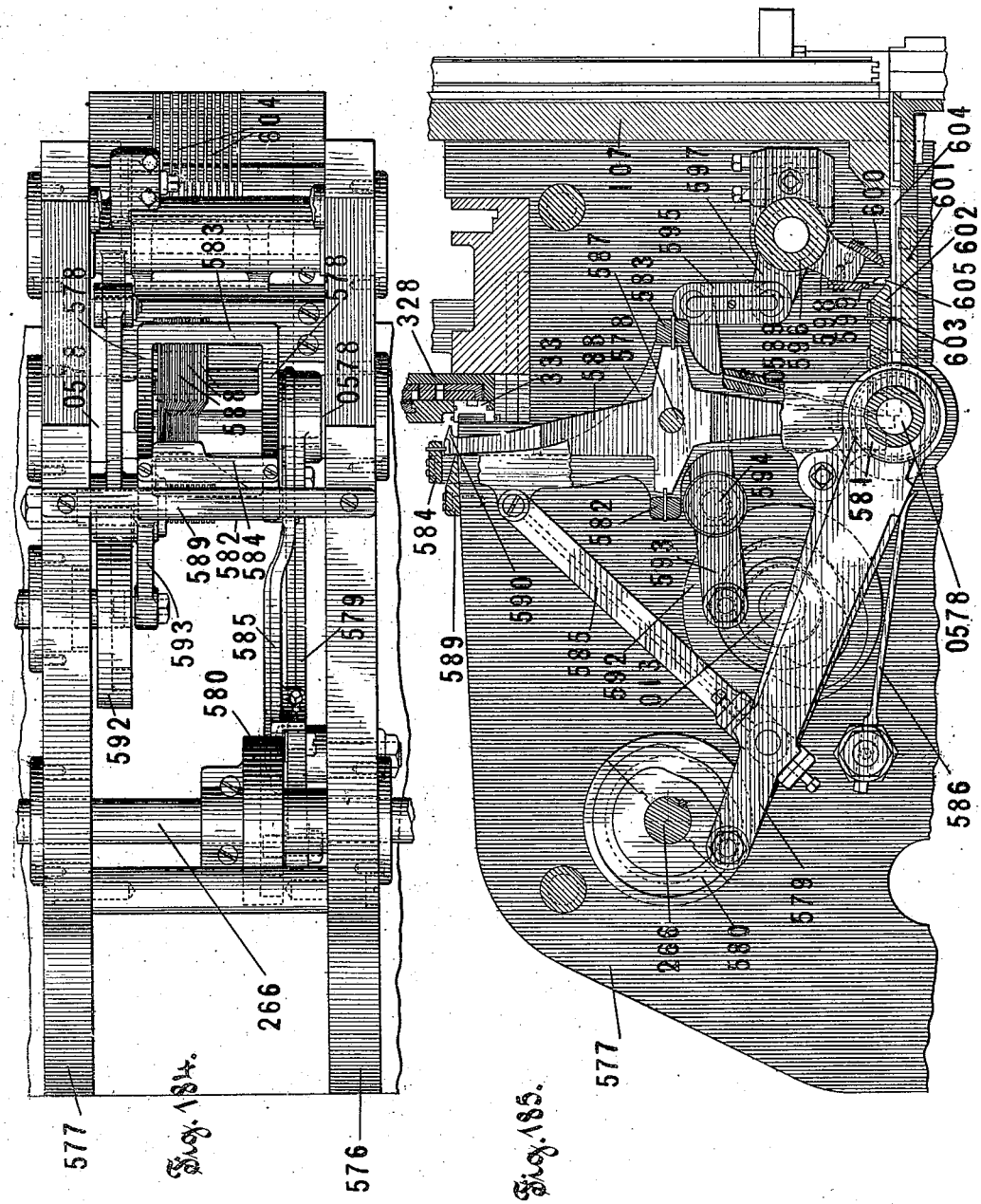
Witnesses
Fredk. H. Mills.
Chas. H. Hood.
Inventors:
James W. Paige 2d
Charles R. North.
By their Attorney
David H. Fletcher.

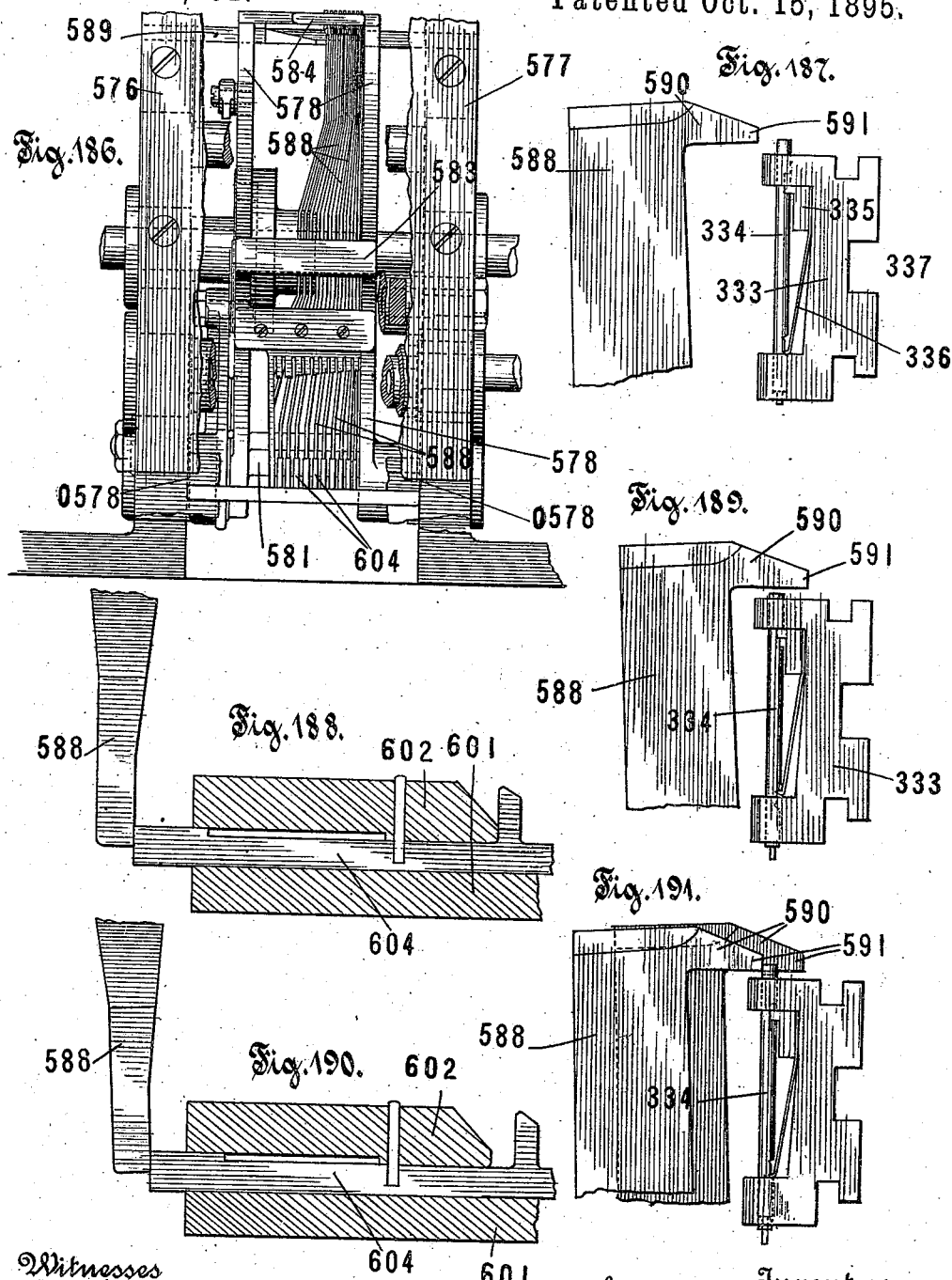

(No Model.)

81 Sheets—Sheet 62.

J. W. PAIGE & C. R. NORTH.
AUTOMATIC TYPE JUSTIFYING MACHINE.

No. 547,861.

Patented Oct. 15, 1895.

Witnesses
Fred'k. H. Mills.
Chas. H. Hood.

Inventors.
James W. Paige and
Charles R. North,
By their Attorney
David H. Fletcher.

(No Model.) 81 Sheets—Sheet 63.
J. W. PAIGE & C. R. NORTH.
AUTOMATIC TYPE JUSTIFYING MACHINE.
No. 547,861. Patented Oct. 15, 1895.
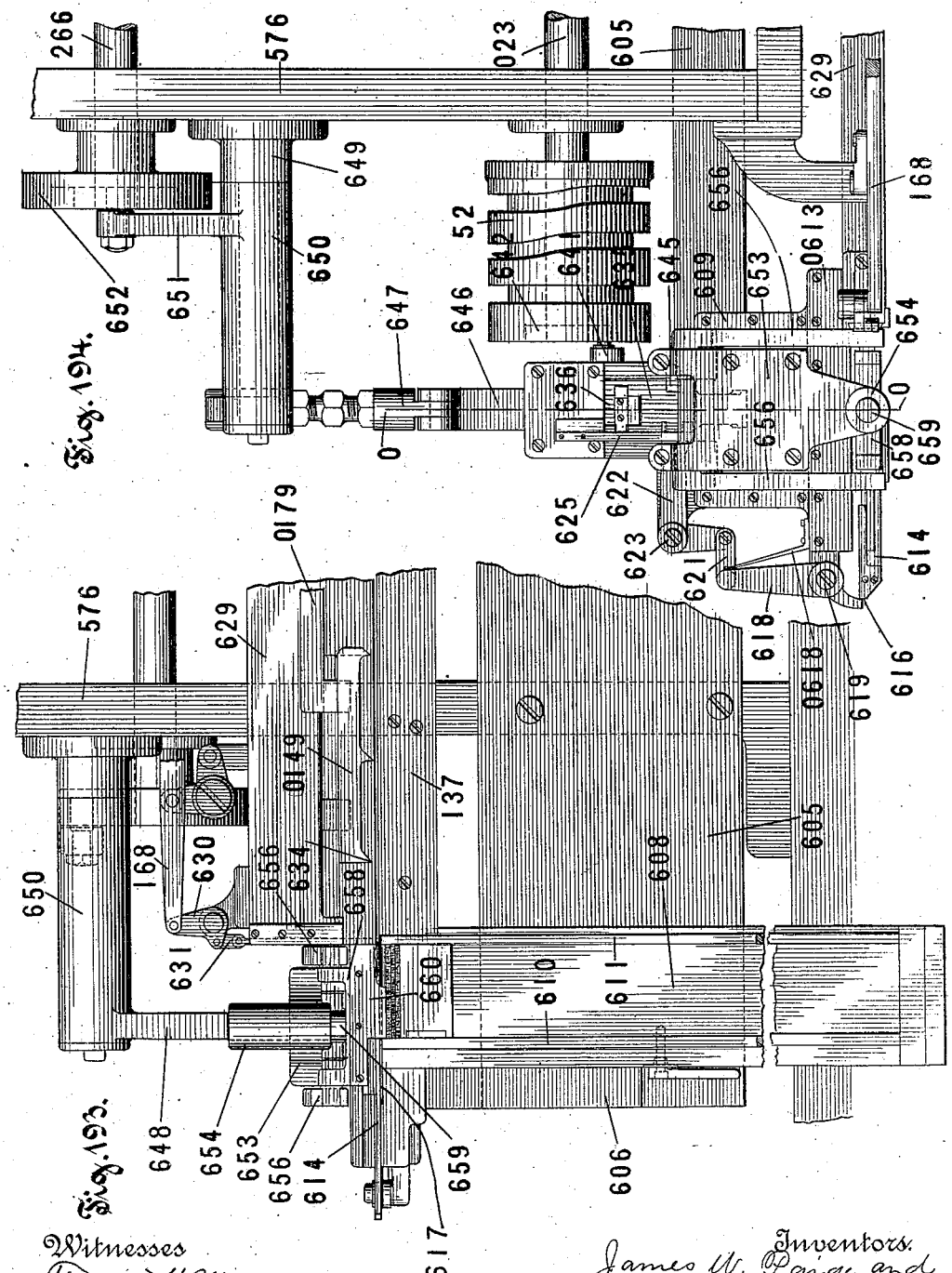
Witnesses
Fredk. H. Mills.
Chas. H. Hood.
Inventors.
James W. Paige and
Charles R. North,
By their Attorney
David H. Fletcher.

(No Model.)
81 Sheets—Sheet 64.
J. W. PAIGE & C. R. NORTH.
AUTOMATIC TYPE JUSTIFYING MACHINE.
No. 547,861.   Patented Oct. 15, 1895.
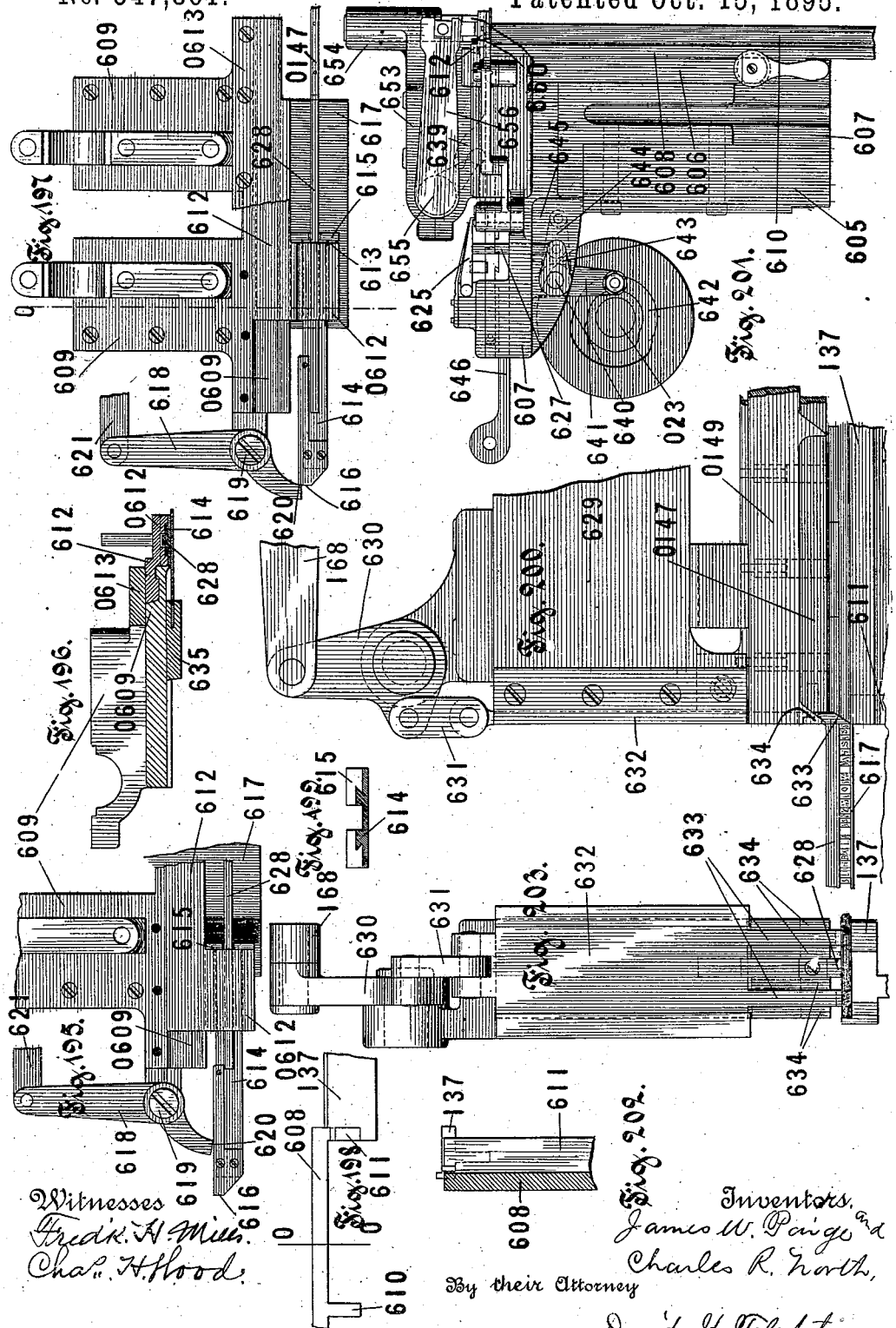
Witnesses
Fredk. H. Mills.
Chas. H. Hood.
Inventors,
James W. Paige and
Charles R. North,
By their Attorney
David H. Fletcher.

(No Model.)  
81 Sheets—Sheet 65.
J. W. PAIGE & C. R. NORTH.
AUTOMATIC TYPE JUSTIFYING MACHINE.
No. 547,861.  
Patented Oct. 15, 1895.
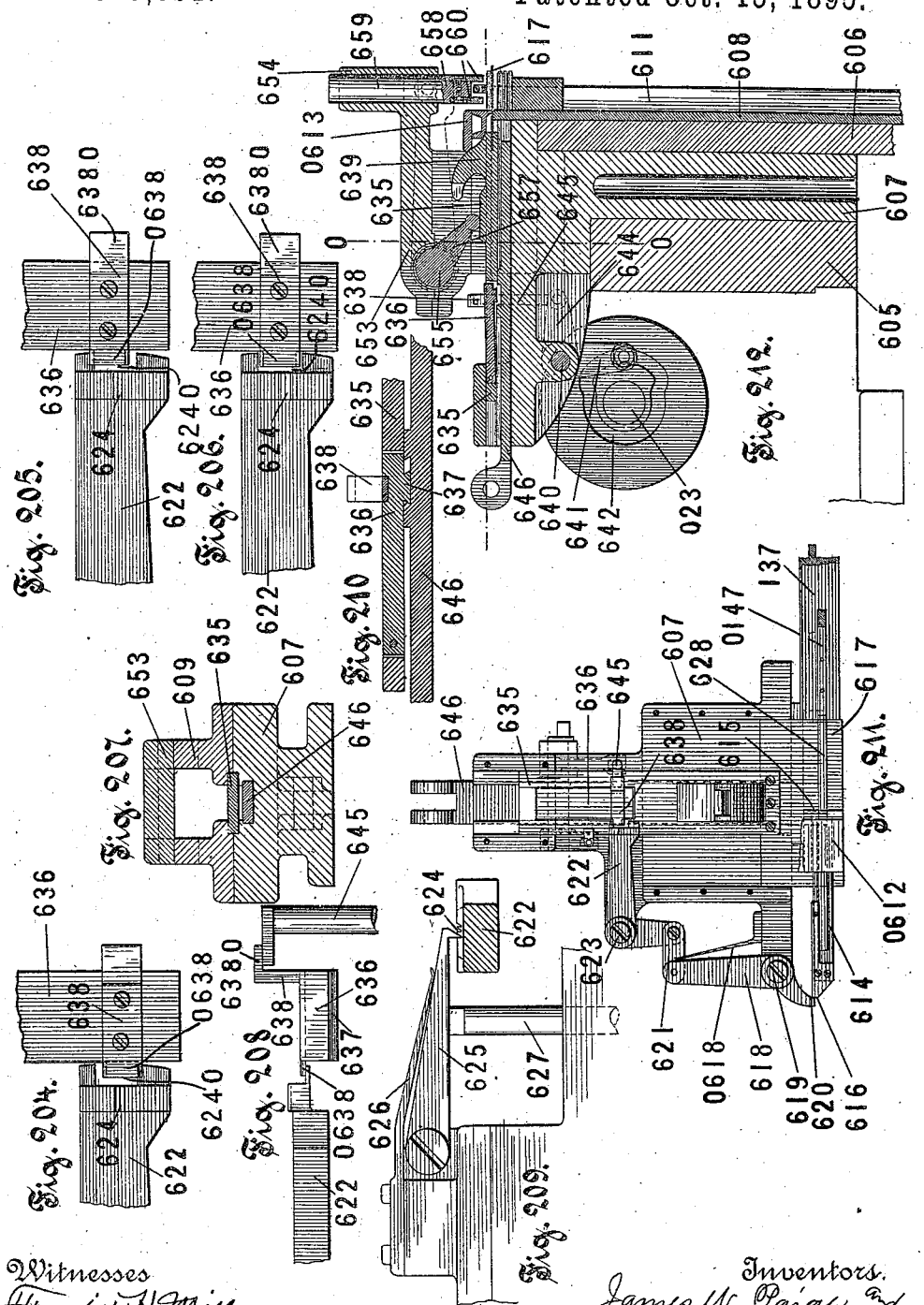
Witnesses  
Fredk. H. Mills  
Chas. H. Hood
Inventors.  
James W. Paige and  
Charles R. North,  
By their Attorney  
David W. Fletcher.

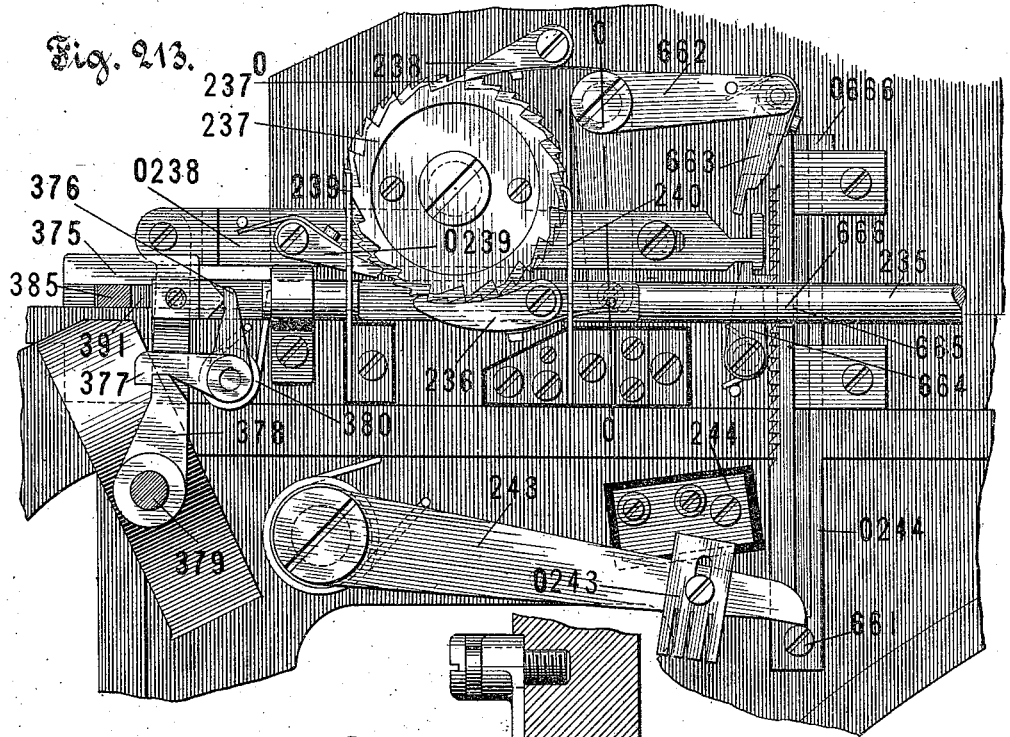

(No Model.) 81 Sheets—Sheet 67.
J. W. PAIGE & C. R. NORTH.
AUTOMATIC TYPE JUSTIFYING MACHINE.
No. 547,861. Patented Oct. 15, 1895.
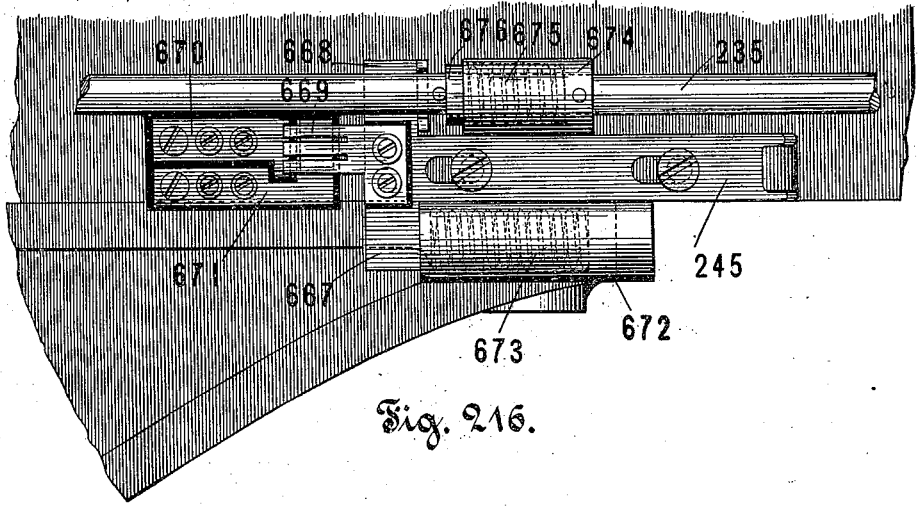
Fig. 216.
Fig. 217.
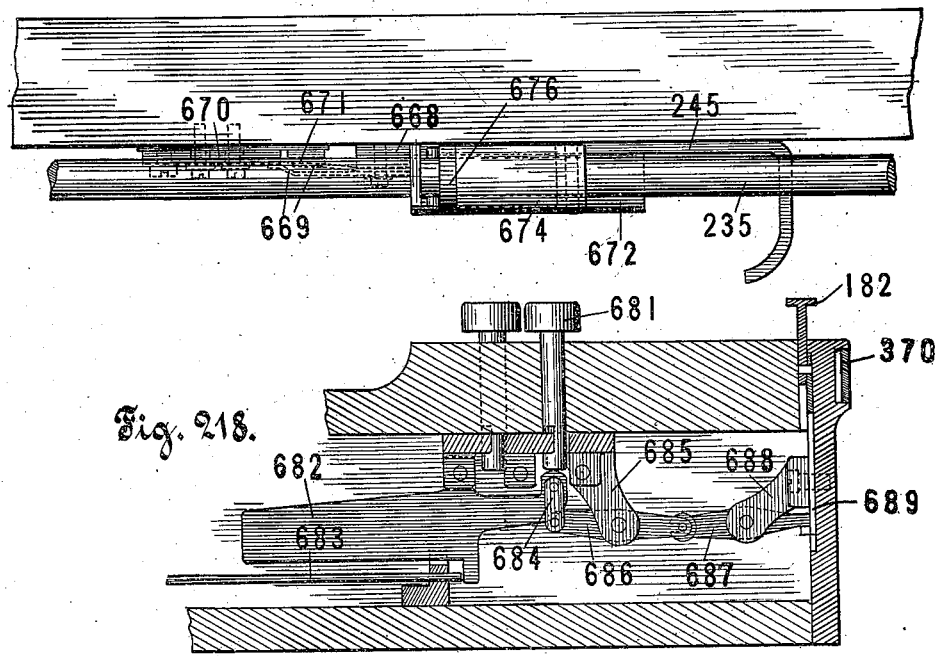
Fig. 218.
Witnesses
Fredk. H. Miles.
Chas. H. Hood.
Inventors.
James W. Paige and
Charles R. North.
By their Attorney
David H. Fletcher.

(No Model.) 81 Sheets—Sheet 68.
J. W. PAIGE & C. R. NORTH.
AUTOMATIC TYPE JUSTIFYING MACHINE.
No. 547,861. Patented Oct. 15, 1895.
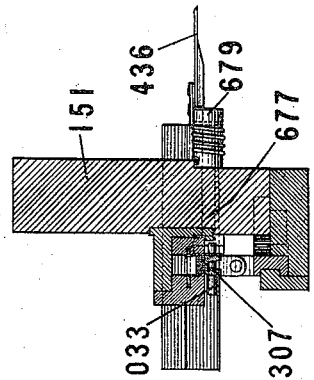
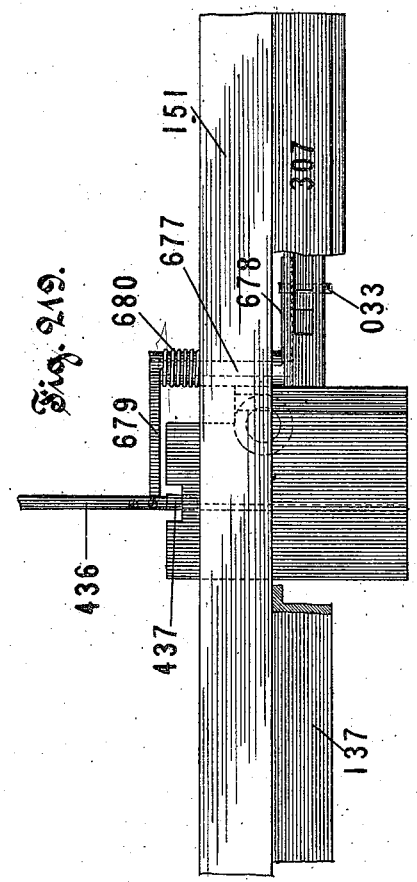
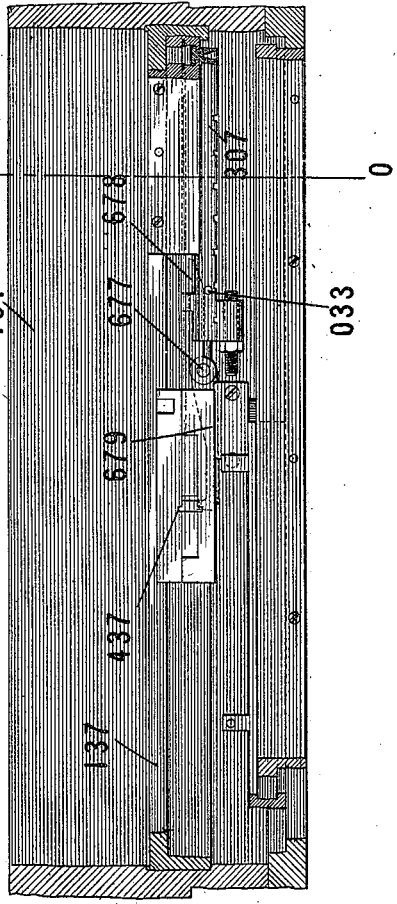
Witnesses
Fredk. H. Mills.
Chas. T. H. Hood.
Inventors.
James W. Paige and
Charles R. North.
By their Attorney
David H. Fletcher.

(No Model.)  81 Sheets—Sheet 69.
J. W. PAIGE & C. R. NORTH.
AUTOMATIC TYPE JUSTIFYING MACHINE.
No. 547,861. Patented Oct. 15, 1895.
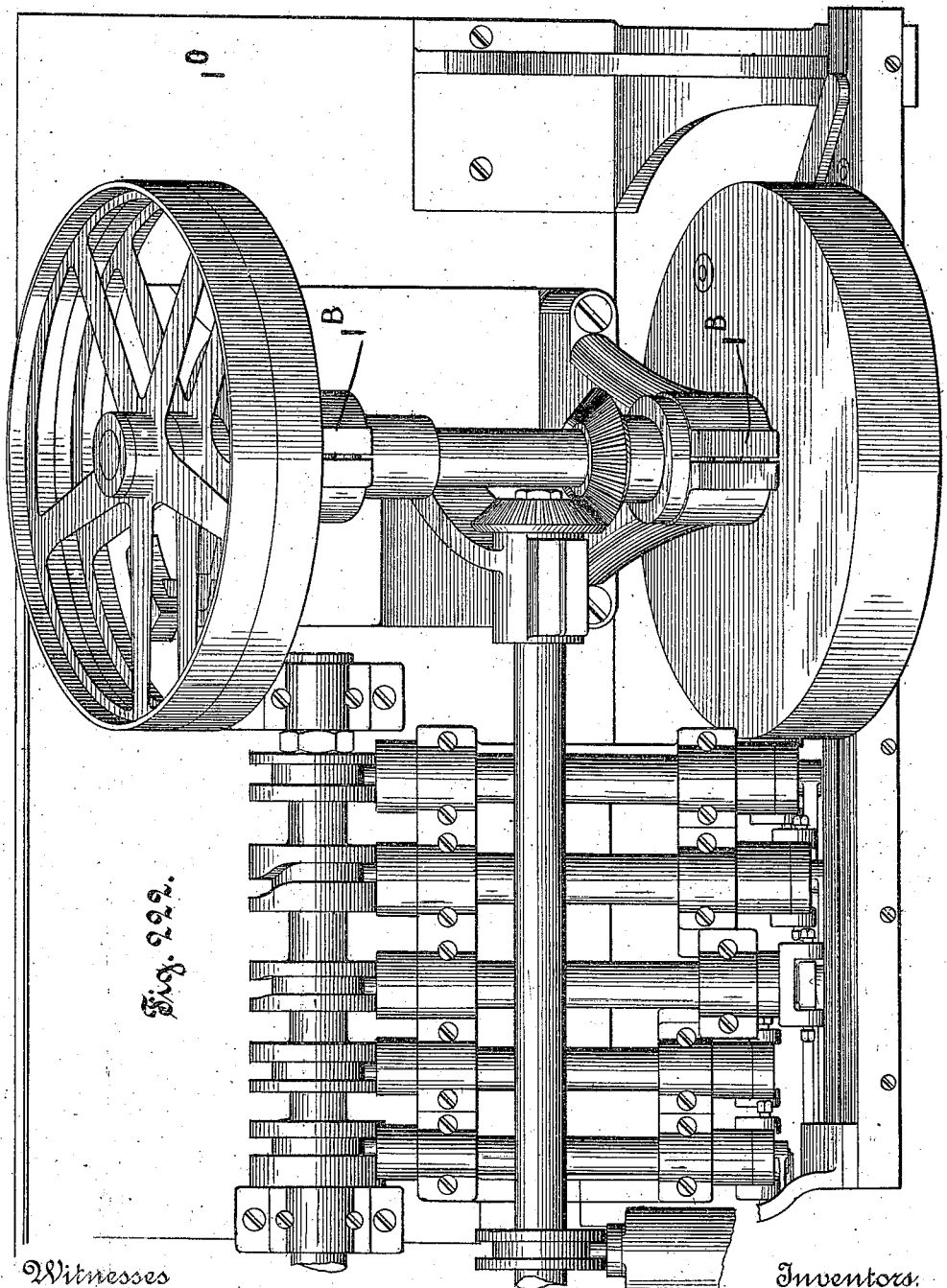

(No Model.) 81 Sheets—Sheet 70.

J. W. PAIGE & C. R. NORTH.
AUTOMATIC TYPE JUSTIFYING MACHINE.

No. 547,861. Patented Oct. 15, 1895.

Witnesses
Fredk. H. Mills.
Chas. H. Hood.

Inventors.
James W. Paige, and
Charles R. North,
By their Attorney
David H. Fletcher.

(No Model.) 81 Sheets—Sheet 71.
J. W. PAIGE & C. R. NORTH.
AUTOMATIC TYPE JUSTIFYING MACHINE.
No. 547,861. Patented Oct. 15, 1895.

(No Model.)

81 Sheets—Sheet 74.

J. W. PAIGE & C. R. NORTH.
AUTOMATIC TYPE JUSTIFYING MACHINE.

No. 547,861. Patented Oct. 15, 1895.

Witnesses
Fred'k H. Mills.
Chas. H. Hood.

Inventors.
James W. Paige and
Charles R. North,
By their Attorney
David H. Fletcher.

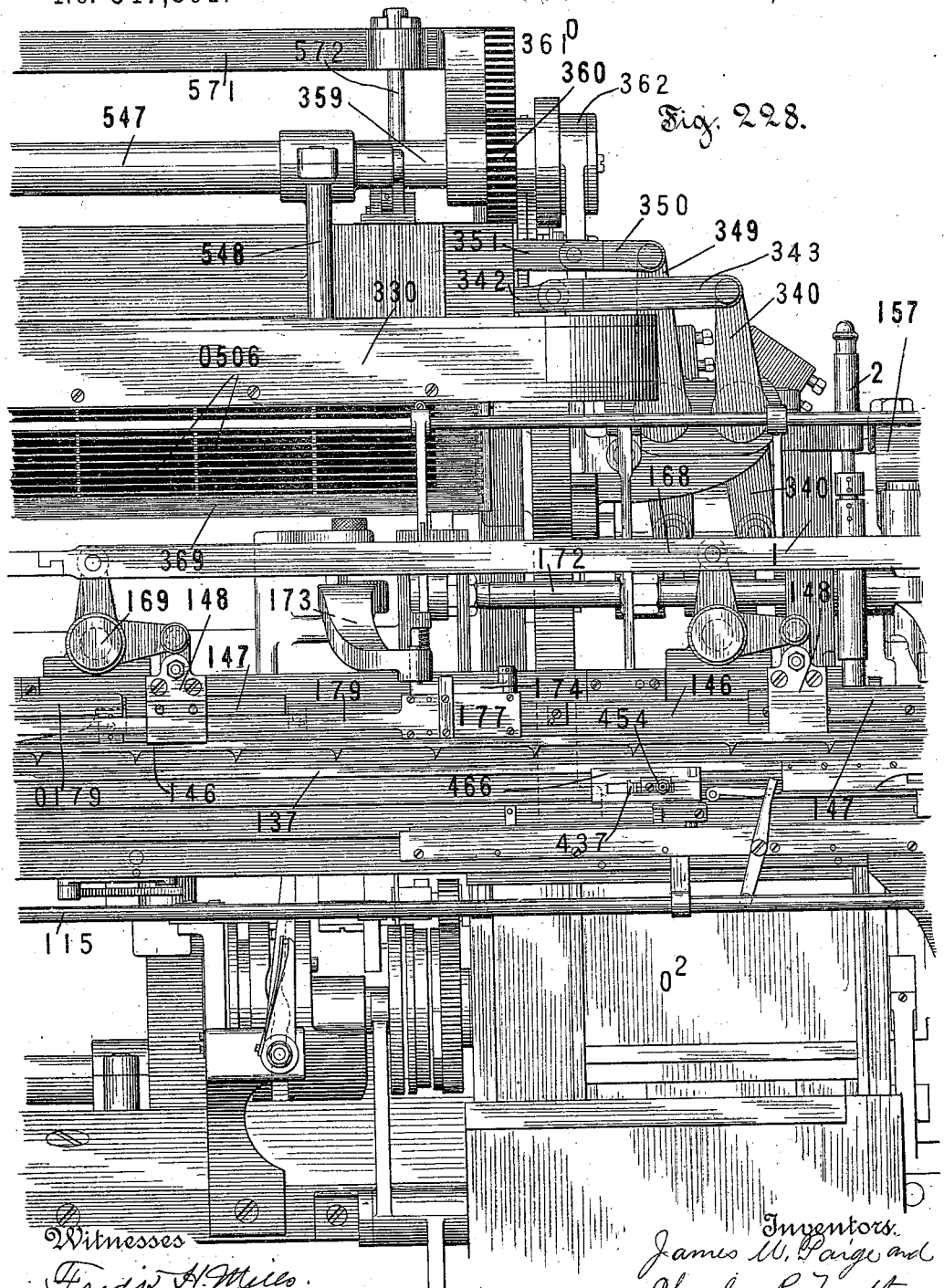

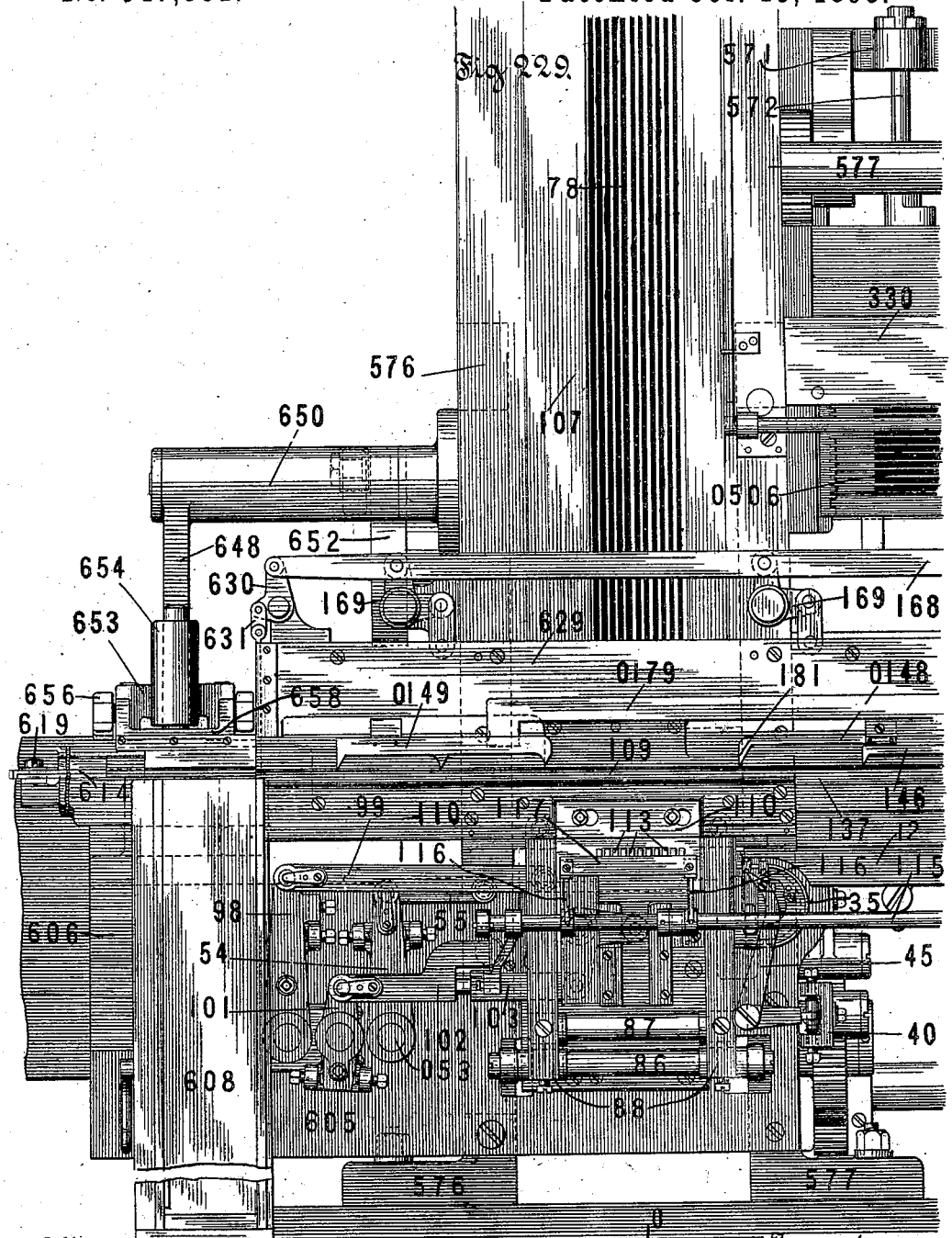

(No Model.)  
81 Sheets—Sheet 77.

J. W. PAIGE & C. R. NORTH.
AUTOMATIC TYPE JUSTIFYING MACHINE.

No. 547,861.  Patented Oct. 15, 1895.

Fig. 230.

Method of Justifying Lines of Type.
Table № 1.

| Lines of 9 Words Column Measure 3 inches | | Lines of 10 Words. Column Measure 3 inches. | |
|---|---|---|---|
| Aggregate Measure of Words without spaces. | Combination of Spaces adapted to justify to column measure | Aggregate Measure of Words without spaces. | Combination of Spaces adapted to justify to column measure. |
| (1) 2 700/1000 inches | spaces measuring 4 " ".040 each 4 " ".035 " | (1) 2 665/1000 inches | spaces measuring 4 " ".040 each 5 " ".035 " |
| (2) 2 705/1000 | 3 " ".040 " 5 " ".035 " | (2) 2 670/1000 | 3 " ".040 " 6 " ".035 " |
| (3) 2 710/1000 | 2 " ".040 " 6 " ".035 " | (3) 2 675/1000 | 2 " ".040 " 7 " ".035 " |
| (4) 2 715/1000 | 1 " ".040 " 7 " ".035 " | (4) 2 680/1000 | 1 " ".040 " 8 " ".035 " |
| (5) 2 720/1000 | 8 " ".035 " | (5) 2 685/1000 | 9 " ".035 " |
| (6) 2 725/1000 | 7 " ".035 " 1 " ".030 " | (6) 2 690/1000 | 8 " ".035 " 1 " ".030 " |
| (7) 2 730/1000 | 6 " ".035 " 2 " ".030 " | (7) 2 695/1000 | 7 " ".035 " 2 " ".030 " |
| (8) 2 735/1000 | 5 " ".035 " 3 " ".030 " | (8) 2 700/1000 | 6 " ".035 " 3 " ".030 " |
| (9) 2 740/1000 | 4 " ".035 " 4 " ".030 " | (9) 2 705/1000 | 5 " ".035 " 4 " ".030 " |

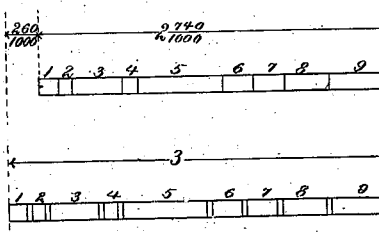

Fig. 231.

Fig. 232.

Witnesses  
Fred'k H. Mills  
Chas. T. Wood.

Inventors.  
James W. Paige and  
Charles R. North.  
By their Attorney  
David H. Fletcher.

(No Model.)  81 Sheets—Sheet 78.

J. W. PAIGE & C. R. NORTH.
AUTOMATIC TYPE JUSTIFYING MACHINE.

No. 547,861.  Patented Oct. 15, 1895.

Fig. 233.

Method of Justifying Lines of Type.
Table No. 2.

Lines of 4 Words.
Column Measure 3 inches.

| Aggregate Measure of Words without spaces. | Combination of Spaces adapted to justify to column measure. |
|---|---|
| 2 775/1000 inches | 1 space measuring .040 inches = .075 inches in one place<br>1 " " .035 " = .075 " " "<br>1 " " .040 " = .075 " " "<br>1 " " .035 " = .075 " " " |
| 2 780/1000 " | 1 " " .040 " = .075 " " "<br>1 " " .040 " = .075 " " "<br>1 " " .035 " = .075 " " "<br>1 " " .070 " = .070 " " " |
| 2 785/1000 " | 1 " " .040 " = .075 " " "<br>1 " " .035 " = .075 " " "<br>1 " " .070 " = .070 " " "<br>1 " " .070 " = .070 " " " |
| 2 790/1000 " | 3 " " .070 " each = {.070 " " "<br>{.070 " " "<br>{.070 " " " |
| 2 795/1000 " | 2 " " .070 " " = {.070 " " "<br>{.070 " " "<br>1 " " .065 " " = .065 " " " |
| 2 800/1000 " | 1 " " .070 " " = .070 " " "<br>2 " " .065 " " = {.065 " " "<br>{.065 " " " |

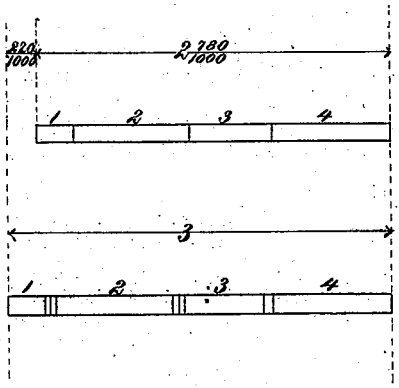

Fig. 234.

Fig. 235.

Witnesses
Fred't H. Mills.
Chas. T. Wood.

Inventors.
James W. Paige and
Charles R. North,
By their Attorney
David H. Fletcher.

(No Model.) 81 Sheets—Sheet 79.
J. W. PAIGE & C. R. NORTH.
AUTOMATIC TYPE JUSTIFYING MACHINE.
No. 547,861. Patented Oct. 15, 1895.
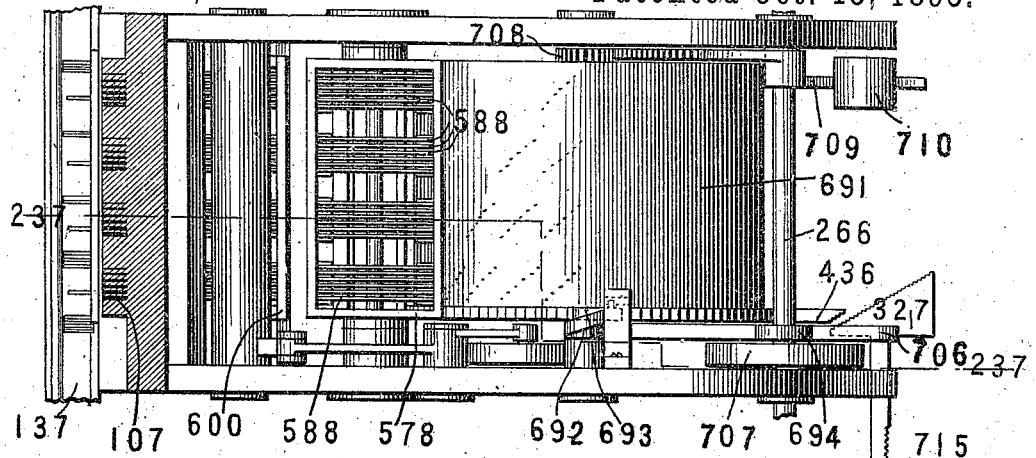
Fig. 236.
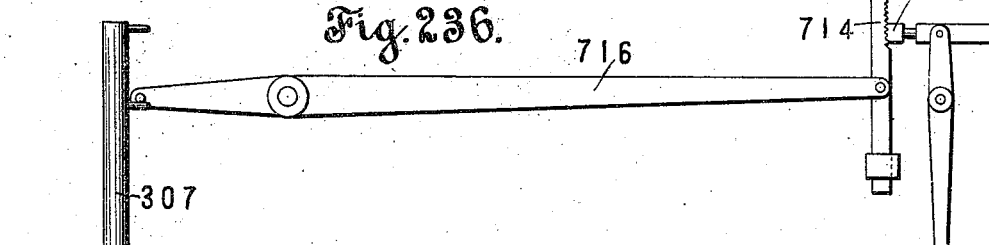
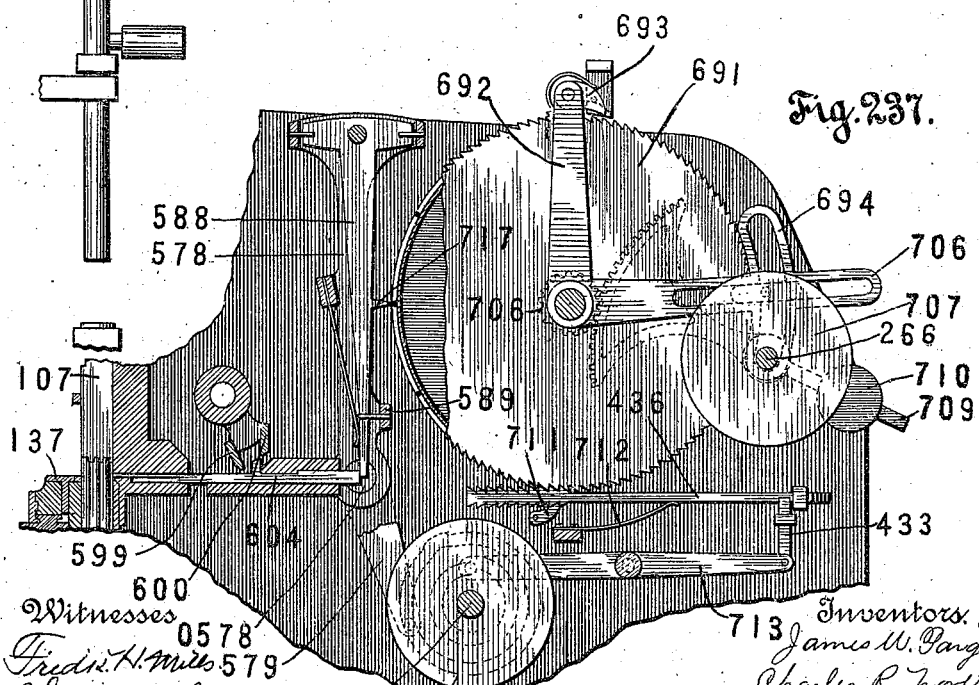
Fig. 237.
Witnesses
Fredk. H. Mills
Chas. T. Hood
Inventors,
James W. Paige
Charles R. North,
By their Attorney
David H. Fletcher

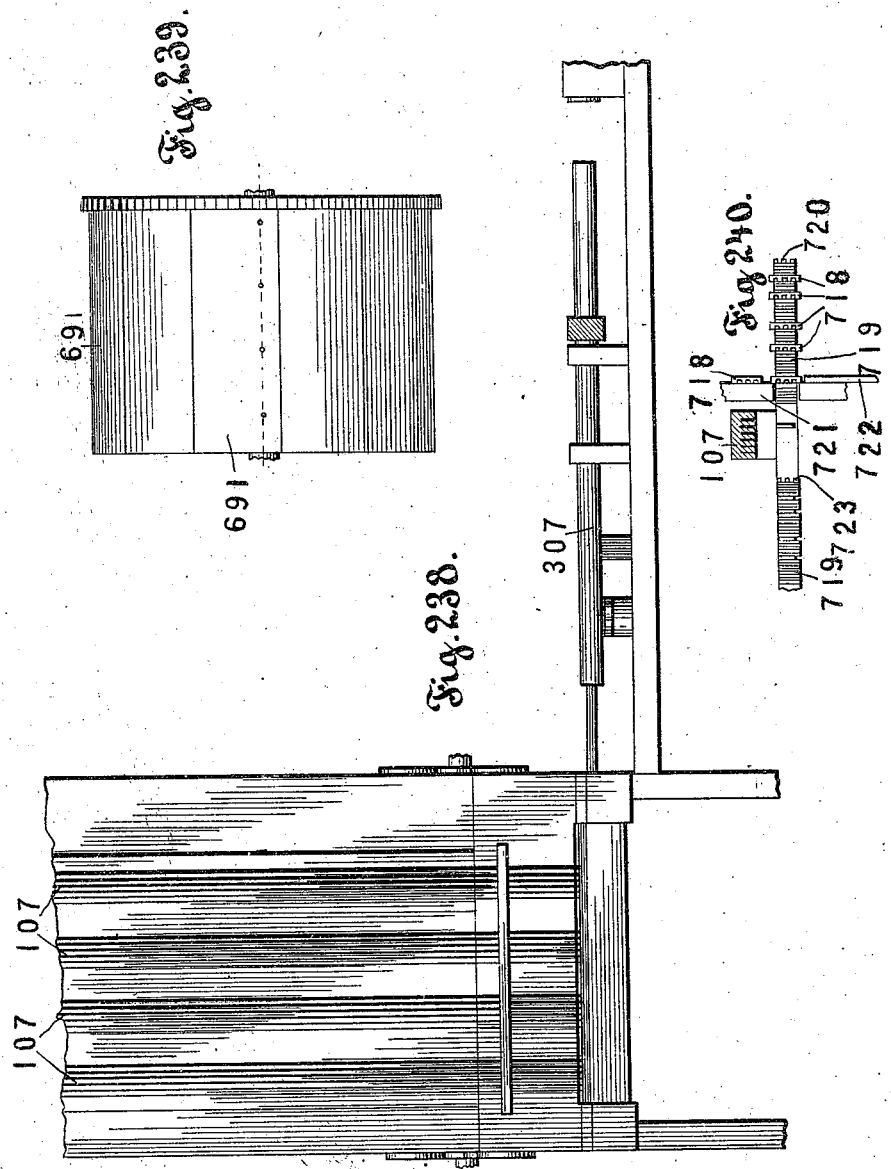

(No Model.) 81 Sheets—Sheet 81.
J. W. PAIGE & C. R. NORTH.
AUTOMATIC TYPE JUSTIFYING MACHINE.
No. 547,861. Patented Oct. 15, 1895.
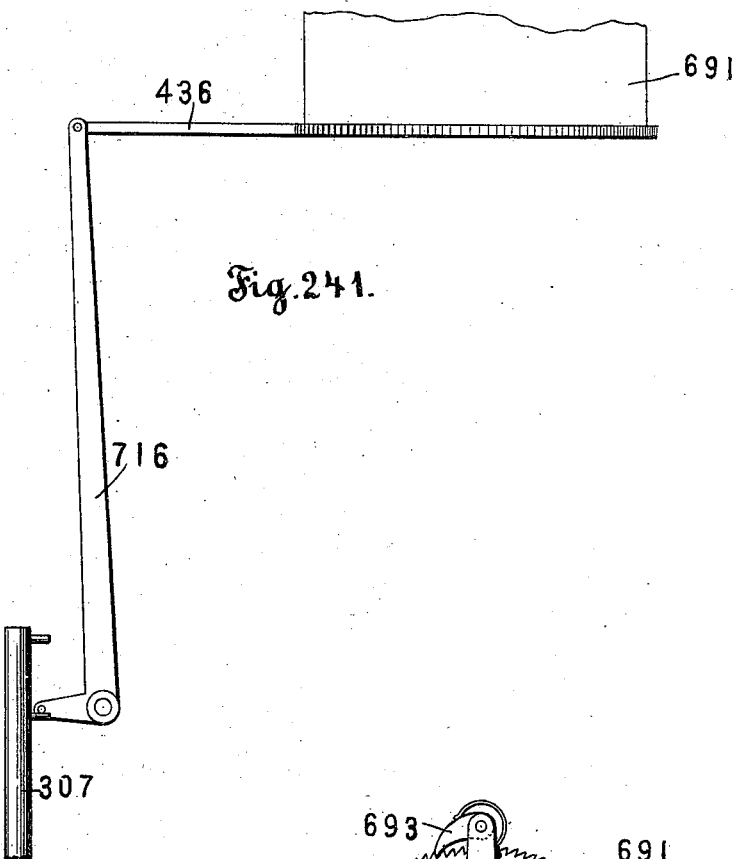
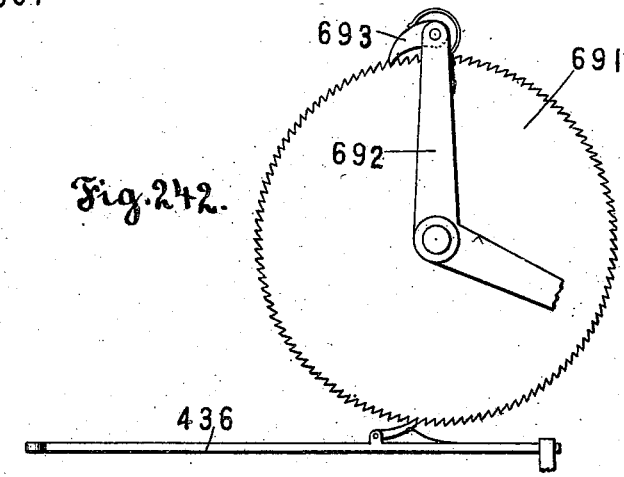

UNITED STATES PATENT OFFICE.

JAMES W. PAIGE AND CHARLES R. NORTH, OF CHICAGO, ILLINOIS; SAID NORTH ASSIGNOR TO SAID PAIGE.

AUTOMATIC TYPE-JUSTIFYING MACHINE.

SPECIFICATION forming part of Letters Patent No. 547,861, dated October 15, 1895.

Application filed February 14, 1893. Serial No. 462,271. (No model.)

*To all whom it may concern:*

Be it known that we, JAMES W. PAIGE and CHARLES R. NORTH, of Chicago, in the county of Cook and State of Illinois, (late of Hartford, in the county of Hartford and State of Connecticut,) have invented a new, useful, and Improved Automatic Type-Justifying Machine, of which the following is a full, clear, and exact description, reference being had to the accompanying drawings, forming a part of this specification, in which corresponding letters and numerals of reference in the different figures indicate like parts.

Our invention relates to the composition of printers' type; and our object therein, in its broadest scope, is to provide automatic means whereby movable type may be evenly spaced and justified to column measure.

To this end our invention is based upon certain mathematical principles, which, while they admit of all the variations necessary in the complete and practical justification of type, are, nevertheless, capable of being adapted concretely and their material results expressed in varying form by means of mechanism devised and intended to operate in accordance with said principles.

As the characters used in all languages vary in appearance and form, so, by common consent, in order to economize space and produce artistic effects, the width of the type used to print those characters has a corresponding variation. The aggregate measurement of a given number of characters therefore varies according to the combination of those characters, and, inasmuch as the number of words, as well as the respective combinations of characters in those words, are constantly changing, it follows that both factors should be considered in justifying a line of type to a standard measurement. The aggregate measurement of characters contained in a given line therefore determines the amount of spacing required to justify the latter to a given length, while the number of words contained in the line determines the number of divisions into which the spacing must necessarily be separated. Hence it follows that a given combination of spaces will always justify any line having a given number of words, provided the aggregate measurement of the words is the same in each instance. As it varies, however, it is necessary to provide for each variation in the order and approximately to the extent of its occurrence.

We have determined by computation that by means of a limited number of predetermined combinations a line having a given number of words may by the use of correspondingly-graduated spaces be invariably justified to within such a small fraction of a given length as to render it entirely satisfactory in practice, the variation being inappreciable. It is obvious, therefore, that if the number of words, as well as the measurement of their length according to the varying combinations of characters, were automatically indicated by relatively corresponding mechanical movements and the factors for producing such movements operatively connected with such an auxiliary mechanism as would, in conformity thereto, cause to be brought successively into a given relative position a series of arbitrary forms representing concretely the particular combinations called for by the indicators additional mechanism could, in turn, be so controlled and varied in its action by the successive presentation of said combination forms as to automatically cause to be inserted in the line of composition a series of spaces conforming in number to the spaces between the words and in aggregate width to the measurement of the space required to complete the measurement of the line. We have discovered and practically demonstrated that in accordance with this principle it is not only feasible to justify any line of a given number of words, but that lines of any number of words may be justified by automatically presenting at the proper time and place, respectively, combinations of mechanical or material forms adapted to correspond to the number of words in a line and their aggregate measurement, said combination forms being in operative proximity and bearing a fixed relation to auxiliary mechanism for introducing the respective spaces into the line of composition, and the spaces being graduated in width to conform to the requirements of the combination forms, while their introduction is, in turn, controlled by the respective combinations therein embodied.

Generally stated, the foregoing principles may be practically applied by the use of the following instrumentalities when operatively combined: first, a suitable race way and means of advancing therein the respective words in the order in which the type are set; second, an automatic measuring device for measuring words or lines or arbitrarily indicating such measurement as a result of setting a given number of type; third, means for taking the aggregate measurement of an unjustified line of type by adding together the respective measures of the words of which it is composed; fourth, means for separating two or more of the words one from another, so that spaces may be inserted at the proper time between the words composing the line and means for advancing said words, preferably so separated, at stated times upon the raceway; fifth, means for automatically indicating to an auxiliary mechanism the number of words contained in a line and for actuating said mechanism in conformity thereto; sixth, means for automatically indicating to auxiliary mechanism the difference between the maximum length of a justified line and its aggregate length as measured for ultimate justification; seventh, means for dividing with approximate uniformity the space so indicated by one less than the number of words contained in a given line; eighth, means for automatically indicating to auxiliary mechanism a series of spaces to be inserted in the line, the measurement in width of which shall correspond to the quotient obtained by the aforesaid division, and means for setting said spaces into the line between the words; ninth, means for automatically collecting the words and spaces composing the line after the insertion of spaces and for removing that line out of the range of action of the line to follow and for placing it in a suitable receiver; tenth, means, preferably, for automatically distributing the spaces into a suitable space-case instead of requiring the same to be inserted therein by hand; eleventh, means for preventing the action or presentation of the combination forms until the minimum number of words are set which are provided for in said forms or combinations; twelfth, means for delaying the action of the mechanism for indicating the spaces after the setting of the maximum number of words in a line as provided for in the machine until such time as all the words are measured and forwarded, and, thirteenth, means for automatically controlling the time at which the intermittent mechanisms are brought into action, whereby they may safely conform to the continuous movements of such type setting or distributing or other mechanisms, if any, as may employed therewith.

The mechanism employed for accomplishing the various purposes enumerated may be varied indefinitely by means of equivalent devices or analogous structures without departing from the essential features of our invention, and in order that the detailed description hereinafter embodied may be the more readily comprehended, as well as that the scope of the invention may be more clearly understood and appreciated, we will now briefly specify the construction and operation of the special instrumentalities employed by us, at the same time suggesting some of the various modifications which have occurred to us as equivalent forms in which said invention may be embodied, after which, in order to enable others skilled in the art to practice the same, we will give a full and exact description of what we regard as the best form of construction for the purpose of accomplishing the various results contemplated thereby.

In a complete type-composing machine it is obvious that proper provision should be made for the distribution and setting of the type in conjunction with its justification. For this reason we have contemplated using our invention in combination with suitable distributing and setting mechanisms, although it can be operated separately and particularly with a setting device alone. The spaces may either be distributed automatically into a suitable case or they may be placed therein by hand. In either event it is manifest that the mechanism for placing them in the line of composition would be the same, and our invention may be employed to good advantage with a setting device alone. In so using it any setting mechanism may be adopted, provided it is supplied with a suitable raceway in which the type are advaced upon their edges by means of an intermittent movement which is actuated by or in harmony with the propelling power of the justifying mechanism.

In applying our invention we cause the type to be advanced by means of any form of driver or conveyer upon a raceway preferably into operative proximity to an auxiliary type-driver, by which the type constituting the separated words are moved out of the position in which they are left by the main driver and are advanced upon a continuation of the raceway in such a manner that the foremost type is caused to engage and move a suitable slide to the extent of the measurement of the type composing said word. Means are then provided for indicating or establishing the measurement so made, which preferably consists of a supplemental bar adapted to be temporarily clamped to the primary measuring-slide until the measurement of the word is taken and then unclamped, while the primary slide or bar is returned to engage the next succeeding word, when the two are again clamped together as before and moved on a distance corresponding to the measurement of the second word. Said supplemental bar is preferably clamped in a stationary position when at rest. In the meantime, while the second word is being measured, the first word is, by means of a suitable conveyer, kept separate from that which follows and is advanced upon the raceway. As each successive word is brought forward its measurement is taken and the result added to that of the others until a sufficient number of words are obtained to approximate to the full measurement of a complete line. An automatic indicator is provided to indicate to the operator when a line is near completion. Combination forms arranged in series or serial groups conforming to the number of words in the line are adapted to be brought successively into a given position or zone, while individual or sub-combinations in each successive series or group corresponding to the aggregate measurement of the words in the line are adapted to be brought into a given position in said zone. For purposes of explanation each main series may be termed the "word-combination series" and each sub-series the "measurement combination." The former may be brought into its zone by means of special actuating mechanism under the control of the operator, the movement of which may be initiated by what may be termed a "word key or lever," to be actuated at the end of each word, while the latter is controlled automatically and either directly or indirectly, but preferably the latter, by the movement of said measuring device. Said combinations may consist of suitable diagrams or forms arranged by means of projections, depressions or perforations upon or in a movable apron, revoluble cylinder, cylindrical section, rotary disk, or upon or in one or more sliding plates, the special construction being immaterial so long as the general principle is adhered to and the relative movement is obtained, whereby the proper combination forms may always harmonize in position with the number and measurement of the words of a line. Should a cylinder or apron be employed, the mechanism for actuating it may be more or less simplified; but in practice we prefer to employ a series of plates arranged parallel to each other and adapted to slide in grooves, each plate representing a word-combination series and being provided with forms for the respective measurement combinations of that series or group, and we prefer to, and do in practice, provide positive means connected with what we term a "word-shaft" and "line-shaft," respectively, both of which are driven by the main actuating mechanism for moving said plates, said actuating mechanism being in operative connection with and controlled by said measuring device, but in such a way as to relieve the latter of all strain, so that the type are not effected by undue pressure or friction. This is accomplished by causing a portion of the measuring device to be alternately disconnected from or attached to the plate-forwarding mechanism, but with such automatic clamping mechanism as to cause the movements of the latter to be modified in exact proportion to the extent of movement of the former.

In operative proximity to the combination forms we provide automatic devices adapted to be positively acted upon by such of said combination forms as may be presented thereto, the relative effect of such action being controlled by both the word and measurement combinations. Said automatic devices preferably consist of a series of independent movable blocks arranged upon an endless track adjacent to the operative position of said forms, which blocks are each provided with a corresponding number of movable parts, preferably in the form of pins, all of which parts are retained by suitable means in a normal position subject to be changed by contact with said combination forms in the order in which the latter are arranged. Suitable automatic mechanism is provided for presenting the blocks to the combination forms when a sufficient number of words are advanced to form a line and for advancing said blocks one by one in operative proximity to auxiliary mechanism, preferably in the form of a series of levers arranged to vibrate in harmony with the primary impulse of the machine. The number of pins or movable parts in each block corresponds to that of said levers, which in turn are made to conform to the number of different-sized spaces in the space-case. Each lever is in operative connection with mechanism for ejecting a corresponding space from the case into the line of composition, and the movement thereof is in harmony with that of the word-conveyer by which the separated words are advanced upon the raceway past the space-case. The levers are caused to vibrate in harmony with the impulse of the machine, but in their normal action do no work. When brought by their vibration, however, into contact with such of said pins or movable parts as may be moved into abnormal positions by said combination forms, the action of said lever is so modified as to cause, directly or indirectly, the ejection of a space or spaces of a width conforming to the combination by which said pins are caused to be actuated. Said spaces are inserted successively between the words as the latter are advanced before the space-case, and as no combination form is provided to act before the first word it follows that no pin would be set, and hence no space would be inserted. The blocks and words, respectively, are advanced until a sufficient number are obtained to form a line properly justified by the insertion of the requisite spaces, as stated, when, by the action of suitable automatic mechanism, the movement of which is initiated by the line itself when advanced by the word-comb upon a gate within a suitable receptacle or galley, the line is properly inserted within said receptacle and the described operation repeated until the latter is full. The dividing of the space constituting the difference between the maximum length of a justified line and the aggregate length of the words by one less than the number of words contained in a given line is accomplished through the adjustment of the combinations. As the aggregate measures of the words in the various lines are represented to the operator by a common indicator which arbitrarily indicates a measurement regardless of words, and as there is a wide variation in the number of words in the different lines and nothing to indicate that variation to the operator, it is obvious that if the measurement of the type only were taken and shown by the indicator and the amount of spacing required were divided according to the number of words in the line lines of many words would be provided with narrow spaces and lines of few words with wide spaces. To avoid this objection, we add to the measurement of each word the measure of an ordinary space, and thus obtain the measure of the line as it would be when provided with ordinary spaces. Each line thus measured is brought as near as possible to the standard length, and the variation in the width of spaces in the different lines is thus reduced to the smallest possible amount. We are enabled to accomplish this result by starting the measuring-slide a distance equal to the width of an ordinary space back of the point where the word is left by the auxiliary driver, thus measuring each word plus the thickness of an ordinary space.

While we prefer in practice to employ uniformly-graduated spaces, yet it is obvious that by modifying the adjustment of the combination forms the ordinary spaces having varying standards of graduations may be used.

The means for automatically controlling the time at which the intermittent mechanisms are safely brought into action consists of what we term an "electromechanical time-lock," being a device comprising a source of electricity and certain circuit making and breaking devices in operative connection with mechanical clutches, whereby the movement of certain parts can only be operated at certain times, and such as harmonize with the main impulse of the machine. The measuring device, like the combination-forms and pin-block system, may be varied indefinitely without departing from the general principle involved, all of which is hereinafter more particularly described, and definitely pointed out in the claims.

In practice our invention is intended to be used in combination with a type distributing and setting machine, which latter is partially illustrated, but not intended to be claimed, herein.

In making the drawings we have in most of the views, as a matter of convenience and for the purpose of economizing space, represented the bed and other portions of the machine without inclination; but as embodied in the machine and preferably constructed these have a backward inclination of about twenty-five degrees. Figure 83$^A$ is an exception to the foregoing rule, in that it shows the parts as they are placed in actual practice. In conformity to the other views some of the parts are represented as having a corresponding forward inclination, when, in fact, they have no inclination. This, for example, is true of Fig. 144 and the main shaft shown in Fig. 222.

Figure 5:
Figure 6:
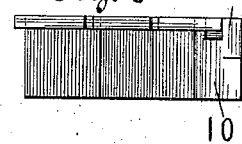
Figure 7:
Figure 8:
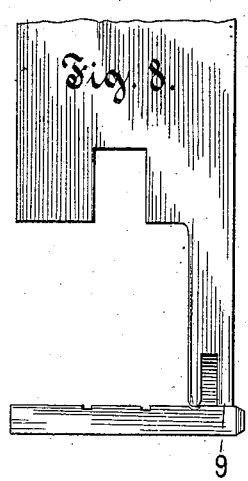
Figure 9:
Figure 10:
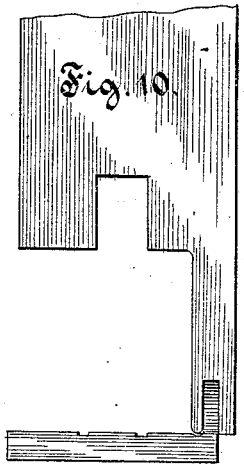
Figure 11:
Figures 12, 13:
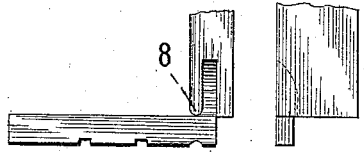
Figure 63:
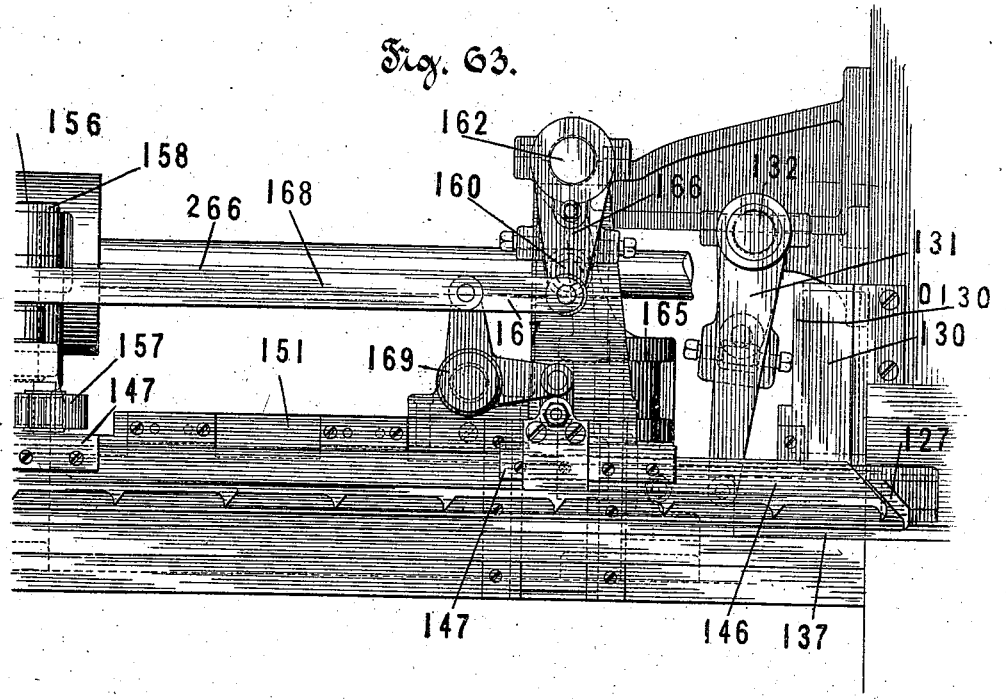
Figure 64:
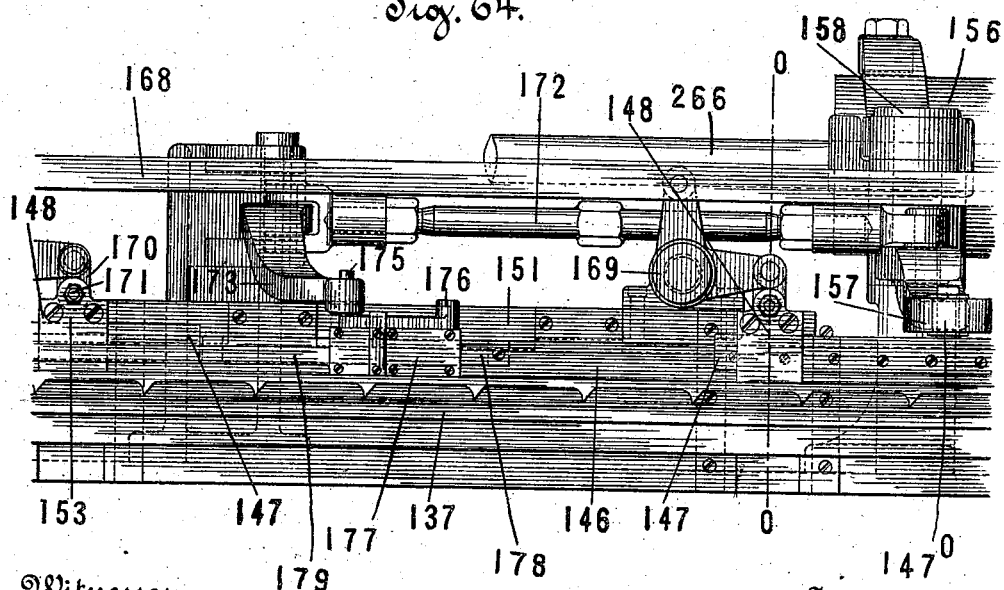

In the drawings, Fig. 1 is a front elevation of a type distributing, setting, and justifying machine embodying the features of our invention. Fig. 1$^A$ represents a front elevation of a portion of a type setting and distributing machine, near the middle of which portion one of the improvements forming the basis for this specification is illustrated; Fig. 2, a plan view of the same; Fig. 3, a view partly in section, taken from the left-hand side on the line o o, Fig. 2; Fig. 4, a left-hand side view of the ward-plate 7 for selecting the spaces, a selected space being shown in its registering position; Fig. 5, a front view of the same; Fig. 6, a bottom view of the same; Fig. 7, a bottom view of the ward-plate without a space; Fig. 8, a left-hand side view of the ward-plate with a type in position, the selection of which would be impossible, because the full movement of the ward-plate would be prevented by the contact of the overhanging portion of the type with the bearing portion 9; Fig. 9, a front view of the same; Fig. 10, a side view of the ward-plate with a wide character in position, which could not in practice be selected, because the full movement of the ward-plate would be prevented by the contact of the overhanging portion of the character with the bearing-face 10; Fig. 11, a front view of the same; Fig. 12, a side view of a proper space in an inverted position, which space consequently cannot be selected, because the full movement of the ward-plate is prevented by the contact of the circular projection 8 with a solid portion of the space; Fig. 13, a front view of the same; Fig. 14, a plan view of portions of the space-comb 15 and raceway 12 and the mechanisms for actuating the space comb, which portions are located next to the part of the machine shown in Fig. 2 on the left-hand side of the same. Some of the specific parts shown at the left-hand end of the view Fig. 2 are also shown at the right-hand end of the view Fig. 14, this being done for the purpose of showing clearly the connection between the different views. Fig. 15 is a front view of the same; Fig. 16, a plan view of the mechanism employed in connection with the space-register; Fig. 17, the right-hand side view thereof; Fig. 18, a front view thereof; Fig. 19, an operative view taken from the right-hand side, showing a space moved into its proper position laterally by the action of the comb, but out of its proper position longitudinally, the same lying a little forward of its proper registering position Fig. 20, a similar view showing the space moved into its extreme backward position; Fig. 21, a similar view showing the space moved forward into its proper registering position; Fig. 22, a plan view of the space-distributer mechanisms located at the left-hand end of the machine; Fig. 23, a left-hand side view of the mechanism for imparting vertical movement to the comb for advancing the forwarder-frames; Fig. 24, a front view of the portion shown in Fig. 22, representing the mechanisms for advancing the spaces within the range of action of the selecting mechanisms and the auxiliary mechanisms employed in connection therewith; Fig. 25, a partial front view, enlarged, of the mechanisms for registering, lifting, and advancing the forwarder-frames by means of which the spaces are moved into position for selection; Figs. 25 to 33, inclusive, are enlarged views; Fig. 25$^A$, a sectional view of the raceway 31, taken from the left-hand side, the forwarder-comb, and the mechanism for locking the forwarder-frames, taken on the line o o, Fig. 25$^B$; Fig. 25$^B$, a front view of the mechanisms shown in Fig. 25$^A$; Fig. 25$^C$, a sectional view taken on the line oo oo, Fig. 25$^B$; Fig. 25$^D$, a front view, partly in section, illustrating the manner of locking the forwarder-frames; Fig. 26, a right-hand side view, partly in section, of the mechanism for lifting the forwarder-frames; Fig. 27, a right-hand side view of a portion of the bent lever 45 and the three-part pawl 46 and a forwarder-frame 36; Fig. 28, a front view, partly in section, of one of the forwarder-frames 36; Fig. 29, a right-hand side view of one of the forwarder-frames 36; Fig. 30, a right-hand sectional view of the raceway 31; Fig. 31, a right-hand side view of the lifter-head 50; Fig. 32, a bottom view of the lifter-head; Fig. 33, a right-hand side view of the three-part pawl 46; Fig. 34, a right-hand side view of the mechanisms for registering and lifting the forwarder-frames, the upright being broken away to show the lifting-lever 48; Fig. 35, a partial front view of the bent lever 45, showing the pawl 46 engaged with a forwarder-frame 36; Fig. 36, a partial top view, enlarged, partially in section, of the connected ends of the lever 40 and the arm 42; Fig. 37, a partial right-hand side view, enlarged, of the parts shown in Fig. 36; Fig. 38, a left-hand side view of a cross-section of the machine between the justifying-uprights and showing the mechanism for selecting and ejecting the spaces from the distributer-raceway and placing them in the space-channels, and also the mechanism for selecting and ejecting the spaces from the space-channels into the line of composition. The pin-block raceway used in connection with the latter selecting mechanism is shown partially in section, and also certain other mechanisms. Fig. 39 is a top view of the right-hand end of the ledge-frame with certain division-strips supported therein and spaces in position between the strips and resting on the supporting-ledges; Fig. 40, a top view of a division-strip 78; Fig. 41, a view of a division-strip 78, taken from the right-hand side; Fig. 42, a top view of the ledge-frame 76 77 and the mechanism for raising it; Fig. 43, a front view of the parts shown in Fig. 39, with a part of the front portion 77 of the ledge-frame broken away to show the division-strips 78 and the spaces in position between the same; Fig. 44, a view of a division-strip, taken from the front side thereof; Fig. 45, a view of the parts shown in Fig. 46, taken from the left-hand side thereof; Fig. 46, a front view thereof; Fig. 47, a front view of the lifter 91, detached; Fig. 48, a front view of the two-part link 102 103, used in connection with the lifter mechanism; Fig. 49, a sectional right-hand side view showing the safety-blocks 113, the lifter 91, the trip-shaft 115, and the two-part link 102 and 103; Fig. 50, a right-hand side view of the supporting-block 110, the guide-block 111 for holding the safety-blocks 113, the lifter-slide 94, and the bell-crank lever 104 with link 103; Fig. 51, a right-hand side view of the lifter-slide 94; Fig. 52, a left-hand side view of the lifter mechanisms and the trip mechanisms connected therewith; Fig. 53, a front view thereof; Fig. 54, an enlarged left-hand vertical sectional view showing some of the parts of the setter mechanisms, some of the parts of the distributer-selecting mechanisms, a section of a portion of the distributer-plate, the forwarder-frame raceway, the ledge portions 76 and 77, the lifter 91, with the safety-blocks 113, the safety-block guide 111, the trip-plate 117, and the upper portion of the trip-lever 116; Fig. 55, a partial plan view of the lifter, illustrating the operation of the safety-blocks employed in connection therewith; Fig. 56, a plan view of a safety-block; Fig. 57, a left-hand side view of the pi-plunger mechanism; Fig. 58, a partial front view of the auxiliary type-driver and the measuring-slide with a word between the bearing-surfaces of the same, the auxiliary type-driver being shown in its extreme left-hand position and the measuring-slide in the position resulting from the measure of the word. Fig. 59 represents the auxiliary type-driver in position to take the type from the position in which it has been moved by the main type-driver; Fig. 59$^A$, an enlarged view, partially in section, of the raceway 137 and the detent-plates 138 and 143 in their proper relative positions; Fig. 60, a plan view of the auxiliary type-driver mechanism; Fig. 61, a view of the same, taken from the left-hand side; Fig. 62, a front view of the same; Fig. 62$^A$, a plan view of the auxiliary type-driver block 124, having the tooth portion 127; Fig. 63, a front view of the right-hand end portion of the word-comb mechanism with the auxiliary type-driver; Fig. 64, a front view of the middle portion of the word-comb mechanism; Fig. 65, a plan view of the parts shown in Fig. 67; Fig. 66, a plan view of the link 172, with portions of the levers 157 and 173; Fig. 67, a front view of the extended movement mechanism and the left-hand end portion of the word-comb mechanism; Fig.

Figure 84:
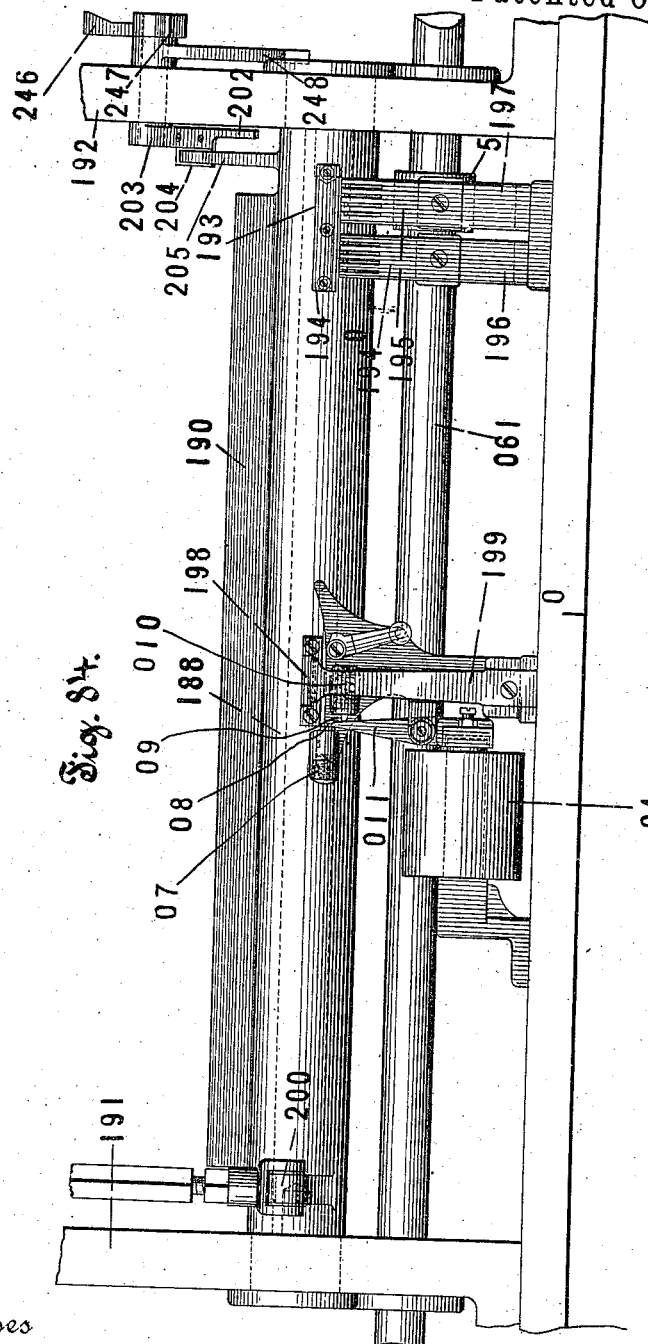
Figure 143:
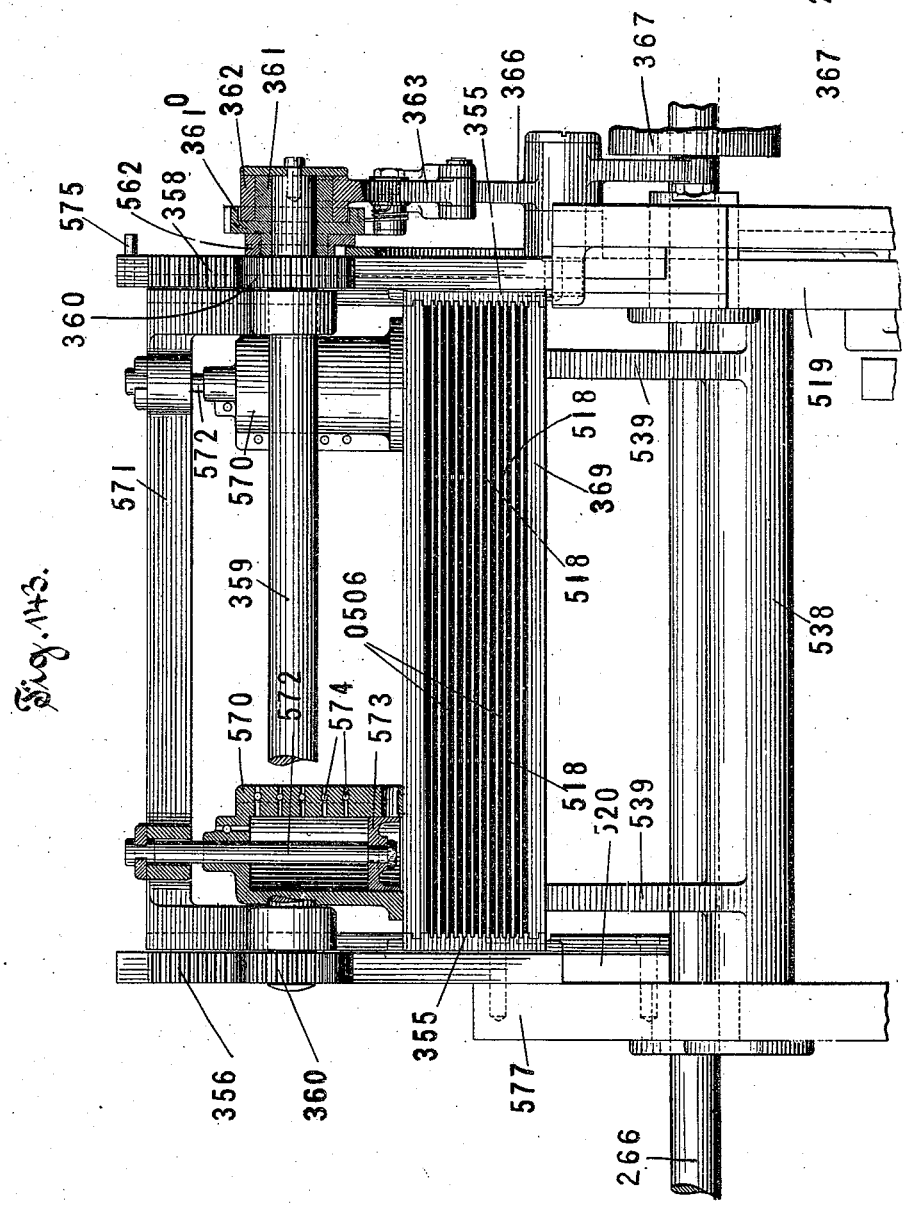
Figure 144:
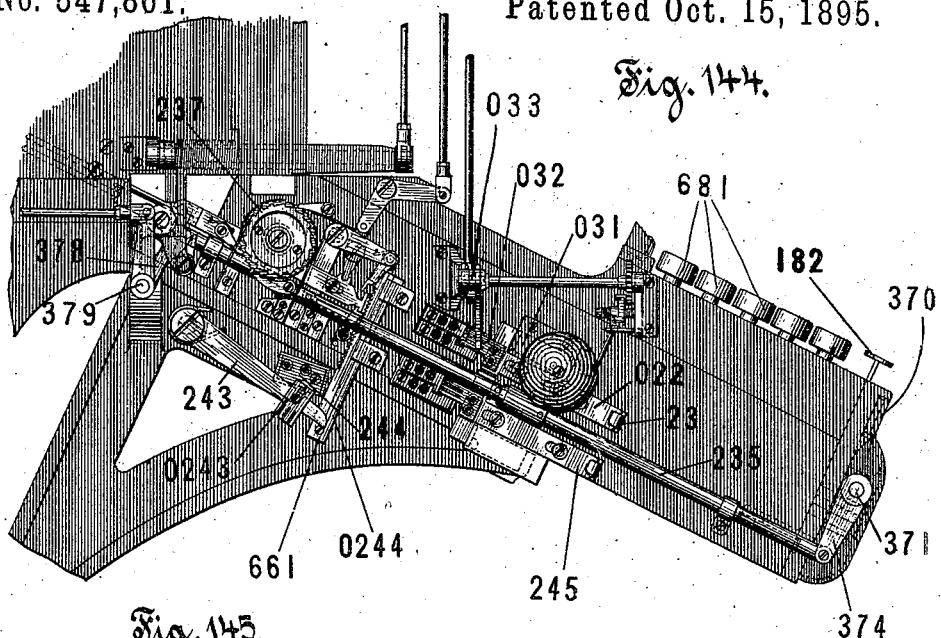
Figure 145:
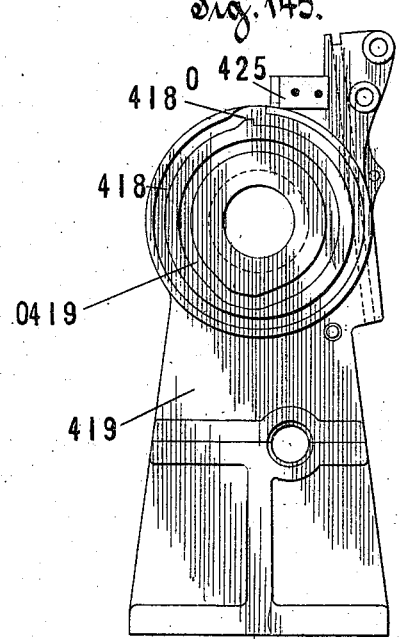
Figure 146:
Figure 147:
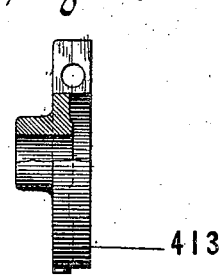
Figure 174:
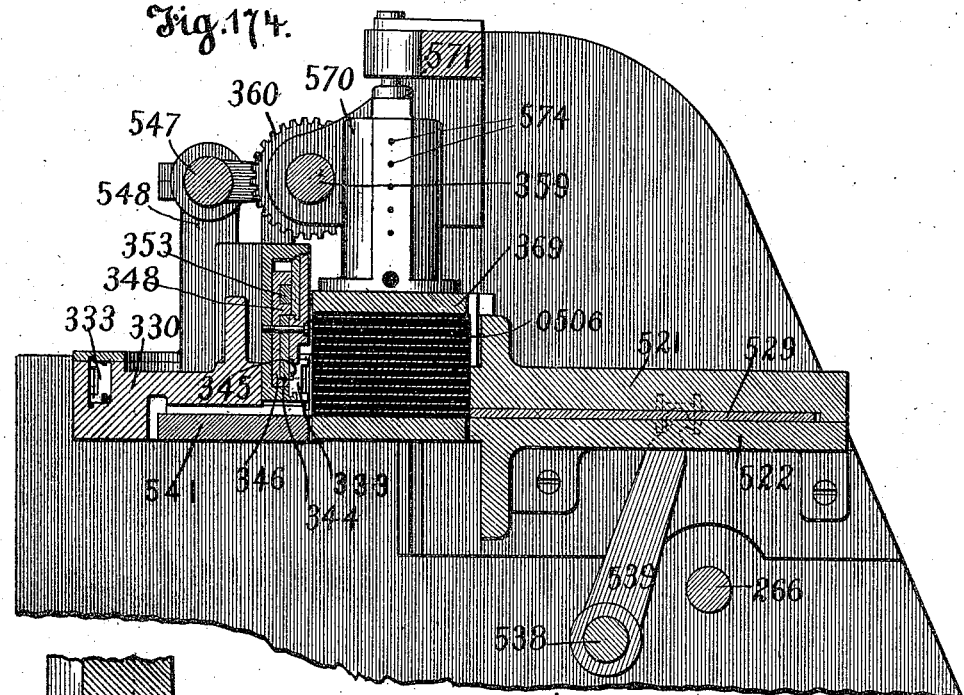
Figure 175:
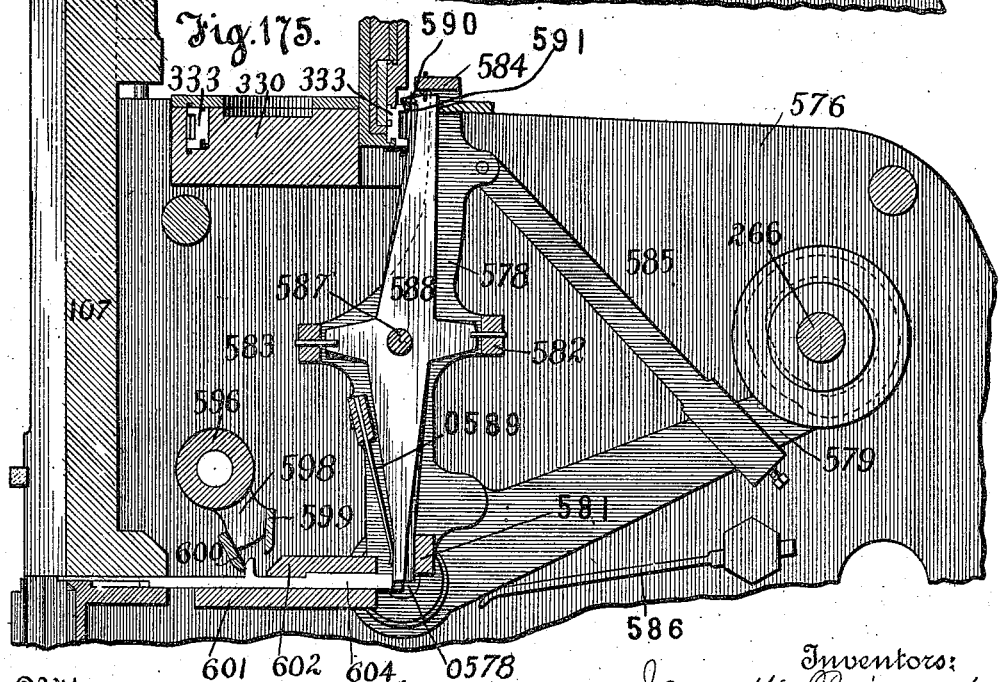
Figure 192:
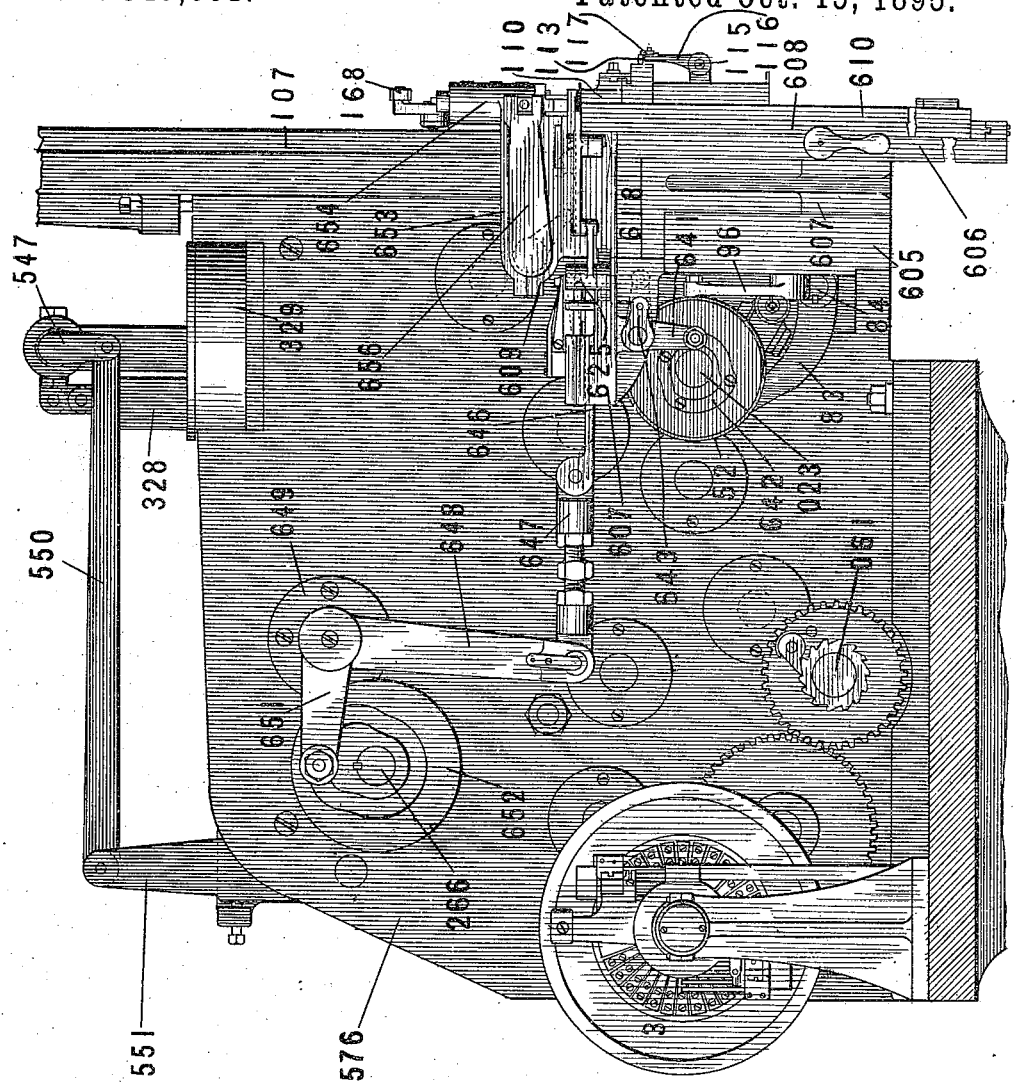
Figure 223:
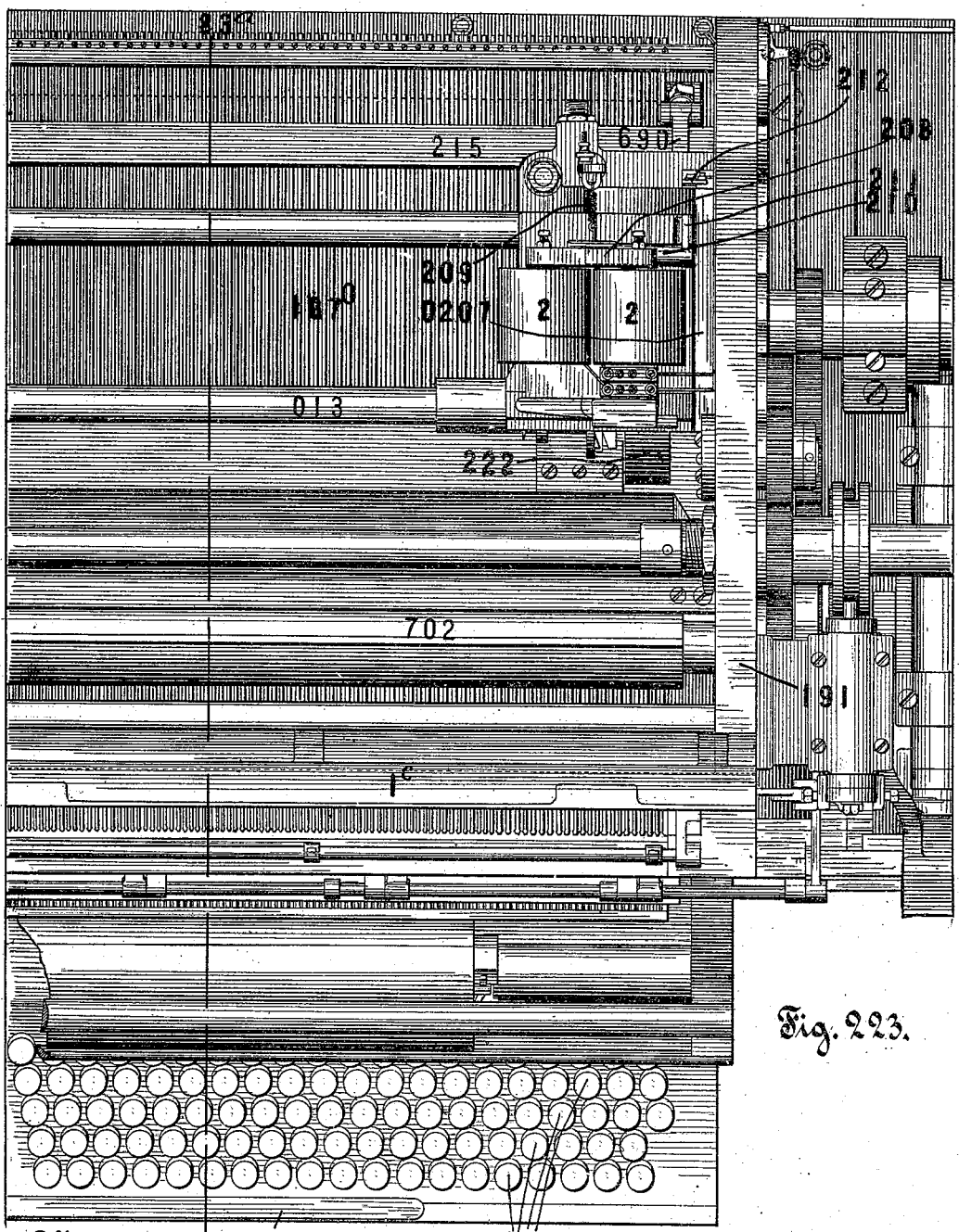
Figure 224:
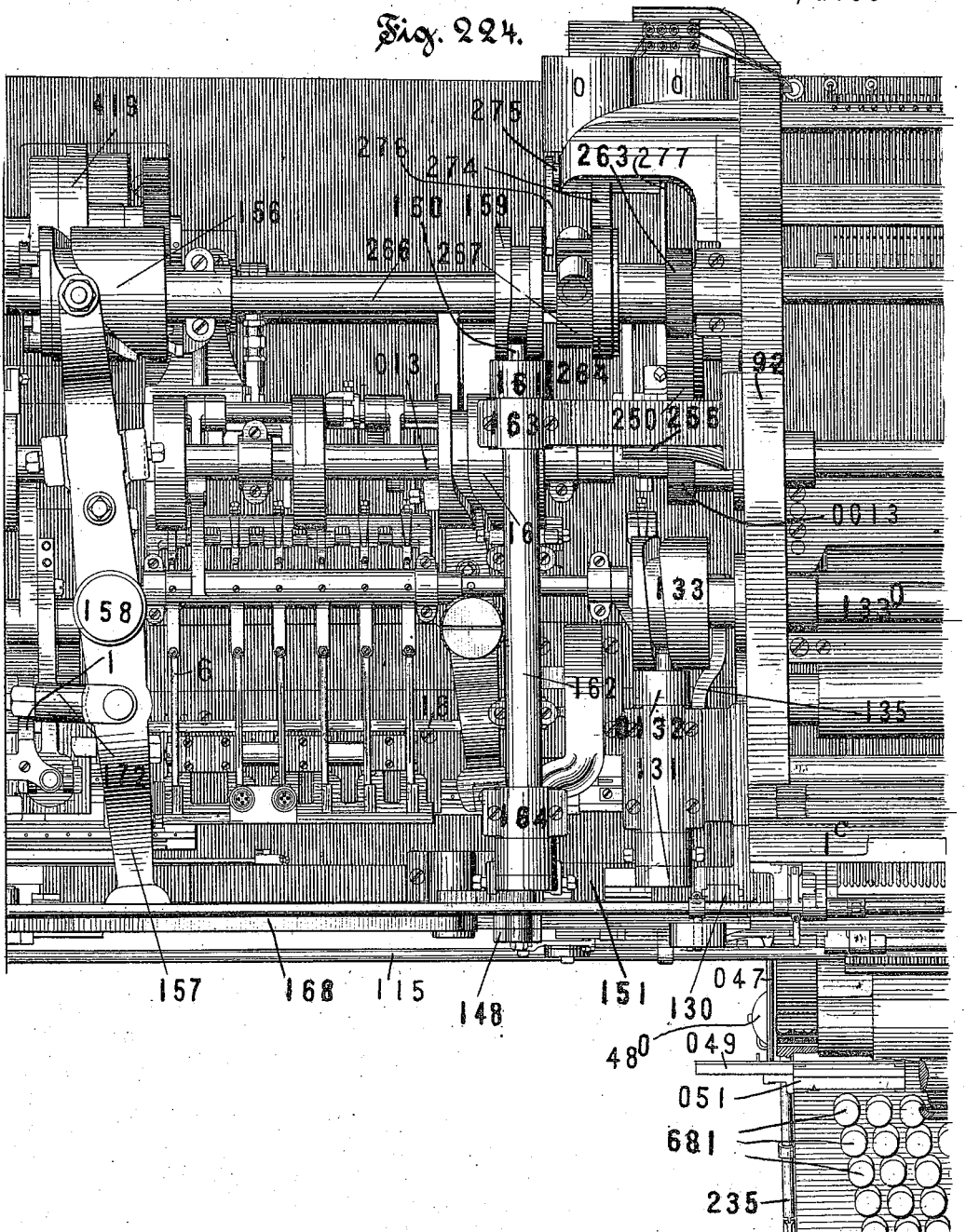
Figure 225:
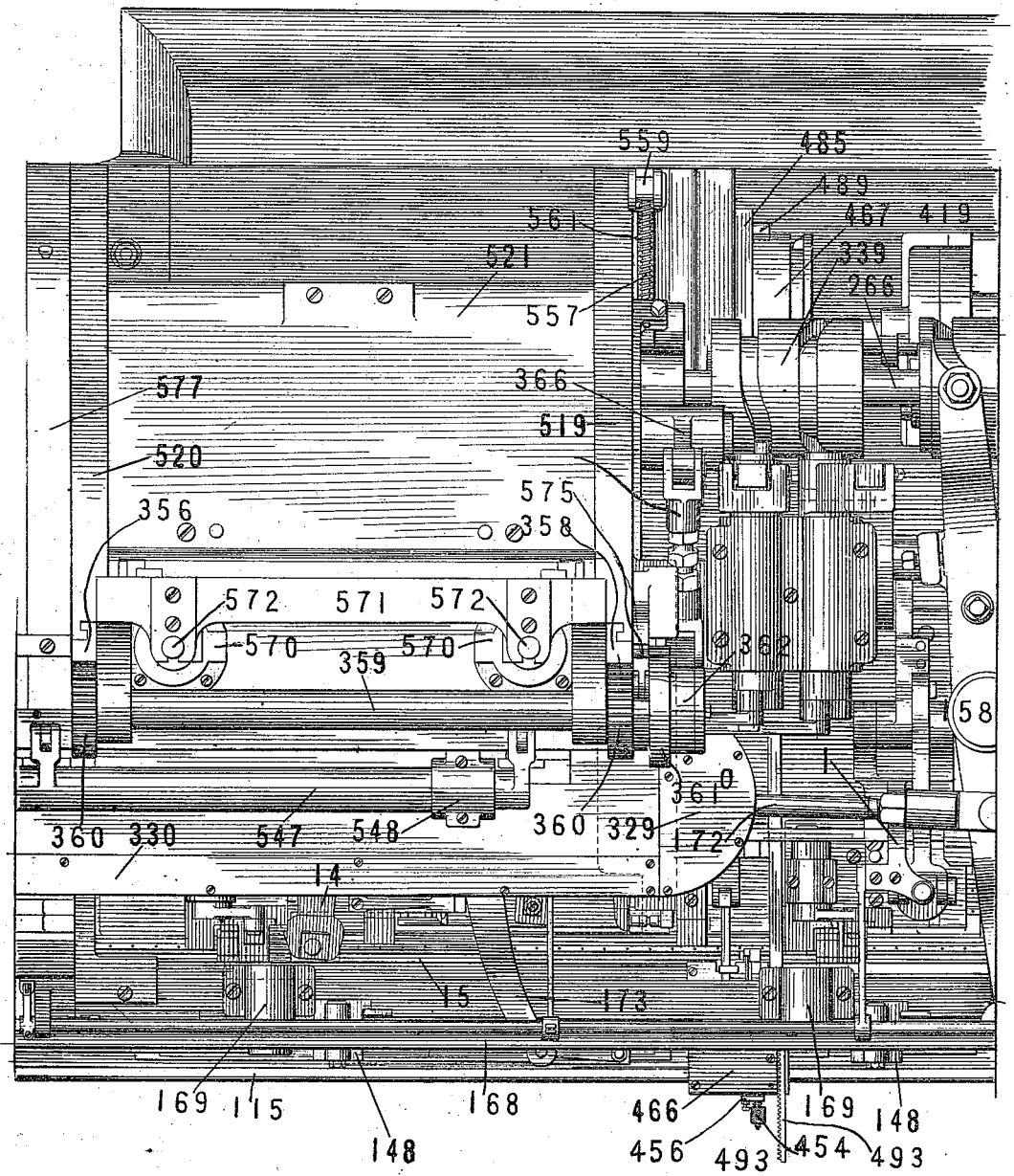
Figure 226:
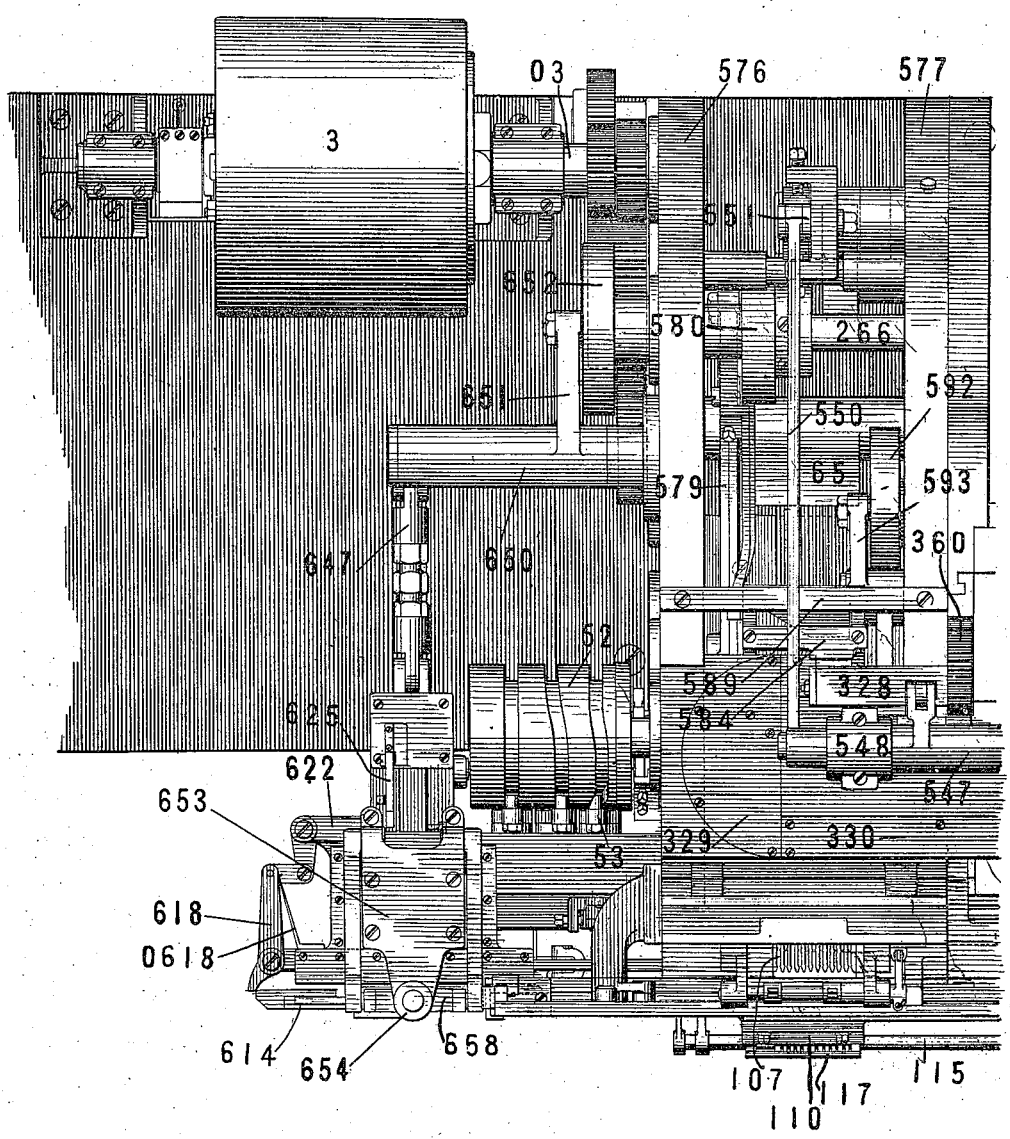
Figure 227:
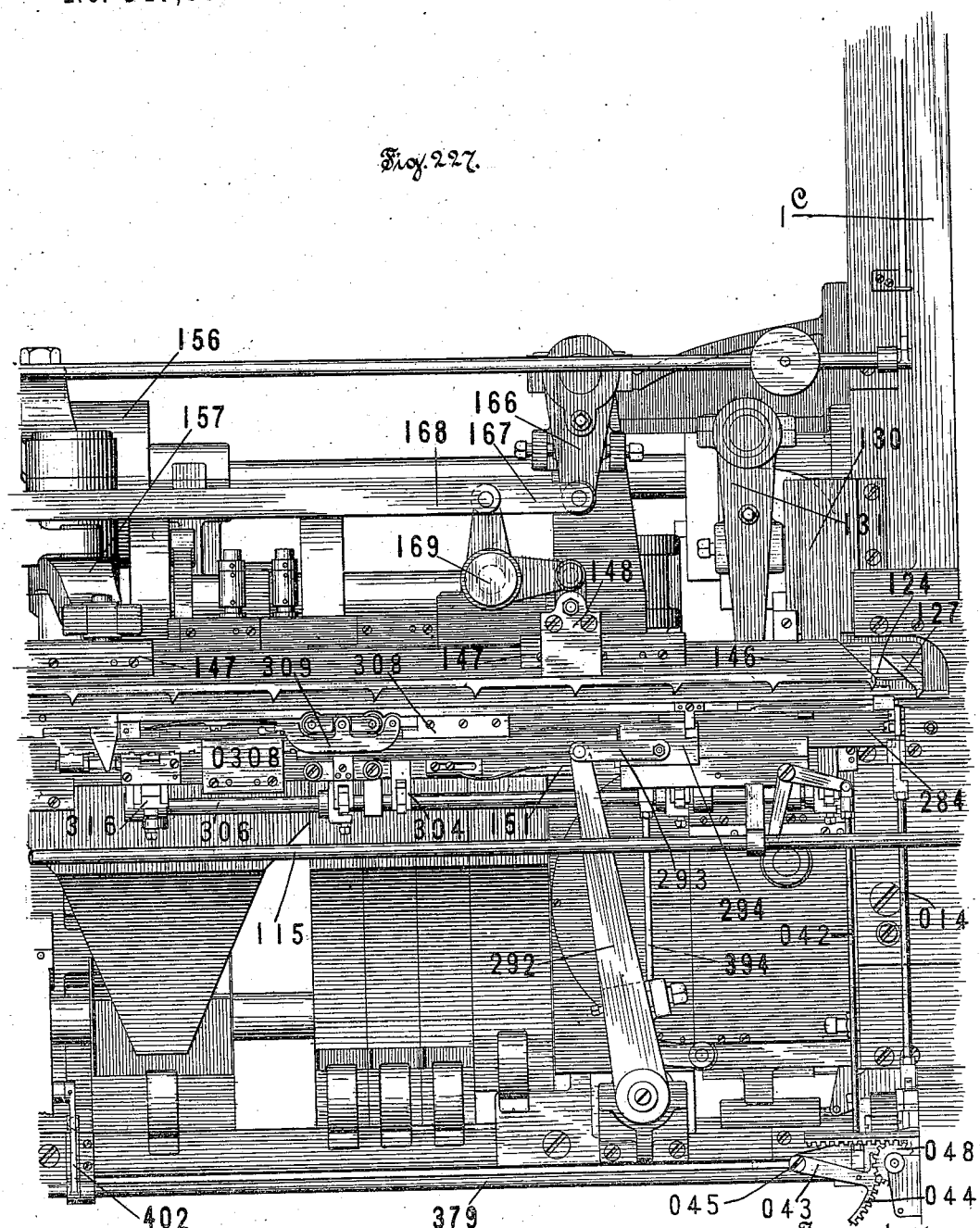

68, a plan view of the right-hand end portion of the word-comb mechanism; Fig. 69, a left-hand side view of the word-comb mechanism and the mechanism for clutching the word-shaft and also the actuating-rod 183 and certain parts of the electrical time-lock mechanism employed in connection with the word-shaft; Fig. 70, an enlarged transverse vertical section taken on the line o o, Fig. 64, through one of the slides for giving vertical movement to the word-comb. Fig. 71 represents an enlarged end view of the front and rear parts 146 146 of the word-comb proper secured to the cap 147; Fig. 72, an enlarged transverse section taken on the line o o, Figs. 65 and 67; Fig. 73, an enlarged end view of the extended movement comb-fingers 181 and the slide to which they are attached and also the link 179, which connects the slide 180 to the word-comb; Fig. 74, an enlarged transverse section taken on the line oo oo, Figs. 65 and 67. Fig. 75 is an enlarged transverse section similar to the section Fig. 74, but taken on the line ooo ooo, Figs. 65 and 67; Fig. 76, a plan view showing the connection of the word-key 182 with the actuating-rod 183, also the special word-key 23 and connecting mechanisms, also illustrating the operation of the word-key escapement mechanisms, the parts being shown in their normal positions; Figs. 77 and 78, operative plan views illustrating the combined action of the escapement-pawls 383 and 0383 and the escapement-bolt 385; Fig. 79, a left-hand side view of the returning-bar 188 for returning the keys and other parts to their normal positions and certain other parts connected therewith, including features of the electric time-lock; Fig. 80, a detached left-hand enlarged end view, partially in section, of the returning-bar 188 on the fulcrum-rod 185 and the arm 193 for making electrical contact with the brush 195; Fig. 81, a detached left-hand enlarged end view, partially in section, of the returning-bar 188 and the arm 198, used in connection with the relieving-spring 199; Fig. 82, a detached left-hand enlarged end view, partially in section, of the returning-bar 188 on the fulcrum-rod 185 and the connecting-rod 201 for returning the same to its normal position; Fig. 83, a left-hand side view of one of the key-levers 184, a section of the fulcrum-rod 185, upon which the key-levers are held, a section of the returning-bar 188, by means of which the key-levers 184 are returned to their normal positions, and a portion of one of the actuating-rods by means of which the movement of the selecting-key is imparted to the key-lever 184. Fig. 83$^A$ is a transverse vertical sectional view upon the line 83$^A$, Fig. 223; Fig. 84, a rear view of the returning-bar 188, held by the uprights 191 192, with portions of the word-key and time-lock mechanisms; Fig. 85, a diagram illustrating the electrical connections of the machine; Fig. 85$^A$, an enlarged detail of said diagram; Fig. 85$^B$, a skeleton view in perspective of the bed and certain leading features of the machine, showing the location of the electrical devices and illustrating the electrical time-lock circuits; Fig. 86, a left-hand side view of the main portion of the time-lock mechanism employed in connection with the setter mechanisms; Fig. 87, a plan view of the same; Fig. 88, a plan view of the lever-arm 213; Fig. 89, a front view of the arm 213, the locking-bolt 212, with a portion of the supporting-bracket 0207, shown in section; Fig. 90, a rear view of the rock-shaft 210, the lever 211, and the spring 233 for making electrical connection, the parts being shown in their proper relative positions upon the supporting-bracket 0207; Fig. 91, a left-hand side view of the same; Fig. 92, a front view of the shaft 013, with certain parts of the actuating mechanism of the time-lock located thereon, and also an end view of the lever 214, located on the bracket 0207; Fig. 93, an operative plan view representing the lever 214, with its pin 216 in its right-hand position against the stop 218; Fig. 94, a front view of the shaft 221, with the sleeve 224 of the time-lock mechanism and toothed portion 225 of the clutch in their disengaged positions, the cam 222 also being held in its position of rest by the bolt 228; Fig. 95, an operative plan view with the time-lock lever 214, having the pin 216 in its left-hand position against the stop 217, in which position of the parts the cam-piece 226 is represented as commencing the action of moving the sleeve 224; Fig. 96, an operative plan view with the cam-piece 227 represented in position to commence the action of returning the time-lock lever 214, with the pin 216, to its normal position; Fig. 97, a front view of the sleeve 224 of the time-lock mechanism with its teeth engaged with the toothed portion of the cam 222, in which figure is also shown the locking-bolt 228, with its tooth 0228 in the groove 230 and disengaged from the recess 231; Fig. 98, a right-hand side view of the mechanism for clutching the word-shaft, showing its connection with the word-key rod 183, the latter being returned to its normal position; Fig. 99, a plan view of the arms 246 247 of the three-part lever of the word-shaft-clutching mechanism; Fig. 100, a right-hand side view of the disk 264, with the lever 256 returned to its normal position and the clutching-bolt 265 in its engaging position; Fig. 101, a right-hand side view of the lever 256 and the block-piece 252, detached, the lever 256 being in its engaging position against the upper stop 253 on the block-piece 252, in which view is also shown the spring-detent 254, held in a socket in the block-piece 252, and the cam-piece 255, formed thereon, as shown; Fig. 102, a rear view of the arm 259 of the lever 256 and the stops 253 253 on the block 252; Figs. 103 and 104, views of the bolt 265, having the V-shaped projection formed thereon; Fig. 105, a rear view of a portion of the block-piece 252, showing the detent 254 and the cam-piece 255. (In the drawings Figs. 102 and 105 are projected from Fig. 101, and the sides of these figures are consequently shown in an inclined position; but in the machine the sides of the parts shown are perpendicular.) Fig. 106 is a rear view of a section of the disk 264 and the gear 263 on the sleeve 262, the section being on the line 00 00, Fig. 100. A section of the frame-piece 267 is also shown, this section being on the line 0 0, Fig. 100. Fig. 107 is a right-hand side view of a vertical section through the center of the air-cushion cylinder of the frame-piece 167; Fig. 108, a plan view of the lever 256; Fig. 109, a front view of the mechanism for clamping the block 435 and unclamping the measuring-bar 307, the clamp-block 435 not being shown in this figure; Fig. 110, a front view of the auxiliary type-driver, the word-comb, the measuring-slide, the clamping mechanisms, the mechanism for returning the measuring-slide, and also portions of the indicator mechanism; Fig. 111, a front view of a portion of the mechanism employed in returning the measuring-slide; Fig. 112, a left-hand side view of a vertical section taken on the line 01 01, Fig. 110, showing one of the mechanisms for clamping the measuring-bar; Fig. 113, a similar view taken on the line 02 02, Fig. 110, showing the mechanism for actuating the rock-shaft 306. Fig. 114 is a similar view taken on the line 03 03, Fig. 110; Fig. 115, a similar view taken on the line 04 04, Fig. 110, with the exception that the slide 294 is not in the position shown in Fig. 110; Fig. 116, end views of the word-measuring slide 287 and the line-measuring bar 307; Fig. 117, a plan view of the slide 304 with the actuating cam-plate 299 on the adjacent portion 146 of the word-comb; Fig. 118, a front view of the same, showing the cam-slot 300; Fig. 119, a left-hand side view of the vertical slide 285 with the guide-piece 286; Fig. 120, a plan view of the line-measuring bar 307, the measuring-bar extension 324, the measuring-plate 327, and the gage-block 437; Fig. 121, a front view of the same, showing a part of the mechanism for returning the line-measuring bar; Fig. 121ᴬ, a left-hand side view of that portion of the indicator mechanism which is adapted to make contact with the line-measuring bar 307 and to receive movement therefrom; Fig. 121ᴮ, a front view of the same; Fig. 121ᶜ, a left-hand side view of that portion of the indicator mechanism which is located on the keyboard-frame; Fig. 121ᴰ, a front view of the same; Fig. 122, a plan view, enlarged, of a portion of the measuring-plate 327, the contact-plate 450, and the gage-block 437, the latter being shown in the position resulting from the arrest of its forward movement by the contact-plate 450; Fig. 123, a similar view with the teeth of the gage-block 437 in engagement with the teeth of the measuring-plate 327. In Figs. 122 to 125, inclusive, the parts are enlarged for the purpose of showing the construction more clearly. Fig. 124 is a right-hand side view of the gage-block 437; Fig. 125, a front view of the same; Fig. 126, a plan view of the measuring-plate 327, the cam 467, the actuating-slide 485, and the clamping mechanisms; Fig. 127, a plan view of the actuating-slide 485 and the mechanism for returning the line-measuring bar 307; Fig. 128, a left-hand side view of a vertical section of the mechanism for giving the positive movement to the contact-plate 450; Fig. 129, a plan view of the plate 465, which is provided with a cam-surface; Fig. 130, a plan view of a part of the oval raceway for the movable pin-blocks 333, a part of the movable portion 328 of the raceway, the actuating-cam 339, and the intermediate connecting parts for advancing the movable pin-blocks 333 in the raceway and locking the same in registering positions; Fig. 131, a plan view of one of the movable pin-blocks 333; Fig. 132, a rear elevation thereof; Fig. 133, a right-hand side view of the parts shown in Fig. 130; Fig. 134, a front view of the parts shown in Fig. 130; Fig. 135, a rear view of a vertical section on the line 01 01, Fig. 136, with a portion of the raceway 328 removed, in which view is shown a wedge-shaped projection on the lock-plate 346, which is adapted to register each individual pin-block as it enters the movable raceway; Fig. 136, a right-hand side view of a transverse vertical section of the movable portion 328 of the pin-block raceway; Figs. 137, 138, 139, and 140, sectional views similar to Fig. 135, illustrating the operation of forwarding and locking the pin-blocks; Fig. 141, a right-hand side view of the mechanism for raising and releasing the box of combination-plates; Fig. 142, a similar view with a portion of the mechanism removed to show the releasing mechanism; Fig. 142ᴬ, a detached right-hand side view of the pawl-releasing cam-plate 562; Fig. 143, a front view of the supporting-brackets 519 520, the box of combination-plates, and the mechanisms for raising and releasing the same; Fig. 144, a left-hand side view of the keyboard, showing a portion of the line-key, word-key, and indicator mechanisms, also the special word and special line keys; Fig. 145, a left-hand side view of the line-shaft bracket; Fig. 146, a plan view of the line-clutch block-piece 414; Fig. 147, a rear view of the line-clutching disk 413; Fig. 148, a plan view of portions of the word-key, word-key escapement, and line-key mechanisms; Figs. 149 and 150, plan views illustrating the action of the line-key rod 235 in detaining the escapement-bolt 385; Fig. 151, a left-hand side view of the bent lever 378 held in its locked position by the hook 377 and the line-key rod 235 in position to unlock the same. Fig. 151ᴬ is a like view with certain of the parts removed to more clearly show said bent lever and hook; Fig. 152, a front view of the parts shown in Fig. 151, together with the line-key bar 370 and connecting mechanisms; Fig. 153, a left-hand side view of the line-shaft, clutching mechanism and mechanisms for releasing the detent 433 of the clamp-block 435; Fig. 154, a detached view of the cam-surface 156° on the cam 156 which controls the release of the detent 433; Fig. 155, a front view of the connecting-rod 429 detached; Fig. 156, a plan view of a section on the line 0 0, Fig. 153; Fig. 157, a plan view of the detent-locking bolt 427, detached; Fig. 158, a left-hand side view of the disk 413, with the line-clutching bolt 416 in engagement with the tooth 423 on the sleeve 422; Fig. 159, a front view of the parts shown in Fig. 153; Fig. 160, a front view of a vertical section of the line-shaft-supporting bracket 419 and a portion of the line-shaft-clutching mechanism located thereon; Fig. 161, a front view of the mechanism for returning the escapement-bolt 385 to its normal position; Figs. 162 and 163, front views illustrating the operation of the bell-crank lever 396 and the pawl 398 in returning the escapement-bolt 385; Fig. 164, a plan view of the actuating-slide 485 and other portions of the mechanism for carrying forward and returning the combination-plates, and also a portion of the mechanism for determining the extent of their forward movement; Fig. 164$^A$, a left-hand side view of the auxiliary stop mechanism employed in connection with the word-measuring slide; Fig. 164$^B$, a front view of the same; Fig. 165, a right-hand side view illustrating the operation of the slide 485 and the cam-disk 467, by which it is actuated; Fig. 166, a right-hand side view of the supporting-bracket 519, the box of combination-plates 369, the pin-block raceway, a portion of the actuating mechanism connected therewith, and the mechanism for moving forward the combination-plates. Fig. 166$^A$ is a left-hand side view of the upper portion of the supporting-bracket 519, the lower portion being broken away to show the mechanism for actuating the combination-plates. The view also shows the bar 436 and its immediate connections. Fig. 167 is a right-hand side view, enlarged, of the teeth of the lower portion 480 of the vertical slide 479 and also the teeth of the clamp-block 435; Fig. 168, a right-hand side view illustrating the joint operation of the clamp-block 435 and the detent 433; Fig. 169, a plan view of a section of the actuating-slide 485, the slide 476, and the connection between the two, also the connection between the slide 476 and the lever 535; Fig. 170, a front view of a vertical section of the same parts on the line 0 0, Fig. 169, and the vertical clamping-slide 479 and other connecting parts; Fig. 171, a right-hand side view of a section in a vertical plane through the center of the rock-shaft 473, Fig. 170; Fig. 172, an enlarged diagram view of a combination-plate adapted for four words; Fig. 173, an operative plan view, partly in section, of the combination-plates 0506, the forwarding-plunger 525, the pin-blocks, and other coacting parts; Fig. 174, a vertical sectional view taken on the line 174, Fig. 173; Fig. 175, a vertical sectional view taken upon the line 175, Fig. 173; Fig. 176, a vertical sectional view taken upon the line 176, Fig. 173; Fig. 177, an enlarged detail view, partly in section and partly broken away, for showing the movement of the pin-block-actuating mechanism; Fig. 178, a like view showing some of the parts in different positions; Fig. 178$^A$, a sectional view taken upon the line 178$^A$, Fig. 173; Fig. 179, a front view of the pin-block raceway and the mechanism for actuating the movable portion of the same; Fig. 180, a plan view of the left-hand end of the pin-block raceway with the mechanism for actuating the movable portion of the raceway; Fig. 181, a right-hand side view of the same, partially in section; Fig. 182, a plan view of a part of the movable portion 328 of the pin-block raceway and one of the plates 543, by means of which it is held and guided in its vertical movement; Fig. 183, a right-hand end view of the same; Fig. 184, a plan view of the mechanism for selecting and ejecting the spaces from the space-channels into the line of composition; Fig. 185, a left-hand side view of a vertical section between the uprights 576 577 of the same mechanism; Fig. 186, a front view of the mechanism shown in Fig. 184, with a portion of the same broken away to show the selecting-levers 588 and the frame in which they are held; Figs. 187, 189, and 191, operative views illustrating the joint action of the selecting-levers 588 and the movable pins in the pin-blocks 333; Figs. 188 and 190, operative views illustrating the action of the selecting-levers 588 in giving an initial movement to the ejecting-plunger 604; Fig. 192, a left-hand side view of the left-hand justifier-upright 576, the mechanisms for withdrawing the rule or gate, and the mechanisms for depressing the justified lines into the galley, including the dynamo for furnishing the electric current and portions of other adjacent mechanisms; Fig. 193, a front view of the setter-galley and the mechanism connected therewith; Fig. 194, a plan of the same; Fig. 195, a plan view illustrating the operation of the sliding plate 612 and slide 614, adapted to receive movement from the line of justified type and the lever 618, employed in connection with the galley mechanism, the parts in this view being shown as having been moved beyond their registering positions by the advance of the line of type; Fig. 196, a left-hand side view of a vertical section on the line 0 0, Fig. 197; Fig. 197, a plan view of the cap-piece 609 of the galley-bracket, the sliding plate 612, the slide 614, the lever 618, and the rule or gate 617, the parts being shown in their normal positions; Fig. 198, a plan view of the type-setter galley and the left-hand end of the raceway 137, showing the manner in which the two are united; Fig. 199, a left-hand side view of a section of the slide 614, having the head portion 615, the slide 614 being shown in transverse section; Fig. 200, a front view illustrating the operation of the vertical slide 632, which serves as the removable abutment at the right-hand end of the justified line; Fig. 201, a left-hand side view of the galley-bracket 607 and the volley mechanism located thereon; Fig. 202, a left-hand side view of a vertical section on the line 0 0, Fig. 198; Fig. 203, a left-hand side view of the parts shown in Fig. 200; Figs. 204, 205, and 206, enlarged plan views illustrating the operation of the latch-piece 636 and the lever 622, having the square recess. Fig. 207 is a front view of a vertical section on the line 0 0, Fig. 212, of a portion of the parts shown in Fig. 212, showing the relative positions of the slides 635 and 646; Fig. 208, an enlarged front view of the parts shown in Fig. 204 with the vertical slide 645 also in its proper relative position; Fig. 209, an enlarged left-hand side view illustrating the action of the hook-catch 625 upon the lever 622; Fig. 210, an enlarged left-hand side view of a vertical section of a portion of the slides 635 and 646 and the latch-piece 636, (shown in Fig. 212,) the latch-piece 636 being shown in engagement with the actuating-slide 646; Fig. 211, a plan view of the galley-bracket 607, with the cap-piece 609 removed, showing the gate 617, the slide 614, and the latch-piece mechanisms; Fig. 212, a left-hand side view of a vertical section on the line 0 0, Fig. 194, showing the galley-cap and the line-depresser in their positions upon the galley-bracket; Fig. 213, a left-hand side view of the electrical key-locking mechanism connected with the line-key rod 235; Fig. 214, a plan view of the parts shown in Fig. 213; Fig. 215, a front view of a vertical section on the line 0 0, Fig. 213, showing the manner in which the lever 662 is attached to the word-key-actuating rod 183; Fig. 215$^A$, a plan view showing the projection 666 on the vertical slide 0244 in engagement with the recess 665 of the line-key rod 225; Fig. 216, a left-hand side view showing the special line-key 245 in its proper position on the left-hand side of the keyboard-frame; Fig. 217, a plan view thereof; Fig. 218, a left-hand side view of a vertical section through the keyboard, showing the mechanism by means of which the word-key 182 receives movement from the special em-quad key 681; Fig. 219, a plan view of the special mechanism for holding the gage-block 437 from movement until a line of the proper length has been set; Fig. 220, a front view of the same; Fig. 221, a right-hand side view of a vertical section through the line 0 0, Fig. 220; Figs. 222, 223, 224, 225, and 226, plan views of successive portions extending from right to left, which views, taken together, represent a plan view of the entire machine. (In arranging these figures for this purpose the sheets should be placed with the long sides adjacent, with the exception of Fig. 222, which should be placed with the broken lines next to Fig. 223.) In each view a portion of the next adjacent view is shown, in order that the connection between them may be clearly seen. In Fig. 222 of this series of views is shown the main driving-shaft with the loose pulley, driving-pulley, and type-driver disk located thereon, also the series of cams and rock-shafts which actuate the mechanisms for forwarding the type and lifting them into the type-channels. In Fig. 223 is shown a portion of the main train of gears, the keyboard, the type-setter ejecting-plungers, and other portions of the type-setter mechanisms. Figs. 223, 224, 225, and 226 embrace the parts which form the subject of this invention; Figs. 227, 228, and 229, front views of the portions of the machine shown in Figs. 224, 225, and 226. Fig. 230 is a table, illustrating the principle involved in our improved method of justifying type. Figs. 231 and 232 are diagram views illustrating the application of said principle. Fig. 233 is a table intended to illustrate a modification of the principle illustrated in Fig. 230. Figs. 234 and 235 are diagram views illustrating the use of said table. Fig. 236 is a plan view in detail of a portion of the machine, showing a modified construction of the measuring device, modified means for utilizing the combinations and for inserting the spaces between the words. Fig. 237 is a vertical sectional view taken upon the line 237 of Fig. 236. Fig. 238 is a front view of the modified construction shown in Fig. 236. Fig. 239 is a front view in detail of a combination cylinder. Fig. 240 is a diagram view indicating a modified means for maintaining the words separate upon the raceway; Fig. 241, a plan view of a modified means for transferring the type measurement to the combination-forms, and Fig. 242 is an end view thereof.

Having given a general statement of our invention, we will first describe so much of an automatic setting and distributing machine as will enable the connection of our invention therewith to be understood, as it is upon the action of and connection with these auxiliary or similar mechanisms that the efficiency of our invention depends, after which said invention will be described in detail.

Referring to the drawings, $1^0$, Figs. $1^A$ and 2 represents the bed or main framework of the machine, which is preferably inclined at an angle to the plane of the horizon in order that the type-cases may likewise be so inclined as to maintain the type in proper position therein, while at the same time the type-ejecting plungers, which are arranged at right angles to the case, as well as other parts, may be more readily adjusted. Attached to the bed are brackets $1^B$ for the support of the main driving-shaft of the machine, and six principle upright brackets 191, 192, 519, 520, 576, and 577, Figs. $85^B$ and 222, which serve as bearings for the various shafts and as supports for the main type-case $1^C$, Fig. $1^A$, and the space-case 107. A keyboard $182^0$ is arranged upon the front of the machine for the purpose of initiating the action of suitable plungers for ejecting the type into a main raceway 137, hereinafter referred to, which extends from the right-hand side of the type-case, along the entire front of the machine, to the setting-galley 608, Figs. $1^A$, 193, 226, 227, 228, and 229, upon the extreme left.

Located in front of the machine at right angles to the plane of the bed is a bracket in which is placed a distributing-galley $O^2$, in which the "dead matter" is intended to be placed for distribution. Above and adjacent to the distributing-galley is an automatic "cut-off" or separator mechanism 1, 2, and 3, Figs. 1, 2, 15, 225, and 228, by which the spaces are separated one by one from the line and conveyed by means of a comb 11, having a four-motion movement upon a suitable raceway to the right, thence forward, thence to the left, and are delivered to carrier-blocks, which are moved into operative proximity to suitable selecting mechanism, whereby the spaces are placed in separate channels according to a predetermined order. A similar comb 15, Figs. 1, 3, 14, and 15, arranged in suitable proximity to a raceway 12, for conveying the spaces to the space-case, is given a four-motion movement by means of the levers 14 and 17, respectively, which are actuated in turn by means of cams 13 and 16 upon the shaft O13.

An adjusting bar or plate 25 is arranged to slide horizontally in suitable bearings, and is actuated by means of a bell-crank lever 24, Figs. 17 and 22, which in turn is operatively connected with a cam 23 upon the distributing carrier-shaft O23. The plate 25 is provided with depending arms 26 and 27, Figs. 19, 20, and 21, which are adapted to engage with the ends of the spaces and move said spaces into a registering position, whereby the usual round nicks therein may be brought into alignment with the bead-like projection or guiding-rib 30, which serves to guide the spaces in their lateral movement upon the raceway, any excess of movement of the type being prevented by means of what we term the "spring-post raceway," as shown at 28, Figs. 14, 18, and 21.

At the left-hand end of the comb 15 the spaces are received in suitable carrier-frames 36, Figs. 24 to 29 and $25^D$, which are independent of each other and are arranged to move upon raceway 34, having curved ends, Fig. 24, in suitable proximity to a space-case 107, as shown in said last-named figure. The object of said frames is to advance the spaces in a satisfactory manner upon the raceway, and to sustain them while being subjected to the action of suitable selecting mechanism. The frames are advanced by means of a comb O56, to which is imparted a four-motion movement and while at rest the spaces are tried by means of wards 7, Figs. 3 to 13, inclusive, which are adapted to select the spaces by means of certain nicks formed therein, with which the wards are adapted to register when pressed against said spaces, respectively. In case the wards so register the levers by which the wards are actuated are moved sufficiently to initiate the movement of ejecting-plungers by which the spaces are forced out upon and across a division-plate 90, Figs. 38, 49, 50, and 54, into a lifter and thereby deposited upon ledges or shoulders 80, Figs. 39 to 44, inclusive, formed upon the lower ends of division-strips 78, which serve to divide the space-case 107 into suitable compartments or channels.

The foregoing brief description is given in order to show, generally, the preferable way in which the spaces are distributed, selected, and introduced into the space-case; but, as they form no part of our joint invention, and as it is not our intention to claim the same jointly, a more elaborate description herein is deemed unnecessary. Neither will a more extended description be given of the type-setting mechanism. Suffice it to say that by means of a reciprocating main type-driver, the type when ejected upon the setting raceway 137, in accordance with the order of depression of the selecting-keys, is advanced by means of said main driver into operative proximity to an auxiliary type-driver 124, Figs. 58, 59, 60, 61, and 62, which consists of a block provided with flanges 125, adapted to fit into corresponding recesses in a frame 126, in which it is arranged to slide longitudinally, said frame being in turn provided with a vertical projection 130, arranged to slide loosely in guides in a stationary frame O130, Fig. 58. The block 124, therefore, is adapted to be reciprocated horizontally and vertically. The former movement is accomplished by means of an oscillating arm 131, Fig. 62, the lower end of which is connected by means of a link 129 to the block 124, while the upper end is rigidly attached to a rock-shaft 132, Figs. 61, 62, 63, 109, and 224, which is supported in a bearing in a suitable bracket attached to the main upright 192. A similar arm O132, is located upon the rear end of the rock-shaft, and is provided with a pin which is adapted to engage with a groove in a cam 133, mounted upon the auxiliary driving shaft $133^0$, Fig. 224. Said auxiliary type-driver is provided with a depending finger 127, which is intended to engage and forward the type to the left, the driver being given a four-motion movement with each impulse of the machine, as follows: To the right in a plane above the top of the type, thence downwardly to engage the type, thence in a horizontal plane to the left, and thence rearwardly and preferably in an oblique line to the upper plane. The manner of moving the type thereby is clearly indicated in Figs. 58 and 59. The forward movement of said driver is comparatively slow in order to prevent a displacement of the type. This comparatively slow forward movement of the auxiliary type-driver, which type-driver is not our joint invention, is utilized by us in connection with our improved measuring device in the manner hereinafter set forth, as an aid in measuring the type constituting the words as they are set.

*The word-comb and word-shaft.*—In order to automatically and properly justify the line, it is essential that the measurement of the type should either be taken directly or properly indicated; but preferably the former, and in order to render practicable the automatic insertion of the spaces in the line it is of the utmost importance that the words should in some way be kept separate until such time as the spaces are inserted. We accomplish the first object preferably by taking the measure of each word separately and obtaining the sum of these separate measurements. The latter end we prefer to accomplish by means of what we term a "word-comb," which is operated primarily by a "word-shaft." These features we will first describe before giving a description of the measuring device, the action of which is dependent thereon.

It should be borne in mind that the main features of the justifying mechanism are normally at rest, and that those which relate to their respective actions, either to a word or to a line, are under the primary control, and their action is subject to the volition of the operator. When, therefore, a word is set, the operator indicates it by the depression of a special key 182, Figs. 224, known as the "word-key," which initiates the movement of mechanism adapted to actuate a clutch upon a shaft 266, Figs. 38, 69, and 224, which is known as the "word-shaft," and which automatically stops upon the completion of a single revolution, unlesss the word-key is again depressed in harmony with the next succeeding impulse of the machine. This is liable to occur for an indefinite number of times for special purposes, and will be hereinafter referred to.

As the mechanism by which the impulse of the word-key is transferred to the clutching device is intimately connected with and dependent upon the time-lock mechanism, a full description thereof will be deferred until the construction and operation of said time-lock mechanism is described in full.

In order to maintain the words separate, one from another, for the purposes mentioned, we provide a word-comb 146, Figs. 63, 71, and 227, which consists of two or more, but preferably four, parallel plates having suitable spacing between to keep them separate, said plates or bars being provided with teeth, as shown, which are sufficiently distant from each other to receive the type representing the longest word of the language between them. Said word-comb extends from the auxiliary type-driver to the space-case 107, as shown in Figs. 110, 227, 228, and 229 above and in operative proximity to the main raceway. An end view of the word-comb is shown in Fig. 71. The number of intervals between the teeth of the comb should be not less than the maximum number of words in any one line.

Aside from the main comb 146, which is intended to convey the words from the point of delivery of the auxiliary type-driver to a point near the space-case, we preferably provide a supplemental driver 0148, having a greater longitudinal movement for conveying the words past the space-case, and a second supplemental portion 0149, like the main portion, which is adapted to convey the words, with the spaces, from the left-hand side of the space-case toward and over the receiving-galley.

Located at suitable points are three blocks 148, Figs. 65, 67, 68, 70, 227, and 228, for the support of the main portion of the word-comb. Said blocks are secured loosely in vertical guides and the word-comb is also loosely secured in bearings in said blocks, so as to permit of a longitudinal movement of the body of said comb therein. Cap-pieces 147 are attached to the comb, as shown to fit in said bearings. It is therefore obvious that said comb is capable of a vertical movement through the action of the sliding-blocks 148 and of a horizontal movement therein, which movements are accomplished as follows: Pivotally mounted at 158, Figs. 68 and 69, upon a suitable bracket which is rigidly attached to the framework of the machine is a lever 157, provided with a pin adapted to engage in a groove in a cam 156 mounted upon the word-shaft 266. The opposite end of said lever is arranged to engage with a block $147^0$, as clearly shown in Figs. 68, which block is pivotally mounted upon a pin attached to the cap-piece 147 of the word-comb.

By the revolution of the shaft 266 horizontal movement is imparted to the word-comb through the lever 157.

The normal position of the word-comb in relation to its horizontal movements is slightly to the left of its extreme right-hand position, and the groove of the cam 156 is so formed as to cause to be imparted to the word-comb, first, a slight movement from the normal to the extreme right-hand position, then a forward movement to the extreme left-hand position, and, finally, a return movement to the place of beginning.

Figure 68:
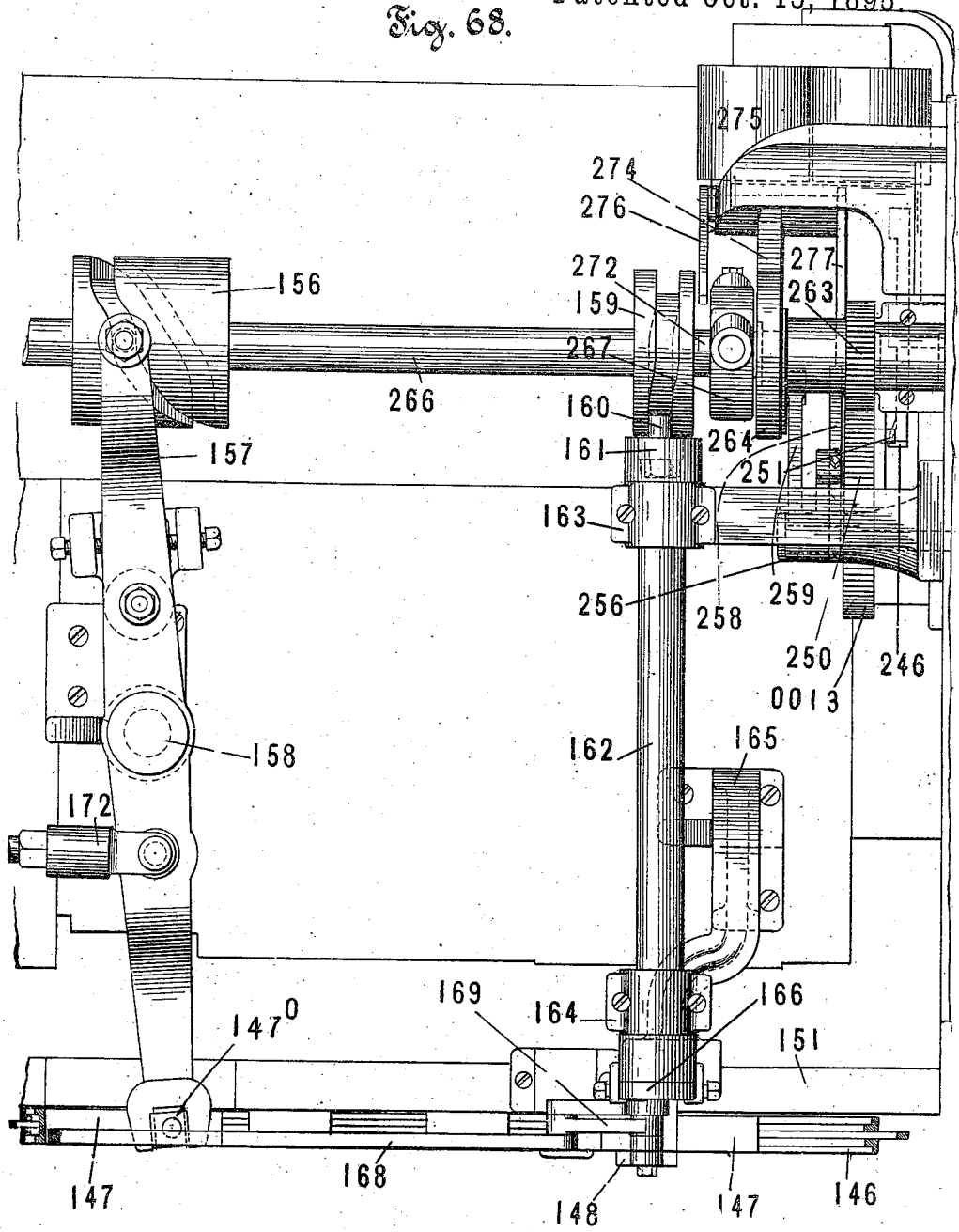

Attached to the slides 148, by means of links 170 and pins 171, Figs. 64 and 70, are the horizontal arms of bell-crank levers 169, Figs. 63 and 227, which levers are located at suitable points upon the beam 151, Figs. 68 and 69. The vertical arms of said levers are in turn attached to a horizontal connecting-bar 168, Figs. 227, 228, and 229, which connects with the vertical arms of all of said bell-crank levers 169, so as to actuate the same simultaneously. The right-hand end of the connecting-bar or link 168 is loosely attached to an arm 166, Figs. 63, 68, and 227, which is rigidly secured to a transverse rock-shaft 162, sustained in suitable bearings attached to the frame. Upon the opposite end of said shaft, as represented in Fig. 68, is a similar arm 161, rigidly attached to said shaft and provided with a pin 160, adapted to engage with a groove in a cam 159, mounted upon the word-shaft 266. Thus, through the rocking of the shaft 162, imparted by the rotation of said cam, a reciprocating movement is transmitted to the connecting-bar 168, and thence to the bell-crank levers, whereby the word-comb is actuated vertically.

The cams 156 and 159, Fig. 68, are so timed as to act in harmony with each other to impart the requisite horizontal and vertical movements to the word-comb when desired. Said comb is thereby caused to move from its normal into its extreme right-hand position, thence downwardly to the lower plane to engage the type, thence forward to its extreme left-hand position to convey the word or words along the raceway, thence upward to the upper plane, and thence backward in said upper plane to its normal position. By depressing the word-key, then, it should be remembered that the word-shaft 266 is caused to be clutched and to make one revolution, thus imparting the four-motion movement to the word-comb to which the auxiliary type-driver delivers the successive words, which words are thereby intermittently advanced along the raceway toward the setter-galley.

In order to prevent displacement of the type upon the raceway, we provide what is known as a "spring-post" raceway 0147, Figs. 70, 72, 74, and 75, which consists of a flat plate or bar arranged between the parallel bars of the word-comb, in which bars are placed a series of vertical spring posts or studs surrounded by spiral springs, as shown, for imparting a yielding pressure to the heads upon the lower ends of said posts, which bear against the type, and thus hold them, by means of frictional contact, in any given place at which they are advanced upon the raceway. This feature is common to both the distributing and setting mechanisms, and we make no claim thereto in this application.

*The measuring devices.*—We are aware that the measurement of the type has heretofore been indicated, upon a scale or otherwise, for justifying purposes according to a predetermined standard of dimensions; but this method is subject to inaccuracies, owing to the fact that there is usually more or less foreign matter between the type, and hence the indicated measure may not at all times conform to the actual. If an actual measurement of the type, together with such foreign matter as may be with it, be made, it is obvious that when spaced accordingly it must always enter the galley without difficulty.

We are the first, as far as we are aware, to actually measure type for purposes of justification, and to automatically transfer that measurement to material combinations by which the proper spaces are caused to be set out. Said measurement may be made and indicated in various ways, one or more of which will be hereinafter suggested; but in practice we prefer to accomplish it as follows: As it is less practicable to measure the line as a whole, owing to the necessity for keeping the words separate in order to introduce the spaces, and as inaccuracies would result from measuring each type by itself, we prefer, as stated, to measure each word separately and add its measurement to the preceding word or words. In doing this we employ what we term a "word-measuring slide," which preferably consists of a head portion 284, Figs. 58, 59, 111, 115, and 227, adapted to slide longitudinally in suitable guides in proximity to the setting-raceway 137. Said head portion is provided with teeth 284°, adapted to project upwardly through slots in the raceway, as clearly shown in Figs. 115 and 164^A, so as to be presented before the type which is advanced by the auxiliary driver. The head portion 284 is adapted to slide horizontally upon a guide 286, better shown in Figs. 115 and 119, which is adapted to enter suitable recesses in said head, and which guide is in turn attached to blocks 285 285, Figs. 109, 115, and 119, arranged to slide loosely in vertical guides in the beam 151. Thus it will be seen that said measuring-slide is capable of both vertical and longitudinal movement. Attached to the head portion 284 is a bar or rod 287, which constitutes the main portion of the measuring-slide, the latter being provided with a groove upon either side and a tongue or wedge-shaped portion above, as clearly shown in Figs. 111 and 116. The word-measuring slide is supported near its left-hand end upon rollers 288 288, Figs. 109 and 110, which rollers are suitably supported by means of a vertical slide 289, similar in construction to the slides 285. Projections are formed upon the vertical slide 289, which extend into the grooves of the square portion of the measuring-slide and thus connect the former to said measuring-slide, as shown in Fig. 113. The word-measuring slide has imparted to it a four-motion movement, as follows: first, in a forward direction in an upper plane; second, in a vertical direction to the lower plane, thence rearwardly in said lower plane, and, finally, in a vertical direction to the upper plane. The forward or left-hand movement of the measuring-slide in the upper plane is imparted by the pressure of the type against the teeth thereof, which type are forwarded by means of the auxiliary driver An adjustable stop 282, Fig. 58, is attached to the framework to serve as a banking for the head of the word-measuring slide, said stop being placed by preference the width of an ordinary space (.035 of an inch) to the right of the extreme left-hand position of the auxiliary driver in order that the measurement of an ordinary space may be added to that of each word for the purpose of securing greater uniformity in spacing, as hereinafter more fully described.

Horizontal return movement to the right-hand is imparted to the measuring-slide by means of a lever 292, Fig. 110, which is connected with a sliding block 294 by means of a link 293. The sliding block is more clearly shown in Figs. 111 and 115. Said block is provided with a hollow cylinder O, in which is inserted a piston having a projection 296 adapted to engage with a projection 297 upon the head 284 of the measuring-slide when the latter has been moved into the lower plane after having taken the measurement of the word. When the word-measuring slide is in the upper plane the projection 297 is above the path of movement of the projection 296. The cylinder is provided with the usual vent openings, so that an air-cushion is formed to ease the concussion of the blow against the projection 297. The piston is returned to its normal position in its left-hand movement by the contact of the projection 296 with a projection 298 rigidly attached to the raceway. The lever 292 is mounted upon a rock-shaft 291, to which is imparted movement by means of a cam 290, mounted upon what we term the "justifying cam-shaft" 061, said cam engaging with a pin upon a short arm rigidly attached to the rear end of the rock-shaft 291. In order to impart a yielding action to the lever 292 we prefer to attach said lever loosely to the rock-shaft 291 and to loosely connect with lugs upon the free end thereof, as shown in dotted lines, Fig. 110, a spring 000, which is rigidly attached to a short arm immediately behind the lever 292, which short arm is in turn rigidly attached to the rock-shaft 291. A set-screw 0000, extending through a lug in said short arm and bearing against the arm 292 enables the necessary adjustment to be made and the tension of the spring to be regulated. The vertical movement of the slides 285 is imparted by means of arms 2890, Fig. 115, rigidly attached to a rock-shaft 306, Figs. 110, 114, and 115, which is actuated in turn by means of an arm 305, rigidly attached thereto and connected with a vertical slide 304 loosely arranged in vertical guides. (See Figs. 117 and 118.) A pin 303 upon said slide is adapted to engage with a cam-shaped slot 300 upon a plate 299, loosely secured between suitable guides above and below to the beam 151, as shown in Figs. 110, 117, and 118. The plate 299 is also attached loosely to the word-comb in such manner as to receive movement therefrom in a horizontal plane between the guides, and as a consequence to impart, by means of the cam-shaped groove and the connecting mechanism described, a vertical movement to the measuring-slide. Said word-comb, the purpose and operation of which will be hereinafter more fully described, is actuated, as stated, at the end of each word. It will therefore be understood that the measuring-slide receives its movement with the setting of each word and in harmony with the movement of the auxiliary type-driver. Being forwarded by means of the direct pressure of the type, it follows that the extent of each forward movement conforms to the measurement of the type in the successive words that are set, the slide always returning after the measurement of each word to its initial position against the stop 282.

*The line-measuring bar.*—The successive forward movements of the measuring-slide indicate the exact measurement of the respective words; but as it is essential that each one of these measurements should be preserved and added to that which has preceded it, we prefer to provide for this purpose what we term a "line-measuring bar" 307, Figs. 109, 112, 113, 114, 116, 220, and 221, which consists of a bar provided with a longitudinal V-shaped groove upon its under side adapted to receive a wedge-shaped tongue formed upon the upper side of the word-measuring slide 287, as clearly shown in the drawings, as well as a similar wedge-shaped tongue 320, Fig. 112, formed upon a stationary block attached to the beam 151. Said measuring-bar is provided with longitudinal grooves upon the sides adapted to fit suitable guides in blocks 308 and 0308, Figs. 110, 114, and 227, in which it is normally free to slide longitudinally.

In order to secure the result of the successive measurements made by the measuring-slide, it is our purpose to clamp the line-measuring bar to the word-measuring slide before the beginning of each forward movement of the latter, move the two together to the extent of the forward movement of the measuring-slide, clamp the measuring-bar to a stationary point during the return movement of the measuring-slide, which during said movement is unclamped from the measuring-bar, reclamp said slide and bar to each other, unclamp the bar from said stationary point and repeat the operation as many times as there are words in a line, thus intermittently advancing the measuring-bar a distance corresponding to the gross measurement of the words in the line, plus the ordinary spaces. We accomplish said result as follows: The measuring-bar is so adjusted in the block 308 in which it is supported, as to be capable of a slight movement in a vertical direction, as shown in Fig. 114. Pivotally secured at one end to a pin 310, better shown in Fig. 109, attached to the raceway 137, is a yoke 309, the other end of said yoke being adapted to rest upon a stop-pin 311, also attached to the raceway. A frame 312, having rollers at the respective ends, is pivotally attached to the yoke by means of a bolt, as shown at 313. A spring 314, Figs. 109 and 110, is rigidly attached at its middle to the raceway, one end thereof being made to bear upon the end of the yoke above the pin 311, so as normally to hold the left-hand end of said yoke against said pin with a yielding pressure. Normally the rollers upon the frame 312 exert no pressure upon the bar 307; but are, through the action of the spring 314, intended to exert a yielding pressure thereon when the slide 289, Fig. 109, to which the rollers 288, hereinbefore referred to, are attached, is raised, which action is accomplished as follows: Loosely connected with a bolt which is passed through suitable lugs at the lower end of the slide 289, as shown in Figs. 109, 110, and 113, is an arm 289°, which is rigidly attached to a rock-shaft 306.

The manner in which the rock-shaft is actuated to impart vertical movement to the head portion 284 of the word-measuring slide has been hereinbefore described. The slide 289 is actuated in like manner, and the wedge-shaped tongue on the word-measuring slide is pressed into the corresponding groove in the line-measuring bar and the two are clamped together with an elastic pressure resulting from the resilient action of the spring 314. This clamping action occurs previous to the forward movement of the measuring-slide resulting from the action of the auxiliary type-driver, and hence the measuring-slide and measuring-bar are caused to move forward together. By means of the pivoted frame 312 held in the yoke 309 the upper rollers are free to adjust themselves with uniform pressure upon the surface of the measuring-bar 307, thus insuring a continuous and perfect clamping of the two bars as they are pushed forward between the upper and lower rollers.

Upon reaching the limit of the forward movement at the end of each word, the measuring-bar is clamped to a stationary part, and the slide and bar unclamped from each other in the following manner: A stationary block 320, Fig. 112, is rigidly attached, as stated, to the beam 151, and is provided with a wedge-shaped portion, as shown in Fig. 112, which latter is adapted to enter the wedge-shaped groove in the bar 307. A slide 316 is arranged in vertical guides in the beam 151, and is provided with lugs 317 and 318, which project forward above and below the bar 307. Said slide is given vertical movement by means of an arm 315 attached to the rock-shaft 306. A spring 319, secured beneath the raceway 137, is adapted to depress the slide 316 and thereby clamp the measuring-bar 307 to the stationary block 320.

At the proper time in the operation of the machine the rock-shaft 306 is caused to give the lever-arms described a downward movement, in consequence of which the slide 316 is caused to descend by the reaction of the spring 319, and thus press the grooved portion of the measuring-bar upon the wedge-shaped projection 320. The clamping action thereby effected occurs just before the measuring-slide is unclamped from the measuring-bar by the action of the other lever-arms upon the rock-shaft, as has been before described. The measuring-bar is thus temporarily held in a stationary position until the measuring-slide is returned to its normal position ready for the measurement of the other word, when the reverse action takes place—that is, the measuring slide and bar are clamped together and the latter unclamped from said stationary connection. As a result of the first movement of the word-comb into its extreme right-hand position, the cam-plate 299, actuated by said comb and having the slot 300, is caused to give the word-measuring slide, which at this time is in its upper plane and in the forward position into which it has been moved by the action of the auxiliary type-driver movement into the lower plane. By this movement, also, the word-measuring slide is unclamped from the line-measuring bar, and the latter is clamped by the stationary clamping mechanism to hold it against accidental movement. After the first movement of the word-comb to the right, and mainly during the downward movement of the same, the word-measuring slide, by the action of the cam 290 and the actuating lever-arm 292, is returned to its extreme right-hand position. During the first part of the movement of the word-comb to the left, and by means of the cam-plate 299 thereon, the word-measuring slide is lifted to its normal position in the upper plane. By the same action, also, the word-measuring slide is again clamped to the line-measuring bar, and an instant later the stationary clamp is released. The measuring-bar is thus left in the forward position into which it has been advanced ready to receive a further impulse from the measuring-slide in the same direction—the described operations being repeated until a sufficient number of words have been set to form a line.

During the rearward and upward movements of the word-measuring slide the first and each subsequent word is advanced step by step on the raceway by the successive movements of the word-comb.

*The measuring-plate.*—It has been heretofore explained in a general way that the word-measurements are automatically transferred to the combination-forms. This might be accomplished directly by modifying the construction of the measuring device, but inasmuch as speed is an important desideratum, we prefer to lighten as much as possible the burden and wear upon the type by making the measuring device as light as possible and relieving it of all unnecessary work, even though the working parts may be thereby increased in number. In practically carrying out our invention, therefore, we provide what we term a "measuring-plate" 327, Figs. 120, 122, 123, 126, and 128, which, instead of being integral with the line-measuring bar 307, is separate therefrom, but so connected as to be actuated thereby a very short distance, but sufficient to represent the difference between the shortest line that is capable of being justified and the full-column measure.

An auxiliary line-measuring bar 324, provided with a slot 326, is arranged parallel with and preferably above the bar 307. A stud 323 is arranged to project into or through said slot, so as to engage with the forward end thereof, as clearly shown in the drawings. It will thus be seen that the bar 307 is capable of being moved almost to its full limit in either direction without actuating the bar 324. The latter is held between the guide-pieces 325 325, and is adapted to slide loosely therein.

Formed in the bottom of the bar 307 is a series of notches, as shown, and to said bar is adjustably secured a block 321, provided with a projection adapted to extend into said notches for the purposes of large adjustments, and provided with a set-screw 322 intended for finer adjustment. When the bar 307 is, by mechanism hereinafter described, returned to its normal starting position, the right-hand end of the screw 322 in the block 321 is moved into contact with a fixedly-adjustable stop or banking, consequently, by means of the adjustment described, the normal starting position of the bar 307 with the stud 323 may be fixed at any desired point, and the distance between its starting position and the point at which it is adapted to move the auxiliary measuring-bar 324 into an operative position, as hereinafter described, may be made to conform to the length of a line of any desired measure. Projecting downwardly from the right-hand end of the auxiliary bar 324, Fig. 121, is a stud 504, which is provided with a contact-piece 505, extending backwardly from its lower end, as shown in dotted lines in Fig. 120, which is adapted to but against a stop-screw 506⁰. The normal position of the auxiliary bar 324 is that which it assumes when the stop 505 is in contact with the stop-screw 506⁰ at the extreme right hand, and the normal position of the bar 307 is also at the right-hand extreme, with its stop-screw 322 against the contact-piece 505.

The auxiliary bar 324 is either integral with or attached to the measuring-plate 327, the face of which is oblique to the axis of the auxiliary measuring-bar 324, and is provided with teeth 449, as shown. Beneath the serrated plate 327 is arranged a contact-plate 450, which is provided with oblique slots 451, through which guide-pins 452 are loosely projected, better shown in Figs. 122 and 123. An end flange 456 is formed upon said contact-plate through a slot in which is loosely projected a bolt 453, which is tapped into the measuring-plate. Between the head of said bolt and the flange 456 is interposed a spring, as shown, which tends to force against the end of said measuring-plate an adjustable set-screw 457, which is tapped into said flange. This movement causes the edge 458 of the contact-plate to normally project beyond the teeth of the measuring-plate, as shown in Fig. 122, but as the contact-plate is moved in an opposite direction the reverse action takes place, caused by the movement of the pins 452 in the slots 451, as shown in Fig. 123.

The teeth of the measuring-plate, which are very fine, are intended to engage with corresponding teeth upon a gage-block 437, which is given a rapid movement, as hereinafter described, and as the teeth would in time become worn by being forced together in this manner, the contact-plate 450, which engages with a corresponding plate or bearing-face 448 upon the block 437, more clearly shown in Figs. 124 and 125, serves as a cushion to receive the impact from said block, after which, by means of a cam-plate 465, Fig. 128, upon the word-comb 146, acting upon a pin 464, passing loosely through the beam 151, and bearing against the end of a lever 463, pivoted upon a bracket attached to said beam, the lower end 462 of said lever bearing against a sliding-plate 460, Figs. 120 and 128, resting against the contact-plate 450, the latter is pushed back against the action of the spring 455, thus enabling the teeth of the gage-block and measuring-plate to engage with certainty and without injury or wear.

The gage-block 437 is intended, by the extent of its movement, which in turn is controlled by the position of the measuring-plate, to regulate the extent of movement of the combination-forms, as hereinafter described, and to thus determine the particular combination to be presented to the mechanism which controls the ejection of the spaces. Said gage-block is rigidly attached to or made integral with a bar 436, termed by us the "connecting-bar," which serves to connect said block with a clamp-block 435, Figs. 164 and 167 to 171, inclusive.

*The gage and clamp-blocks and their actuating mechanisms.*—When the clamp-block 435 is in its normal position it is against a fixed stop or banking, and the gage-block 437 is in the position shown in Fig. 120. When the clamp-block is released it moves forward under a spring-pressure until the gage-block 437, connected therewith, makes contact, as before described, with the measuring-plate 327, the extent of this movement depending upon the position of the plate 327, which latter depends, as before described, upon the measurement of the words in the line. In order to insure accuracy and prevent undue wear, the clamp-block, gage-block, and connecting-bar 436 are preferably made comparatively light and the forward movement is made with a light spring-pressure. The return movement of the clamp-block 435 to the fixed banking is obviously equal to its forward movement and also represents the measurement of the line. This return is made with a powerful positive movement and is utilized in a manner hereinafter described.

As it is desirable to make the combination-forms as compact as possible, they are preferably arranged in the form of a series of parallel plates having, by preference, a series of projections thereon intended to represent the various combinations required. Each plate is intended to represent all the combinations for lines of a given number of words, and hence it is not only necessary to provide mechanism to bring the particular plate required into a given position, but also to move that plate, when so presented, a definite distance according to the combination desired. As the plates are necessarily heavy, and as speed and accuracy are both essential in their manipulation, it follows that they should be actuated positively by relatively powerful mechanism and that the comparatively delicate measuring devices should be relieved of all such strain as would otherwise be put upon them if required to actuate heavier parts. For this reason we have connected the combination-plate actuating mechanism with what we term a "line-shaft," which is normally at rest, but is brought into action by means of a suitable clutch in operative connection with the word-shaft, the action of which clutch is initiated by the depression of what we term a "line-key" 370, Fig. 144, intended to be actuated upon the completion of each line.

The manner of clutching the line-shaft through the action of the line-key is not material for the present general understanding of that feature of the machine, but will be hereinafter fully described in connection with the time-lock mechanisms by which its harmonious action with the driving parts is insured. Said line-shaft 424 is shown in Figs. 38, 141, 159, 164, and 166. By means of a cam 467, Figs. 164 and 165, a positive reciprocating movement of a definite length is imparted to a slide 485, shown in said last-named figures and also in Fig. 169. Said slide 485 is intended to actuate in turn a secondary slide 476, the extent of movement of which is dependent upon the relative position of the clamping-block 435, which in turn is controlled by the position of the measuring-plate. The extent of movement of the secondary slide controls that of the combination-plates with which it is connected by means of a suitable lever.

We will now describe the specific construction and operation of the parts. The slide 485 is shown in detail in Fig. 165. The rear portion is arranged to slide in grooved guides, as shown, in a bracket 485⁰, Fig. 166, while the front portion or end is held by suitable guides 475 upon a main supporting-plate, as shown in Figs. 164, 166, and 170. The rear portion of the slide is made in the shape of a cross, in which is formed horizontal and vertical slots 486 and 487, respectively, the former of which is intended to receive the line-shaft 424. A pin 483 in the cam-disk 467 is adapted to engage with the slot 487 and by the revolution of the shaft to impart a reciprocating motion to said slide. In order to prevent a possible movement of the slide while the pin 483 is passing the slot 486, we provide pins 488 and 489, which are attached to the slide near the respective ends of the slot 486, said pins being adapted to enter a cam-groove 484 formed in the cam-disk 467. It will thus be seen that when the slide attains either extreme of its movement one or the other of said pins will be in engagement with said groove, and thereby prevent a longitudinal movement of the slide. By means of this device we are enabled to actuate the slide positively and to obtain a period of rest at each extreme of its movement without impeding the motion of the shaft 424. The front portion of the slide 485 is provided with a hollow cylindrical portion 490, into which is inserted pistons 495 and 496, having interposed between them a diaphragm 494, indicated in dotted lines in Fig. 164 and more clearly shown in Fig. 169. Upon the respective sides of said diaphragm and upon the top of the cylindrical portion 490 are formed vents, one of which is shown in Fig. 170. Attached to the piston-rod 495⁰ is a contact-plate 491, which projects laterally from the slide 485 into the path of movement of the clamping-block 435, and also that of a slide 476, which is arranged parallel to the slide 485. The object of said contact-plate is to return the clamping-block 435 and the slide 476 to their respective normal positions in the manner hereinafter stated, and the object of the cylinder and pistons described is to form an air-cushion in order to ease the impact of said contact-plate. A stud 498, Fig. 169, is attached to the framework of the machine and is provided with an adjusting-screw, as shown, which serves as a stop for the clamp-block 435 when the latter is in its normal position. A spring-actuated detent 433, Figs. 168 and 169, under control of the operator, as hereinafter described, is adapted to automatically engage with a lug 435⁰, attached to the clamp-block 435 and beveled upon its under side, as shown, and to hold the same with the clamp-block in its normal position against the action of an elastic arm 439, Fig. 166, which is pivoted at 441 upon a bracket 440 in a bore in which is inclosed a plunger 442, arranged to bear against the arm 439 and actuated by a spring 443, the tension of which is regulated by a set-screw 444. The lower end of the arm 439 is loosely connected by means of the stud 438, Fig. 164, with the bar 436, (see, also, Fig. 126,) which connects the gage-block and the clamping-block. The detent 433 is normally locked by means of a sliding plate 427, Figs. 153, 157, and 159, which is operatively connected with a lever-arm 426', mounted upon a rock-shaft 426⁰, to which is rigidly attached an arm 426, in turn connected directly with a rod 405, which is in operative connection with the line-key for the primary purpose of actuating the line-shaft clutch mechanism, as hereinafter set forth. A lever 432, attached to a rock-shaft 431, is connected with said detent, as clearly shown in Fig. 153. Another arm upon said rock-shaft connects with a rod 429, Figs. 153, 155, and 159, the upper end of which is bent at right angles thereto, as shown, and adapted to bear against a cam-surface 156⁰ upon a cam 156, said cam-surface having a perpendicular offset 428 in order to permit a quick return motion of the rod 429, which may be readily understood by reference to Fig. 154. The rod 429 is held by a yielding pressure against said cam by means of the spring 434, Fig. 159. Upon a depression of the line-key the bolt 427 is unlocked through the action of the rod 405, and as the line-key also causes the word-shaft to be actuated, the revolution of the latter causes the withdrawal of the detent 433 as soon as the rod 429 is forced into the offset 428 through the action of the spring 434. Upon the further revolution of the word-shaft the inclined surface $428^0$, Fig. 153, of said cam reverses the position of the rod 429 and restores the detent 433 to its normal position. The return of the clamp-block 435 to its normal position causes the beveled lug thereon to depress the detent 433 against the action of the spring $432^0$, and thereby to lock itself in position. Upon releasing the detent 433, which results, as stated, from a depression of the line-key, the connecting-bar 436 is thrust forward until the gage-block 437 is brought into contact with the measuring-plate 327, the lateral position of which, as stated, determines the extent of the forward movement of said gage-block.

As before specified, the gage-block 437 and the measuring-plate 327 are provided with teeth 447 and 449, respectively, Figs. 120, 122, and 123, the depth of which teeth, measuring lengthwise of the machine, corresponds to the unit of measurement of the spaces. This feature will be again referred to and fully described in connection with the description of the combination-plates. The fineness of the teeth and the accuracy of measurement required render it less practicable to bring the two sets of teeth directly together by the action of the spring-actuated arm 439, and hence we provide the contact-plate 450, hereinbefore mentioned. The gage-block 437 is provided with projections 445, Figs. 120 to 125, inclusive, which are accurately fitted in grooves 446, formed in stationary guide-plates 466, constituting the box or casing which incloses the measuring-plate and gage-block. The normal position of the contact-plate 450 is that shown in Fig. 122, in which it is held by the action of the spring 455. Upon releasing the detent 433 a beveled surface 448 upon the gage-block is brought into contact with the contact-surface 458 of the contact-plate 450, which receives the impact thereof. Simultaneously the cam-surface of the plate 465, Figs. 128 and 129, is brought into contact with the pin 464, thus actuating the lever 463, the plate 460, and thereby the contact-plate 450, as hereinbefore described, against the action of the spring 455, (see Figs. 120 and 122,) the direction of movement of the plate being controlled by the oblique slots 451, it is withdrawn, as shown in Fig. 123, thus permitting the teeth of the gage-block and measuring-plate, respectively, to be gently brought into contact with each other, thereby avoiding wear and inaccuracy. Immediately following the action just described is that of the mechanism by which the clamping-block is attached to the slide 476. A slide 479, Figs. 164, 170, and 171, is arranged to move in vertical guides formed in standards 477, Figs. 126, 164, and 171, attached to the slide 476, which standards serve also as bearings for a rock-shaft 473, to which is rigidly attached an eccentric 478, Fig. 170, extending between the standards 477. A longitudinal recess is formed in the slide 479 for the reception of said eccentric, as clearly shown in Figs. 164 and 170, the eccentric being arranged to bear upon the upper and lower faces of said recess, so that the rotation of the eccentric serves to actuate the slide vertically. Upon the bottom of the slide, as shown at 480, Fig. 171, are formed teeth, which are adapted to engage with corresponding teeth upon the clamp-block 435. The teeth of the clamping-block are by preference one twenty-fourth of an inch apart, which corresponds to the length of the steps or teeth of the gage-block 437 and measuring-plate 327. Hence it follows that the teeth in the clamp-block 435 and slide 479 will always register with each other when the gage-block and measuring-plate are in contact, as shown in Fig. 164. A plate $491^0$, Fig. 169, is secured upon the front end of the slide 476 in position to be engaged by the plate 491, whereby the slide 476 may be returned to its normal position by the forward movement of the slide 485. Rigidly attached to the rear end of the rock-shaft 473 is an arm 472, Figs. 109 and 164, which is connected by means of a link 471 to the end of a two-part or yielding lever 469, loosely attached to a rock-shaft in a bracket which is rigidly secured to the frame-plate. Said lever is provided with a secondary part $469^0$, rigidly attached to the same rock-shaft as the part 469, and is provided with a pin 468, which engages with the peripheral groove upon the cam 467. The two parts of said lever are connected by means of a powerful spring 474, which normally holds the two in a fixed position with relation to each other, thus making the lever practically rigid, but capable of yielding to undue pressure. The rotation of the cam 467 serves to actuate the rock-shaft 473 and thus to clamp the slide 476 to the clamp-block 435 in whatever position the latter may chance to be when the gage-block and measuring-plate are in contact.

It should be borne in mind at this time that no description has been given of a means for unclamping the measuring-bar 307, which result is accomplished by the action of the rock-shaft 473 through a link 481, Fig. 109, connecting at one end with an arm upon said rock-shaft and at the other with an elbow-lever pivoted upon and forming a part of a rock-shaft 482, extending through the beam 151, the short arm of said lever being in engagement with the free end of the yoke 309. This end of the connecting-rod 481 is provided with a slot, as shown, in order that the latter part only of the movement of the rock-shaft 473 may be communicated to the rock-shaft 482. When the rock-shaft 473 is actuated to cause the clamping of the block 435 to the slide 476, as before described, the connecting-rod 481 is also moved simultaneously therewith; but in consequence of the lost motion resulting from the slot in the end of the rod 481 the movement imparted by the rock-shaft to the connecting-rod is not communicated to the rock-shaft 482 until the clamping action before referred to is nearly completed. This insures accurate measurement and prevents any displacement of the parts before the actual transfer of said measurement to the slide 476.

In order to complete the general description of the operation of the measuring devices, it is necessary to explain the manner in which the line-measuring bar and measuring-plate, respectively, are returned to their normal positions, after which we will proceed with the description of the means employed by us to transfer the measurement of the type to the combination-plates.

Attached to the slide 485, Figs. 126 and 127, is an extension-slide 492, arranged to slide in a suitable groove in the frame-plate, which slide is provided with a rack 493 upon one of its faces, as shown, adapted to engage with a small gear-wheel 499, mounted upon a vertical shaft 500. A secondary gear-wheel 501 upon the lower end of said shaft is in turn adjusted to engage with the teeth upon a rack-slide 502, (see, also, Figs. 121 and 228,) having a contact-lug 503. Upon releasing the measuring-bar 307 in the manner described the slide 485, and with it the rack 493, is given a rearward movement, thereby actuating the shaft 500, the gear-wheel 501, and in turn the slide 502, the contact-lug 503 upon which is thereby brought into contact with the adjustable screw 322 of the lug-block 321, Fig. 121, upon the measuring-bar 307, which imparts a return movement thereto. The right-hand end of the screw 322 in its movement engages the contact-lug 505 of the auxiliary measuring-bar 324, when both bars are caused to be moved together until the normal position is reached against the stop 506⁰.

A full description having been given of the measuring devices, we will now resume the description of the mechanisms to which the result of the type measurement is transferred. The rearward movement above referred to of the slide 485, Figs. 164, 169, and 171, causes the lug or plate 491 to engage with the clamp-block 435, which, as above stated, has been rigidly clamped to the slide 476. The slide 476 is thus by the backward movement of the slide 484 carried back until the block 435 is brought into contact with the stop 498, which is the normal position of the clamp-block 435. Upon reaching this position the lug upon the clamp-block is engaged by the detent 433, thus holding it against the action of the spring 443, Fig. 166, as stated. At this time the rock-shaft 473 is actuated, the slide 479 raised, as shown in Fig. 171, and the block 435 unclamped through the action of the cam 467. The slide 476 is then free to be returned to its normal position upon the forward movement of the slide 485. It will thus be seen that the distance which the slide 476 is moved away from its normal position is dependent upon the extent to which the gage-block is moved forward against the measuring-plate, and the extent to which the slide 476 is moved away from its normal position determines the extent to which the combination-plates are advanced from their respective normal positions to operative positions, as hereinafter set forth.

As previously stated, the combination forms are preferably placed upon a series of parallel plates 0506, Figs. 143, 166, 172, 173, 174, 228, and 229, arranged to slide loosely in horizontal grooves formed in the end pieces 355, Fig. 143, of a box or case 369. Cleats 518, attached to said plates, serve as intermediate supports to prevent said plates from yielding under the slight pressure applied thereto by the pin-blocks, as hereinafter specified. Each plate is independent of its fellow, and as each one represents a series of combinations adapted to space lines having a given number of words it is desirable as each word is set by the operator to cause a plate corresponding to the number of words set to be automatically raised to a given position in order that the spaces necessary to justify that number of words may be ejected in case the line is completed. To accomplish this result, we provide the following means for raising and lowering the box containing said plates: The box 369, which is open on the front and rear sides, as shown, is rigidly attached at the respective ends to vertical rack-bars 356 358, having ribs 357, Figs. 166 and 174, adapted to slide in corresponding grooves in the supporting-brackets 519 520. A shaft 359, mounted in suitable bearings in said brackets, is provided with pinions 360, adapted to engage said rack-bars. A ratchet-wheel 361⁰ is keyed to said shaft, having journaled upon the hub 361 thereof the hub 362 of a lever 363, Figs. 141, 142, and 143. A pawl 364 is pivotally attached to a lever-arm 363, which is connected by means of an adjustable link 365, Fig. 141, to one arm of a lever 366, pivoted upon a bearing attached to the bracket 519. A pin upon the opposite end of said lever is adapted to engage with a groove in the side of the cam 367, mounted upon the word-shaft 266, each revolution of which serves to actuate said levers, thereby rotating the ratchet-wheel 361⁰ one step. A retaining-pawl 368, actuated by means of a spring, as shown, serves to lock said ratchet-wheel during the backward movement of the pawl 364. Each step-by-step movement of the pawl 364, raises the racks 356 358 sufficiently to bring a new combination-plate into a registering position ready to be advanced by the action of the slide 476 hereinbefore described.

Connecting with the slide 476, (see Figs. 126, 164, 166, and 166ᴬ) by means of a suitable pin is a lever-arm, 535 which in turn is pivotally attached to one end of a rock-shaft 538, which extends through a bearing in the bracket 519 and has the opposite end supported by a bearing-stud projecting from the bracket 520, as shown in Figs. 126 and 143, said rock-shaft being beneath and in the rear of said box of combination-plates. An arc 535⁰, Fig. 126, is rigidly attached to the rock-shaft 538, and by means of set-screws, as shown in Fig. 166, an accurate adjustment of the lever 535 may be made with reference to the rock-shaft 538. Rigidly attached to said rock-shaft are arms 539, Figs. 143, 166, and 174, the upper ends of which are rounded and loosely inserted in bearings 527, formed in plungers 525, which are connected by means of a frame-plate 524, arranged to slide loosely in suitable guides between plates 521 and 522, Figs. 166 and 174. Each of said plates is provided at either end with a rearwardly-projecting lug having a recess or notch 517 therein, which is adapted to engage with a projection 528 upon the forwarding-plungers 525, Figs. 172 and 173.

When the words forming a line are set, a combination-plate corresponding to the number of words in that line is brought into alignment with the plungers 525. At the same time the remaining plates above and below are retained in position by means of retaining-bars 531, Fig. 173, which, entering the recesses 517, serve to guide the combination-plates accurately in their vertical movement, as well as to prevent any horizontal displacement thereof. The plungers being actuated by means of the movement of the slide 476, a certain combination is brought into an operative position with relation to certain parts to be actuated thereby, as hereinafter stated. During the period of rest which the slide 485 is caused to receive by reason of its peculiar connection with the cam 467 the combination-plate is also at rest in its forward position, and a sufficient time is thus provided for the actuation of the parts before referred to.

By the return of the slide 476 to its normal position, as above described, the plungers 525 are returned, and being in engagement with the hooks upon the lugs of the particular combination-plate forwarded thereby the latter is returned to its normal position. This having been done, it is necessary that the plate-box should also be returned ready to be again raised step by step, consequent upon the setting of the respective words of the next line. This action, which is necessarily rapid, as it is essential in order to avoid confusion that it should occur before the word-shaft is again rotated, is accomplished as follows: Attached to the top of the combination-plate box 369, Figs. 143 and 174, are cylinders 570, having openings 574 therein for the escape of air, the size of which openings is regulated by means of screws in the usual way. Pistons 573 are adjusted in said cylinders and are connected by means of rods 572 to a cross-beam 571, which is attached in turn to the supporting-brackets. Upon releasing the pawls 364 and 368, Fig. 141, the plate-box is permitted to fall; but all jar resulting therefrom is prevented by the air-cushion described. The release of the pawls is effected in the following manner: Loosely mounted upon the hub of the ratchet-wheel 361⁰ is a cam-plate 562, which is provided with projections 564 and 565, Fig. 142ᴬ, adapted at the proper time to engage with laterally-projecting pins, as shown in Fig. 142, upon the pawls 364 and 368. An arm 566 is also pivotally attached to said plate and provided with a spring 567 to exert a yielding pressure between said arm and plate. The plate 562 is pivotally attached at 563 to a connecting-bar 558, to which is in turn adjustably attached a rod 557, having a head 559. Said rod or pin is passed loosely through a yoke 0555 upon one arm of a lever 555, pivoted at 556 to the bracket 519. A spring 561 is interposed between the yoke 0555 and a shoulder 560. The opposite end of the lever 555 is connected by means of a pin, as indicated, with a groove in a cam 554, mounted upon the line-shaft 424. It will be observed that the lever 555 is adapted to actuate the bar 558 positively in one direction by contact with the head 559, thereby actuating the cam-plate 562, while, on the other hand, the lever 555 is free to be moved in an opposite direction against the action of the spring 561 without actuating the bar 558. At the proper time in the action of the machine the lever 555 is actuated by the cam 554, so as to move the bar 558 rearwardly. This serves to partially rotate the plate 562, and the projections 564 and 565 being brought into contact with the pins upon the pawls 364 and 368, respectively, the latter are released and held back by said projections, which permits the box of combination-plates to fall to its normal position. Immediately after causing the release of the pawls, as described, the lever 555 is, through the action of the cam 554, returned to its normal position, which action is permitted by the yielding of the spring 561 before the descent of the box of plates is completed; but the cam-plate 562 is prevented from returning with said lever by engagement with a stop 569, as shown in Fig. 142, against which the arm 566 is temporarily locked by the action of the spring 567, Fig. 142ᴬ. As the box of plates reaches its lowest position, a pin 575 upon the rack 358 is brought into engagement with the arm 566, thereby disengaging it from contact with the stop 569 and enabling the spring 561 to return the plate 562 to its normal position.

*The combination-plates and their relation to the space-ejecting mechanism.*—Having described the construction and operation of the type-measuring mechanism and the means employed by us for imparting said measurement to the combination-plates, we will now describe the combinations themselves as applied to said plates, including the relative dimensions or graduations existing between the measuring-plate and gage-block on the one hand and the combinations on the other, which we have seen fit to employ, but which were not fully explained in describing the principle of construction of said parts.

In order to illustrate the principle embodied in the combination forms as applied to the justification of type, we have provided tables, Figs. 230 and 233, which are intended to indicate the combinations of spaces adapted to justify lines of type of varying length. A unit of measure is first determined upon, which is by preference fixed at five one-thousandths of an inch, although this may be obviously departed from without varying the principle involved. In the tables referred to a limited number of combinations of spaces is represented, which combinations are adapted to justify lines of nine, ten, and four words, respectively, to a column width of three inches. It will be noticed that the measure of the lines increases from the top to the bottom by the fixed unit of measure—namely, five one-thousandths of an inch—and also that the individual spaces employed increases or decrease in size in the same ratio. In an accompanying diagram, Fig. 231, 1 2 3 4 5 6 7 8 9 represent the words of which a justified line is to be composed, which words aggregate in length two inches and seven hundred and forty one-thousandths of an inch. Referring to the table, Fig. 230, ninth division, we find that the combination necessary to justify this line to column measure consists of eight pieces, four of which measure thirty-five one-thousandths of an inch each and four of which measure thirty one-thousandths of an inch each. Upon inserting them, as indicated in the diagram view, Fig. 232, the line will be found to be fully justified, the aggregate measure of the spaces in the combination given being two hundred and sixty one-thousandths of an inch, and the variation between the spaces not exceeding five one-thousandths of an inch. A further example is given in the same figure of the spaces necessary to justify a line of ten words. It is manifest that two or more spaces may be used in one place between the words without departing from the principle involved. This is shown in the table, Fig. 233, and the accompanying diagram, Figs. 234 and 235.

We have ascertained by computation that when the system of graduation is employed which we have described, we can, with a series of about seventy-three combinations, justify to within five one-thousandths of an inch all lines of type having a given number of words such as may be contained within a column of average width, comprising, for example, fifteen words. These combinations we prefer to indicate by means of a series of projections 512, Fig. 172, formed upon the combination-plates 0506, also shown in Figs. 143, 166, and 173. Said plates are by preference about three inches wide and about fourteen inches long and are divided into longitudinal and transverse divisions, the former being one twenty-fourth of an inch in width, thus allowing seventy-three combinations to be formed in longitudinal rows upon each plate.

We have found in practice that eleven spaces of varying width or even a smaller number are all that are necessary when properly combined to justify a line of ordinary column measure, and hence we have preferably divided said plates transversely into sections or groups of eleven divisions each, said sections being divided by the divisions 510, Fig. 172. Each section is adapted to be brought into engagement with projecting pins upon one of a series of pin-blocks, which in turn control the action of space-selecting levers in the manner hereinafter stated.

As it is necessary to fill out short lines with "quads," which are set and justified in the same manner as regular type, it is not necessary in practice to provide combinations for a line of less than four words. Hence upon the first plate we show the groups of combinations adapted to determine the spaces for a line of that number of words, and as fifteen is the largest number of words that ever occurs in a line of the length suggested we have provided in the machine illustrated for that number only. Hence it follows that twelve plates are all that need be used, the first representing three groups of combinations and eleven blank sections, the second four groups and ten blank sections, and so on up to fourteen groups, which is the number found upon the twelfth plate, in which there are no blank sections. The only reason for having any blank sections is to enable the plates to be of uniform length. Only that portion of the four-word plate is shown in Fig. 172 upon which there are combinations; the remainder, being blank, is broken away.

The notches upon the measuring-plate 327, Fig. 122, are of a depth, measuring laterally, of five one-thousandths of an inch. The unit of measurement of the spaces and the angle of the taper of the measuring-plate are such that the length of the notches is, as stated, one twenty-fourth of an inch. By this device the measurement indicated by the measuring-plate is so multiplied that with each lateral movement of the measuring plate to the extent of said unit the combination-plate which conforms to the number of words set is advanced one twenty-fourth of an inch.

The measuring-plate 327, the gage-block 437, the clamp-block 435, and the mechanism for giving forward movement to the combination-plates are so adjusted with relation to each other that when the aggregate measure of the words of a line plus the allowance for the ordinary spaces is equal to the full standard measure, as desired, the forward movement of the gage-block will be arrested by the measuring-plate at such a point that the combination-plate in operative position will be forwarded until the tenth longitudinal division, Fig. 172, upon that plate will be placed in operative position. If then there are projections upon the plate within this tenth division, these projections will cause, through mechanism hereinafter described, of which the pin-blocks before referred to form a part, the setting of spaces into the line. A projection within the first transverse section counting from the right will cause the setting of a space before the last word of the line, or the first word counting from the right. A projection within the next transverse section will set a space before the next word, and so on. If the line is one of four words, the four-word plate represented in Fig. 172 will be forwarded and the three places between the words, and these only, will be provided with spaces, as only three transverse sections on the plate are provided with projections.

The eleven different sizes of spaces before referred to are held in eleven corresponding channels in the space-case and are preferably arranged in order acccording to their size, with the smallest in the right-hand channel and the largest in the left-hand channel. The connecting mechanism, hereinafter fully described, between the combination-plates and the space-channels is such that a projection upon the first or right-hand transverse division of any section will cause the setting of a space from the right-hand channel of the space-case or one measuring .020 of an inch. A projection on the next transverse division will set a space from the next channel measuring .025 of an inch, and so on to the left-hand transverse division, which sets a .070 space. It is obvious, therefore, that if upon the four-word plate illustrated in Fig. 172 a projection be placed within each of the three sections upon the tenth longitudinal division and fourth transverse division they will cause the setting in each of the three places between the words of a space from the fourth channel or one measuring .035 of an inch, which will justify the line to column measure. A line composed of a larger number of words would be provided with the right number of spaces by placing projections upon the corresponding number of transverse sections.

The foregoing explanation refers to lines the words of which, with the allowance for ordinary spaces, are of the standard column measure. If a line measures .005 of an inch less than the standard measure, the measuring-plate will allow the gage-block to move forward one step farther. The combination-plate will also be moved one step farther, and the next or the eleventh longitudinal division thereon will be placed into operative position. The line in question will obviously require spaces measuring in the aggregate .005 of an inch more than the one previously mentioned, and we therefore place upon the eleventh longitudinal division of the combination-plate projections which will cause these spaces to be inserted. We arrange the projections preferably the same as before, with the exception of one on the first section, counting from the right. This projection is placed on the fifth transverse division and will consequently cause the insertion of a space measuring .005 of an inch more, making the aggregate measure of the spaces right for the justification of the line. A line measuring .010 of an inch less than the standard measure will in a similar manner cause the twelfth longitudinal division to be placed in operative position and the projections upon this longitudinal division will cause the insertion into the line of spaces measuring, respectively, .040, .040, and .035 of an inch. The projections upon the thirteenth and each succeeding longitudinal division are arranged upon the same principle. In a similar manner the ninth, eighth, and each succeeding longitudinal division in the opposite direction are provided with projections which cause the justification of lines which, with the allowance for ordinary spaces, measure more than the standard width of the column. All the combinations upon the rear portion of the plate, Fig. 172, commencing with the thirty-fourth, provide for two spaces in the manner hereinbefore suggested. This is made necessary when the thickest space, measuring seventy one-thousandths of an inch, is insufficient to accomplish the desired result. Thus it will be seen that each successive combination represents spaces measuring in the aggregate five one-thousandths of an inch more than the preceding combination, so that as the measuring-slide is advanced that distance the transferred measurement indicates the exact combination necessary for proper justification. As hereinbefore stated, the tenth combination on each plate is made the starting point for the series upon that plate, and each combination below the tenth represents five one-thousandths of an inch less, and each combination above, five one-thousandths of an inch more than that which preceeds it. The seventy-third combination on each plate consequently represents spaces which in the aggregate measure three hundred and fifteen one-thousandths of an inch more than the spaces of the tenth, and the first combination represents spaces measuring in the aggregate forty-five one-thousandths of an inch less than that of the tenth combination. The aggregate difference, therefore, between the first and seventy-third combinations upon each of the twelve plates is three-hundred and sixty one-thousandths of an inch.

It is obvious that the number of plates may be varied to conform to the number of words required for different widths of columns. As has been suggested in connection with the description of the mechanism for raising the box of combination-plates, said box is raised one step for each word set as a result of the depression of the word-key. The parts are so adjusted that when four words of a line have been set and the word-key depressed the fourth time the four-word plate or the upper one of the series is elevated into position opposite the plungers 525, and consequently into position to be moved forward by the latter. A fifth depression of the word-key causes the five-word plate to be lifted into position, and so on until a sufficient number of words have been set to form a line, when the plate corresponding to the number of words set will have been brought into position opposite the plungers 525 and will upon the depression of the line-key be advanced a given distance in conformity to the measurement of that line.

When two or more longitudinal divisions upon a combination-plate, which are adjacent to each other in any vertical division, are to be covered by projections the latter are preferably formed upon or attached to the plate in one piece.

*The movable pin-blocks and their relation to the combination-plates and space-ejecting mechanism.*—Having described in full our improved means for measuring the type and the manner of transferring that measurement to combination forms representing the required spaces, we will now describe the intermediate mechanism by which the combinations are in turn indicated to mechanism for ejecting such spaces into the line of composition as are represented by said combinations. This result may be accomplished in various ways, as hereinafter stated, all of which embody a like principle; but in practice we prefer to employ a series of independent movable blocks, each provided with as many independent pins adapted to be set in an abnormal position by contact with the combination forms as there are spaces in the space-case. The manner of constructing and manipulating said pin-blocks, is as follows: The pin-blocks 333, Figs. 130, 131, 132, 173, 174, 187, 189, and 191, are preferably formed, substantially as shown, from blocks of steel cut away in the rear for the reception of a series of springs 336, which are adapted to engage with notches formed in a series of vertical pins 334, secured loosely in bores formed in projections at the top and bottom of said blocks. A banking 335 serves as a stop for said pins to limit their upward and downward movement. The pins conform in number to the number of spaces in the space-case, which is eleven, and they are adapted to be held in one or the other of two extreme positions, as indicated in Figs. 187 and 189, by the springs 336 until positively reversed in the manner hereinafter set forth. Said blocks are loosely mounted within an endless oval raceway 330, Figs. 130, 133, 173, 174, 179, and 181, having semicircular ends 329 and a vertically-movable portion 328 in the rear. Between the ends of said movable portion and the beginning of the curved ends, respectively, is a sufficient space 332 to receive a pin-block, while the length of the movable portion is sufficient to receive twenty of said blocks, as shown in Fig. 173. The main portion of said raceway is rigidly attached to the framework of the machine and is arranged to inclose said pin-blocks, as shown in Fig. 181, and serve as a guide therefor. The movable portion of said raceway, which contains the actuating mechanism for fowarding the pin-blocks, is extended vertically for that purpose and is made quadrangular in cross-section, as shown in Fig. 136. This portion is provided with ribs 331, which project into suitable recesses formed in the pin-blocks and serve as guides therefor. The manner in which the pin-blocks are supported both in the main and movable portion of the raceway is shown in Fig. 181. The raceway as a whole forms an endless guideway adapted to permit a continuous intermittent movement of the pin-blocks, which are positively actuated step by step thereon by a suitable forwarding mechanism adapted to be brought into contact with those blocks upon the movable portion of the raceway, the movement of which blocks is thereby communicated to the remainder of the series by contact one with another. The movable portion of the raceway is in front of and in operative proximity to the box of combination-plates, as clearly shown in Figs. 173, 166, and 174, and is so arranged that when a given plate is forwarded, as shown in Fig. 181, said plate passes beneath said pin-blocks, being supported upon a shelf 541, (shown in Fig. 174, and also indicated in Fig. 179,) upon which said plate loosely slides. At the proper time in the movement of the machine—that is to say, when said plate is thrust forward and at rest—the movable portion of said raceway is depressed, thus causing such of the pins as are in position to register with projections upon said combination-plates 0506 to be raised into an abnormal position and to thus remain until their projecting ends are brought into contact with the space-ejecting levers, as hereinafter explained. The vertical movement of the portion 328 of the raceway, which is loosely adjusted in vertical guides 544, Fig. 173, is accomplished through the agency of the line-shaft, as follows: Attached to the central frame portion 540, Figs. 179, 180, and 181, are rigid standards 548, in bearings in which is mounted a rock-shaft 547, which is provided with lever-arms 546, attached by means of links 545 to suitable lugs upon the movable portion 328 of the raceway, as shown in Figs. 182 and 183. A lever 549, rigidly attached to said rock-shaft 547, is connected by means of a link 550 to a lever 551, pivotally attached to a bracket 577. The opposite end of said lever is connected by means of a pin to a cam 553 upon the line-shaft 424, by the action of which the operation described is effected as a result of the depression of the line-key.

The pin-blocks are forwarded and locked while at rest by means of the joint action of a forwarding and locking plate, to the former of which is imparted a four-motion movement. Fitted loosely within the hollow casing of the movable portion 328 of the raceway, (see Figs. 134 to 140, inclusive, and Figs. 174, 176, 177, and 178,) so as to have a vertical movement only, is a locking-plate 346, having flanges 348, as shown in Fig. 136, which serve as guides for a forwarding-plate 344, loosely inclosed, so as to be reciprocated therein. Said plates are both parallel with and in close proximity to the pin-blocks 333 on the side of the latter, which is opposite the movable pins. Said locking-plate is provided with a series of lugs 347 upon the lower flange 348, and said forwarder-plate with a like series of lugs 345 upon its lower edge, the lugs in each series being placed at equal distances apart, (see Figs. 177 and 178,) so that each may be adapted to register in turn with horizontal and vertical grooves 337 and 338, respectively, formed in the pin-blocks 333. (More clearly shown in Figs. 131 and 132.) Parallel with the upper portion of the locking-plate 346 and arranged in suitable guides within the casing 328, as shown, is a third plate 352, which is provided with rearwardly-projecting pins 353, Figs 134 and 136, which engage with slots or grooves 347⁰, Figs. 134, 177, and 178, formed obliquely in the upper portion of the locking-plate.

Extending from the end of the forwarding-plate through the end of the casing is an arm 343, Figs. 134, 179, and 228, connected by means of a link 342 to a lever-arm 340, pivoted at 341 to a suitable bracket upon the framework. The opposite end of said lever is arranged to engage in the usual way with a groove in a cam 339 upon the word-shaft. A similar arm 351 upon the slide 352 is connected in like manner by means of a link 350 to a lever 349, similarly pivoted and having its opposite end connected in like manner with a second groove in said cam 339. Thus it will be seen that both the forwarding-plate 344 and the plate 352 are actuated by the rotation of the word-shaft. The movement of the plate 352 is sufficient to raise the locking-plate 346 and with it the forwarding-plate 344, so that the projections 347 on the locking-plate are caused to register, as shown in Fig. 135, with the horizontal grooves in the pin-blocks 333, and the projections 345 on the forwarding-plate are moved into engagement with the vertical slots 338. While the plates are held in the raised position described a forward movement is imparted to the forwarding-plate, which advances all the pin-blocks one step upon the raceway or a distance corresponding to the length horizontally of one of the pin-blocks. The forward movement having been completed, the forwarding-plate by the action of the lock-plate is caused to descend, and consequently the projecting lugs on the forwarding-plate are brought into line with the horizontal grooves 337 of the pin-blocks and the projecting lugs on the lock-plate into engagement with the lower portion of the vertical grooves 338, as shown in Fig. 138. The forwarding-plate is then returned to its normal position, which it is permitted to do by the passage of the lugs thereon through the horizontal grooves in the pin-blocks, while at the same time the pin-blocks are held in position by the engagement of the lugs on the lock-plate with the vertical grooves of the same.

As stated, the locking-plate receives only a vertical movement, while the forwarding-plate is caused to reciprocate back and forth therein, which imparts a four-motion movement to the lugs upon the latter and in turn advances the pin-blocks intermittently with each revolution of the word-shaft. A slight excess of movement in a rearward direction is preferably given to the forwarding-plate and then a forward movement into position to cause accurate registration between the lugs and the pin-block grooves.

Inasmuch as there is necessarily a slight lost motion in the movement of the pin-blocks upon the raceway we have caused the first of the series of lugs 347 to be beveled, as shown in Fig. 135, in order to cause the proper registration of each block as it enters upon the movable portion of the raceway. The advantage of this device is that a positive movement is imparted to the forwarding-plate to advance the blocks, while, on the other hand, they are by means of the lock-plate positively and securely locked in position when at rest and while being depressed into contact with the combination-plates, as stated. The pins in the respective pin-blocks after having been set and having been utilized to control the action of the selecting-levers, as hereinafter stated, are returned to their normal positions by being brought into contact with a cam-surface 330⁰, Fig. 178ᴬ, upon the upper surface of the raceway, so that as said blocks are again brought upon the movable portion of the raceway said pins are in position to be again set by depressing the blocks against said combination forms, as stated.

As suggested heretofore in a general way, the combination forms upon the combination-plates and the pin-blocks bear a fixed relation to each other. Each transverse section hereinbefore described in the combination-plates is adapted to conform in position and measurement to one of the series of pin-blocks when locked upon the raceway. The eleven transverse divisions upon each section of the plate conform to the pins in the blocks, while each plate is of such a length that the part for combinations occupies a space in front of the pin-block raceway equal to the longitudinal space occupied by fourteen pin-blocks, as shown in Fig. 173, this number corresponding, as stated, to the number of spaces used in lines of fifteen words, which is the largest number provided for in the series, although it is obvious that the number might be increased. On the plate containing combinations for lines of four words the space opposite the first three pin-blocks only, measuring from the right of the plate, is employed, inasmuch as this number corresponds to the number of spaces used in lines of four words. On the five-word plate the space opposite the first four pin-blocks is used, and so on to the fifteen-word plate upon which the entire space used for combinations—namely, that opposite fourteen pin-blocks—is used.

From the foregoing descriptions it will be understood that any one of the longitudinal divisions, Fig. 172, of any combination-plate may be moved into position under the row of pins in the pin-blocks, which are in the movable portion of the raceway, Fig. 173, and that any portion or all of the pins in the fourteen blocks over the plate may be set when the movable portion is depressed by means of corresponding projections upon such longitudinal division of the combination-plates. For the purposes of justification, however, it is found necessary in most instances to place but one projection in each transverse section on one longitudinal division, consequently setting but one pin in each block. In some instances, however, two and even three projections are placed in each section, this being done for the purpose of obtaining the necessary wide spacing for lines of few words, it being understood that each pin bears such a relation to the space-case and selecting levers as to represent a space of a given width.

A projection upon any portion of the first transverse division of any section upon a combination-plate—as, for example, 509, Fig. 172—will when the combination-plate is advanced to the proper position beneath the pin-blocks cause the setting of the first pin in the corresponding pin-block when the latter is depressed, and a projection upon any portion of any second transverse division—as, for example, that at 512—will when the plate is moved to the proper position cause the setting of the second pin in the corresponding pin-block, and so on throughout the series.

As above stated, the combination-plates are raised step by step with the setting of each word. A line having been formed, the plate conforming to the number of words in it will be advanced upon the depression of the line-key. In the meantime the pin-blocks also are forwarded one by one with each depression of the word-key as follows: When the first word of the line is set and the word-key is depressed, one new block is advanced into position before the box of combination-plates. With the setting of the second word and consequent depression of the word-key a second pin-block is advanced into position, and so on until a sufficient number of words shall have been set to form a line, when a number of pin-blocks, corresponding to the number of words in the line, will have been advanced into position before the box of combination-plates ready to be acted upon by said combination forms.

*The space-selecting levers and space-ejecting mechanism.*—By means of the pin-block-forwarding mechanism last described the pin-blocks 333 are moved in successive order in conformity to that by which the words are moved upon the setting-raceway by the word-comb from the position in the raceway in front of the box of combination-plates to a position in front of and in operative proximity to the space-selecting levers 588 behind the space-case, as shown in Figs. 38, 173, and 185. When a pin-block is thus brought into position before the space-selecting mechanism, each one of its eleven movable pins is adapted, when properly set, to select, by means of the space-selecting mechanism, the corresponding space from the space-case 107, Figs. 226 and 229, as hereinafter specified. Supported between the uprights 576 and 577, Figs. 38, 175, 184, 185, and 186, are pivot-studs 0578, upon which is pivotally mounted a frame 578, having cross-beams 582 583 in rear and front respectively, each of which is provided with a series of separating-pins, as shown, for the purpose hereinafter set forth. The frame is united at the top by a cross-beam 584. A lever-arm 579 is attached to one of the pivot-studs 0578 and extended rearwardly into proximity to a cam mounted upon the word-shaft into a groove 580, of which a pin is caused to project from said lever. Said lever-arm is connected with the upper portion of the frame by means of an adjustable link 585, by which rigidity is imparted to the frame and accurate adjustment provided for. A counterbalance-spring 586 is attached to the upright 576 and arranged to bear against said lever-arm, as shown in Fig. 185. Loosely mounted upon a pivot-bar 587, at or near the middle of said frame, are a series of selecting-levers 588. Said levers are separated and properly guided by means of the separating-pins referred to in the cross-bars 582 583, which engage with front and rear projections upon said levers. Pins also extending through the cross-bar 584 serve to separate and guide said levers at the top, while they are likewise separated and guided at the bottom by similar means. (Not shown.) The lower ends of the levers are normally held against the cross-beam 581 of the pivoted frame at the bottom by means of a series of independent springs 0589, while the upper ends thereof are at each return movement of the pivoted frame banked against the stationary cross-bar 589. Said levers are bent and the upper ends so assembled as to register, respectively, with the pins 334 of the pin-blocks 333, as shown in Figs. 173, 175, and 186, when any one of the latter is brought into proper position before them, and each one is provided with a forwardly-projecting part 590, having a bearing-face 591, as shown in Fig. 175 and in enlarged views in Figs. 187, 189, and 191. The lower ends of said levers 588 are held against the cross-beam 581 of the frame by the springs 0589, and hence, under normal conditions, when the frame is oscillated upon the pivot-studs 0578 the levers move with the frame and their upper ends are caused to vibrate back and forth with each movement of said frame, and in case a pin-block 333 is in position before them, as shown in Fig. 185, and any one of the pins therein is set, the corresponding selecting-lever is adapted to be brought into engagement therewith, as shown in Fig. 191, when the frame is forwarded. The lower ends of said levers are in alignment and adapted to register with ejecting-plungers 604, Figs. 175, 185, 186, 188, and 190, but as these ends are located at or near the center of movement of the oscillating frame and are held normally by the springs 0589 the plungers are not actuated thereby. When, however, the projection 590 is brought into contact with a pin-block pin, the upper end of the lever is prevented from moving forward to its full limit, and as the movement of the frame 578 is positive the lever necessarily turns in the frame on its central pivot 587, the lower end is thrust forward against the action of the spring 0589, and an initial movement is imparted to the plunger 604, with which it is caused to engage. The relative position of the lower end of said levers under the different conditions described is shown, respectively, in Figs. 188 and 190. The forward ends of the plungers 604 are in alignment, respectively, with the channels of the space-case 107. Said plungers are normally at rest in the position indicated in Figs. 185 and 188, but when a forward movement of any one or more of them is initiated by the engagement of a lever or levers 588 with a pin-block pin 334 the complete forwarding and return thereof for the ejection of a space or spaces, is accomplished by the following instrumentalities: Mounted in suitable bearings in the uprights mentioned is a rock-shaft 596, having a rigid arm 598 formed thereon, to which is attached blades 599 600, adapted to engage with projections 605 upon the plungers when the forward movement of the latter is initiated, as specified. An arm 597 upon said rock-shaft is connected by means of a link 595 to one arm of a lever 593, pivoted at 594 to the upright 577, the other end of which lever is in operative connection with a groove formed in a cam 592 upon the galley cam-shaft 013. The oscillation of said rock-shaft serves to forward and return the plungers selected and to eject from the space-case 107 onto the raceway 137, Figs. 38 and 54, such spaces as may have been represented by the particular combinations presented to the pin-blocks.

The manner in which the respective parts co-operate to cause the insertion of the spaces in their proper positions, respectively, in the line of composition is substantially as follows: As the setting of the first word of the line is completed, a depression of the word-key causes the word-shaft to make one rotation. As a result, the word is advanced by the word-comb one step on the type-setter raceway 137, and a pin-block also is advanced one step by the pin-block-forwarding mechanism into position before the box of combination-plates. When the setting of the next word is finished, and so on in successive order, the same operation is repeated until a sufficient number of words have been set to form a line. This having been accomplished, the words of which the line is to be composed will be in position upon the raceway, separated one from the other as they have been forwarded by the word-comb, and a corresponding number of pin-blocks will have been forwarded into position before the box of combination-plates. The measurement of the line having been taken, as described, the depression of the line-key will cause the result to be transferred to the combination-plates and also cause one or more pins, through the action of the combination forms, to be set in each one of the pin-blocks except the first. As no space is required before the first word, no combination projection is provided, and hence no pin is caused to be set. As the words of which the next line is to be composed are advanced by the word-comb, those of the first line, also, are forwarded step by step toward the space-case, while at the same time the corresponding pin-blocks are also advanced toward an operative position before the selecting-levers. The parts are so timed that when the first word of the line reaches the position next to the space-case on the right the first pin-block of the set will have reached the position in front of the selecting-levers 588. No pin having been set in the first pin-block, for the reason stated, no space will be ejected from the space-case in front of the first word when the proper movement is imparted to the selecting-levers. With the next revolution of the word-shaft the first word of the line will have been swept past the space-case by means of the extended-movement mechanism of the word-comb in order that the space may be inserted thereafter and the second word will have been brought into position at the right of the space-case. The second pin-block will, also, at the same time have been moved into position in front of the selecting-levers, and as the proper pin in this block will have been set by means of the selected combination the proper space will be caused to be ejected from the space-case in front of the word or between said first and second words. This operation will be repeated until the last word of the line and the last of the selected pin-blocks are brought into their respective positions, at which time the last space provided for in the combination will have been placed in position before the last word. The next revolution of the word-shaft will cause these to be moved forward to make way for the first word and the first pin-block of the next line. After the spaces are thus inserted in the line, the words, with the spaces, are moved forward with each revolution of the word-shaft by the extended portion of the word-comb toward the galley. Before explaining the means for operating said auxiliary and extended portions, respectively, of the word-comb we will describe the manner in which the measuring-slide is caused to omit the measurement of a space at the beginning of each line, so as to conform to the arrangement of the combination-plates, which provide for no space at the beginning of a line. This feature has before been referred to, but a full explanation has been deferred until now in order to avoid confusion, it being thought that it would be more opportune and that a better understanding would be had after a full description of the function and operation of the combination-plates and pin-blocks.

As before set forth, the measuring-slide is caused to move back against a banking or stop 282, Fig. 110, which is placed thirty-five thousandths of an inch back of the forward position of the auxiliary driver, which would, if not otherwise prevented, cause said slide to move thirty-five thousandths of an inch, or the width of an ordinary space, in addition to the distance represented by the actual measurement of each word. This is manifestly unnecessary for accurate justification, but is requisite in order to secure approximately uniform and artistic spacing; but as no space is required at the beginning of a line it is obvious that the space measurement corresponding thereto should be omitted. We avoid such additional measurement at the proper time by temporarily interposing a supplemental or special stop 015, Figs. 164ᴬ and 164ᴮ, as follows: The stop 015 is arranged to slide in suitable bearings and adapted to move upwardly into position in front of the bearing-face of the head portion 284 of the word-measuring slide. Said stop-slide 015 is connected by means of a rod 014 to an elbow-lever 012, pivoted at 013 to the frame of the keyboard. The lever 012 is connected, as shown, to a secondary lever 010, pivoted at the point 011. The opposite end of the lever 010 is connected to a slide 0238, which is in turn loosely connected to the end of an arm 378, also shown in Fig. 213, which is rigidly attached to a rock-shaft 379, adapted to be actuated by means of a spring 409, Fig. 159, connected by means of intermediate mechanism having a further purpose and which need not now be explained. When the line-key 370 (see Figs. 144 and 213) is actuated, the rod 235 is thereby drawn toward the front, which rod being in operative connection with an arm 376 upon a rock-shaft 380 serves to release a catch upon a secondary arm 377 from engagement with a projection upon the arm 378, in which engagement it is normally held by means of a spring, as shown. The upward movement of the stop 015 is caused by actuating the line-key, which movement takes place after the last word of the line has been set and measured and before the measuring-slide has been returned to its normal position against the banking 282, Fig. 110. Thus it will be observed that with each depression of the line-key the measuring-slide is caused to be arrested a distance corresponding to the measurement of an ordinary space short of its full normal movement, and hence the actual measurement of the first word of each line only is taken, while to that of the remaining words of the line is added the thickness of an ordinary space.

The extended movement referred to of the auxiliary portion of the word-comb may be described as follows: Said extended movement portion 0148, which is provided with teeth 181, Fig. 67, corresponding to those of the main portion, is rigidly attached to a slide 180, an end view of which is shown in Fig. 74, and a front view indicated in dotted lines in Fig. 67, which slide is held by the guide-bar 0151, hereinbefore described, and the outer portion 0181, Fig. 74, of the beam 629, in such a manner as to slide freely in a horizontal direction. Said slide 180 is connected by means of a bar 179, Figs. 64, 67, 72, 73, and 74, to a similar slide 177, which is loosely mounted upon a guide-bar 178, the ends of which are rigidly attached to the main portion of the word-comb 146. Said last-named slide is thus free to move horizontally upon said word-comb. A link 174, Fig. 67, is loosely attached to said slide 177 by means of a pin 176, which link is in turn attached in a similar way to the free end of a lever 173, the other end of which lever is pivoted at a stationary point 173⁰ upon a bracket attached to the framework, likewise shown in Fig. 69. A link 172, attached to the lever 173 near its pivotal point, serves to connect said lever, as shown in Figs. 65, 66, and 69, with the main lever 157, which actuates the word-comb. Thus it will be seen that the main and auxiliary portions of said word-comb are actuated in harmony by the same prime mover, the auxiliary portion being given by means of the multiplying-lever 173 a longer throw than the other, but synchronously therewith, whereby the word moved by said auxiliary portion is swept by a single movement entirely across that portion of the raceway which is in front of the space-case and is brought within the range of action of the extended portion 0149 of the word-comb. This device enables a space from any one of the channels of the space-case to be inserted between the separated words, as described, when, by means of said extended portion 0149 of the main comb, which is connected and caused to move with the main word-comb by the bar 0179, as shown in Figs. 67 and 193, the words, with the proper spaces between them, are advanced upon the raceway 137 toward the rule or gate, as hereinafter described, and upon said gate over the galley.

*The galley mechanism.*—The construction and operation of the galley mechanism for inserting the justified line into the galley is as follows: In order to accomplish the desired result in the most satisfactory manner, it is important to provide at the upper end of the setting-galley a movable gate, which may serve temporarily as a continuation of the raceway, so that the type may without obstruction be advanced thereon and supported thereby above and in registration with the column. This horizontal gate or movable way should be withdrawn at the proper time, in order to permit the depression of the line, and suitable means should be provided for holding the line when advanced upon the gate in registry with the galley, so that the end type may not be moved from any cause in such a way as to obstruct the movement by which it is accurately inserted into the galley. Moreover, it is our desire to provide suitable automatic means whereby, if the line should chance from any cause to be too long to enter the column, the action of the line-depressing mechanism will be withheld and the line pushed out without being depressed into the galley at all, suitable devices being provided in the meantime for indicating this special action of the machine by means of any approved indicator mechanism or by sounding an alarm.

The setter-galley 608, Figs. 192, 193, and 201, which is provided with suitable side walls 610 611, is attached to a plate 606, which is in turn secured to a bracket 607, arranged to support the galley mechanisms, said bracket being mounted upon the beam 605, which is secured to the justifying-uprights 576 and 577. The upper end of the side wall 611 of the galley is united to the extreme left end of the type-setter raceway by means of tongues and grooves, as shown in Figs. 193, 198, and 202, so as to be flush with the top of said raceway. Loosely mounted in the horizontal portion of the bracket 607 is a slide 635, Figs. 194 and 212, which is adapted to be moved horizontally in the manner hereinafter set forth, and to the front end of which is rigidly attached a thin plate or gate 617, (shown also in Figs. 195, 197, and 200,) the width of which is preferably greater than that of the interior of the galley, as shown in Fig. 193, in order that galleys of different widths may be employed, if desired, and the upper face of which is flush with the top of the raceway 137. Said slide is caused to rest normally in a forward position, as shown in Figs. 197 and 212, so that the words of the line with the inserted spaces may be gathered together and advanced thereon by the movement of the extended portion 0149 of the word-comb. A horizontal slide 612, Figs. 195, 196, and 197, is provided with a rib adapted to slide in a corresponding groove 0609 in the galley-bracket, said slide being held loosely in position by means of a cap-plate 0613 upon the plate 609. The slide 612 has an extended portion 0612, which projects forward over the gate 617, and is depressed so as to be in the line of movement of the type when projected upon the gate. Said extended portion is grooved upon its under side for the reception of a dovetailed slide 614 therein, which slide is provided with a head portion 615, Figs. 197 and 199, adapted to serve as an abutment for the end type of the line. The slide 614, which is intended to move independently of the slide 612, is extended to the left, as shown in Fig. 197, and is provided with a bearing-face 616, which rests normally against the end of a lever 618, pivoted to a rigid support at 619, and connected by means of a link 621 to one arm of an elbow-lever 622, Fig. 211, pivoted at 623 to the bracket 607. A spring 0618 tends, in conjunction with other parts, as hereinafter specified, to retain the lever in a normal position. The free end of the lever 622 is adjacent to and extended slightly over the edge of the slide 635, and substantially at right angles thereto. Pivotally mounted in the slide 635 is a gravity-latch 636, to which is attached a cross-bar 638, the ends of which project, as shown, over the edges of said latch, the right-hand end $638^0$ being extended upwardly and laterally, as shown in Fig. 208. The lever 622 is adapted to be held in a normal or abnormal position by means of a hook-catch 625, Figs. 201 and 209, adapted to engage with notches 624 in the top of said lever, in which position it is normally held by means of a spring 626. A rod 627, Figs. 201 and 209, extended loosely through the bracket-plate 607, is arranged to engage the hook-catch 625, as shown. The lower end of said rod is connected with a lever-arm 643, mounted upon a rock-shaft 640. A pin projecting from another arm 641 on the opposite end of said rock-shaft is adapted to engage with a groove 642 in a cam mounted upon the galley cam-shaft 023. The continuous revolution of said latter shaft causes the lever to be oscillated and the hook-catch 625 to be lifted with each impulse of the machine. A third arm 644, mounted upon the rock-shaft 640, has connected therewith a rod 645, Figs. 194, 201, and 208, the upper end of which is bent at right angles, as shown in the last-named figure, so as to engage with the projection $638^0$ upon the cross-bar 638. The free end of the lever 622 is provided with a recess $624^0$, Figs. 204, 205, and 206, of a width sufficient to permit the projection 0638 to fall therein when the tooth of the hook-catch 625 is in the middle one of the notches 624, at which time the projection is intended to register with the recess. It should be understood that when this action occurs the slide 635, having the latch 636 with the projection, is at rest in its normal forward position. (Shown in Figs. 211 and 212.) When the projection 0638 fails to register with the recess $624^0$, as shown in Figs. 204 and 205, or when the projection $638^0$ rests upon the end of the rod 645 in its raised position, as shown in Fig. 208, the latch 636 is prevented from falling; but when neither of said projections is engaged in the manner stated said latch is free to fall. A dovetailed projection 637 is formed upon the lower side of the latch 636, which is adapted to engage, when said latch is lowered, with a corresponding recess in a slide 646, as shown in Figs. 210 and 212. The slide 646 is connected, by means of a link 647, Figs. 192, 194, and 226, to one arm of an elbow-lever 648, which lever is pivoted to a stud 649 upon the upright 576. The other arm 651 of said lever is provided with a pin, which is adapted to engage with a groove upon a cam 652, mounted upon the word-shaft. Thus it will be seen that the slide 646 is adapted to be reciprocated with each revolution of the word-shaft, while the latch 636, normally out of engagement therewith, is permitted to fall by virtue of its own gravity with each impulse of the machine, provided the lever 622 is in proper position to permit such action, into the engaging position described, thus locking together the slides 646 and 635. Formed upon the front end of the slide 635 is a hook 639, having a rounded recess therein, as shown in Fig. 212, adapted to engage with the rounded end of a lever-arm 657, which is rigidly attached to a rock-shaft 655. Rigidly attached to the outer ends of said rock-shaft are forwardly-projecting arms 656, Figs. 194 and 201. The ends of said arms are provided with square recesses, which are loosely connected with bearing-blocks, as shown, attached to a cross-bar 658, provided with a vertical guide-rod 659, Fig. 212, arranged to project loosely through a bore 654 in a rigid plate 653. Attached to the front and back of the cross-bar 658 are parallel depression-plates 660, Figs. 193 and 201, which are intended to depress the line of type in the galley, as hereinafter stated. Between said plates and extending longitudinally through the part 0612 of the slide 612 is a flat bar 628, Figs. 195, 196, 197, 200, and 203, which forms a continuation of the spring-post raceway 0147, as shown in Figs. 197 and 200, and is intended to prevent a displacement of the type upon the gate 617.

The part 615 upon the slide 614 is intended to serve as an abutment for the foremost type, being capable of moving so as to cause a proper registration of that end of the line with the galley, while at the same time, through the mechanism described, it initiates the movement of the line-depressing mechanism. The other or right-hand end of the line is supported in position by means of a vertically-movable automatic gate during the time that it is being depressed, which gate is actuated in harmony with and by a portion of the mechanism which actuates the word-comb.

Adjusted in suitable guides upon the end of the beam 629, Figs. 200 and 203, which is rigidly attached to the justifying-uprights, is a vertical slide 632, the upper end of which is connected by means of a link 631 to one arm of an elbow-lever 630, pivotally mounted upon said beam. The other arm of said lever is attached to the bar 168, Figs. 200 and 229, by which vertical movement is imparted to the word-comb. Formed upon the lower end of the slide 632 are teeth 633, which are adjusted to pass between the spaces of the word-comb, as clearly shown in Fig. 203. The face of said teeth is intended to be flush with that of the end teeth 634 of the extended portion of the word-comb when the latter is in its extreme forward position, and said teeth are likewise arranged to straddle the bar 628 and thus descending to the gate 617 to form an abutment to prevent the backward movement of the type from the gate upon the raceway.

The operation of said galley mechanism is as follows: Assuming the gate 617 to be in its normal position, as shown in Fig. 197, the type with the respective spaces forming the line are advanced step by step by the extended portion 0149 of the word-comb until the full line is upon the gate, at which time the foremost type of the line will have been brought into contact with the movable abutment 615, the normal position of which is slightly to the right of the point of registration with the left-hand side of the galley. The full forward movement of the tooth 634 of the word-comb advances the line so as to slightly move the abutment 615 forward and thus permit the last type of the line to be in exact registration with the right-hand side of the galley. The word-comb is then lifted, while the gate 632 is lowered, so that the teeth 633 rest against and serve as a support for the right-hand end of the line, as shown in Fig. 200. The type are thus held between the two abutments and beneath the bar 628, as shown, being slightly compressed by the action of the spring 0618 acting upon the lever 618, Fig. 211. Assuming the line to be properly justified, the foremost type causes a slight advance of the abutment 615 of, say, one one-hundredth of an inch, thereby actuating the slide 614, the bearing-face 616 of which rests against the arm 620, thus moving the lever 618 against the action of the spring 0618 until, through the action of the intervening parts, as shown in Fig. 211, the lever-arm 622 is in position to cause the tooth of the hook-catch 625 to enter the middle one of the notches 624, in which place said lever is temporarily held by said hook-catch. The projection 0638, Fig. 205, is thereby brought into registration with the recess 624⁰, as shown in Fig. 206. The latch 636, which previous to this time has been held in its upper position by the rod 645, is now allowed to descend, being permitted to do so by the downward movement at this time of the rod, which is actuated by the cam upon the shaft 023 in harmony with the movement of the slide 646. The latch is thus permitted to drop into engagement with the slide just before the latter is moved back through the revolution of the word-shaft. The backward movement of the slide 646 causes the slide 635, the latch of which is in engagement therewith, to be likewise drawn back, thus withdrawing the gate 617, immediately after which the hook 639, Fig. 212, is caused to engage the arm 657, thereby depressing the arms 656, and with them the line-depressing plates 660, which depresses the justified line into the galley. When the slide 635 is in its normal position, the end of the arm 657 rests, as shown in Fig. 212, upon a raised portion of said slide, which serves to raise and hold the line-depresser warned of the time when the indicator is about to approach the first mark 0, we have provided a bell 48⁰, the hammer of which is pivoted in the usual way and actuated by means of a spring, as shown. A pin 048⁰, Fig. 121ᶜ, projecting from the pinion 048, is adapted to engage with a trigger arranged in its path of movement and forming an extension of the bell-hammer arm, and thus cause the sounding of said bell at the proper time.

The aim of the operator in setting type should be to bring the pointer as near to the normal index-line as possible; but should it rest anywhere between the points 0 and 00 it indicates that the line which has been set will be properly spaced by the justifying mechanism, and inasmuch as the distance between said last-named points is sufficient to provide for the longest word of one syllable likely to occur in the language—such, for example, as the word "through"—the operator may know when he sees the position of the indicator whether there is room for the insertion of another syllable in the line or not. This arrangement avoids the necessity for dividing a word of one syllable or any syllable of any word at the end of a line. When, therefore, the operator is warned, as stated, by the indicator, he sets another syllable or word, or not, according as the space permits, depresses the line-key to cause the proper justification of the line, and then proceeds in the same manner to set another line.

*Special mechanism for normally locking the gage-block.*—As it would cause confusion and prevent justification should the line-key be depressed otherwise than at the end of the line, unless special provision be made therefor, we have devised means for locking the gage-block and consequently preventing the forwarding of a combination-plate in case said line-key, by accident or otherwise, should be depressed at the wrong time. This device, which possesses other advantageous features hereinafter mentioned, is described as follows: Pivotally mounted in a bearing in the beam 151, Figs. 219 to 221, inclusive, is a rock-shaft 677, having rigid arms 678 and 679, respectively, projecting in opposite directions therefrom upon opposite sides of said beam. The arm 679 is adapted to rest against the lower face of the bar 436, upon which is formed a projection adapted to engage therewith. A spring 680 serves normally to hold said arm in contact with said bar. The arm 678 is provided with an inclined surface upon its lower side adapted to be engaged by the pin 033, projecting laterally from the measuring-bar 307, which, as stated, is normally in an extreme right-hand position, at which time the arm 679 is in its normal position against the bar 436. If at this time the line-key should be depressed, the bar 436 will remain locked by the arm 679, and hence the clamping-block 435 upon the other end thereof, Fig. 171, will not receive the movement necessary to cause the forwarding of a combination-plate and the consequent setting of spaces. When, however, such an amount of type has been set as can be properly spaced to form a line, the movement of the line-measuring bar 307 resulting therefrom causes the pin 033 thereon to engage with the cam-surface on the arm 678, as shown in Fig. 220, thus giving to the latter an upward movement, which depresses the arm 679 and withdraws it from its engaging position. If at this time the line-key is depressed and the detent 433 released, the measuring-block 437 will be free to move, and as a result the line will be properly spaced, as described. Another important object is accomplished by means of said locking mechanism. When the type composing an entire article has been set, it is obvious that a certain number of words would remain upon the setting-raceway ready to be advanced toward the galley, and hence it is necessary to continue the operation of the justifying mechanism, or a portion thereof, until all such words are advanced and depressed in the galley. This may be accomplished by successively depressing the word-key, by which the words are advanced along the raceway, the spaces previously provided for introduced into the line of composition, and the line or lines depressed into the galley. Inasmuch as the measuring-bar, the box of combination-plates, and other mechanisms are likewise actuated as a result of the depression of the word-key, and inasmuch as all of the selecting-keys are caused to be locked, as hereinafter stated, upon depressing the word-key fifteen times, or such number of times as corresponds to the maximum number of words in a line, it is necessary at or previous to that time to depress the line-key or the special line-key hereinafter described, in order that the parts so actuated may be returned to their respective normal positions. When this is done, the word-key may be again successively actuated until the words have all been advanced to and depressed into the galley, when the parts abnormally moved thereby may be again returned to normal positions, respectively, by depressing the line-key. In case the word-key be thus successively actuated without the setting of type it is obvious that the line-measuring bar 307, not having any type to measure, would not be advanced into position to actuate the lever-arms 678 and 679 and unlock the gage-block 437, and that consequently the depression of the line-key at such time would not cause the forwarding of a combination-plate, and no pins would be set in the pin-blocks and no spaces set out from the space-case. It will therefore be understood that the special mechanism for locking the gage-block not only prevents ill results, which might occur from a depression of the line-key at the wrong time, but enables both the word and line keys to be actuated successively an indefinite number of times for any desired purpose without causing the setting of spaces.

plates 660 above the upper face of the type, as shown in said last-named figure. The slide 646 is returned by the action of the word-shaft, moving with it the slide 635 to its normal position, at which time the part 637 is by reason of its dovetail form in engagement with the counterpart in said slide in such a manner, as shown in Fig. 210, as to prevent the latch 636 from being lifted. The slide 636 is therefore slightly drawn back to the position shown in Fig. 212, when upon the upward movement of the rod 645 the latch 636 is raised to its normal position, as shown in Figs. 208 and 212. Simultaneously with this movement the hook-catch 625 is lifted by the rod 627, whereupon the spring 0618 causes the lever 622 to be returned to its normal position, as shown in Figs. 205 and 211, in which position it prevents the descent of the projection 0638, and thereby prevents the latch 636 from again engaging the slide 646 until the abutment 615 is again moved by the pressure of the next succeeding line. The latch 636 is raised and permitted to descend with each revolution of the cam on the continuously-revolving shaft 023, but is prevented by the lever 622 from descending to its engaging position until the last word of the properly justified line is advanced onto the gate 617. As the word-comb is moved back for the purpose of forwarding new type upon the gate 617, the gate or slide 632 is lifted, so as to permit the advancing type to pass beneath the abutment-teeth 633.

The foregoing completes the description of the normal operation of the galley mechanism, or that action which takes place when the line is of the proper length to enter the galley; but in case it should chance to be longer than the width of the column it is manifest that it could not be inserted therein without obstruction and consequent injury. Hence we have provided means for preventing the action of the line-depressing mechanism at such time. When the type are advanced upon the gate until the line obtains an abnormal length, the foremost type is caused to press against the abutment 615, and to impart thereto an excessive movement, which may be continued to any extent, being permitted by the resulting movement of the slide 612, inasmuch as the latter is held in position by moderate friction only. As the movement of the slide 612 is continued, the bearing-face 616 of the slide 614 is caused to pass the end of the arm 620, as shown in Fig. 195, after which it may be moved indefinitely without causing any damage to the connecting parts. Any excessive movement, however, beyond the normal of the slide 614 likewise imparts an excessive movement to the arm 618 and its connecting parts, so that the lever-arm 622 is moved into the position shown in Fig. 204 with relation to the projection 0,638, which prevents the latch 636 from falling into engagement with the slide 646, and hence the line-depressing mechanism remains unmoved. The line may by means of this provision be advanced until the type fall off from the end of the gate; but it is obvious that any simple alarm mechanism may be actuated by the excessive movement of the slide 614 to warn the operator, by whom the imperfect line may be removed and the slide 614 returned to its normal position. It will therefore be seen that all lines of proper length will be automatically depressed into the galley, while lines which are either too short or too long to move the abutment 615 the proper distance will not be depressed.

*The line-indicator mechanism.*—In operating the machine it is essential that the operator should have some means for determining when a sufficient number of type have been set to form a properly-justified line, in order that he may depress the line-key at the proper interval. This is accomplished automatically by means of an indicator, preferably arranged upon the keyboard, by which the operator is enabled to judge when a line is nearly completed. To accomplish this we provide the following mechanism: Upon the keyboard in front of the operator is arranged an index-plate 051, Figs. 121$^C$ and 121$^D$, provided with a suitable scale, in front of which is a pointer 050, attached to a slide 049, adapted to move horizontally in suitable bearings. Upon the extended portion of said slide is formed a toothed rack, as shown, which is adapted to engage with the teeth of a pinion 048, mounted upon a shaft 047, which is sustained in bearings in brackets attached to said keyboard. A secondary pinion 046 is mounted upon said shaft, which is in engagement with a segmental gear 044, pivoted at 045 upon a stationary bracket, as shown. Said segmental gear is connected by means of a link 042 to an elbow-lever 040, Figs. 110, 121$^A$, and 121$^B$, pivoted at 041 to the frame beneath the raceway. The other arm of said lever is connected by means of a link 033 (better shown in Fig. 110) to one arm of a lever 034, also pivoted to said frame at 036. The free end of said lever lies in the path of movement of a pin 033 projecting from the measuring-bar 307. When the quantity of type set by the operator approaches the amount necessary for forming the line, the pin 033 upon the measuring-bar 307 is brought into engagement with the lever 034, and through the intermediate mechanism described causes the pointer 050 to move to the right over the index-plate 051. The parts are so adjusted that when the measuring-bar indicates a line of exactly column measure the pointer 050 will coincide with the normal index-line 052. When the pointer coincides with the line 0, it indicates that the amount of spacing required is the greatest for which provision has been made in the series of combinations, and when it coincides with the index-line 00 it indicates that the amount of spacing required is the least for which provision has been made in said combinations.

In order that the operator may be duly

*Special controlling and modifying mechanisms.*—Having described the general construction and operation of the machine, commencing at the point from which the type are set and including the distribution of the spaces and their selection and introduction into the line of composition and finally into the galley, as well as the means for automatically indicating to the operator when the respective lines approach such a length as to enable them to be automatically justified, we will now proceed to describe and explain certain details of construction heretofore referred to, but purposely omitted, together with certain special mechanisms which tend to modify or supplement the ordinary action of the machine, including, among others, certain safety appliances, novel means for securing harmonious action between the regular and intermittently movable parts, and finally such modifications of the novel features employed by us as tend to show the breadth and scope of certain of the more prominent novel principles involved in our invention.

*The electrical time-lock and key mechanisms.*—Inasmuch as the action of the main portion of the machine is constant and the impulses derived from the rotation of a continuously-revolving shaft, from which power is transmitted to the various parts, are regular, it becomes essential to provide some means whereby all intermittent movements—such, for example, as those of the type-ejecting plungers, the word and line shafts, respectively, and the combination-plates, as well as various other intermittent movements, above referred to—may be so controlled and timed as to harmonize with the continuous and regular movements of the driving parts of the machine. We are enabled to accomplish these results by means of what we term an "electromechanical time-lock." The lock proper may consist of any suitable bolt, dog, or stop adapted to prevent the action of a spring or weight arranged to throw a clutch or other analogous mechanism into engagement with some one of the constantly-moving parts, so as to cause one or more of certain mechanisms, normally at rest, to be actuated at a predetermined time, for the purpose of performing a particular function or functions. The release of said locking mechanism is accomplished by means of electrical devices consisting of a constant source of electricity and a series of normally-open circuits, having two breaks in each, so arranged in connection with suitable circuit-closing devices that one of said breaks may be closed at the will of the operator, while the other can only be closed automatically by the regular action of some one of the constantly-moving parts of the machine. By this means it is manifest that while the machine may close its portion of the circuit with each impulse, it cannot effect the release of the lock and the consequent movement of any given part controlled thereby until the secondary break in the circuit is closed, and hence the question of bringing the part into action is subject wholly to the will of the operator, while the exact timing of its movement is controlled entirely and automatically by the machine.

While the electrical features of the time-lock mechanism are parts of a common system, subject to a common source of electrical energy, there may be said to be two time-locks proper and a special lock analogous in character, termed by us the "safety-lock." The time-locks serve to lock the parts which are operated by the keys against action during that period of time when there is a possibility of conflict with the parts having continuous movement, or a possibility that the movements initiated by the keys will, through imperfect engagement of the parts, be only partially completed by the parts having continuous movement. One is employed to control the action of a cam normally at rest, which cam, through intermediate mechanism, which is brought into action as a result of the depression of the keys, causes a continued or extended movement of ejecting-plungers, thereby bringing the latter into engagement with continuously-revolving carriers and causing the ejection of the type, after which the character and word keys, respectively, and other coacting parts are returned to their normal positions as a result of the complete rotation of said cam. The secondary time-lock is employed to control the starting of the word-shaft mechanisms, while the safety-lock serves to arrest automatically the action of the machine by locking the word, line, and selecting-keys at times when any mechanism having a movement of definite length has reached in said movement the limits of safety, or when from any one of different causes, hereinafter explained, it becomes necessary to prevent the movement of said keys.

In the action of the setting portion of the machine the keys do not directly actuate the setting-plungers, but only serve to initiate their movement. Hence the keys may be depressed at any time, but the final actions resulting therefrom are not performed excepting at the proper times, and in case the initial movements are made at improper times the completion thereof is delayed by the time-lock mechanisms before referred to until the conditions of safety again occur. Being parts of a common system the time-lock employed in connection with the word-shaft mechanism necessarily harmonizes with that which serves to control the action of the selecting-keys, the action of the two devices being necessarily synchronous.

As the time-lock mechanisms are intended to coact directly with the selecting and word keys, we will first describe the construction and operation of the mechanical portion of said time-lock and that of said keys and their connection with the type-ejecting mechanism, in order that the electrical features of said time-lock mechanisms may be more clearly understood.

For the purpose of bringing the desired parts into action when the electric circuit is closed and to return said parts respectively to the irnormal positions we provide a cam 222, Figs. 83ᴬ, 86, 87, and 92, which is loosely mounted upon a shaft 013, having continuous revolution. Said cam is adapted to be clutched as a result of the movement of certain mechanism actuated by a spring normally under tension, the release of which is caused by electrical means, as hereinafter explained.

The mechanism for actuating the clutch will first be described. Attached to the upright 191 is a bracket 0207, Figs. 86 and 87, which is in suitable proximity to the shaft 013, said bracket being intended to support the main mechanical features of the time-lock. Supported by said bracket is an electromagnet 2, the electrical connection with which will be hereinafter explained, the armature 208 of which is mounted upon an arm 209 upon a rock-shaft 210, having a horizontal arm 211 projecting therefrom. Attached to the arm 209 is a spring 219, which is adapted to hold the armature away from the magnet and thereby depress the arm 211, to which is attached a locking-bolt 212, (better shown in Figs. 88 and 89,) adapted to be brought into engagement with one arm 213 of an elbow-lever pivoted to the bracket at 215. The other arm 214 of said lever is provided with a pin 216, Figs. 86, 87, 92, and 93, which is adapted to engage with cam-faced projections 226 and 227, formed upon the continuously-revolving sleeve 224, which is splined to the shaft 013 and adapted to move thereon longitudinally. The end of the lever-arm 214 is limited in its movement by means of stationary shoulders 217 and 218, formed upon the bracket 0207, so that when said arm is caused to rest against one or the other of said bankings the pin 216 causes the sleeve 224 to be shifted longitudinally by engagement with one or the other of said cam-surfaces thereon, according to the position of said lever. Formed upon the sleeve 224 is a disk 229, which is provided with teeth 225, forming one member of a clutch, the counterpart of which, having the teeth 223, is formed upon a sleeve loosely mounted upon the shaft 013, to which sleeve the cam 222 is attached. The movement of the lever-arm 214, therefore, causes the clutch to be engaged or disengaged and the cam 222 to be rotated or not, according as said lever-arm is caused to rest against one or the other of said bankings.

A slide 228, Figs. 86, 94, and 97, is arranged to move longitudinally in bearings in a stationary support and is provided with a notch 2:S⁰, into which the disk 229 projects. A projection 0228 is adapted when the clutch is engaged to project loosely into a groove 230; but when said clutch is thrown out the projection 0228, by means of a curved incline 231 in the groove 230, is permitted to slide into engagement with a shoulder 232 and thus to hold the cam 222 in a fixed position as long as said clutch is disengaged. Preferably inclosed in a tubular screw is a spiral spring 220, Figs. 86 and 87, the end of which is caused to bear against the arm 213 of the elbow-lever, by which said clutch is actuated, and thereby, when free to do so, throw said clutch into engagement. The lever-arm 213 is normally locked by the bolt 212, and hence the clutch is normally disengaged. The cam-pieces 226 and 227 are so located with reference to each other that the latter follows the former. When the electric circuit is closed with the magnet 2 by the depression of a character-key, as hereinafter stated, the bolt 212 through the lever 209 211 is withdrawn, thereby releasing the lever 213 214. The normal position of the lever-arm 214 and its pin 216 is shown in Figs. 92 and 93, at which time the bearing-face of the cam-piece 226, upon the continuously-revolving sleeve 224, is brought into contact with the pin 216 during each revolution of the sleeve, by which action the latter is maintained in its left-hand position upon the shaft 013, which prevents the clutch from becoming engaged. Upon the withdrawal of the locking-bolt the position of the lever-arm 214 is reversed and the pin 216 is moved against the banking 217, in which position the left-hand bearing-face of the cam-piece 226 in its revolution engages with the pin 216, as shown in Fig. 95, and by reason of the lever-arm 214 being held in a stationary position against the banking 217 the sleeve 224 is moved to the right and the clutch engaged, thereby giving revolution to the cam 222. By the further revolution of the sleeve 224 the right-hand bearing-face of the cam 227 is brought into engagement with the pin 216, as shown in Fig. 96, thus moving the lever-arm 214 back to its normal position against the stop or banking 218, when by a still further revolution the right-hand bearing-face of the cam-piece 226 is brought into contact with said pin, and the latter being rigidly held by the banking 218 the sleeve 224 is returned to its normal position, as shown in Figs. 92 and 93, thus disengaging the clutch. In the meantime, as a result of the lever-arm 214 having been returned to its normal position, the arm 213 is forced back beneath the end of the bolt 212, which is beveled to permit this action, and the bolt being actuated by the spring 219 is forced down behind said arm, thereby locking the latter in place until the magnet 2 is again brought into circuit by the depression of a character-key.

Having thus described the mechanical construction and operation of the main time-lock and the means by which the clutch controlled thereby is thrown into and out of engagement, we will now describe the connection thereof with the initial plungers and the manner in which the initial and setting plungers are actuated and the various parts returned to their respective normal positions through the revolution of said cam 222.

The keys 681, Figs. 83ᴬ and 218, are extended loosely through a suitable keyboard and rest upon the ends of counterpoised pivoted levers 682, having shoulders in operative proximity to the ends of a series of parallel rods 0183, Figs. 79, 83, and 83ᴬ, which rest loosely against the ends of short arms 186, formed upon levers 184, loosely mounted upon a shaft 185, the upper ends 187 of which rest beneath initial type-ejecting plungers 187⁰, arranged parallel to each other (see Fig. 223) and separated laterally by means of guide-pins, as shown in said Fig. 79. In the upper ends of said levers are notches adapted, when said levers are pushed back, to be engaged by detents upon the ends of springs 0187, which bear thereon, as shown, for the purpose of holding them in proper positions when thrown back. The initial plungers 187⁰ are provided with shoulders adapted to engage with the ends of said levers when the latter are thrown back sufficiently to permit said initial plungers to fall into engagement therewith. A returning-bar 188, Figs. 79, 80, and 84, is pivotally mounted at the ends upon the rod 185 by means of cap-pieces 189, Fig. 80. The rod 185 extends between and is rigidly secured to the uprights 191 and 192, and the returning-bar 188, which is provided with a rib or flange 190, also extends nearly the entire distance between said uprights, or a sufficient distance to include all of the levers 184, with which it is intended to be normally in contact. Extending rearwardly from the bar 188 is a rigid arm 198, Figs. 81 and 84, which is beveled upon its end, as shown, for the purpose of engaging with a spring 199, having a corresponding beveled portion, (see Fig. 81,) the object of which is to insure the complete rearward movement of the returning-bar when the latter is partially tilted through the action of any one of the keys, as hereinafter described. As stated, the release of the time-lock bolt 212, and the consequent revolution of the cam 222, is caused by the depression of one or more of the keys, which throws back the corresponding arm or arms 187 and permits the corresponding initial plungers 187⁰ to fall into engagement therewith. This action also throws back the returning-bar 188. The mechanism which is adapted to complete these initial movements and to return the various parts to their respective normal positions is as follows: Pivotally mounted upon a suitable bearing is a lever 690, Fig. 83ᴬ, having a pin upon one end, which is adapted to engage with a groove in the cam 222. The other end of said lever is connected by means of a link 201 to an arm 200, projecting rearwardly from the returning-bar 188. An elongated slot in the arm 200, as shown in dotted lines in Fig. 82, permits the necessary lost motion to enable said returning-bar to be thrown back by the key-rods 0183. A weight 704, adjustably secured to an arm 703, serves as a counterpoise to the returning-bar 188, as shown in Fig. 83ᴬ, thereby causing the pin in the link 201 to be normally in contact with the bottom of the slot in the arm 200. The revolution of the cam actuates the lever 690, thus tilting the returning-bar forward, and, through the contact of the part 190 with such arm or arms 187 as have been thrust back by the action of the key or keys, the latter is pushed forward. The initial plungers 187⁰, being then in engagement with the arms 187, are likewise forwarded, and in turn push forward ejecting-plungers 705, having projections thereon, which are thus brought into the path of a revolving carrier 700, mounted upon a continuously-revolving shaft 699. The type being ejected by said plunger into the raceway, the plunger is returned to its normal position by means of a carrier 702 upon a shaft 701, which is rotated continuously in an opposite direction from that of the shaft 699. The throw of the carrier 702 being greater than that of the carrier 700, the plunger is thereby returned to its normal position out of the path of movement of the forwarding-carrier. The initial plungers are moved back longitudinally by the return of the ejecting-plungers; but in the meantime it is necessary that the rear ends thereof should be raised to their normal height in order to avoid conflict with the ends of the arms 187. This is accomplished as follows: A lever 695, Fig. 83ᴬ, having a pin upon one end adapted to engage with a groove in the cam 222, is connected by means of a link 696 to an arm 697, attached to a rock-shaft 694, as shown, having uspending arms connected by means of a cross-bar 698, extending beneath and transversely to the initial plungers. The rotation of the cam causes the rock-shaft to be tilted, so as to lift the plungers to the proper height, when they are free to be pushed back over the arms 187, as shown.

Having described the mechanical features of the main time-lock, we will now describe the electrical features in connection therewith. It is essential that a constant current of electricity should be maintained. This may be accomplished by means of an ordinary battery or in any well-known way; but we prefer to employ a dynamo therefor, which may be mounted upon or connected with any one of the continuously-rotating shafts. In Figs. 85ᴮ, 192, and 226 we have shown a dynamo 3, located upon a shaft 30, which is geared to the shaft 061, the latter having imparted thereto a continuous movement when the machine is in operation.

*Main circuit.*—In Fig. 85 we have shown a diagram view of the various electric circuits and in Fig. 85ᴮ a skeleton view of the machine and circuits, which latter view is intended as an aid in locating the parts indicated in the former. We have in said views employed the numbers from 1 to 28. These numbers have been used elsewhere; but as they relate to entirely different subject-matter no confusion will result therefrom. Mounted upon the shaft 061 is a continuously-revolving circuit-maker 5, Figs. 79, 85, and 85ᴮ, which is in operative proximity to a brush 207, electrically connected with one pole of the dynamo 3, but properly insulated from the machine. The other pole of the dynamo is connected with the bed of the machine, through which and the shaft 061 the circuit is completed with the circuit-maker 5. It will thus be seen that that portion of the circuit is regularly closed for a definite time during each revolution of said shaft, and hence any action resulting therefrom must harmonize with the general movement of the machine. It is, moreover, manifest that if an opening elsewhere in the circuit be closed when the contact-surface 206 of said circuit-maker is out of engagement with the brush 207 no action can result therefrom, but action, if any, must be delayed until said brush and circuit-maker are in contact.

The secondary break in the circuit is adapted to be closed as follows: Attached to and extending rearwardly from the returning-bar 188 is an arm 193, Figs. 80, 84, 85, and 85ᴮ, to which is attached a contact-plate 194, insulated, as shown, from said arm. Said plate forms a contact-surface and is in operative proximity to springs 194⁰ and 195, attached to insulated brackets 196 and 197. When a character-key is depressed and the returning-bar tilted, the break in the circuit between the contact-springs 194 and 195 is momentarily closed. Should this occur at a time when the circuit-closer 5 is in contact with the brush 207, then the entire circuit, with the dynamo 3, in which the electromagnet 2 is interposed, is closed, thereby exciting said magnet, withdrawing the locking-bolt 212 of the time-lock, and causing the clutching and consequent revolution of the cam 222 and the resulting action of the various parts connected therewith, as hereinbefore described. The electric circuit thus made is as follows: over the line 1 of the dynamo to the bed 4 of the machine, thence by the bed and intermediate parts or the line 1, as shown, for purposes of illustration in the diagram, to the circuit-maker 5, thence through the brush 207, the copper strip 8, bracket 197, spring 195, plate 194, spring 194⁰, bracket 196, and line 1 to the electromagnet 2, from whence the current, following the line 1, is returned to the dynamo. Should a key be depressed when the circuit is broken with the circuit-maker 5, the plate 194 will be held in contact with the contact-springs described by means of the spring 199, Figs. 81 and 84, until the circuit is completed by said automatic circuit-closer, when the time-lock bolt is released, and through its action the various movements made and the various parts returned to their respective normal positions, ready to repeat the operation upon the depression of the next key. It is thus apparent that whether both breaks in the circuit are closed simultaneously or not the final result is necessarily the same—viz., the release of the time-lock bolt during said interval in a given impulse of the machine, as permits the resulting movements to be completed without conflict with or injury to any of the parts.

*Auxiliary or shunt circuit for main time-lock.*—Should a key be depressed and the circuit completed at an instant of time when the contact-surface 206 is about to separate from the brush 207, a spasmodic impulse might be given to the magnet 2, which would be insufficient, owing to its short duration, to insure the release of the time-lock bolt. In order to meet this contingency, we have provided a secondary or shunt circuit directly with the dynamo and the magnet 2, which may be closed and rendered effectual for releasing the time-lock bolt, notwithstanding the short duration of the contact and the consequent sluggish or spasmodic action mentioned. Said shunt circuit is caused to be made automatically as the direct result of the instantaneous closing, as stated, of the main circuit, and is as follows: Attached to but insulated from the bracket 0207, Figs. 90 and 91, is a contact-spring 233, also shown in Figs. 85 and 85ᴮ, which is normally separated from but in operative proximity to the lever-arm 211, so that a slight movement of the latter may cause the two to be brought into contact. The arm 211 is connected with the bed of the machine by means of an insulated wire or other electrical connection 6, as shown, while the contact-spring is connected in like manner by means of a wire 7 with the copper strip 8.

It is thus apparent that when the main circuit is closed for an instant, as specified, the attraction of the armature to the magnet 2 causes the lever-arm 211 to be brought into contact with the spring 233, thereby completing the shunt-circuit as follows: from the dynamo over the line 1 to the bed 4, thence along the line 6 to the arm 211, thence over the spring 233 and line 7 to the copper strip 8, and thence over the line 1 and intermediate connections of the main circuit through the magnet 2, and again over the line 1 to the dynamo. This insures a complete movement of the armature 208 and a consequent release of the time-lock bolt, rendering the action as complete and perfect as if the circuit were closed by the depression of a key at the time when the spring 207 and contact-surface 206 of the circuit-closer 5 were in full contact.

The contact-surface 206 should be of such a length and so adjusted as to make the circuit only at a time when the movement of the lever 214, Fig. 95, would not cause a collision between the pin 216 on said lever and the cam-piece 226 on the sleeve 224.

*The word-shaft clutching mechanism.*—The locking mechanism which controls the time for clutching the word-shaft is in principle the same as that of the main time-lock, and the electrical features are intended to act conjointly with those of said main time-lock; but before describing said electrical parts we will describe the word-key mechanisms and the means employed for clutching the word-shaft.

The word-key 182, Figs. 76, 144, 148, and 224, is connected by means of suitable levers with the word-key rod 183, the rear end of which rests against an arm 202, Figs. 79, 84, and 98, rigidly attached to a rock-shaft 203, mounted in a bearing in the upright 192, as clearly shown in Fig. 84. Attached to the arm 202 is a laterally-projecting plate 204, against which rests the end of an arm 205, which is rigidly attached to or connected with the returning-bar 188, so as to move therewith. Rigidly attached to and extending in different directions from the shaft 203, upon the opposite end thereof from the arm 202, are three arms 246, 247, and 248, respectively, Figs. 69, 84, 85, and 98. Upon the end of the arm 247 is a beveled portion having a slight notch above, into which normally rests a detent upon the end of a spring 281. The purpose of said spring is to hold said arm normally in a given position, as well as to impart thereto a full movement when it has been initially tilted through the action of the rod 183 upon the arm 202, when the word-key is depressed, thereby in turn tilting the arms 246 and 248, the former of which initiates the movement of the word-shaft clutch, while the latter actuates a circuit maker and breaker for the purpose of making an electric circuit in the manner hereinafter explained, for the purpose of releasing the word-key time-lock. Pivotally attached to the upright 192 is an arm 234, Figs. 69 and 85, which is held in a given normal position by means of a spring 234⁰. Said arm is intended to serve as a lock for the arm 247, and is provided with a shoulder, as shown, which rests normally above the end of said arm, but a sufficient distance therefrom, so that a partial movement may be imparted thereto upon the depression of the word-key, said partial movement being sufficient to enable the arm 248 to close one break in an electric circuit, but not sufficient to enable the arm 246 to cause the clutching of the word-shaft, as hereinafter explained. Upon one side of the arm 246, at or near the end, as shown in Fig. 99, is an inclined face 249, which, when said arm is in an abnormal position, is adapted to engage with pins 251, Figs. 68, 69, and 98, which are passed loosely through bores in a gear-wheel 250, said pins being located diametrically opposite to each other, as shown in Fig. 98. The length of said pins is greater than the thickness of the gear, and when, by the revolution of the latter, which is in engagement with a gear 0013 upon the continuously-revolving shaft 013, they are brought into contact with said inclined face 249, they are pushed through said gear, and, after serving, in turn, to actuate a lever and release a detent in the manner hereinafter explained, are returned successively to their normal positions by being brought into contact with an inclined surface 255, Figs. 98, 101, and 105, formed upon a stationary block 252, which is rigidly attached to the framework of the machine. It should be borne in mind, however, that but one of the pins 251 is actuated as a result of a given depression of the word-key. The gear-wheel 250 revolves at only one-half the speed of the gear 0013 by which it is driven, and is connected with and imparts continuous revolution to a gear 263, Fig. 98, formed upon a sleeve 262, Figs. 100 and 106, which is preferably mounted upon a stationary sleeve 261, attached rigidly to the framework, and which latter sleeve in turn forms an end bearing for the word-shaft 266. It will thus be seen that the gears 0013 and 263, each running at the same rate of speed, make two revolutions, respectively, to one of the gear 250. The object of this construction is to delay the starting of the word-shaft for the purpose of permitting the character-keys and word-key to be depressed simultaneously, thus saving time to the operator, who is thus enabled to accomplish with one movement what would otherwise require two. This delay in the action of the mechanism is necessary in order that the movements initiated by the depression of the character-keys may be completed and the selected type ejected into the raceway; also that the main and auxiliary type-drivers may be permitted to make their full forward movements, respectively, and deliver the selected type before the word-comb, which is actuated by the word-shaft, is caused to start for the purpose of continuing the forward movement of said type. This delay is caused mainly by the relative position of the pins 251 with respect to the part intended to be actuated thereby, the location of a given pin being such that when moved into an operative position by the interposition of the cam-surface 249 it is necessary for the gear 250 to complete a half-revolution before the pin is brought into an engaging position with the part intended to be moved thereby, during which time the setter-shafts will have made a full revolution. There is also a further period of delay before the word-shaft is fully clutched, which is occasioned by the action of mechanism hereinafter described. Immediately upon the completion of said period of delay it is essential that the word-shaft 266 should be clutched and caused to make one full revolution with each depression of the word-key, but only after the lapse of the intervening time stated, and after such revolution it is essential that it should be suddenly arrested and retained in a given position until required to be brought into action again, unless it is desirable to cause it to make two or more successive revolutions, when the stopping mechanism is only brought into action at the end of the last revolution, as hereinafter specified. In order to accomplish these results the following mechanism is provided: Formed upon one end of the revolving sleeve 262, Figs. 98, 100, and 106, is a disk 264, which is preferably integral with said sleeve and forms one member of a clutch, the counterpart of which consists of a disk or block 267, also shown in Fig. 107, which is rigidly keyed to the word-shaft. The one member 264 is constantly rotated while the other is normally at rest. Loosely secured by means of suitable longitudinal guides in the disk 264 is a radially-movable sliding bolt 265, Figs. 100, 103, and 104, the body of which is flush with the inner face of the disk, while the wedge-shaped projection 0265 is formed thereon, the point of which is adapted to register with the outer or inner face of a flange 278, formed upon and extending partially around said disk and pointed, as shown, at the opposite end. The object of said wedge-shaped projection is to cause said bolt, as a result of its own movement while revolving with the disk 264, to be thrown, as hereinafter explained, into or out of an engaging position with a laterally-projecting contact-lug 271, formed upon the free end of a bell-crank lever pivoted at 272 upon the block 267, secured to the word-shaft. The free end of said lever is located between bankings or stops 0267, Fig. 107, which serve to limit its movement. The other arm 270 of said lever is connected by means of a link 269 to a double-headed piston, the rod of which extends through a diaphragm 268, upon each side of which are adjustable vent-holes for the escape or admission of air. This device is intended to form an air-cushion for the purpose of relieving the shock, which would otherwise result from suddenly starting or stopping the word-shaft, while the rigid bankings 0267, against which the end of the arm 271 is adapted to abut, renders the starting and stopping of said word-shaft positive. The projection and withdrawal of the locking-bolt 265 is accomplished by the following means: Pivotally mounted upon a stationary stud 257, Fig. 98, is a compound lever 256, having arms 258 and 259, Figs. 68, 69, 98, 100, 102, and 108, the end of the arm 258 of which lies normally in the path of movement of the pins 251 when abnormally projected through the gear-wheel 250 by the action of the cam-surface 249, as stated. Upon the end of the arm 259 is a pin 260, which projects laterally into such a position that when the arm 258 is lifted by the pin 251 the pin 260 will engage and be held within the revolving circular flange 278 and at the proper time cause the ejection of the clutch-bolt 265, as hereinafter stated. In order that the projection and withdrawal of said bolt may be positive, we provide stops 253 upon the upper end of the stationary block 252, as shown in Figs. 101 and 102, said arm being intended, by virtue of its own gravity, to rest normally against the lower one of said stops. The position of the flange 278 with relation to the pins 251 is such as to enable the point of said flange to pass beneath the pin 260 when the latter is lifted, as stated, and thus hold said pin in a raised position until it is brought into contact with the inclined surface of the projection 0265, which causes the bolt 265 to be forced out into an engaging position with the lug 271, when the word-shaft is thereby caused to rotate. A curved projection 279, secured to the continuously-revolving disk 264, Fig. 100, is provided for the purpose of insuring the return of said pin 260 to its normal position after the completion of the clutching action. The clutch member 267 and with it the word-shaft is normally locked, and before the rotation of said shaft can be commenced it is essential that said locking device should be withdrawn and that automatic means be provided for returning it in time to intercept the lug 271 when said rotation is completed. For these purposes we provide the following instrumentalities: Pivoted to a stationary bracket, which is rigidly attached to the framework, is a rock-shaft 275, Figs. 68 and 98, to which is rigidly attached an arm 274, the end of which is in operative proximity, as shown in Fig. 98, to the path described by the lug 271 when rotated, said arm being intended to serve as a banking or stop for said lug and to rest normally in the locking position shown in said Fig. 98. Likewise rigidly attached to said rock-shaft 275 are operating-arms 276 and 277, respectively, the former of which is intended to move said locking-arm into its engaging position upon being brought into contact at the proper time with the projecting portion of the pivot-pin 272, Figs. 68 and 100, and the latter of which arms is intended to cause its release. Said release is accomplished through the following-described means: Pivoted to the stationary block 252, as shown in Fig. 98, is an arm 0252, the free end of which lies in the path of movement of the pins 251 when in their respective abnormal positions. The opposite end of said lever is connected by means of a link 0253 to a lever 0254, connected in turn with a spring-actuated detent 254, adapted to engage with a notched plate upon the arm 277. The movement of said arm 0252, when actuated by a pin 251, is intended to withdraw the detent 254 in the manner hereinafter described.

The complete operation of said clutching mechanism is as follows: When the types forming a complete word are set and the word-key is depressed, the rod 183 is caused to bear against the arm 202, Figs. 79 and 98, on the rock-shaft 203 and to impart a sufficient movement thereto to disengage the detent of the spring 281 from the notch in which it normally rests and cause it to bear upon the inclined surface of the end 280 of the lever 247, and upon the withdrawal of the arm 234 by the action of the magnet 00 above referred to and hereinafter described, the continuing pressure of the spring causes the lever 247 to complete its full movement, when the inclined surface 249 is brought into the path of movement of the pins 251 long enough to cause the movement of one of said pins into an abnormal position; but through the action hereinbefore described of the arm 205, secured to the returning-bar 188, said lever 247 is returned to its normal position before the second pin 251 is brought into contact with the cam-face 249, unless the word-key is again depressed during the interval, as will be hereinafter described. The pin 251 thus set upon making half a revolution engages with the arm 258 of the compound lever 256 and lifts it so that the end of the arm 259 is caused to rest against the uppermost banking 253 when the pin 260 thereon is at a height above the path of the inner surface of the flange 278 on the revolving disk 264. The movement of said flange is so timed that when the pin is raised the pointed end of the flange is caused to pass beneath it, and being held by said flange the further revolution of the disk causes the wedge-shaped projection 0265 to be brought into engagement with said pin, thus thrusting out the bolt 265 in time to engage the lug 271, thus clutching the word-shaft, the impact of which action is relieved by the air-cushion described formed in the block 267. In the meantime, before the completion of said clutching action, the pin 251 in its further movement is brought into contact with the lever 0252, moving it sufficiently to withdraw the detent 254 from the lowermost notch, as shown in Fig. 98, when, in the further movement of said pin 251, it is brought into engagement with the arm 277, thus pushing it down until the detent is projected into the secondary notch. This movement causes the arm 274 to be disengaged from the lug 271, with which it is normally engaged, as shown in Fig. 98, in time to enable the clutching of the word-shaft to take place, as described, without conflict. Immediately after this clutching action the pin 260, is, by means of the curved projection 279 on the revolving disk 264, returned to its normal position, where it is held by the contact of the lever with the lower banking 253 on one side and by the outer surface of the flange 278 on the other, in which position it makes contact at the close of one revolution of the word-shaft with the outer inclined surface of the projection 0265, and thereby returns the bolt 265 to its normal unclutched position. In the meantime the pin 251, the projection of which into its abnormal position causes these movements, being brought into contact with the cam-surface 255, is returned to its normal inoperative position, and the projecting portion of the pin 272, upon the revolution of the block 267, being brought into engagement with the arm 276, the stop-lever 274 is thereby caused to be moved into its normal position in the path of the lug 271, thus forming a stop therefor and arresting the further movement of the word-shaft. The impact of the engaging parts is relieved by the air-cushion, which enables said shaft to be suddenly started and as suddenly arrested without shock or undue wear.

*Time-lock mechanism for releasing the locking-arm of the word-shaft clutch.*—Having described the construction and operation of the word-shaft clutching mechanism, we will now describe the electrical time-lock mechanism and electrical circuits by which the locking-arm 234, Fig. 69, is caused to be released. As the depression of the word-key serves to actuate the rod 183, Fig. 79, which, through the arms 202 and 205 actuates the returning-bar 188, it follows that said bar must with each depression of the word-key receive the same movement and aid to close the same electrical circuits as when the character-keys only are depressed.

The electrical circuits employed in connection with the time-lock of the word-shaft mechanisms are made in different ways, according to varying requirements and conditions, which are as follows: The depression of the word-key serves to actuate the three-part lever having the arms 246 247 248, the latter of which is provided with a spring contact plate or brush 11, Figs. 69, 84, 85, and 85ᴬ, insulated therefrom, the ends of which rest normally upon an insulated contact-plate 12, as shown in said figures, which plate is in close proximity to but separated from a similar contact-plate 10, both of which plates are attached to but insulated from the upright 192. The electrical circuit illustrated in Fig. 85 is as follows: from the dynamo 3, along the line 1, bed 4, and line 1 again to the shaft 061; thence through the shaft and circuit-maker 5; thence to the contact-spring 207; thence along the line 8 to the line 9, which is electrically connected with the plate 10; thence upon the contact-spring 11 11, when in its abnormal position, to the insulated plate 12, (see Fig. 85ᴬ;) thence, Fig. 85, by the line 9 to the magnet 00, around said magnet and along the line 9 to the main line 1 and back again thereby to the dynamo. The excitement of the magnet 00, caused by the closing of said circuit—the time of which closing, as is obvious, is dependent upon the rotation of the circuit-closer 5—attracts the armature upon the arm 234, and hence actuates the latter, so that the shoulder thereon is no longer in a position to obstruct the movement of the arm 247. The latter, assuming it to have been initially moved by the depression of a key, is, upon the withdrawal of said arm 234, caused to move to its full limit by the action of the spring 281 upon the inclined face of said arm, which causes the inclined surface 249 of the arm 246, Fig. 98, to be brought into engagement with one of the pins 251, which pin, in turn, through the mechanism described, causes the clutching of the word-shaft in the manner hereinbefore set forth. As said circuit is made conjointly and simultaneously with that of the main circuit which controls the action of the typesetting mechanisms, it follows that the word-shaft also must be actuated in harmony with the movement of the driving-shaft and other continuously-moving parts. Upon the breaking of the circuit, through the rotation of the circuit-closer 5, the arm 234 is returned to its normal locking position by the action of the spring 234⁰, Fig. 69. This movement is permitted through the action of the returning-bar, which at the proper time causes the return to its normal position of the three-part lever having the arm 247.

It is obvious that the depression of the word-key does not of itself cause the closing of the circuit, but merely causes a break in one part of it to be closed, and hence it is manifest that no action further than the initial action mentioned can take place excepting at the time when the circuit-closer 5 is in contact with the spring 297. It is therefore apparent that the time of forwarding the initial plungers, as well as that of clutching of the word-shaft, is controlled by the circuit-closer 5.

*Auxiliary or shunt circuit for word-shaft time-lock.*—The clutching of the word-shaft is subject to the same contingency as that before described in relation to the main time-lock—namely, the possibility that the word-key may be actuated at an instant of time when the circuit is about to be broken with the contact-spring 207, thereby producing a current of such short duration as to cause a mere spasmodic action of the armature upon the arm 234, instead of insuring a full movement thereof. This contingency is overcome by the employment of a "shunt-circuit" similar to that heretofore described in connection with the main circuit and the electromagnet 2. Said shunt-circuit is made as follows: from the dynamo 3 by the line 1 to the bed 4, thence over a line 15 to an insulated contact-plate 16, Figs. 69, 85, and 85ᴬ, in close proximity to but separated from the plate 10 and also in operative proximity to a contact spring or brush 17 18 upon the arm 234, from which it is properly insulated. Said plate in its normal position, as shown, is not adapted to connect the contact-plates 10 and 16; but by the slight backward movement of the arm 234, caused by the momentary excitement of the magnet 00, the longer portion 17 of the spring, which is slightly bent, so as to rest normally upon the plate 10, is brought into electrical contact with said plate 16, thereby connecting the two. The current then passes over the contact-spring 11 11, which is then in contact with the plates 10 and 12 to the plate 12, thence by the line 9 to the magnet 00, thence over the continuation of said line 9 to the main line 1 and back to the dynamo. The difference between the primary and shunt circuits now under consideration is that in the latter the current passes directly from the bed 4 through the wire 15 and contact-plate 17 18 to the plate 10, while in the former said current passes through the circuit-maker 5 and wire 9 to said plate 10.

*Special shunt-circuit in connection with returning-bar mechanisms.*—For the same reasons that we provide the special circuit just described around the magnet 00 in connection with the action of the lever-arm 234 we also provide a special shunt-circuit around the magnet 2, in order to insure certainty in the action of the returning-bar mechanisms, by which the three-part lever, the word-key, and connecting parts are returned to their normal positions, the circuit also being brought into action by the depression of the word-key. Said circuit is as follows: from the dynamo to the bed 4, thence by a line 13 to the locking-arm 234, thence over a contact-spring 14 in metallic contact with the arm 234 to a plate 014, attached to but insulated from said upright. This last connection is permitted by reason of the slight backward movement of the arm 234, caused by the excitement of the magnet 00, as a result of the passage of the current over the primary circuit. The contact-spring 14 is made of sufficient length to enable it to extend over the plate 014, as shown, and to rest normally upon an insulated plate 013, being slightly bent at the end, so as not to make a metallic contact at such time with the plate 014. From the plate 014 the current passes over the continuation of the shunt-line 13 to the main line 1, through the electromagnet 2, and thence to the dynamo.

*Special circuit for causing the locking of the returning-bar.*—When the character-keys and word-key are depressed together, at that instant when the circuit-closer 5 is about to move out of contact with the spring 207, there is a liability that the word-key may be depressed somewhat later than the others and consequently cause a circuit to be closed around the magnet 2, but not around the magnet 00. This contingency is provided for by means of a special electrical circuit and certain automatic mechanism in connection therewith adapted to lock the returning-bar and thus prevent the setting of type until the desired movement of the word-shaft clutch mechanism is completed. Pivotally attached to the upright 192 and in metallic contact therewith is a ratchet-wheel 19, Figs. 69 and 85, the teeth of which are in operative proximity to a pawl 20, which is pivotally attached to the end of the arm 247. A contact-spring 21, is also attached to said upright but insulated therefrom, and is in turn connected by means of an insulated electrical connection with a special word-key or slide 23, Figs. 76, 85, and 144, which is intended to be used for breaking the circuit and thereby releasing the returning-bar after the latter has been locked a sufficient length of time to enable the desired operations to be completed. We will first briefly describe the completion of said circuit, after which we will give a detailed description of said special key. The circuit is adapted to pass through contact-springs 032, Fig. 85, upon said special key to a line 22, thence around an electromagnet 24, also shown in Fig. 84, thence by a continuation of the line 22 to the line 1, and thence through the dynamo to the bed. The teeth of the ratchet-wheel 19 are normally out of contact with the spring 21, but are so spaced as to cause one to be brought into contact therewith whenever the three-part lever is partially moved in the manner stated, but not when it is in either of its extreme positions. The partial movement described, which results in closing the circuit, causes the excitement of the magnet 24, the armature of which is attached to one end of a pivoted lever 011, Figs. 84 and 85. Bearing against opposite sides of the other end of said lever are longitudinally-movable pins 08 and 09, which are actuated longitudinally by means of spiral springs 07 010, indicated in dotted lines in Fig. 84, the latter of which is somewhat stronger than the former and tends to hold the armature away from the magnet and the end of the lever 011 out of the path of movement of the arm 198 upon the returning-bar. The attraction of the magnet, however, when excited overcomes the pressure of the spring 010 and permits the spring 07 upon the return of the arm 198 to its normal upper position to thrust the end of the pin 08 beneath the arm 198 and lock the returning-bar in its normal position against the action of the keys, which is equivalent to locking the keys themselves, and hence serves as a warning to the operator. This circuit around the magnet 24, with the consequent locking of the returning-bar, continues until it is broken by the special word-key, which is constructed as follows:

*The special word-key.*—A metal plate 022, Figs. 76 and 144, is arranged to slide in any suitable guides upon the side of the keyboard, said plate having a hooked finger-piece 23. A spring 030, Fig. 76, is arranged within a suitable casing 031, which spring serves to hold said key in a normal position. Attached to but insulated from said plate is a contact-spring 032, with which the line 22 is connected. An insulated contact-plate 033, connected with the continuation of the line 22, is normally in contact with the spring 032, which latter is maintained in the position described by means of the spring 030.

The operation of said device as a whole is as follows: Assuming the character and word keys, respectively, to be depressed at about the time when the circuit is broken with the circuit-maker 5, but in such order that the character-keys are actuated before and the word-key an instant after the occurrence of said break, as hereinafter stated, the desired characters will be set, but the word-shaft mechanism will not be actuated because of the automatic breaking of said circuit in the manner stated. The three-part lever, however, will have received a partial movement from the rod 183 and will have been returned to its normal position by the returning-bar before the circuit is again closed by the circuit-closer 5. This partial movement of the three-part lever being sufficient to cause the hook-pawl 20 on the arm 247 to move the ratchet-wheel 19 into contact with the spring 21, the circuit is thus closed with the dynamo around the magnet 24, thereby causing the movement of the lever 011 into an abnormal position and locking the returning-bar and through it the keys.

We recommend that the returning-bar and the connecting parts be so adjusted as to require that the former be moved slightly forward by the actuating-rod before the circuit around the magnet 24 can be completed by the action of the ratchet-wheel 19, so that when the circuit is closed around the magnet 24 it may be impossible to lock the returning-bar until it is returned to its normal position. This enables the operation of the parts receiving their initial movement from the depression of the character-keys to be completed. It then remains for the word-shaft clutch mechanism to be actuated before any more characters are set; but the character and word keys being locked neither can be actuated until the returning-bar is released. This is accomplished by withdrawing the special word-key 23 against the action of the spring 030, thereby breaking the electric circuit between the dynamo and the electro-magnet 24.

*Special word-key mechanism for actuating the word-key rod.*—It is obvious that when the circuit is broken by actuating the special word-key the word-key might be depressed in the usual way, which would secure the desired result and provide for the spacing of a word; but a careless or inefficient operator might fail to do it, in which case the final result would be the same as if the returning-bar had not been locked. In order to insure the desired action, therefore, we provide means whereby the movement of the special word-key may serve to actuate the bar 183 in the same manner as it would be accomplished by the depression of the word-key itself. The following means are employed to accomplish this result: Rigidly attached to the plate 022, Fig. 76, is an arm 024, which extends laterally therefrom and is connected by means of a link 025 with a lever 026, pivotally attached to a suitable support, as shown, the free end of said lever being in operative proximity to a shoulder 027 upon the bar 183. The withdrawal of said special word-key actuates the lever 026 and thereby moves the bar 183 in the same manner as would the depression of the word-key. This construction is obviously a sure safeguard against errors on the part of the operator who, being warned by the locking of the keys that he has failed to depress the word-key in proper time and being unable to proceed further until the keys are unlocked, is compelled to actuate the special key, which in effect performs the double function of unlocking the returning-bar and initiating the action of the word-clutch mechanism.

In the normal operation of the word-key mechanism the partial movement of the three-part lever always completes the circuit around the magnet 24 through the ratchet-wheel 19; but upon the full movement of said lever the ratchet-wheel is moved far enough to again break the circuit with the contact-spring 21, which action, occurring before the returning-bar is returned to its normal position, the locking thereof is prevented.

*Automatic lock for word key bar.*—We prefer to make the word-key rod 183 in two parts, as shown in Fig. 76, in order that the rear portion may be actuated by the special word-key without actuating what we term the "escapement mechanism," hereinafter described, which is in operative connection with the forward portion of said word-key rod. It is desirable, therefore, to cause said forward portion to be automatically locked whenever the special word-key is actuated. This is accomplished by means of a cam-shaped plate 028, indicated in dotted lines in Fig 76, which cam is in operative connection with a notch formed in a bolt 029, which is adapted to be thrust into engagement with the forward portion of said rod 183 when the special key is actuated by the operator. Said special key is returned to its normal position by the action of the spring 030, which action causes the other parts connected with said key to be likewise returned.

*The line-key and line-shaft clutch mechanism.*—There are certain electrical circuits and locking mechanisms in connection with the line-key and its coacting mechanisms, the description of which will be deferred until after the description of the line-key and line-shaft clutch, which is as follows: The line-key is preferably placed upon the front of the keyboard and consists of a flat bar 370, Figs. 83$^A$ and 144, which is attached to arms rigidly secured to a rock-shaft 371, having a depending arm 374 at the left-hand end, which is attached to the line-key rod 235. Said line-key rod is arranged to slide in suitable bearings upon the side of the keyboard, and is actuated and caused to move out of its normal position by the rearward pressure of the thumb of the operator upon said line-key. A shoulder 375, Figs. 151 and 151$^A$, upon the line-key rod, is in engagement with an arm 376 of an elbow-shaped tripping lever, the arm 377 of which is provided with a hook-catch, as shown, adapted to engage with a bent lever-arm 378, mounted, in turn, upon the right-hand end of a rock-shaft 379, Figs. 144, 151, 152, 153, 159, and 227, mounted in bearings attached to the frame. The movement of said line-key rod, when the key is actuated, is against the pressure of a spring 380, which tends to move said lever-catch and to cause it to engage with and lock the arm 378 in the position shown in Fig. 151 against the pressure of a spring at the end of a train of mechanism, which is intended at the proper time to cause the clutching of the line-shaft, as hereinafter described.

The rock-shaft 379 is extended along the front of the machine, as shown in Fig. 159, and is provided with a rigid arm 402, the end of which is connected by means of a rod or link 403 (better shown in Fig. 154) to an arm 404, attached to one end of a short rock-shaft rigidly supported in a suitable bearing, to the other end of which rock-shaft is attached a similar arm 404$^0$. Said latter arm is connected by means of a link or rod 405 to an arm 406, attached to a rock-shaft, mounted in a bearing formed in an upright bracket 419, upon the other end of which rock-shaft is an arm 407, the end of which is provided with an inclined face or cam and is in close proximity to the end of a revoluble cam 156, mounted upon the word-shaft 266. A pin 408, indicated in dotted lines in Figs. 153 and 159, respectively, is arranged loosely and parallel with the word-shaft in a bore formed in the cam 156. Said pin is made longer than the cam, so as to project from one or the other end thereof, according as it is actuated by the cam-face upon the end of the arm 407 or by a like cam-face upon the end of an arm 408$^0$, which arm is rigidly attached to the upright 419. The cam-surface upon said latter arm tends to throw said pin into its normal position, so that its end is caused to project from the right-hand end of the cam 156, and as the arm 407 is normally out of the path of movement of said pin the position of the latter is only changed as a result of actuating the line-key. The arm 407 is held in its normal non-operative position against the pressure of a spring 409, Fig. 59, which tends to throw it into position to engage said pin 408 whenever the spring-catch 377, Fig. 151, is released and the lever 378 is free to act, as hereinafter stated, it being understood that said lever is thrown into its abnormal position through the action of said spring 409, communicated through the intermediate parts described. The line-shaft 424 is supported at its left-hand end in any suitable bearing and at its right in a sleeve 422, Figs. 158, 159, and 160, which, in turn, is loosely sustained in a bearing in an upright bracket 419 rigidly attached to the frame. Said sleeve is adapted to rotate independently of the shaft 424, and is provided with a pinion 421 keyed thereto, which meshes into an intermediate gear 0421, Figs. 153 and 159, in engagement with a gear upon the continuously-revolving shaft 061. Thus the sleeve 422 is caused to rotate continuously when the machine is in operation, and by means of a suitable clutch is adapted to actuate the line-shaft, as hereinafter described. Rigidly keyed to the line-shaft 424 is a disk 413, Figs. 153, 156, 158, 159, and 160, which forms the secondary member of a clutch, of which the sleeve 422 is the first. Arranged within a radial notch or recess cut inwardly from the periphery of the disk 413 is a block 414, which is narrower than said recess and is capable of a forward or backward movement therein in the plane of the disk. Said block is provided with cylindrical end pieces, as indicated in dotted lines in Fig. 153 and in full lines in Fig. 146. Said cylindrical end pieces are fitted in bores formed in said disk, indicated in dotted lines in Fig. 158, and one of which is shown in Fig. 147. Said bores, respectively, are closed with plugs 420, having air-vents therein, the size of which is adapted to be regulated by means of screws. The cylindrical pieces are adapted to be moved longitudinally in the bores in which they are fitted, said vents being intended to form air-cushions at the respective ends to modify said longitudinal movement. A notch (shown in Fig. 146) is formed in said block for the reception of a bolt 416, which is intended to move radially from the shaft 424. One or the other end of said bolt is adapted to project beyond the corresponding face of the block 414, and when said bolt is in its normal position it projects beyond the periphery of the disk 413, as shown in Fig. 153. A pin 417 (better shown in Fig. 156) is caused to project from the face of the bolt 416 into a groove 418, formed in a stationary cam upon the face of the upright 419, which is adjacent to that of the disk 413. Said cam is shown in detail in Fig. 145. A rise 418⁰ in said groove is adapted to engage the pin 417 and lift said bolt into its normal position, as shown in Fig. 153. Said bolt, when in its normal position, is adapted to be engaged by a stop 425, which is adapted to arrest the movement of the shaft 424, as hereinafter stated. The inner end of said bolt is adapted, when in its abnormal position, to engage with clutch-teeth 423. (Indicated in dotted lines in Fig. 153, 158, and shown in full lines in Fig. 160.) The clutching position of said bolt is indicated in Fig. 158. A secondary bolt 0420 is arranged in said disk 413 diametrically opposite, or nearly so, to the bolt 416, and adapted to be abnormally engaged by one of the teeth 423. A laterally-projecting pin upon said bolt 0420 is arranged to engage with a groove 0419 in said stationary cam.

The object of the bolt 0420 is to continue the engagement of the shaft 424 an instant longer after the release of the bolt 416, and thus rotate the disk until the bolt 416 is in engagement with the stop 425 and free to be again moved into an abnormal or clutching position, in the manner hereinafter stated.

For the purpose of throwing the bolt 416 into a locking position the following mechanism is provided: Pivoted at 411⁰ to the bracket 419 is an arm 411, having a foot or bearing-surface 412 upon the free end thereof, which is adapted to engage the bolt 416 and to rest thereon, as shown in Fig. 153, when said bolt is in its normal position. A cam 410 is attached to or formed upon said arm, which cam is in the path of movement of and adapted to be actuated by the pin 408 when the latter is moved into its abnormal position as a result of the actuation of the line-key. A pawl 0425, Fig. 153, is attached to the bracket 419 and adapted to engage with ratchet-teeth upon the periphery of the disk 413 to prevent a backward movement thereof.

For the purpose of returning the lever-arm 378 to its normal position against the action of the spring 409 we provide the following device: Upon the periphery of the disk 413 is formed a cam-shaped projection 0413, adapted to engage with one arm of an elbow-lever 0414, pivoted to a stationary support, the other arm of which is attached to the rod 405. The engagement of said cam with said lever serves to move said rod in an opposite direction from that in which it is actuated through the movement of the line-key.

*Mechanism for actuating the word-shaft by the line-key.*—It is important that the word and line shafts should operate in harmony, and as the latter receives its movement through the action of the former it is manifest that provision should be made for initiating the movement of the word-shaft as a result of the movement of the line-key. Moreover, it is obvious that, while the movement of the line-key should serve to actuate the word-shaft clutch, the word-key should be free to be actuated independently of the line-key or line-key mechanisms.

We are enabled to accomplish said results through the following means: Rigidly secured to the rock-shaft 371, Figs. 148 and 152, is a lever 372, to the upper end of which the line-key 370 is attached. Connected to the lower end of said lever is a bar 373, which is extended rearwardly and provided with an elongated slot O into which is loosely inserted an arm 389, Fig. 148, of a three-part lever pivotally attached to a stationary support. One arm 390 of said lever is in engagement with the word-key rod 183, while the third arm is so connected with the word-key 182 as to be moved by it in a left-hand direction. By reason of the elongated slot O it is apparent that the word-key may be depressed without causing any movement of the bar 373; but when the line-key is actuated said bar is drawn back and the line and word key rods are moved simultaneously.

The operation of the line-clutch mechanism is as follows: As the operator pushes against the line-key, the bar 373 is drawn back, thus actuating the word-key rod as stated and causing the clutching of the word-shaft. Simultaneously, the line-key rod 235 is drawn back against the action of the spring 380, Fig. 151, thus releasing the hook-catch 377, and assuming the lever-arm 378 to be then free to act, as a result of the favorable position of the "escapement-bolt," hereinafter described, but the special modifying action of which need not now be taken into account, permitting the rock-shaft 379 to be tilted, and thereby, through the movement of the arm 402, bar 403, arms 404, 404⁰, rod 405, and arm 406, permitting also the arm 407, as a result of the action of the spring 409, to be thrown into an operative position. By this latter movement the cam-surface on the lever is brought into engagement with the end of the pin 408 in the cam 156 on the word-shaft, thereby projecting the pin from the opposite end of the cam, the rotation of which cam has been caused through the initial movement imparted to the word-key rod. In the further revolution of the word-shaft the pin 408 is brought into engagement with the cam 410 upon the arm 411, thereby depressing said arm, and with it the bolt 416. The latter being thus brought into engagement with one of the clutch-teeth 423 of the continuously-revolving sleeve 422, the disk 413 and line-shaft 424 are caused to rotate. The pin 417, being in engagement with the groove 418, said bolt is, by means of said groove, held in an engaging position with the clutch-tooth 423 until the completion of one revolution of the line-shaft, when said pin 417, being brought into contact with the rise 418⁰ in the groove, Fig. 145, the bolt 416 is thrown out of engagement with the clutch-tooth 423 and into engagement with the stop 425. A detent 415, Fig. 156, arranged within one of the cylindrical parts of the block 414, is caused, by means of a suitable spring, as indicated, to engage with one or the other of two notches in the bolt 416 and thus hold said bolt temporarily in one or the other of its extreme positions.

The groove 0419, Fig. 145, is so arranged as to hold the bolt 0420 in engagement with the clutch-tooth 423 during most of the revolution of the line-shaft and to maintain such engagement an instant after the release of the bolt 416, by which action the latter bolt is positively carried beyond the point of disengagement and into a position to be depressed by the foot on the arm 411 when the line-key is again actuated, this position being insured by the pawl 0425 and the ratchet upon said disk with which it is caused to engage. During the revolution of said disk the cam 0413 is brought into contact with the arm 0414, Fig. 153, thus through the intermediate mechanism positively returning the lever-arm 378 to its normal position against the action of the spring 409 into engagement with the hook-catch 377, the end of which rides up upon an inclined face, as shown, upon said lever-arm, Figs. 151 and 151ᴬ, into a locking position. The pin 408 is also returned to its normal position by the action of the cam upon the stationary arm 408⁰.

From the foregoing it will be understood that the actuation of the line-key first causes the starting of the word-shaft, and that the latter before the completion of its revolution causes the clutching of the line-shaft, each shaft, as a result of the actuation of the line-key, making but a single revolution, at the end of which it is brought to rest. The word-shaft, however, is under special circumstances capable of making one or even more than one revolution after the actuation of the line-key and before the commencement of the particular revolution of the word-shaft which results from said actuation of the line-key, the purpose and manner of which intermediate revolutions will be hereinafter described.

*The escapement mechanism.*—As has been before explained, the revolution of the word-shaft is delayed in order that the type set out by the setter mechanisms may be delivered to the auxiliary driver. To accomplish this about two revolutions of the setter-shafts are provided for before the word-shaft is started. This delay enables the operator to depress the word-key three times in quick succession before the completion of the first of the three revolutions which may be initiated thereby, and hence, as the pin 260, Fig. 100, after being forced out into its normal position by the cam 279, is as a result of the second depression of the word-key again returned to its abnormal position before the advance of the flange 278, the word-shaft does not become unclutched, but continues to revolve. This rapid successive depression of the word-key is often necessary in order to utilize the full capacity of the machine, owing to the frequent occurrence of successive short words—such, for example, as "and," "in," "the,"—each of which words may be set by a single movement of the operator, who simultaneously depresses the word and character keys therewith. Such rapid initial action would, unless special means were provided to prevent, cause the starting of the line-shaft too soon—that is, instead of being caused to start by that revolution of the word-shaft which results from the actuation of the line-key, it would be started by one of the intermediate revolutions before referred to. As a result of this premature action, time would not be allowed for the completion of the resultant movements — such, for example, as the measurement of the words and the presentation of the successive combination-plates therefor in successive order—and there would be therefore a conflict of mechanism, the wrong combination-plate would be presented, and the line would not be justified. It is manifest, therefore, that some automatic means should be provided for preventing this premature clutching of the line-shaft. We accomplish this result preferably by delaying the action of the line-key mechanisms by means of what we term an "escapement mechanism," the object of which is to prevent the movement of the lever-arm 378 consequent upon actuating the line-key until the intermediate revolutions before referred to of the word-shaft have been completed. Said escapement mechanism consists, mainly, in a sliding bolt arranged at right angles to the axis of the word-key rod and provided with a notch which is normally in the path of movement of the lever 378. When said notch is in the position specified, said lever-arm when released is free to move to its full extent and to thus cause the clutching of the line-shaft; but inasmuch as said bolt is moved abnormally one step with each depression of the word-key and returned one step with each resultant movement of the word-comb it follows that if the word-key is depressed two or more times in quick succession said bolt will remain in an abnormal position until two or more revolutions of the word-shaft are completed to return it, and hence, notwithstanding the movement of the line-key, the clutching of the line-shaft cannot occur until the completion of the necessary movements of the word-shaft. The means which we prefer to employ for carrying out said principle are as follows: Attached to the word-key rod 183 is a plate 382, Figs. 76, 77, 78, 148, 149, and 150, upon which is pivoted two pawls 383 and 0383, respectively, which are held in normal positions, respectively, as shown, against suitable stops, which prevent them from being brought closer together, while they are free to be moved farther apart against the action of the springs 386, which hold them against said stops. Supported horizontally in suitable guides beneath the plate 382 and arranged transversely thereto is a bolt 385, which we term the "escapement-bolt." Said bolt is provided with a series of ratchet-teeth $385^0$ upon opposite sides thereof, which are in operative proximity to and adapted to be engaged by said pawls. The pawls normally prevent the bolt from being moved in a right-hand direction; but when said bolt is impelled in an opposite direction against the action of the spring 388, Fig. 76, the springs 386 yield and permit said pawls to slip over the ratchet-teeth. The ratchet-teeth $385^0$ upon one side of the bar are in advance of those upon the other to the extent of one-half the distance between the points of the teeth, and the pawls 383 and 0383 are placed at such a distance from each other that as the bar 183 is reciprocated the tooth of one pawl enters into engagement with the ratchet-teeth upon that side just previous to the escape of the tooth of the other pawl from the teeth with which it is adapted to engage. Inasmuch, therefore, as the spring 388 tends constantly to push the escapement-bolt to the right, it is obvious that if the bar 183 be reciprocated the escapement-bolt will be caused to move step by step the distance of one-half a notch with each backward-and-forward movement of the word-key bar, thus moving the notch 391 the extent of the length of one of the notches $385^0$ to the right of its normal position. When the lever-arm 378, therefore, is released from its engagement with the catch 377 by the movement of the line-key, it cannot act because of the interposition of the escapement-bolt, as shown in Fig. 150; but a sufficient movement is permitted to prevent the hook-catch from re-engaging when the line-key is released, and when the escapement-bolt is drawn back, as hereinafter described, so that the notch 391 therein is in its normal position opposite to the lever-arm 378, the latter is free to enter the notch, and thus, through the intermediate mechanism described, to cause the clutching of the line-shaft. When the line-key is actuated, the line-shaft, as hereinafter stated, is clutched by that revolution of the word-shaft which results from the actuation of the line-key. It is important, therefore, that the bolt 385 should be allowed to move to the right by the action of the escapement mechanism only when the word-key is depressed, and not when the line-key is actuated; otherwise, as the bolt would be returned to its normal position by means of that revolution of the word-shaft with which it is intended to clutch the line-shaft, said bolt would not be returned in time and the line-shaft would not be clutched. To prevent, therefore, the action of the escapement mechanism when the line-key is actuated, we provide the following device: Rigidly attached to the line-key rod 235 is an arm 235', Figs. 148, 149, and 150, having a detent thereon, as shown, which, when said rod is pulled forward, is adapted to engage with ratchet-teeth $235^2$ upon the rear side of the escapement-bolt, but is normally out of engagement therewith. Said detent is so adjusted as to hold said escapement-bolt until the pawl 383 is returned by the word-key rod into engagement with the same ratchet-tooth from which it was disengaged by the rearward movement of the word-key rod. By the intervention, therefore, of said detent it is obvious that the escapement-bolt 385 will not be permitted to move to the right when the line-key is actuated, and consequently said bolt will be returned to its normal position in time to permit the lever-arm 378 to move to the rear and accomplish the clutching of the line-shaft, as before described.

In Figs. 161 to 163, inclusive, we have shown the special means employed by us for returning the escapement-bolt to its normal position. Formed upon the upper side of the escapement-bolt 385 are ratchet-teeth 387, adapted to be engaged by a pawl 399, which is pivotally attached to one arm of an elbow-lever 396, having a spring-actuated pin 400, the end of which is arranged to bear upon said pawl, so as to thrust the detent thereof into engagement with said ratchet-teeth 387. Said elbow-lever is pivoted upon a stationary support, as shown, and the other arm thereof is in operative connection with one end of a lever 395. Said lever is pivoted to the frame and the other end is connected by means of a link 394 to a sliding bolt 393, arranged in vertical guides, the upper end of which bolt is preferably beveled, as indicated. A block $391^0$, Fig. 161, is rigidly attached to the word-comb, said block being provided on its upper end with a rearwardly-projecting part, on the under side of which part is formed the cam-surface 392, (indicated in dotted lines,) which is in engagement with the upper end of the vertical bar 393. A spring 0395, acting upon the lever 395, serves to retain the parts in their respective normal positions, as shown in said Fig. 161. When in said position, the free end of the pawl 399 rests upon the inclined face 385' of a stationary block 401, through which the escapement-bolt is passed and which serves as a bearing therefor. When resting upon said face, the pawl is out of engagement with the ratchet-teeth 387, and said escapement bolt is free to move to the right when permitted to do so, as hereinbefore described. With each forward movement of the word-comb the bar 393 is depressed against the action of the spring 0395 by the cam 392. This movement is communicated through the levers 395 396 to the pawl 399, which, being thereby advanced toward the left, rides off from the incline 385' and engages with one of the ratchet-teeth 387. The continued backward movement of said pawl forces the escapement-bolt to the left against the pressure of the spring 388 a distance of one notch, and until the pawl 383, Fig. 148, is brought into engagement with the next succeeding ratchet-tooth in proximity thereto. Thus it will be seen that with each depression of the word-key the escapement-bolt is moved to the right one notch and returned one notch with each resulting movement of the word-comb. It follows, therefore, that if the word-key is depressed once immediately before the actuation of the line-key the escapement-bolt will be returned to its normal position in time to permit the necessary action of the line-key mechanism immediately after without causing any conflict, and if the word-key is depressed twice or more in quick succession immediately before the actuation of the line-key the escapement-bolt will be moved a corresponding number of notches to the right, and hence cannot be returned until the word-shaft is rotated a like number of times. By means of such escapement mechanism the operator is not only enable to actuated the character, word, and line keys to the full limit of his speed, but is insured against causing erroneous justification or conflict of mechanisms.

*Electrical safety-lock mechanism for locking the keys upon actuating the line-key.*—For the purpose of preventing conflict between the setting and line key mechanisms, it is important that the action of the former should be automatically arrested during the operation of the latter. We are enabled to accomplish this result by means of an electromechanical safety-lock, which forms a part of and is adapted to coact with the electrical system hereinbefore described. Pivotally attached to the line-key rod 235, Figs. 213 and 214, is a spring-actuated pawl 236, having a detent thereon, which is adapted to engage with a ratchet-wheel 237⁰, which is mounted upon a stud attached to the side or framework of the keyboard, as clearly shown in Fig. 144. A retaining-pawl 238 is adapted to hold said ratchet-wheel in a given position when actuated. Attached to the ratchet-wheel 237⁰, so as to rotate therewith, but insulated therefrom and from the stud upon which they are pivoted, is an electrical contact-wheel 237, the teeth of which are in permanent metallic contact with a spring 239, which is attached to the frame by means of a suitable block properly insulated therefrom. A second contact-spring 240 is also attached to and insulated from said frame, but is so adjusted as to be normally out of contact with the teeth of the contact-wheel 237. Said springs are electrically connected with the dynamo 3, Fig. 85, and with the electromagnet 24, Figs. 84 and 85, by means of any suitable electrical connection. Arranged upon the side of the keyboard is a horizontal bar 0238, Fig. 213, one end of which is supported upon a stud passing through a slot in said bar, while the other is pivotally secured, as shown, to the end of the lever-arm 378, so that as the latter is actuated said bar is caused to be thereby reciprocated. A spring-actuated pawl 0239 is attached to the bar 0238, which pawl is adapted to engage with the ratchet-wheel 237⁰, for the purpose hereinafter stated. The operation of said device is as follows: When the line-key is actuated by the operator and the line-key rod 235 is thereby drawn toward the front of the keyboard, the pawl 236 rotates the wheel 237⁰ a sufficient distance so that the spring 240 is brought into contact with a tooth upon the contact-wheel 237; and, as the spring 239 is also in contact with a tooth upon the opposite side, the electric circuit is closed with the dynamo 3, Fig. 85, and so remains until released, as hereinafter described, upon the completion of the movement of said line-shaft mechanism. As the ratchet-wheel 237⁰ is held against backward movement by the retaining-pawl 238, the return of the line-key rod and pawl 236 to their respective normal positions does not serve to displace said contact-wheel. The electric circuit adapted to be closed by the action of said wheel is as follows: From the dynamo 3, Fig. 85, to the bed, thence over a suitable conductor 25 to the spring 239, thence through the contact-wheel to the spring 240, thence over the line 25 to the magnet 24, and finally around said magnet and back to the dynamo. This action serves to lock the returning-bar 188, and thereby the character and word keys, until the circuit is broken by the movement of the wheel 237, which is accomplished as follows: When the line-key is actuated, the catch 377 is released, thereby permitting the lever 378 to be thrown back, as before described. The latter carries with it the bar 0238 a sufficient distance to enable the pawl 0239 to engage with the next succeeding tooth of the ratchet-wheel 237⁰. When the lever 378 is positively returned to its normal position in the manner hereinbefore described during the revolution of the line shaft, it moves the bar 0238 toward the front of the keyboard, and through the action of the pawl 0239 rotates the wheel 237⁰, and with it the contact-wheel 237, a sufficient distance to separate the spring 240 from the tooth with which it was engaged, thereby breaking the electrical circuit and releasing the returning-bar.

*Electrical safety-lock in connection with the measuring-slide.*—In order to prevent a conflict of parts when the measuring-slide has reached the limit of safety during the operation of setting type, we provide an electro-mechanical safety-lock for temporarily locking the character-keys. Attached to the beam 151, Fig. 110, is a contact-spring 241, which is insulated from said beam, as shown, and connected by means of any suitable electrical connection with the electromagnet 24 and dynamo 3, as indicated in diagram in Fig. 85. Upon the measuring-slide 287 is formed a contact-shoulder, (indicated in said last-mentioned figure,) which is adapted to engage with said spring when said measuring-slide has reached the limit of safety in its movement.

The electrical circuit is as follows: From the dynamo 3 to the bed 4, thence by the line 26 to the measuring-slide, and from the latter, when in contact with the spring 241, to the line 27, thence around the magnet 24 and back to the dynamo, thus locking the keys in the manner hereinbefore described and preventing the setting of type.

*Special line-key mechanism and electrical safety-lock in connection with the combination-plates and other parts.*—It is obvious that when the maximum number of words have been set for which combination-plates have been provided the further setting of type, as well as the depression of the word-key, should be prevented until the box of combination-plates is returned to its normal position. It is also obvious that the action of the line-key should be withheld until the minimum number of words provided for on the combination-plates are set. We are enabled to accomplish these results by the following means: Pivoted upon the side of the keyboard is an arm 243, Figs. 144 and 213, the free end of which is in contact with a stud upon the lower end of a vertical slide 0244, which is fitted in suitable guides adapted to permit an upward movement thereof. A spring secured to the arm 243, as shown, serves to press said arm downwardly, and with it the slide 0244. Said slide is provided with a series of ratchet-teeth, as shown, which are in operative proximity to pawl 663, pivoted upon one arm of an elbow-lever 662, which in turn is pivoted to the frame. Said pawl is provided with a detent adapted to engage the teeth upon said vertical slide and with a spring to press said detent into proper engagement therewith. A retaining-pawl 664 is also provided with a detent, which is likewise held in engagement with said ratchet by means of a suitable spring. The other arm of said elbow-lever 662 is connected with the word-key bar 183 by means of a stud, as clearly shown in Fig. 215. The ends of the pawls 663 and 664, respectively, project into notches formed in the end of the bar 0238, hereinbefore described, which bar is adapted, when moved in the manner hereinafter specified, to release said pawls. The slide 0244 is provided with a projection 666, which, when the slide 0244 is in its normal position, is in engagement with a notch formed on the line-key rod 235, as indicated in dotted lines in Fig. 213 and shown in full lines in Fig. 215$^A$.

Attached to the arm 243 is a contact-spring 0243, which is adapted to engage with an insulated plate 244. Said spring and contact-plate are each properly insulated and are connected by means of suitable electrical connections with the electromagnet 24 and the dynamo 3. Interposed in said circuit is a special key 245, Figs. 85 and 144, which we term the "special line-key." Enlarged detail views of said special line-key 245 are shown in Figs. 216 and 217. Said key consists of a flat bar arranged to slide horizontally on suitable guides and provided with a hook at the end adapted to be actuated by the finger of the operator, as shown. A depending projection 667 upon said key is in contact with a spring 673, arranged in a cylinder 672, which is adapted by pressure against the part 667 to hold said key in a normal position. An upward projection 668 is also formed upon said key, which is provided with a yoke, as shown, arranged to partially embrace the line-key rod 235 and thus to be brought into engagement with a collar 676, loosely adjusted upon the latter. One end of said collar is in engagement with a spring 675, inclosed within a cylinder 674, attached rigidly to said line-key rod. The other end of said collar bears normally against a stop-pin on the line-key rod, as shown. A contact-spring 669, attached to said key and insulated therefrom, is adapted to bear against and to normally connect two insulated plates 670 and 671, attached to the side of the keyboard. Said plates, respectively, are electrically connected in any well-known way to the dynamo and electromagnet 24, as hereinafter described. The electrical circuit employed in connection with said circuit making and breaking devices of the special line-key and other mechanism is as follows: From the dynamo to the bed by the line 1, thence by the line 28 to the contact-spring 0243 and plate 244, when in contact, to the special line-key 245, the contact-spring of which, as stated, normally connects the two contact-plates and closes the circuit at this point, as shown in Figs. 85 and 216, thence over the line 28 to the electromagnet 24, and thence back to the dynamo.

The mechanism described above in connection with Figs. 85, 144, 213, 214, 216, and 217 is adapted to act as a safety-lock to prevent a further movement of the combination-plates when they have reached their upward limit, by preventing the word-key from being actuated, to lock the keys and prevent a further setting of type after the maximum number of words provided for in the machine have been set, and to lock the line-key until as many words are set as are provided for upon the first combination-plate, so that the machine can in no event fail to provide the proper spacing.

The operation of said mechanisms in the order of their respective functions is as follows: With each depression of the word-key the lever 662, and with it the pawl 663, is actuated, thus raising the slide 0244 one notch. The arm 243, being in contact with the stud 661 upon said slide, is actuated accordingly. The contact-spring 0243 is so adjusted with reference to the contact-plate 244 and the notches in said slide that the upward movement of the slide will cause the spring and plate to be brought into contact when the word-key has been depressed fifteen times, or such a number of times as corresponds to the greatest number of words provided for upon the combination-plates. The electric circuit being thereby closed through the magnet 24 and dynamo 3, Fig. 85, the returning-bar is locked, as described, and no more type can be set until the circuit is broken. This is accomplished by pulling the special line-key 245 toward the front of the machine, which serves to disconnect the plates 670 and 671, Fig. 216, by drawing the contact-spring 669 off from the former. At the same time the yoke upon the extension 668 is brought into engagement with the collar 676 and moves the same against the tension of the spring 675. If the line-key rod 235 is not free to move at the instant the spring is compressed, it serves to actuate said rod as soon as the same is free. The latter action in turn causes the release of the lever-arm 378, which withdraws the pawls 663 and 664 from engagement with the teeth of the slide 0244, thereby releasing the latter, which, through the action of the spring-actuated arm 243, is moved to normal position, while the contact-spring 0243 is moved off from the plate 244, thus breaking the electric circuit. The return movement of the lever-arm 378 to its normal position, as hereinbefore described, actuates the slide 0238 and permits the pawls 663 and 664 to again engage with the teeth of the slide 0244.

It will thus be seen that the single movement of the operator in actuating the line-key for the purpose of breaking the circuit with the magnet 24 serves also to actuate the line-key rod, thereby insuring the required automatic movement thereof, which otherwise, owing to the neglect of the operator, might not take place.

*Mechanism for locking the keys until the minimum number of words provided for in the combinations have been set.*—As before stated, the minimum number of spaces provided for in the combination-plates is three, or the number required for four words. Hence it is important that the line-key should not be actuated until the setting of the fourth word, and until such time as the word-key shall have been depressed three times. It will be observed that the projection 666, Figs. 213 and 215^A is in engagement with the notch 665 of the line-key rod when the slide 0244 is in its normal position, thereby locking said rod against movement. Said projection is so adjusted as to remain in engagement with said notch until, through the repeated action of the word-key, the slide 0244 is raised three notches, which corresponds to the setting of a like number of words, so that if the line-key be actuated with the setting of the fourth word the first combination-plate will be presented to the pin-blocks and thereby cause the proper spacing of said line. With each movement of the special line-key it is caused when released by the operator to be returned to its normal position through the action of the spring 673.

*The special em quad key.*—In paragraphing it is desirable to enable the operator to fill out a line rapidly with quads and actuate the word-key by the depression of one of the quad-keys. To accomplish this result we so connect the em-quad key with the word-key mechanism as to enable the latter to be actuated by the depression of the em-quad key, while the word-key may be depressed without actuating the em-quad key. In Fig. 218 we have shown the means which we prefer to employ for accomplishing this result. In operative connection with one arm of a bell-crank lever 682, which is pivoted to a bracket beneath the keyboard, is the special em-quad key 681. A projection upon said lever is in operative proximity to a rod 683, which is adapted to actuate an initial plunger for rejecting the quads from the em-quad channel. Said lever is connected by means of a link 684 to a lever 686, pivoted to a bracket 685, which is attached to the frame. The other end of said lever is in turn connected with a lever 687, pivoted to a bracket 688. The other end of the latter lever is adapted to engage with a projection upon a plate 689, which is connected with the word-key 182. The depression of said special em-quad key causes the ejection of an em-quad in the setting-raceway and also actuates the word-key 182 by depressing the plate 689. When the word-key, however, is depressed the special em-quad key is not actuated thereby.

The advantage of employing said special em-quad key is that in paragraphing the em-quad key, the special em-quad key, and the en-quad key may be simultaneously and successively depressed, thus enabling the line to be filled out with groups of quads, each of which groups consists of two em-quads and one en-quad. As the word-key is also automatically depressed in each instance, these groups are advanced by the word-comb and are automatically justified in the same manner as the lines made up of regular words.

While we have hereinbefore described what we regard as the best means for embodying our invention, yet it is obvious that the manner of construction may be varied indefinitely without departing from the broad principles involved. It is apparent that the combination forms may be utilized whether placed upon separate plates each representing the various combinations required for lines of a given number of words or upon a cylinder or an endless apron divided into corresponding divisions, and it is immaterial, so far as the principle involved is concerned, whether the initial action of the space-ejecting plungers be imparted directly by the combination forms or whether additional mechanism be interposed. The spaces may be inserted into the line one at a time with each revolution of the word-shaft, or the spaces for an entire line may be inserted at once upon the revolution of the line-shaft. In the latter case instead of one a series of space-cases corresponding in number to the maximum number of spaces in a line would be required.

Instead of employing separate mechanism for actuating the combination forms they may be brought into the required position by the direct action of the measuring-bar, and instead of measuring the words separately spaces may be arbitrarily inserted for the purpose of measurement and the entire line measured as a whole, allowance being made for said arbitrary spaces when the latter may be removed and the proper spaces inserted to conform to the combination presented.

Instead of employing eleven different spaces and graduating them throughout by .005 of an inch, as we prefer to do, the number may be decreased with a like result. Assuming six spaces, for example, to be employed, five of them may be increased by a unit-variation of .005 of an inch, and the sixth may be double the width of the fifth. The graduation might then be .020, .025, .030, .035, .040, and .080; but although preferring them, as hereinbefore stated, in no event do we wish to be understood as confining ourselves to spaces having a fixed unit of graduation, as it is clearly manifest that said combination forms may be adapted to the arbitrary system of spacing in common use, in which the graduation is varied.

While we regard a word conveyer or comb having a four-motion movement and widely-separated teeth, substantially as described, as the best means for keeping the words separate until the spaces are inserted, it is manifest to us that a like result may be accomplished by temporarily inserting spaces, as suggested, and utilizing them in the manner hereinafter described to permit the line-measurement and the substitution of permanent spaces.

The multiplication of the line-measurement, so desirable in making the measurement transfer to the combination forms, as hereinbefore described, may be caused by interposing a suitable lever between the measuring-bar and measuring-gage, or between said bar and the cylinder upon which the combinations are placed, as the case may be.

For the purpose of sweeping the words past the space-case we have employed, as described, an auxiliary word-comb having an extended movement. This may in practice be dispensed with and one or more spaces assembled and inserted together, if desired, by means of a single wide plunger.

While we greatly prefer, for the reasons hereinbefore set forth, to take the actual measure of the type and to transfer that measurement to the combination forms, yet it is clearly not essential to the use of said forms, as an arbitrary indicated measurement could be transferred in the same way by placing ratchet-teeth upon the measuring-bar and actuating said bar with the depression of each key. In such case each ratchet-tooth would represent a unit of measurement, and each key might be so connected therewith as to move said bar one or more units, according to the width of the type represented thereby. In this connection we desire it to be understood that where in the claims we have referred generally to the measurement of the words or line without limiting words or clauses, said reference is intended to be construed as indicating any means for ascertaining the length of a line, whether it be indicated arbitrarily or by actual measurement.

In Figs. 236 to 242, inclusive, we have shown views of varying forms of mechanism adapted to illustrate the modifications suggested in the foregoing statement.

Mounted in bearings in suitable uprights is a cylinder 691, Figs. 236, 237, 239, 241, and 242, provided with suitable combinations of pins or other projections or holes, as may be preferred, upon its periphery. Each longitudinal section, as indicated, represents a word-series of combinations and may be provided with all the combinations necessary to justify all lines of a given number of words in the same manner as a combination-plate. By rotating the cylinder a given section may be brought into operative position by the rotation of the word-shaft, which is equivalent to the raising of a given plate, while the movement of the measuring-bar in like manner may cause the presentation of the proper combination in a given section. Loosely pivoted upon the shaft upon which said cylinder is mounted is an elbow-lever 692, having a spring-actuated pawl 693 upon one arm adjusted to engage with ratchet-teeth upon a disk secured to the end of said cylinder. The other arm of said lever is provided with transverse slots 694 706, Fig. 237, as shown, into the latter of which is projected a slide, as indicated, which is loosely secured to a crank-pin upon a disk 707, attached to the word-shaft 266. Each revolution of said word-shaft is adapted to rock said lever, and by means of the pawl 693 to rotate said cylinder to the extent of the width of one section. We prefer to employ twelve sections, corresponding to the twelve combination-plates hereinbefore described. Attached rigidly to the cylinder-shaft is a pinion 708, Figs. 236 and 237, which is in engagement with a gear-segment, as shown, upon one end of a lever 709, the other end of which is provided with a weight 710. Said lever is loosely pivoted upon the word-shaft 266. Arranged horizontally beneath the cylinder is a gage-bar 436, having ratchet-teeth upon opposite sides, as shown, those upon one side being adapted to engage with the teeth upon said cylinder-disk, while those upon the other are engaged by a pawl 711. A spring 712 is adapted to hold the ratchet-teeth of said gage-bar in yielding engagement with the teeth upon said disk. A detent 433 is adapted to engage with a notch in said gage-bar, the detent being secured to one end of a pivoted lever 713, the other end of which is provided with a pin engaging with a cam-groove in the face of a cam 580, mounted upon the line-shaft 424. The gage-bar is notched upon the end in the same manner as the gage-block hereinbefore described and is intended to engage with similar teeth upon a measuring-plate 327, Fig. 236. The latter is secured to a bar 714, as shown, having notched teeth adapted to engage with a clamping-block 715. The bar 714 is attached to the long arm of a lever 716, pivoted to a stationary point, the other end of which is provided with a pin, as shown, adapted to engage with one or the other of two pins upon a measuring-bar 307.

A lever 579, a pin in the end of which is in engagement with a groove in a cam 580 upon the line-shaft 424, is rigidly secured to a rock-shaft 0578, Fig. 237, to which is secured a vibratory frame having a series of levers 588, pivoted at the top of said frame, as shown, and held normally against a cross-bar 589 by means of springs. Projections 717 upon said levers are adapted to engage with the combination pins or projections upon the cylinder when the latter are properly presented. Space-ejecting plungers 604 are arranged, as shown, in operative proximity to the lower ends of said levers, and a suitable carrier having wings 599 and 600 is adapted to actuate said plungers when the latter are initially moved by said levers in substantially the same manner as hereinbefore described and as shown in Fig. 185.

In the drawings provision has been made for the spacing of lines not exceeding five words, and hence four separate space-cases 107, Fig. 236, are represented, a separate set of vibratory levers and of ejecting-plungers being provided for each space-case. As the largest number of words provided for is five, only a part of the surface of the cylinder is used for combinations.

The operation of said modified device is as follows: The word-key having been depressed at the end of each word, the cylinder, through the action of the lever 692, is rotated sufficiently to cause the section corresponding to the number of words in that line to be brought into an operative position before the projections 717 upon the levers 588. Upon actuating the line key the clamping-block 715 is actuated to clamp the bar 714 in the position in which it has been left by the action of the measuring-bar 307, and the cam 580 is rotated, which, through the action of the lever 710, withdraws the detent 433, thereby releasing the gage-bar 436, whereupon the weight 710, acting through the gear segment and pinion described, causes the cylinder to revolve until the end of the gage-bar is brought into contact with the gage-plate 327. The position of said gage-plate is controlled by the length of the line through the lever 706 and measuring-bar 307, as stated.

We have not deemed it necessary to show any means for returning the gage-bar 436 to its normal position, as it is obvious that this might be accomplished in various ways. Suffice it to state, however, that upon the return of said bar it may be depressed against the action of the spring 712, thus releasing the teeth thereof from those of the disk and permitting the cylinder, through the action of the weighted lever, to return to its normal position, when the same operation may be repeated with the next line.

In the construction described it will be observed that in the transfer of measurement from the measuring-bar to the gage-plate the multiplication of said measurement is made through the lever 706. It will also be apparent that the initial action of the ejecting-plungers is caused by the direct engagement of the levers 588 with the combination forms, thereby enabling the pin-blocks to be dispensed with. Moreover, in this construction all of the spaces for the justification of a line are ejected at once into the raceway 137, as shown in Fig. 236, in which the words are indicated as separated upon said raceway with the spaces intervening, in which case it is obvious that the continued movement of the word-comb would serve to collect said words and spaces into a compact line ready for insertion in the galley.

In Figs. 241 and 242 is indicated a means whereby the measurement of the line may be transferred directly from the measuring-bar 307 to the combination-cylinder 691 through the intervention of an elbow-lever 716, which is the equivalent of the lever 716 in Fig. 236, arranged to cause a greater multiplication. The gage-bar 436 is arranged to actuate the cylinder by means of a pawl, as shown in Fig. 242.

In the diagram Fig. 240 is indicated a means for keeping the words separate without the intervention of a word-comb by means of arbitrary spaces 718, of a greater length than the type 719, which spaces may be inserted into the raceway from a suitable type-case or otherwise. The type and arbitrary spaces may be advanced by a conveyer 720 until the ends of the foremost space are brought into contact with abutments 721, when said space may be ejected by means of a plunger 722.

In the meantime a space may be ejected from the space-case 107 upon the raceway and the line advanced until the next arbitrary space is brought against the abutments, which are sufficiently separated to permit the type to pass between, as shown. By means of a toothed conveyer 723, to which may be imparted a four-motion movement and the teeth of which are adapted to enter notches indicated in said arbitrary spaces, the word with the space is advanced until brought into contact with the preceding portion of the line, in which the proper spaces have been introduced. It is obvious that the introduction of arbitrary spaces in this way may be employed for the purpose of enabling the entire line to be measured at once, instead of measuring the words separately, in which case only the measuring-bar need be employed, the word-measuring slide being dispensed with. Should this means of measurement, however, be em-employed, it is obvious that allowance should be made in the adjustment of the combination forms for said arbitrary spaces.

While we have shown and described our improved justifying machine as applied to and connected with a specific form of type-setting machine, it is obvious that it may be applied to any form of type-setting machine adapted to set and deliver the type upon a raceway at a given point.

By means of our improvements we are not only enabled to accomplish all that the human compositor is capable of doing by hand, but to secure more artistic justification and that with vastly greater speed and accuracy. As a result of more perfect justification and uniform spacing, the amount of matter contained in a given column or page composed by our machine is greater by a considerable per cent. than that of ordinary hand-work in which a corresponding size of type is employed.

Our machine, although embodying many parts, is simple and durable in construction and positive and accurate in operation, while every contingency liable to occur in composition is so carefully and amply provided for by means of special automatic appliances that the chances for error are confined almost, if not wholly, to the carelessness or inefficiency of the operator, who has only to follow his copy correctly to produce perfect results.

Having thus described our invention, we claim—

1. An automatic type justifying machine provided with a series of combination forms for determining the selection of the spaces, means for indicating the number of the respective words in a line, means for indicating the measurement of said words, and interposed means for controlling the relative or determining position of said forms, substantially as described.

2. The combination in a type justifying machine, of a series of combination forms for determining the selection of the spaces, automatic mechanism for indicating the relative length of the components of a line and means for transferring said indicated measurement to the combination forms, said mechanism being arranged to operatively control the relative position of said combination forms, substantially as described.

3. An automatic type justifying machine provided with a series of combination forms for determining the selection of the spaces, an automatic type measuring device for taking the actual measurement of the line and means for transferring said measurement to said combination forms for operatively controlling the relative position of said forms according to said actual measurement, substantially as described.

4. An automatic type justifying machine provided with a series of combination forms representing the varying combinations necessary to justify lines of type composed of varying numbers of words and varying numbers and widths of characters respectively, means for controlling the respective positions of said combinations by the length of the line to be justified, a space receptacle provided with a series of spaces, and means in operative proximity to and controlled by the varying positions of said combination forms, for automatically inserting said spaces into the line of composition, substantially as shown and described.

5. An automatic type justifying machine provided with a series of movable combination forms representing the varying combinations necessary to justify lines of type composed of varying numbers of words and varying numbers and widths of characters respectively, means for controlling the respective positions of said combinations by the measurement of the type and the number of words in the respective lines, a space receptacle provided with a series of spaces of different widths, and means in operative proximity to, and controlled by the varying positions of said combination forms, for automatically inserting said spaces into the line of composition, substantially as shown and described.

6. An automatic type justifying machine provided with a series of movable combination forms representing the varying combinations necessary to justify lines of type composed of varying numbers of words and varying numbers and widths of characters respectively, means for controlling the respective positions of said combinations by the actual measurement of the type and the number of words in the respective lines, a space receptacle provided with a series of spaces, a race-way, means for maintaining the words separate one from another upon the race-way, and means in operative proximity to, and controlled by the varying positions of said combination forms for automatically inserting said spaces into the line of composition, substantially as shown and described.

7. An automatic type justifying machine in which is embodied means for automatically measuring the width of the type as it is delivered upon a race-way, means for indicating concretely the varying combinations in width of spaces necessary to justify lines of a given number of words, means for bringing each word combination series into a given zone, means for selecting the particular combination in that zone which conforms to a given measurement of the words composing the line, and means for placing that particular combination of forms in operative proximity to mechanism for ejecting the spaces into the line of composition,—substantially as shown and described.

8. In a type justifying machine, the combination of a race-way, a conveyer for moving the type thereon, a measuring device in conjunction therewith for engaging the type and measuring the same in the order of delivery of the words, a primary series of combination forms adapted to conform to the number of words in a line, and which is provided with subordinate combination forms arranged in series to indicate all the different widths of spaces necessary to justify lines of a like number of words but varying in measurement, means for causing the proper combination, as indicated by the measurement, to be brought into operative position, a space-case provided with suitable spaces, plungers for ejecting the spaces into the race-way, mechanism having movable parts adapted to be set abnormally to conform with any given combination presented thereto, means for bringing said abnormally set parts into operative proximity to plunger actuating mechanism, means for intermittently advancing and maintaining the words separate upon the race-way, line mechanism for causing the insertion of spaces and depressing the justified line into a suitable galley, and means, under the control of the operator, for initiating the movement of said word and line actuating mechanisms respectively, substantially as specified.

9. The combination in an automatic justifying machine, a type race-way of an intermittently movable conveyer for conveying and maintaining the words separate one from another upon the race-way, means for actuating the same at the will of the operator, and a suitable driver or conveyer for advancing the words in operative proximity thereto, substantially as shown and described.

10. In an automatic justifying machine, a type race-way, a word comb provided with suitable teeth for advancing the words in a separated condition upon a race-way, and means for actuating the same at the will of the operator, substantially as set forth.

11. In an automatic justifying machine, a type race-way, a word comb and means for imparting a four motion movement thereto at the will of the operator, substantially as shown and described.

12. In an automatic justifying machine, a type race-way, a word comb normally at rest, mechanism for imparting a four motion movement thereto, a continuously moving main driving mechanism and means for bringing said word comb mechanism into engagement with the main driving mechanism at the will of the operator, substantially as shown and described.

13. In a type justifying machine, the combination of a type race-way, a word-comb for moving the type in a separated condition upon the race-way, and a driver having a slow forward movement for conveying said type from a delivery point, into the range of action of the word-comb, substantially as shown and described.

14. In an automatic justifying machine, a type race-way, a conveyer for delivering type from suitable setting mechanism, a measuring slide in proximity to the race-way and arranged to be engaged by the foremost type in its forward movement, means for returning said slide to engage with the next succeeding word and means for registering the extent of each succeeding forward movement of said measuring slide, substantially as shown and described.

15. In an automatic justifying machine, means for delivering type from suitable setting mechanism, a race-way, a measuring slide in operative proximity thereto, and arranged to be engaged by the foremost type in its forward movement, a secondary slide or bar in connection with the first, means for clamping the two together during the forward movement of the first and means for releasing said clamp during the backward movement of the first, whereby an accurate measurement of each word may be obtained as it is advanced as well as the aggregate measurement of the words composing a given line, substantially as specified.

16. In an automatic justifying machine, the combination of a race-way, means for delivering type thereon from suitable setting mechanism, a conveyer having a slow forward movement for farther advancing said type, a measuring slide in operative proximity to said race-way and arranged to be engaged and pushed forward by the type in its forward movement, means for disengaging said slide from contact with the type thus advanced and carrying it back to its normal position, a secondary slide or registering bar in operative connection therewith, and means for alternately clamping the latter to said measuring slide and to a stationary point, substantially as and for the purposes set forth.

17. In an automatic justifying machine, means for delivering type upon a race-way from suitable setting mechanism, a measuring slide in operative proximity to said race-way and arranged to be engaged and pushed forward by the type in its forward movement, means for returning said slide to engage with the next succeeding word, means for registering the extent of each forward movement of the slide, a series of combination forms representing respectively all of the combinations of spaces necessary to justify lines of a given number of words, and means for moving said series of combination forms after having been brought into a given position, a farther distance corresponding to the difference between the aggregate measurement of the words in a line and the ultimate length of that line when justified, substantially as shown and described.

18. In an automatic justifying machine, the combination of a measuring device for determining the aggregate measurement of the words adapted to form a line, a series of combination forms for each given number of words in a line, means for indicating to said forms the extent of the movement of said measuring device and means for actuating said forms to a greater extent but in relative proportion to the movement of said measuring device, substantially as specified.

19. In an automatic justifying machine, the combination of a measuring device for determining the aggregate measurement of the words adapted to form a line, a series of combination forms for each given number of words in a line, means for indicating to said forms the extent of movement of said measuring device and means for independently and positively actuating said forms to a greater extent but in relative proportion to the movement of said measuring device, substantially as specified.

20. In an automatic justifying machine, the combination of a device for measuring the length of a line, a series of combination forms for determining the selection of spaces, means for transferring said measurement to definitely control the movement of said forms, and means for multiplying said measurement according to a proportionate standard, substantially as described.

21. In an automatic justifying machine, the combination of a measuring device adapted to take the aggregate measurement of any given number of words composing a line, a series of groups of combination forms each group representing the combinations necessary to justify any line of a given number of words, means for moving each successive group into a given position with the advancement of the respective words, and means for automatically varying the position of a given group in exact proportion to the difference between the measurement of the full line and the aggregate measurement of the words composing it, substantially as shown and described.

22. The combination in a type justifying machine of a series of combination forms, a measuring device for measuring words, and means for transferring the result of that measurement to said forms, substantially as specified.

23. The combination in a type justifying machine of a device for measuring the type, mechanism for transferring the result of said measurement to a movable clamping block, combination forms for determining the selection of spaces, positively actuated mechanism having a constant extent of movement for actuating said space determining combinations, and an intermediate clamping mechanism in operative connection with said clamping block, whereby the extent of movement of said combination forms may be controlled by the measurement of the type while said type measuring mechanism is relieved from undue strain, substantially as set forth.

24. The combination in a type justifying machine, of a series of combination forms indicating the varying combinations of spaces necessary to justify lines of a given length, a measuring device for measuring words, means for placing said forms in a given position in accordance with the result of said measurement, a space reservoir and means in operative proximity to said forms, for ejecting such spaces therefrom as conform to the combination forms that are brought to said given position, substantially as set forth.

25. The combination in a type justifying machine of combination forms indicating the varying combinations of spaces necessary to justify all lines of a given length, a measuring device for measuring words, means for placing said forms in a given position in accordance with the result of said measurement, means for separating and temporarily maintaining the words separate from each other as they are advanced upon the race-way, a space reservoir, and intermediate mechanism adapted to be given an initial movement by said forms whereby the respective spaces conforming thereto may be ejected from the reservoir into position between the separated words, substantially as shown and described.

26. The combination in a type justifying machine of a series of combination forms expressive of the varying combinations of spaces necessary to justification, a measuring device for measuring words, means for placing said forms in a given position conformatory to said measurement, a suitable race-way, means for temporarily preserving the words separate from each other as they are advanced thereon, a space-case containing all the spaces necessary for justification, means for ejecting the same into the race-way, mechanism for controlling said ejecting mechanism in accordance with the combination forms presented to control the justification of the respective lines, and means for automatically advancing and placing the justified line in a suitable receiver or galley, substantially as specified.

27. An automatic type justifying machine provided with combination forms for selecting the spaces to be inserted in the line, said forms being arranged in groups according to the possible variation in the number of words in the line, and in sub groups conforming to the possible variation in the difference between the aggregate measurement of the words composing the line, and the ultimate measure of said line when justified, substantially as shown and described.

28. An automatic type justifying machine provided with a series of combination forms arranged in groups corresponding in successive order to the varying number of words in the lines, each group representing all the space combinations necessary to justify said lines respectively, substantially as described.

29. An automatic type justifying machine provided with a series of combination forms arranged in groups corresponding in successive order to the successive increase in the number of words in the lines, each group representing all the space combinations necessary to justify said lines respectively, means for bringing said groups in a given position successively in the order in which the words are presented, a measuring device for measuring type and means for automatically moving any group of combinations to conform to said measurement, substantially as described.

30. An automatic type justifying machine provided with combination forms for selecting the spaces to be inserted in the line, the relative position of which forms respectively, is controlled by the measurement of the type, a plurality of blocks arranged to move in operative proximity to said forms, each block having a series of movable parts adapted to be acted upon and moved into an abnormal position by contact with said forms, said parts corresponding in number to the number of different spaces in the space-case, and mechanism for selecting and ejecting the spaces, said mechanism being selected and initiated in its movements by said abnormally set parts, substantially as shown and described.

31. An automatic type justifying machine provided with combination forms for selecting the spaces to be inserted in the line, the relative position of which forms respectively is controlled by the measurement of the type, a plurality of blocks arranged to move in operative proximity to said forms each block having a series of movable pins corresponding in number to the whole number of different spaces and adapted to be moved into abnormal positions by contact with said forms, a series of levers for ejecting the spaces and means for initiating the movement of said levers by the interposition in the path of movement of the latter of said abnormally set pins, substantially as shown and described.

32. An automatic type justifying machine provided with combination forms arranged in groups upon separate plates, said plates corresponding in their order to the number of words in the lines, and the forms thereon representing all the space combinations necessary to justify said respective lines, means for advancing said plates one by one to a given position in the order in which the words are set, and means for indicating, by the measure of the words, the required combination upon a given plate corresponding to the spaces required to justify a line of the number of words indicated by said plate, substantially as described.

33. An automatic type justifying machine, provided with combination forms arranged in groups upon separate plates which in turn are arranged in successive order according to the number of words in a line, means for automatically measuring the words in successive order, a race-way, a word conveyer for advancing said words separately thereon, a word shaft normally at rest and in operative connection with said combination plates and said word conveyer respectively, a word key for initiating the revolution of said word-shaft, a measuring device for measuring the words and for indicating said measurement by means of a suitable gage, a line shaft normally at rest, a line-key for actuating the same, means for connecting said word-shaft with said combination plates and means in operative connection with said gage for determining the extent of the movement of said plates whereby the combination plate representing the number of words in a given line may be brought into a given position and the required combination thereon determined by said measuring device, substantially as shown and described.

34. In a justifying machine, a series of combination plates arranged parallel to each other, means for imparting a step-by-step vertical movement thereto with the advancement of each word, means for measuring the type and for moving in its own plane, the last plate presented a distance proportioned to the aggregate measurement of the words in the line, substantially as specified.

35. An automatic type justifying machine provided with continuously moving driving power, revoluble word and line shafts respectively normally at rest, a race-way, means for actuating the type thereon, a word conveyer for advancing the words separately from each other upon said race-way, a measuring device for measuring words, combination forms for governing the selection of the spaces, means for operatively connecting said word-conveyer with said word-shaft and said combination forms with said line shaft, suitable clutches for connecting said line and word shafts with a continuously moving source of power, and line and word keys for bringing said clutches into action, substantially as specified.

36. An automatic type justifying machine provided with a series of combination forms adapted to be brought by the measurement of the type into a given position for the selection of spaces, a series of blocks arranged upon an endless track, movable pins therein adapted to be moved into abnormal positions by said forms, a series of vibratory levers for causing the ejection of spaces and means for automatically bringing said pins into the path of said levers, substantially as shown and described.

37. An automatic type justifying machine provided with a series of combination forms for determining the selection of the spaces and a series of independently movable pin-blocks loosely mounted upon an endless track, means for bringing a number of said blocks corresponding to the number of words in a line into contact with a given group of forms, a series of vibratory space ejecting levers corresponding in number to the pins in the respective blocks and means for moving said blocks one by one into operative proximity to said levers, whereby the abnormally set pins in the former may modify the action of the latter in the manner and for the purpose set forth.

38. In a justifying machine a series of combination forms for governing the selection of the spaces, a series of independently movable pin-blocks arranged upon an endless track to operate in conjunction with said forms and means for projecting said pin blocks against said forms at predetermined times, substantially as specified.

39. An automatic justifying machine provided with a series of movable pin-blocks each having a series of pins adapted to be set by means of combination forms, a series of vibratory levers arranged in the path of movement of said blocks, a space-case and means for ejecting the spaces therefrom through the action of said levers when modified by the interposition of said pins, substantially as and for the purposes specified.

40. In a justifying mechanism, a movable pin-block provided with a series of movable pins corresponding to the number of spaces required for justification, and means for automatically setting said pins into an abnormal position for controlling the action of ejecting mechanism, substantially as described.

41. In a justifying device a series of movable pin-blocks each having a series of movable pins, combination-plates formed to move said pins into abnormal positions according to a predetermined order, means for actuating said pin-blocks and for locking the same in position upon a suitable way, and ejecting mechanism adapted to be controlled in its action by such pins as may be set in an abnormal position, substantially as shown and described.

42. An automatic justifying machine provided with a device for measuring type, a gage for registering such measurement, a series of combination forms for determining the selection of the spaces and means for actuating said forms at the will of the operator independently of the direct action of said measuring device whereby said gage may determine the extent of movement of said forms, substantially as set forth.

43. An automatic justifying machine provided with a series of combination forms for determining the selection of the spaces and a measuring device arranged to co-act with and control the movement of said forms consisting of a plurality of disconnected parts in conjunction with automatic clamping mechanism, whereby the measurement of one part may be transferred to another and thence to the combination forms, substantially as shown and described.

44. The combination in an automatic justifying machine of a series of combination forms for determining the selection of the spaces, positively actuated mechanism having a constant extent of movement for actuating said forms, a disconnected type measuring device and means for imparting the result of its measurement through automatic and intermittently acting clamps to the point of connection between said combination forms and said constant driving mechanism, substantially as shown and described.

45. The combination in an automatic type justifying machine of a series of combination forms for determining the selection of the spaces, means for actuating and presenting the same in conformity to the varying length of lines and the varying numbers of words therein, a space-case, plungers normally at rest for ejecting the spaces into the line of composition, mechanism for actuating said plungers when the latter are initially moved into engaging positions therewith, and means, in operative proximity to said combination forms and controlled thereby for causing an initial action to be imparted to such of said ejecting plungers as may conform to any given combination presented, substantially as specified.

46. In a justifying machine, the combination of a measuring slide for measuring words, a measuring bar adapted to be moved thereby for the purpose of indicating the aggregate measurement of the words in a line, a serrated measuring plate adapted to be actuated by said bar, a movable gage-block the extent of the movement of which is controlled by said measuring plate, a line-shaft, means for causing its revolution at the end of each line, a slide in operative connection with a cam upon said line-shaft, a secondary slide adapted to be moved by said line-shaft slide, a bar and clamping block in connection with said gage-block, means for clamping the same to said secondary slide at a point controlled by the position of said measuring plate and a series of combination forms in operative connection with said secondary slide, substantially as set forth.

47. The combination with a driver for advancing the type upon the race-way of the measuring slide 284, the measuring-bar 307, the measuring plate 327, slide 476, a clamping block arranged to slide thereon, gage-block 437, bar 436, means for holding the same in a given position against the action of a spring adapted to throw said gage-block and measuring-plate into engagement, a line-shaft normally at rest, means for causing its rotation upon actuating a line-key, means for releasing said gage-block and permitting it to engage with the measuring plate, means for clamping said clamping-block to the slide 476 when said gage-block and measuring-plate are in engagement, a slide 485 adapted to be actuated by said line-shaft, means for connecting said slide with the clamping-block, a rock-shaft in operative connection with the slide 476, lever arms upon said rock-shaft, a series of combination plates, and means for causing such of said plates as corresponds in numerical order to the number of words in a line, to be brought into operative connection with said lever arms, substantially as set forth.

48. In a type justifying machine, the combination of the serrated measuring-plate and gage-block, means for imparting a rapid engaging movement to the latter, and a yielding contact-plate for preventing the wear of the teeth consequent upon sudden impact, substantially as described.

49. The combination of a slide arranged to be actuated by the line-shaft the extent of movement of which slide is constant, a secondary slide arranged to be actuated by the first, a series of combination plates arranged to be brought into operative connection one by one, with said secondary slide, a measuring device for determining the length of an unjustified line of type, and means for transferring said measurement to said secondary slide, whereby the movement of the latter may be varied to conform to the varying measurement of the unjustified type-line, substantially as shown and described.

50. The combination in a type justifying machine, of a race-way, a driver for advancing the type thereon when set, a word-conveyer provided with projections or teeth which are separated from each other a distance of not less than the length of the longest word in the language, and means for actuating said conveyer as each word is set, substantially as shown and described.

51. The combination in a type justifying machine, of a race-way, a word-comb for advancing and maintaining the words separate thereon, means for actuating said word-comb, a space-case, a series of combination forms and co-acting mechanism for selecting and ejecting the spaces, and an extended movement comb for sweeping the words consecutively past the space-case, substantially as set forth.

52. The combination in a justifying machine, of a race-way, means for maintaining the words separate thereon pending the insertion of the spaces, combination forms for selecting the spaces, means for controlling said forms to conform to the measurement of the line, space-ejecting mechanism the selection of which is controlled by said forms, a setting galley, a bridge or gate thereover forming a continuation of the race-way, means for advancing the justified line thereon, and means for withdrawing said gate and depressing the line in the galley, substantially as set forth.

53. In a type justifying machine, a word-shaft normally at rest means for causing the same to make one revolution with the setting of each word, a series of combination forms arranged in groups representing the number of words and the line measurement respectively, and means in operative connection with said word-shaft for moving said groups of forms one by one into a given position, substantially as shown and described.

54. In a type justifying machine, a word-shaft normally at rest means for causing the same to make one revolution with the setting of each word, a series of combination plates consecutively arranged, each plate representing combinations corresponding to a given number of words in a line, and means in operative connection with said word-shaft for moving said plates step-by-step with each revolution of said word-shaft whereby a plate corresponding to a given number of words set is brought to an operative position, substantially as described.

55. In a type justifying machine, a word-shaft normally at rest, means for causing the same to make one revolution with the setting of each word, a series of combination plates arranged in consecutive order, each plate representing combinations adapted to select spaces for lines of a given number of words, means in operative connection with said word-shaft, for presenting each of said plates in its order in a given position as said shaft is rotated, a line-shaft, normally at rest, means for actuating said line-shaft upon the setting of a sufficient number of words to form a line, means for operatively connecting said line-shaft with the last plate presented by the revolution of said word-shaft, and a measuring device arranged to co-act with said line-shaft mechanism whereby said plate last mentioned may be so actuated as to cause the proper combination thereon to be brought into an operative position, substantially as set forth.

56. The combination in a type justifying machine, of a series of combination forms for determining the spaces in a line, a series of movable blocks having pins arranged to be abnormally set by means of said combination forms, space ejecting levers in proximity to said blocks the action of which is modified by means of said abnormally set pins, a type race-way, a space-case, a word-comb for maintaining the words separate and advancing the same upon the race-way, the number of teeth in which, from the first tooth to the space-case, corresponds to the number of blocks between the first section of combination forms and the space-ejecting levers, and means for advancing said blocks step-by-step and for actuating said word-comb intermittently in harmony therewith, whereby a given word may be advanced to the space-case in unison with the movement of a given block, substantially as shown and described.

57. The combination of the type race-way, 137, word-comb 147, means for imparting a four motion movement thereto, a space-case adjacent to the race-way, means for automatically ejecting the spaces therefrom in harmony with the movement of said word-comb, auxiliary word-comb 0148, means for imparting a movement thereto in harmony with, but greater in extent than that of the main comb, and an extended portion 0149, substantially as shown and described.

58. The combination with a race-way of a toothed word-comb having a main and extended portion, between which the regular teeth are omitted, means for imparting a four motion movement thereto, a space-case opposite the portion where said teeth are omitted, an auxiliary toothed portion opposite said space-case and means for imparting an extended movement thereto, substantially as described.

59. In a type justifying machine, the combination of a shaft normally at rest, means for connecting the same at the will of the operator with a continuously moving source of power, means for automatically stopping said shaft upon the completion of one revolution, a word-comb in operative connection with said shaft, a race-way and means for delivering the words thereon in operative proximity to said word-comb, substantially as described.

60. The combination with a word-shaft normally at rest, of means for actuating the same at the will of the operator, a race-way, a word-comb, and cams and levers for connecting the same with said word-shaft, whereby a four motion movement may be imparted to said word-comb with each revolution of said word-shaft, substantially as described.

61. In a type justifying machine, the combination of a race-way, a type driver having a constant movement, a measuring slide, means for imparting a four motion movement thereto and for bringing the same into engagement with the foremost type upon the advancement of each word, substantially as shown and described.

62. The combination of a race-way, means for advancing the type to a given point thereon, a measuring slide arranged to engage and be moved by the type, means for returning the same to a normal position and a stop for limiting the backward movement of said slide, said stop being located at an arbitrary distance back of the point of forward movement of said driver, whereby an arbitrary measurement corresponding to a given unit, may be added to the measurement of each word, substantially as described.

63. The combination of a race-way, means for advancing the type to a given point thereon, a measuring slide arranged to engage and be moved by the type, means for returning the same to a normal position, a stop located at a predetermined distance back of the point of forward movement of said driver for limiting the backward movement of said slide, and a movable stop and means for automatically interposing the same between said first mentioned stop and slide at a predetermined time, substantially as set forth.

64. The combination with a race-way, of a driver for advancing the type thereon to a given point, a measuring slide arranged beneath said race-way, means for imparting a four motion movement thereto, and suitable teeth upon said slide adapted to extend through suitable slots above the surface of said race-way to engage said type, substantially as set forth.

65. The combination in a type justifying machine of a race-way, a type driver for advancing the type to a given point thereon, a reciprocating measuring slide and an adjustable stop for limiting the backward movement of said slide, substantially as and for the purposes set forth.

66. In a type justifying machine, the combination of a type driver, a measuring slide arranged to be moved in one direction by the movement of the type, means for rapidly returning said measuring slide to a normal position, and an air cushion for cushioning the return movement of said slide, substantially as specified.

67. In a type justifying machine, the combination with a measuring slide of a lever for returning the same to a normal position, and a spring in conjunction therewith for imparting a yielding action thereto, substantially as described.

68. The combination in a type justifying machine, of a reciprocatory measuring slide adapted to be brought into contact with and moved forward by the type upon the setting of the respective words, of a roller for supporting one end of said slide, a secondary bar in operative connection with said measuring slide, a clamp, and means for automatically clamping said bar and slide to each other during the forward movement of the latter, substantially as described.

69. The combination of a word measuring slide and a line measuring bar tongued and grooved, respectively, as described, means for automatically clamping the one to the other during their forward movement, means for moving the former into contact with the type and means for connecting the latter with a series of combination forms, substantially as described.

70. The combination with the word measuring slide and line measuring bar of the spring actuated yoke 309 provided with rollers, means for moving said slide into contact with the type and means for connecting said bar with a series of movable combination forms, substantially as specified.

71. The combination of a word measuring slide, a line measuring bar, means for clamping the one to the other during their forward movement, a movable measuring plate in operative connection with said measuring bar, said plate having teeth arranged in a line oblique to the axis of said bar, and of a depth corresponding to a unit of measure of the type, and a toothed gage-block adapted to engage therewith, said block being in operative connection with a series of combination forms, substantially as described.

72. The combination with a line measuring device, arranged to move parallel with the race-way, of a measuring plate having teeth arranged in a line oblique to said race-way, the depth of the teeth of said plate corresponding to a unit of type measure and the length of which exceeds the depth, a gage-block having teeth corresponding to those of said measuring-plate and means for automatically causing said gage block to be brought into contact with said measuring-plate at the end of each line, substantially as set forth.

73. In a type justifying machine, the combination with the toothed measuring-plate 327, of a spring actuated gage-block having teeth corresponding thereto, means for retaining said block in a normal position, and means for automatically releasing the same at the will of the operator, substantially as shown and described.

74. In a type justifying machine, the combination with the toothed measuring-plate 327, of a spring actuated toothed gage-block, means for retaining said block in a normal position, means for automatically releasing the same at the will of the operator, and the yielding contact-plate 458, substantially as and for the purpose set forth.

75. In a type justifying machine, the combination with the measuring-plate 327 and gage-block 437, of a contact-plate 450, a spring for holding the same in a normal position, and means for automatically and positively withdrawing said contact-plate at a predetermined time, against the action of said spring, to permit the gentle engagement of the teeth of said measuring-plate and gage-block, substantially as described.

76. In a type justifying machine, the combination of the toothed measuring-plate 327, of a spring actuated toothed gage-block, means for retaining the same in a normal position, means for automatically releasing the same at the will of the operator, a clamp-block connected with said gage-block, a reciprocatory slide in operative proximity to said clamp-block, means for automatically clamping said block to said slide, an actuating slide having a constant movement, and means for connecting the same with said clamp-block, substantially as specified.

77. In a type justifying machine, a device for measuring the type, mechanism for determining the selection of the spaces, positively actuated mechanism having a constant extent of movement for actuating said space determining mechanism, and an intermediate automatic clamping mechanism in operative connection with said measuring device, whereby the type measurement may be caused to modify the extent of the resulting movement transmitted from said positively actuated mechanism, substantially as specified.

78. In a type justifying machine, the combination of a measuring plate 327, having teeth of a greater length than depth, a gage-plate arranged to co-act therewith, said gage-plate being provided with corresponding teeth, a clamp-block rigidly connected with said gage-plate, a slide in operative connection therewith, teeth upon said clamp-block and slide respectively the measurement of which corresponds to that of the length of the teeth of said measuring-plate, means for automatically clamping said block and slide to each other, a power actuated slide having a constant movement, in operative connection with said first mentioned slide, and means for connecting said first mentioned slide to a series of combination plates, substantially as described.

79. The combination of the slides 485 and 476, means for imparting a positive constant movement to the former, clamp-block 435, means for governing the position of the same by the measurement of the type, an automatic clamp, means for actuating said clamp-block by the movement of the slide 485, a lever in connection with the slide 476, and means for connecting the same with a series of space-determining combination forms, substantially as specified.

80. The combination with a measuring device arranged to control by the measurement of the type, the relative position of a clamping-block upon a slide, of the slide 485, having slots 486—487 therein, means for actuating said clamping-block by said slide 485, a line-shaft arranged to pass through the slot 486, cam 467, pins 483, 488 and 489, and slot 484, substantially as described.

81. In a type justifying machine, the combination of the slide 485, line-shaft 424, and cam 467 all arranged and constructed substantially as described.

82. The combination of the slides 485 and 476, the one constant and the other variable in its movement, means for actuating the latter by the former, and means for governing the extent of movement of the latter by the measurement of the type, substantially as described.

83. The combination with a slide in operative connection with a series of combination plates, of a clamp-block, means for automatically clamping the same to said slide, means for determining the position of said block to conform to the measurement of the type, a power-actuated slide having a fixed movement and means for causing the same to engage with said clamp-block,—whereby said first mentioned slide may be actuated a distance proportionate to the measurement of said type, substantially as described.

84. The combination of a slide in operative connection with a series of combination space-selecting forms, a clamp-block in operative connection with said slide, means for automatically and arbitrarily determining its position thereon by the measurement of the type, an automatic clamping device, a power actuated slide having a constant movement for engaging with said clamp-block, and an interposed air-cushion for cushioning the impact, substantially as specified.

85. The combination in a type justifying machine, of a series of space determining combination plates, means for automatically raising the same step-by-step with the setting of each word, and means, in operative connection with a type measuring device, for imparting horizontal movement to any one of said plates when brought to a registering position, substantially as specified.

86. The combination in a justifying machine, of a series of space-selecting combination plates, means for raising the same step-by-step with the setting of the respective words, a line-key and intermediate mechanism for automatically causing the horizontal forwarding and return of a plate when brought to a registering position, means for releasing said mechanism and permitting said plates to fall to a normal position, and an air cushion for easing the fall, substantially as set forth.

87. The combination in a type justifying machine, of mechanism for ascertaining the length of a line, a series of movable space determining combination forms in operative connection therewith, and controlled thereby, a series of pin-blocks arranged loosely upon a track, each block having a number of pins corresponding to the number of different spaces in the space-case, a word-key in operative connection with said pin-blocks, and combination-forms respectively, intermediate mechanism for actuating said pin-blocks and combinations with each depression of said key, means for temporarily locking said pin-blocks and mechanism for bringing the same into contact with said combination forms at the will of the operator, substantially as described.

88. The combination in a type justifying machine of mechanism for ascertaining the length of a line, a series of movable space determining combination forms in operative connection therewith and controlled thereby, a series of pin-blocks arranged loosely upon a track, each block having a number of pins corresponding to the number of different spaces in the space-case, a word-key in operative connection with said pin-blocks and combination-forms respectively, intermediate mechanism for actuating said pin-blocks and combinations with each depression of said key, means for temporarily locking said pin-blocks, a line-key and intermediate mechanism for causing a given combination-form to be brought to a registering position, and mechanism for automatically bringing said pin-blocks into contact with said combination-forms, substantially as described.

89. In a type justifying machine, the combination of a series of pin-blocks arranged upon a suitable way, each of said blocks being provided with a vertical and horizontal groove therein, forwarding and locking plates respectively having projections thereon adapted to engage said grooves, means for imparting a four motion movement to said forwarding plate, and means for imparting a vertical movement to said locking plate, substantially as shown and described.

90. The combination with a series of space determining combination forms, of a series of pin-blocks 333, having pins 334, adapted to be arbitrarily set by said forms, a race-way for sustaining said blocks, means for forwarding the same step-by step thereon, and a series of vibratory space selecting levers, the movement of which is adapted to be intercepted by said pins when set, substantially as shown and described.

91. In a type justifying machine, the combination of a race-way, a series of pin-blocks, a forwarding-plate and means for automatically actuating said forwarding-plate at the will of the operator, substantially as set forth.

92. In a type justifying machine, the combination of a race-way, the pin-blocks 333 grooved as described, forwarding-plate 344, locking-plate 346, and means for actuating said forwarding and locking plates respectively, substantially as described.

93. The combination of a word-key, a word-shaft normally at rest, a continuously rotating shaft, an intermediate automatic clutch, a race-way, a series of pin-blocks 333, arranged loosely thereon, forwarding plate 344, locking plate 346, and intermediate mechanism in operative connection with said line-shaft for actuating said locking and forwarding plates, substantially as described.

94. The combination in a type justifying machine of an endless race-way, a series of movable pin-blocks, a movable portion upon said race-way, means for actuating said movable portion at the will of the operator, a series of combination forms in operative proximity to said movable portion, and means for causing a given combination to register with said pins, whereby the movement into an abnormal position of said movable portion of the race-way may cause certain of said pins to be arbitrarily set, substantially as specified.

95. In a type justifying machine, the combination of an endless race-way, a series of pin-blocks 333, means in operative connection with a word-key for actuating said pin-blocks step-by-step, a movable portion upon said race-way, and means, substantially as specified, for causing said blocks to register with said movable portion, substantially as set forth.

96. In a type justifying machine, the combination of an endless race-way, a series of pin-blocks, means for forwarding the same upon said race-way, means for bringing said pins into contact with a series of combination forms whereby one or more of said pins may be abnormally set, and means for positively returning said pins to a normal position, substantially as specified.

97. In a type justifying machine, the combination of an endless race-way, pin-blocks 333, having pins 334, means for bringing said pins into contact with a series of space determining combination forms, space selecting levers arranged to vibrate in operative proximity to said pins when set, and the cam surface 330⁰, for returning said pins to abnormal positions, substantially as described.

98. The combination of a pivoted frame in operative connection with the word-shaft, of a series of space selecting levers pivoted upon said frame, springs for holding said levers in a normal position with reference to said frame, a series of pin-blocks, means for bringing said blocks one by one in the path of movement of said levers with each revolution of the word-shaft, a series of space-ejecting plungers arranged to be initially moved by said levers, and means for positively forwarding and returning said plungers when initially moved, substantially as described.

99. The combination of the pivotally mounted frame 578, word-shaft 266, in operative connection therewith, a series of levers pivoted in said frame at or near their middle, springs for holding the same normally in a given position, movable pin-blocks 333, means for moving the same one by one in front of said levers, space ejecting plungers arranged to be initially moved by said levers, a space-case, and means for positively actuating said plungers, substantially as described.

100. The combination with a series of blocks 333, a race-way for sustaining and guiding the same, independent movable pins 334, a series of levers 588, corresponding in number to said pins and arranged to vibrate in a suitable frame, projections 590, adapted to be brought into contact with said pins when abnormally set, space ejecting plungers, means for forwarding and returning the same, and a space-case adapted to contain spaces of different widths and corresponding in number to the number of said levers, substantially as set forth.

101. The combination with the pin-blocks 333 and initial space ejecting plungers, of the vibratory frame 578 and the selecting levers 588, substantially as described.

102. The combination with a series of movable pin-blocks, a race-way for supporting the same, means for abnormally setting the pins therein to conform to the length of an unjustified line of type, a space-case, space-ejecting levers adapted to be controlled by said pins, space-ejecting mechanism in operative proximity to said levers, a type-race-way, a word-comb for advancing the type thereon, a word-key, a word-shaft and intermediate mechanism controlled thereby, whereby said pin-blocks may be intermittently advanced in harmony with the movement of said word-comb, substantially as described.

103. The combination with a measuring-slide and line-key, of a special stop in operative connection with said line-key, for arresting the movement of said measuring-slide a distance corresponding to the width of an ordinary space, away from its normal position, substantially as and for the purposes set forth.

104. The combination with a measuring-slide of the stop 282, and special stop 015, in operative connection with the line-key, substantially as described.

105. In a type justifying machine, the combination of a race-way, means for advancing the type thereon, a galley, a movable gate arranged to form a continuation of the race-way, a slide arranged to be actuated by the foremost type as the line is advanced, positively acting mechanism for depressing the line, and automatic mechanism interposed between said slide and said positive acting mechanism, whereby the latter may be brought into action to withdraw the gate and depress the line, substantially as described.

106. The combination with a galley, of a word-comb for advancing the line to the galley, automatic depressing mechanism for depressing the line therein, a movable gate for temporarily sustaining the line, and means for holding said line when advanced upon the gate, in registry with the galley, substantially as set forth.

107. The combination in a type justifying machine, of a race-way, a word-comb for advancing the type thereon, a setting galley having a movable gate adapted to form a continuation of said race-way, and a vertically movable gate in operative connection with the word-comb moving mechanism and arranged to operate in harmony with the word-comb, substantially as set forth.

108. The combination with a galley of a slide for indicating the length of a line of type when advanced into the galley, line depressing mechanism, and intermediate connecting mechanism for automatically initiating the action of said line depressing mechanism, substantially as shown and described.

109. The combination with a galley, of means for advancing the type therein from a race-way, normally disconnected line depressing mechanism, and means for connecting the same with a source of power and bringing it into action by the movement of the type in the galley, substantially as described.

110. The combination with a galley of line depressing mechanism, means for initiating the action thereof by the advancement of the line, and means for preventing said action when the line is either too short or too long to register with the galley.

111. The combination with a galley of a movable gate forming a continuation of the race-way, and line depressing mechanism, means for initiating the action of said gate and line depressing mechanism by the advancement of the line of type, and means for preventing said action when the line is either too short or too long, substantially as specified.

112. The combination with a race-way, a word-comb and galley, of the vertically movable slide 632 having teeth 633, arranged to pass between and to be flush with the end teeth of the word-comb when forwarded to its extreme limit, whereby a temporary abutment may be formed for the type, substantially as specified.

113. The combination of a race-way, a galley, a movable gate in said galley adapted to form a continuation of said race-way, means for forwarding the type upon said gate, line depressing mechanism, a slide in the line of movement of the type, a lever adapted to be actuated by said slide, a spring for holding the same in a normal position, a slide in operative connection with the word-shaft, a secondary slide in operative connection with said gate and line depressing mechanism respectively, a gravity latch adapted to connect said two last mentioned slides, means for raising said latch and means in operative connection with the lever for preventing the fall and consequent engagement of said latch until the end of the line of type is caused to register with the walls of the galley, substantially as shown and described.

114. The combination with a galley of a movable horizontal gate forming a continuation of the race-way, means for advancing the type thereon, a line depressing mechanism normally at rest, a slide normally at rest in operative connection with said gate and line depressing mechanism respectively, a slide in operative connection with the word-shaft, an intermediate mechanism adapted to be actuated by the line of type when advanced upon said gate, which mechanism is fitted to cause the operative connection of said slides when the line is of a proper length to register with the galley, substantially as specified.

115. In a type justifying machine, the combination with a galley of the gate 617, slide 614, having the head 615, levers 618, 622, in operative connection with each other, a spring for holding them in a normal position, slides 635, 646, means for actuating the latter upon the setting of each word, a spring catch for temporarily holding the lever arm 622, in any one of three different positions, latch 636, a projection thereon adapted to register with a notch in the end of the arm 622, when the latter is held by said spring catch midway between its two extreme positions, means for lifting said latch and a line depressing mechanism in operative connection with the slide 635, substantially as described.

116. In a type justifying machine, the combination with a type measuring device, of an indicator for indicating to the operator when the line is of proper length to conform to column measure.

117. The combination with the line measuring-bar 307, of a scale, a movable pointer and intermediate mechanism whereby the measurement of the line may be indicated to the operator, substantially as described.

118. The combination with the line-measuring bar 307, of a scale, a movable pointer normally at rest, and intermediate mechanism for actuating the pointer by the line-measuring bar when the line is nearly completed, substantially as described.

119. The combination with the line measuring bar 307, of a scale, a movable pointer, an alarm, an intermediate mechanism for actuating said pointer and alarm, substantially as described.

120. In a type justifying machine, the combination of a type measuring device, an indicator for indicating to the operator when the line has reached its proper length, a series of space determining combination forms, means for actuating the same in harmony with said type measurement, a line-key and intermediate mechanism for causing said forms to be automatically actuated at the will of the operator, substantially as described.

121. The combination in a type justifying machine, of a gage-block for transferring the measurement of the type, a line measuring-bar, means for normally locking said gage-block, and means in operative connection with said line measuring-bar for releasing said locking device, substantially as shown and described.

122. The combination of a line-key, a series of movable space determining combination forms, intermediate mechanism for actuating the same, a type measuring device, a gage-block and connecting mechanism for transferring said measurement to said combination forms, means for normally and automatically locking said gage-block, and means for automatically releasing said gage-block at a predetermined time whereby, in case said line-key is depressed at an improper time, it may fail to actuate said combination forms, substantially as described.

123. The combination of the measuring-bar 307, spring-actuated rock-shaft 677, having arms 678, 679, constructed substantially as described, pin 033, and bar 436, having a notch therein adapted to be engaged by the arm 679, substantially as specified.

124. The combination with an automatic type justifying machine having intermittently acting mechanism and a regular and continuously acting source of power, of a source of electricity, suitable electrical connections, an electro magnet interposed in the electric circuit, the armature of which is in operative connection with clutching mechanism arranged to connect said continuously moving with said intermittently moving parts, an automatic circuit maker and breaker adapted to close a given break in the circuit at regular intervals, and a circuit maker and breaker under the control of the operator, substantially as shown and described.

125. The combination with an automatic type justifying machine having intermittently acting mechanism and a regular and continuously acting source of power, of means for initiating the action of said intermittently acting mechanism, a lock for normally locking said initiating mechanism, a source of electricity, suitable electrical connections, an electro-magnet interposed in the electric circuit, the armature of which is in operative connection with said lock, clutching mechanism arranged to connect said continuously moving with said intermittently moving parts, an automatic circuit maker and breaker adapted to close a break in the circuit at regular intervals, and a circuit maker and breaker under the control of the operator, substantially as shown and described.

126. In an automatic justifying machine, the combination with continuously acting mechanism and intermittently acting auxiliary mechanism adapted to be driven thereby, of a source of electricity having suitable electrical connections, a normally open circuit closing device interposed in said circuit arranged to make and break said circuit continuously at regular intervals in harmony with the driving impulse of the machine, an electro-magnet having an armature in operative connection with suitable starting mechanism, an independent circuit closing device and a supplemental circuit in connection therewith and with said magnet whereby the magnet may be automatically retained in a closed circuit during a predetermined time, substantially as shown and described.

127. The combination in an automatic justifying machine, of a continuously moving driving power, mechanisms normally at rest for accomplishing the necessary intermittent movements in connection with the justification of the type, means for operatively connecting the two at the volition of the operator, and an electrical time-lock in operative connection therewith whereby said portion or portions of the machine as are normally at rest may be caused to act in harmony with the continuously moving mechanism, substantially as set forth.

128. The combination in a type justifying machine having continuously and intermittently acting mechanisms, of an electrical time-lock for controlling the time of movement of the type ejecting mechanism, an electrical time-lock for controlling the action of the intermittently moving justifying mechanism, means for actuating said first named time-lock separately, and means for actuating both of said time-locks when desired, by a single impulse common to both, substantially as described.

129. The combination in a type justifying machine having continuously and intermittently movable co-acting parts, of a main electro-mechanical time-lock for controlling the time at which the type may be ejected, said main time-lock being in operative connection with the character-selecting keys, a secondary time-lock for controlling the time at which the main justifying mechanism may be brought into action, a word-key in operative connection with said secondary time-lock, and a common mechanism for automatically returning the parts connected with said selecting keys and word-key respectively to their normal positions with each impulse of the machine, substantially as set forth.

130. In a type justifying machine, the combination with a continuously acting source of power, of a series of character selecting keys, lever-arms in connection therewith for initiating the action of the type ejecting plungers, a returning bar in proximity to said levers for returning the latter from an abnormal to a normal position, intermediate mechanism in connection with a clutch-member normally at rest for actuating said returning-bar, a continuously revolving clutch member adapted to engage said first clutch member, spring actuated mechanism for throwing the same into engagement, a lock for preventing said action, a source of electricity, suitable electrical connections, an electro-magnet having its armature in operative connection with said lock, mechanism in connection with said clutch for restoring said returning-bar to a normal position, a word-key, a word-shaft, intermediate clutching mechanism in operative connection with said word-key, a lock for normally preventing the action of said word-shaft clutching mechanism, an electro-magnet for releasing said lock, means for connecting the same with a source of electricity, an automatic circuit maker and breaker adapted to act with each impulse of the machine, and a circuit maker and breaker interposed in said circuit and in operative connection with said word-key, substantially as shown and described.

131. The combination in a type justifying machine, of a continuously moving main mechanism, intermittently moving auxiliary mechanism, intermediate clutching mechanism, a source of electricity, an electro-magnet for controlling the action of said clutch, a continuously revolving circuit maker and breaker interposed in said circuit, a word-key, and a secondary circuit maker and breaker in operative connection therewith, substantially as described.

132. The combination in a type justifying machine having continuously and intermittently movable co-acting parts, of a main electro-mechanical time-lock for determining the time at which the type may be ejected, said main time-lock being in operative connection with the character-keys, a word-shaft and line-shaft normally at rest, clutch mechanism for connecting said word-shaft with the main driving-power, a word-key and intermediate mechanism for connecting the same with said word-shaft clutch, an electrical time-lock for causing said word-shaft clutch to be brought into action, a line-shaft clutch mechanism interposed between the same and said word-shaft, mechanism in operative connection with said line-key for causing the clutching of said line-shaft, a source of electricity, electro-magnets adapted to release each of said time-locks, a rotary circuit maker and breaker arranged to revolve in harmony with the impulse of the machine, and a circuit maker and breaker in operative connection with said line-key, substantially as shown and described.

133. The combination of continuously moving mechanism, mechanism normally at rest, intermediate clutching mechanism, a source of electricity, an electro-magnet for controlling the action of said clutching mechanism, a revoluble circuit maker and breaker adapted to act continuously and in harmony with the impulse of the machine, a circuit maker and breaker under the control of the operator, and a secondary circuit adapted to be closed by the action of said magnet, whereby a spasmodic and imperfect action may be avoided, substantially as shown and described.

134. In a type justifying machine the combination with a continuously moving source of power of the intermittently acting setting mechanism, intermittently acting justifying mechanism, magnets 2 and 00 respectively, electrical circuits connected therewith and with a source of electrical energy, a continuously acting automatic circuit maker and breaker common to both of said circuits, a series of selecting keys, a circuit maker and breaker in connection therewith adapted to be actuated at the will of the operator upon the depression of one or more of said selecting keys to close the circuit with said magnet 2, a word-key, a circuit maker and breaker in connection therewith adapted to close the circuit with both of said magnets, and intermediate clutching mechanism adapted to be controlled by the armatures of said magnets for bringing said intermittently movable parts into action, substantially as described.

135. The combination of a word-shaft, normally at rest, a continuously acting source of power, a clutch for connecting said word-shaft with said source of power, an electric time-lock for controlling the action of said clutch, electrical connections connected with said word-key for causing the action of said time-lock, returning-bar 188, a word-key, lever-arms 202, 205, means for connecting the former with said word-key and with said word-shaft clutch mechanism, and a series of selecting-keys in operative connection with said returning-bar, substantially as specified.

136. The combination in a type justifying machine, of a continuously acting source of power, type ejecting plungers, mechanism for initiating the action thereof, a returning-bar a series of selecting keys in operative connection with said returning-bar, a word-shaft and line-shaft respectively, normally at rest, clutch mechanism for connecting the same with the continuously moving parts, a word-key and line-key respectively, each in operative connection with said returning-bar, an electrical time-lock in operative connection with the selecting keys, for controlling the intermittent action of the type ejecting plungers, an electric time-lock in operative connection with the word and line keys respectively for controlling the action of the word-shaft clutch, a source of electricity, suitable electrical connections, a dog or bolt for locking said returning-bar, an electro-magnet for actuating the same, and means for exciting said magnet upon the depression of the word-key, substantially as described.

137. The combination with a continuously moving source of power, of the word-shaft 266, a word-key, an automatic clutch mechanism in operative connection therewith and means for suddenly and positively releasing said clutch upon the completion of a single revolution of said word-shaft, substantially as described.

138. The combination with a continuously acting source of power of the word-shaft 266, an intermediate clutch mechanism, a key for causing the same to be brought into action, means for releasing said clutch upon making a single revolution and an air cushion for relieving the impact incident to the sudden starting and stopping of said clutch, substantially as specified.

139. The combination of the word-key, the lever 246—247, in operative connection therewith, the continuously revolving gear 250, having pins 251—251, disk 264, constructed as described, lever arms 258, 259, sliding block 265, and means rigidly attached to the word-shaft, for engaging said block when projected, substantially as described.

140. The combination with the movable block 265 and means in operative connection with a key for actuating the same, of the part 267, rigidly attached to the word-shaft, contact lug 271, upon a lever pivotally attached to the part 267, a piston and cylinder in operative connection therewith, and adjustable openings for admitting air to said cylinder, substantially as described.

141. The combination with a continuously moving source of power of a word-shaft, a word-shaft clutch and a cushioned or yielding contact lug in operative connection therewith, substantially as described.

142. The combination with a continuously moving source of power of a word-shaft, a word-shaft clutch, a movable contact lug, means for engaging said lug to start said shaft, a banking for engaging the same to stop said shaft and means for cushioning the movement of said contact lug in both directions, substantially as described.

143. The combination of the gravity arm 259 having the pin 260, said arm being in operative connection with the finger-key, of the disk 264, flange 278, movable block 265 having the part 0265, a cushioned movable contact lug 271, attached to a frame-piece rigidly secured to the word-shaft, and means for limiting the movement of said contact-lug, substantially as described.

144. The combination with a word-shaft, of a clutch, one member of which is provided with a cushioned contact lug and means for positively limiting the movement of said lug, substantially as described.

145. The combination with a word-shaft, of a clutch, one member of which is provided with an elastic or yielding contact-lug the movement of which is cushioned in opposite directions, and an automatically movable banking for engaging said lug to stop the same, substantially as described.

146. The combination with the word-shaft 266, of a clutch, one member of which is provided with an elastic or yielding contact-lug the movement of which is cushioned in opposite directions, the pivoted arms 274, 276, 277, and means for automatically tilting said arms, substantially as described.

147. The combination with the word-shaft, of a clutch having a movable contact-lug, means for positively limiting the movement of said lug, and a double acting air-cushion in operative connection therewith, whereby the inertia may be overcome without shock in starting and stopping said shaft, substantially as specified.

148. The combination with a word-key of a word-shaft clutch, a lever in operative connection therewith for initiating the action of said clutch, electro-magnet 00, a source of electricity, an electrical connection therewith and with said magnet, arm 248, having a circuit maker and breaker adapted to close a break in the circuit with said electro-magnet, arm 234, having an armature attached thereto in operative proximity to said magnet and a circuit maker and breaker interposed in said circuit adapted to close the same at regular intervals, substantially as described.

149. The combination with the lever arm 247, ratchet wheel 19, an electric circuit, a source of electricity, contact spring 21, electro-magnet 24, an automatic circuit maker and breaker adapted to close the circuit at regular intervals, returning-bar 188, having a projection 198 in operative proximity to a dog 011, attached to the armature of the magnet 24, and the special word-key 23, also interposed in said circuit, substantially as described.

150. The combination with the word-key rod 183 of the special word-key 23, and intermediate connections, whereby upon actuating said word-key to break the electric circuit and release the returning-bar, the word-key rod may be simultaneously actuated, substantially as described.

151. The combination with the special word-key of the two-part word-key bar and means for automatically locking the forward portion when the special word-key is actuated, substantially as set forth.

152. The combination in a type justifying machine, of a word-shaft, means for actuating the same, a line-shaft normally at rest, a clutch mechanism for connecting said line-shaft with a source of power, a line-key in operative connection with and adapted to initiate the action of said word-shaft, mechanism in operative connection with said word-shaft for initiating the action of said line-shaft clutch and a spring catch in operative connection with said line-key, for holding the same in an inoperative position against the action of a spring, substantially as described.

153. The combination, in a type justifying machine, of a word-shaft and line-shaft respectively, each of which, being normally at rest, is adapted to be brought into action and make a single revolution, the action of said line-shaft being controlled by mechanism in operative connection with said word-shaft, substantially as described.

154. The combination of a word-shaft and line-shaft, the action of the latter being controlled by that of the former, and means for bringing the former into action without actuating the latter, substantially as specified.

155. The combination with the line-shaft 424, of a primary clutch-member attached rigidly to said shaft, a secondary clutch-member in operative proximity to the first and attached to a shaft adapted to rotate continuously, a radially movable bolt secured in said primary clutch-member, a stop in engaging proximity to the outer end of said bolt when the latter is projected outwardly, a lug upon said secondary clutch-member in engaging proximity to the inner end of said bolt when the latter is projected inwardly, a stationary cam having a groove therein in operative connection with said bolt, said groove being so constructed as to permit said bolt to be projected inwardly into engagement with said secondary clutch-member at the beginning of the revolution of said primary clutch-member, and outwardly at the end of said revolution, and automatic means in operative connection with the line-key for actuating said bolt, substantially as described.

156. The combination with the disk or clutch-member 413, rigidly attached to the line-shaft, of a clutch-member in operative connection with a continuously rotating shaft, said clutch-member having one or more contact-lugs 423, bolt 416, a stationary cam having the groove 418, with rise $418^0$, means, such as the pin 417 for connecting said bolt with said groove, stop 425, arm 411, cam 410 and pin 408, in operative connection with the line-key, substantially as described.

157. The combination with the line-shaft of the disk 413, means for causing the same to start and stop at a given point after having completed one revolution, cam 0413, lever 0414, tilting arm 378, spring-catch 377, in operative connection with the line-key, and intermediate spring actuated mechanism for initiating the action of the line-shaft clutch, such mechanism being connected with the lever 0414, whereby said mechanism may be returned to its normal position by the revolution of the line-shaft, substantially as described.

158. In a type justifying machine, the combination with the disk 413, radially movable bolt 416 and stationary cam 418, having rise $418^0$, of a secondary clutch-member having contact-lugs 423, 423, bolt 0420, and cam groove 0419, in operative connection therewith, substantially as described.

159. The combination with the line-shaft 424, of the disk 413, bolts 416, 0420, stationary cam grooves 418, 419, a secondary continuously rotating clutch-member adapted to be engaged by said bolts, stop 425, and means, in operative connection with the line-key, for actuating the bolt 416, substantially as described.

160. The combination in a type justifying machine of a word-shaft and line-shaft normally at rest, means for bringing the same into operative connection with a continuously moving source of power, and means for delaying the action of said line-shaft for a definite period after said word-shaft is brought into action, substantially as described.

161. The combination in a type justifying machine of a main setting type-driver, an auxiliary type-driver, a word-shaft normally at rest for controlling the mechanism relating to the words, means, under control of the operator, for connecting said word-shaft with a continuously moving source of power, and means for delaying the action of said word-shaft until the type set out by a given impulse of the setting mechanism, are delivered to the auxiliary driver, substantially as described.

162. The combination in a type justifying machine of a word-shaft normally at rest for actuating mechanism relating to the words, a line-shaft normally at rest, for actuating mechanism relating to the line, means for actuating one or the other of said shafts at the will of the operator, and means for automatically locking the starting mechanism of the line-shaft for a predetermined time after starting said word-shaft, substantially as described.

163. The combination of a word-shaft, a word-comb and word-key, respectively, in operative connection therewith, a line-shaft, a line-key and intermediate mechanism for actuating said shaft, a movable obstruction in operative connection with said word-key for preventing the action of the line-key actuating mechanism when said word-key is depressed, means for moving said obstruction one step away from a normal inoperative position with each depression of the word-key, and means, in operative connection with the word-shaft, for returning said obstruction one step toward a normal position with each revolution of said word-shaft, whereby the action of the line-key may be withheld until the completion of the movements of the word-shaft mechanism incident to a rapid successive depression of the word-key, substantially as described.

164. The combination with the spring-actuated escapement bolt 385, having notch 391, with the arm 378, ratchet mechanism in operative connection with the word-key for releasing said bolt step by step, and mechanism in operative connection with the word-comb for returning said escapement bolt a corresponding distance with each forward movement of said word-comb, substantially as described.

165. The combination in a type justifying machine, of type setting and justifying mechanism, the latter of which is normally at rest, of locking mechanism for locking the selecting keys, a source of electricity, a normally open electric circuit, an electro-magnet interposed therein for actuating said locking mechanism, a line-key and a suitable circuit maker and breaker in operative connection therewith, whereby the depression of said line-key may cause the simultaneous locking of said character-keys, substantially as described.

166. The combination in a type justifying machine, of type setting and justifying mechanism, the latter of which is normally at rest, of locking mechanism for locking the selecting keys, a source of electricity, a normally open electric circuit, an electro-magnet interposed therein for actuating said locking mechanism, a line-key for initiating the action of the mechanism relating to the line, a circuit maker and breaker in operative connection with said line-key, and means for automatically breaking the circuit upon the completion of the movement of the mechanism relating to said line, substantially as specified.

167. The combination in a type justifying machine, of a lock for locking the character keys, an electro-magnet for actuating said lock, a source of electricity, an electric circuit, a line-measuring device, and a circuit maker and breaker in operative connection therewith, whereby said circuit may be closed when said line shall have reached a given limit, substantially as described.

168. The combination with the word-key of the ratchet-bar 0244, means for actuating the same step by step by the movement of said word-key, and a detent upon said ratchet-bar adapted to engage a notch in the line-key rod, whereby said line-key may be locked until a given number of words are set, substantially as described.

169. The combination with a word-key of a ratchet, means for actuating the same step by step with each depression of said word-key, a lock for locking the selecting keys, a source of electricity, an electric circuit, an electro-magnet interposed therein, an armature of which is in operative connection with said lock and a circuit closing device controlled by said ratchet, whereby the character keys may be locked when a given number of words are set, substantially as described.

170. The combination with a word-key, of a ratchet, means for actuating the same step by step with each depression of said word-key, a lock for locking the selecting-keys, a source of electricity, an electric circuit, an electro-magnet interposed therein, the armature of which is in operative connection with said lock, a circuit closing device under the control of said ratchet-wheel, which device is adapted to close said circuit upon the setting of a given number of words, and a special line-key with means in operative connection therewith for breaking said circuit at the will of the operator, substantially as described.

171. The combination with a word-key of a special em-quad key adapted to actuate said word-key, but so connected that the word-key may be depressed without actuating said em-quad key, substantially as specified 172. A type justifying machine in which mechanisms relating to the words and requiring to be operated at a given time are directly actuated or controlled by a revoluble word-shaft normally at rest, and mechanisms relating to the line are directly actuated or controlled by a revoluble line-shaft normally at rest,—said word and line shafts respectively being arranged to act in harmony with respect to each other, and being provided with automatic means, subservient to the will of the operator, for bringing one or both into operative connection with a continuously moving source of power, whereby all the elements to be operated at any one time during the movements of said shafts or either of them, may be actuated as a unit and in perfect accord, substantially as described.

In testimony whereof we have signed this specification, in the presence of two subscribing witnesses, this 9th day of February, 1893.

JAMES W. PAIGE.
CHARLES R. NORTH.

Witnesses:
DAVID H. FLETCHER,
ARMINTA S. KILBOURN.